(12) United States Patent
Bujotzek et al.

(10) Patent No.: US 12,466,889 B2
(45) Date of Patent: Nov. 11, 2025

(54) ANTI-HLA-G ANTIBODIES AND USE THEREOF

(71) Applicant: Hoffmann-La Roche Inc., Little Falls, NJ (US)

(72) Inventors: Alexander Bujotzek, Munich (DE); Alejandro Carpy Gutierrez Cirlos, Munich (DE); Anne Freimoser-Grundschober, Zurich (CH); Carina Hage, Penzberg (DE); Thomas Hofer, Zurich (CH); Silke Kirchner, Penzberg (DE); Meher Majety, Munich (DE); Ekkehard Moessner, Kreuzlingen (CH); Christiane Neumann, Schlieren (CH); Christian Spick, Seeshaupt (DE); Georg Tiefenthaler, Sindelsdorf (DE); Thomas Weindl, Lenggries (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 0 days.

(21) Appl. No.: 18/047,605

(22) Filed: Oct. 18, 2022

(65) Prior Publication Data

US 2023/0159642 A1 May 25, 2023

Related U.S. Application Data

(63) Continuation of application No. 17/644,525, filed on Dec. 15, 2021.

(30) Foreign Application Priority Data

Dec. 17, 2020 (EP) .................................... 20214951
Oct. 18, 2021 (EP) .................................... 21203272

(51) Int. Cl.
  *C07K 16/28* (2006.01)
  *A61P 35/00* (2006.01)

(52) U.S. Cl.
  CPC .......... *C07K 16/2833* (2013.01); *A61P 35/00* (2018.01); *C07K 2317/31* (2013.01);
  (Continued)

(58) Field of Classification Search
  CPC ............ C07K 16/2833; C07K 2317/31; C07K 2317/52; C07K 2317/56; C07K 2317/565; A61P 35/00
  See application file for complete search history.

(56) References Cited

U.S. PATENT DOCUMENTS 4,676,980 A  6/1987 Segal et al.
4,816,567 A  3/1989 Cabilly
(Continued)

FOREIGN PATENT DOCUMENTS

CN  1308675 A  8/2001
CN  1718588 A  1/2006
(Continued)

OTHER PUBLICATIONS

Chen et al., Enhancement and destruction of antibody function by somatic mutation: unequal occurrence is controlled by V gene combinatorial associations. Embo J. Jun. 15, 1995;14(12):2784-94. (Year: 1995).*

(Continued)

*Primary Examiner* — Aurora M Fontainhas
*Assistant Examiner* — Selam Berhane

(57) ABSTRACT

The present invention relates to antibodies that bind to human HLA-G, multispecific antibodies thereof, their preparation, formulations, and methods of using the same.

91 Claims, 21 Drawing Sheets

Specification includes a Sequence Listing.

(52) U.S. Cl.
CPC ...... *C07K 2317/52* (2013.01); *C07K 2317/56* (2013.01); *C07K 2317/565* (2013.01)

(56) References Cited

U.S. PATENT DOCUMENTS

| | | | |
|---|---|---|---|
| 5,208,020 | A | 5/1993 | Chari et al. |
| 5,416,064 | A | 5/1995 | Chari et al. |
| 5,500,362 | A | 3/1996 | Robinson |
| 5,591,828 | A | 1/1997 | Bosslet et al. |
| 5,624,821 | A | 4/1997 | Winter et al. |
| 5,635,483 | A | 6/1997 | Pettit et al. |
| 5,648,237 | A | 7/1997 | Carter |
| 5,648,260 | A | 7/1997 | Winter et al. |
| 5,712,374 | A | 1/1998 | Kuntsmann et al. |
| 5,714,586 | A | 2/1998 | Kunstmann et al. |
| 5,731,168 | A | 3/1998 | Carter |
| 5,739,116 | A | 4/1998 | Hamann et al. |
| 5,750,373 | A | 5/1998 | Garrard et al. |
| 5,767,285 | A | 6/1998 | Hamann et al. |
| 5,770,429 | A | 6/1998 | Lonberg et al. |
| 5,770,701 | A | 6/1998 | McGahren et al. |
| 5,770,710 | A | 6/1998 | McGahren et al. |
| 5,773,001 | A | 6/1998 | Hamann et al. |
| 5,780,588 | A | 7/1998 | Pettit et al. |
| 5,789,199 | A | 8/1998 | Joly et al. |
| 5,821,337 | A | 10/1998 | Carter et al. |
| 5,840,523 | A | 11/1998 | Simmons et al. |
| 5,869,046 | A | 2/1999 | Presta et al. |
| 5,877,296 | A | 3/1999 | Hamann et al. |
| 5,959,177 | A | 9/1999 | Hein et al. |
| 6,040,498 | A | 3/2000 | Stomp et al. |
| 6,075,181 | A | 6/2000 | Kucherlapati et al. |
| 6,150,584 | A | 11/2000 | Kucherlapati et al. |
| 6,171,586 | B1 | 1/2001 | Lam et al. |
| 6,248,516 | B1 | 6/2001 | Winter et al. |
| 6,267,958 | B1 | 7/2001 | Andya et al. |
| 6,417,429 | B1 | 7/2002 | Hein et al. |
| 6,420,548 | B1 | 7/2002 | Vezina et al. |
| 6,630,579 | B2 | 10/2003 | Chari et al. |
| 6,737,056 | B1 | 5/2004 | Presta |
| 6,982,321 | B2 | 1/2006 | Winter |
| 7,041,870 | B2 | 5/2006 | Tomizuka et al. |
| 7,087,409 | B2 | 8/2006 | Barbas, III et al. |
| 7,125,978 | B1 | 10/2006 | Vezina et al. |
| 7,189,826 | B2 | 3/2007 | Rodman |
| 7,332,581 | B2 | 2/2008 | Presta |
| 7,371,826 | B2 | 5/2008 | Presta |
| 7,498,298 | B2 | 3/2009 | Doronina et al. |
| 7,521,541 | B2 | 4/2009 | Eigenbrot et al. |
| 7,527,791 | B2 | 5/2009 | Adams et al. |
| 7,695,936 | B2 | 4/2010 | Carter et al. |
| 11,591,397 | B2 | 2/2023 | Freimoser-Grundschober et al. |
| 11,608,376 | B2 | 3/2023 | Georges et al. |
| 11,672,858 | B2 | 6/2023 | Freimoser-Grundschober et al. |
| 11,780,920 | B2 | 10/2023 | Freimoser-Grundschober et al. |
| 2003/0232051 | A1 | 12/2003 | Long et al. |
| 2005/0014934 | A1 | 1/2005 | Hinton et al. |
| 2005/0079574 | A1 | 4/2005 | Bond |
| 2005/0119455 | A1 | 6/2005 | Fuh et al. |
| 2005/0163770 | A1 | 7/2005 | Reiter |
| 2005/0260186 | A1 | 11/2005 | Bookbinder et al. |
| 2005/0266000 | A1 | 12/2005 | Bond et al. |
| 2006/0025576 | A1 | 2/2006 | Miller |
| 2006/0104968 | A1 | 5/2006 | Bookbinder et al. |
| 2007/0020703 | A1 | 1/2007 | Menier et al. |
| 2007/0061900 | A1 | 3/2007 | Murphy et al. |
| 2007/0071675 | A1 | 3/2007 | Wu et al. |
| 2007/0117126 | A1 | 5/2007 | Sidhu et al. |
| 2007/0160598 | A1 | 7/2007 | Dennis et al. |
| 2007/0237764 | A1 | 10/2007 | Birtalan et al. |
| 2007/0259403 | A1 | 11/2007 | Miyagawa et al. |
| 2007/0292936 | A1 | 12/2007 | Barthelemy et al. |
| 2008/0069820 | A1 | 3/2008 | Fuh et al. |
| 2009/0002360 | A1 | 1/2009 | Chen et al. |
| 2011/0142864 | A1 | 6/2011 | Dengjel |
| 2014/0051834 | A1 | 2/2014 | Hoffman et al. |
| 2017/0355756 | A1* | 12/2017 | Julien ..................... A61P 25/00 |
| 2020/0102389 | A1 | 4/2020 | Fischer et al. |
| 2020/0199234 | A1 | 6/2020 | Georges et al. |
| 2020/0270347 | A1 | 8/2020 | Freimoser-Grundschober et al. |
| 2021/0147553 | A1 | 5/2021 | Dengl et al. |
| 2021/0147554 | A1 | 5/2021 | Dengl et al. |
| 2021/0403562 | A1 | 12/2021 | Freimoser-Grundschober et al. |
| 2022/0010014 | A1 | 1/2022 | Freimoser-Grundschober et al. |
| 2022/0213199 | A1 | 7/2022 | Bujotzek et al. |
| 2022/0259318 | A1 | 8/2022 | Bujotzek et al. |
| 2023/0277662 | A1 | 9/2023 | Freimoser-Grundschober et al. |
| 2023/0416411 | A1 | 12/2023 | Bruenker et al. |
| 2024/0042022 | A1 | 2/2024 | Freimoser-Grundschober et al. |
| 2024/0043535 | A1 | 2/2024 | Amann et al. |
| 2024/0132590 | A1 | 4/2024 | Freimoser-Grundschober et al. |

FOREIGN PATENT DOCUMENTS

| | | | |
|---|---|---|---|
| CN | 101967191 A | 2/2011 | |
| CN | 104203982 A | 12/2014 | |
| CN | 106795221 A | 5/2017 | |
| EP | 0404097 B1 | 9/1996 | |
| EP | 0425235 B1 | 9/1996 | |
| EP | 2264067 A1 | 12/2010 | |
| EP | 1870459 B1 | 6/2016 | |
| JP | 2016-505556 A | 2/2016 | |
| JP | 2019526599 A | 9/2019 | |
| JP | 2020-511112 A | 4/2020 | |
| RU | 2635537 C2 | 11/2017 | |
| WO | WO-93/01161 A1 | 1/1993 | |
| WO | WO-93/08829 A1 | 5/1993 | |
| WO | WO-1993/16185 A2 | 8/1993 | |
| WO | WO-1993/16185 A3 | 9/1993 | |
| WO | WO-94/11026 A2 | 5/1994 | |
| WO | WO-94/11026 A3 | 8/1994 | |
| WO | WO-94/29351 A2 | 12/1994 | |
| WO | WO-94/29351 A3 | 12/1994 | |
| WO | WO-96/27011 A1 | 9/1996 | |
| WO | WO-98/50431 A2 | 11/1998 | |
| WO | WO-98/50431 A3 | 1/1999 | |
| WO | WO-99/42128 A1 | 8/1999 | |
| WO | WO-00/03016 A1 | 1/2000 | |
| WO | WO-01/77342 A1 | 10/2001 | |
| WO | WO-02/22784 A2 | 3/2002 | |
| WO | WO-2004/056312 A2 | 7/2004 | |
| WO | WO-2004/106381 A1 | 12/2004 | |
| WO | WO-2005/061547 A2 | 7/2005 | |
| WO | WO-2005/100402 A1 | 10/2005 | |
| WO | WO-2006/029879 A2 | 3/2006 | |
| WO | WO-2006/044908 A2 | 4/2006 | |
| WO | WO-2006/029879 A3 | 9/2006 | |
| WO | WO-2007/042261 A2 | 4/2007 | |
| WO | WO-2007/110205 A2 | 10/2007 | |
| WO | WO-2007/147901 A1 | 12/2007 | |
| WO | WO-2008/024715 A2 | 2/2008 | |
| WO | WO-2008068048 A2 * | 6/2008 | ............. A61P 31/10 |
| WO | WO-2008/119567 A2 | 10/2008 | |
| WO | WO-2009/080251 A1 | 7/2009 | |
| WO | WO-2009/080252 A1 | 7/2009 | |
| WO | WO-2009/080253 A1 | 7/2009 | |
| WO | WO-2009/080254 A1 | 7/2009 | |
| WO | WO-2009/089004 A1 | 7/2009 | |
| WO | WO-2010/112193 A1 | 10/2010 | |
| WO | WO-2010/115589 A1 | 10/2010 | |
| WO | WO-2010/129304 A2 | 11/2010 | |
| WO | WO-2010/136172 A1 | 12/2010 | |
| WO | WO-2010/145792 A1 | 12/2010 | |
| WO | WO-2010/145793 A1 | 12/2010 | |
| WO | WO-2010/150233 A2 | 12/2010 | |
| WO | WO-2010/150235 A1 | 12/2010 | |
| WO | WO-2010/129304 A3 | 2/2011 | |
| WO | WO-2011/034605 A2 | 3/2011 | |
| WO | WO-2011/090754 A1 | 7/2011 | |
| WO | WO-2011/090762 A1 | 7/2011 | |
| WO | WO-2011/117330 A1 | 9/2011 | |
| WO | WO-2010/115589 A8 | 10/2011 | |
| WO | WO-2010/145792 A8 | 10/2011 | |
| WO | WO-2011/143545 A1 | 11/2011 | |

(56) References Cited

FOREIGN PATENT DOCUMENTS

| | | |
|---|---|---|
| WO | WO-2012020006 A2 | 2/2012 |
| WO | WO-2012/025525 A1 | 3/2012 |
| WO | WO-2012/025530 A1 | 3/2012 |
| WO | WO-2012/041968 A1 | 4/2012 |
| WO | WO-2012/058768 A1 | 5/2012 |
| WO | WO-2012/058768 A8 | 6/2012 |
| WO | 2014/023708 A1 | 2/2013 |
| WO | WO-2013/026831 A1 | 2/2013 |
| WO | WO-2013/026833 A1 | 2/2013 |
| WO | WO-2013/026835 A1 | 2/2013 |
| WO | WO-2013/026839 A1 | 2/2013 |
| WO | WO-2013/059885 A2 | 5/2013 |
| WO | WO-2013/096291 A2 | 6/2013 |
| WO | WO-2013/106586 A2 | 7/2013 |
| WO | WO-2013/120929 A1 | 8/2013 |
| WO | WO-2013/096291 A3 | 9/2013 |
| WO | WO-2013/157953 A1 | 10/2013 |
| WO | WO-2013/157954 A1 | 10/2013 |
| WO | WO-2013/164325 A1 | 11/2013 |
| WO | WO-2013/174873 A1 | 11/2013 |
| WO | WO-2014/072534 A1 | 5/2014 |
| WO | WO-2014093396 A1 | 6/2014 |
| WO | WO-2014/131712 A1 | 9/2014 |
| WO | WO-2015066379 A2 | 5/2015 |
| WO | WO-2015/095392 A1 | 6/2015 |
| WO | WO-2015/095539 A1 | 6/2015 |
| WO | WO-2015/150447 A1 | 10/2015 |
| WO | WO-2016/016299 A1 | 2/2016 |
| WO | WO-2016/020309 A1 | 2/2016 |
| WO | WO-2016/062734 A1 | 4/2016 |
| WO | WO-2016/094566 A2 | 6/2016 |
| WO | 2016/139181 A1 | 9/2016 |
| WO | WO-2016/160622 A2 | 10/2016 |
| WO | WO-2016/172485 A2 | 10/2016 |
| WO | 2022/055926 A1 | 3/2017 |
| WO | 03/031376 A1 | 4/2017 |
| WO | WO-2017060144 A1 | 4/2017 |
| WO | WO-2017/207775 A1 | 12/2017 |
| WO | WO-2018048763 A1 | 3/2018 |
| WO | 2022/174031 A1 | 8/2018 |
| WO | WO-2019/202040 A1 | 10/2019 |
| WO | WO-2019/202041 A1 | 10/2019 |
| WO | WO-2020/043899 A1 | 3/2020 |
| WO | WO-2020/127618 A1 | 6/2020 |
| WO | WO-2021/255138 A1 | 12/2021 |
| WO | WO-2021/255143 A1 | 12/2021 |
| WO | WO-2021/255146 A1 | 12/2021 |
| WO | WO-2021/255155 A1 | 12/2021 |

OTHER PUBLICATIONS

Edwards et al., The remarkable flexibility of the human antibody repertoire; isolation of over one thousand different antibodies to a single protein, BLyS. J Mol Biol. Nov. 14, 2003;334(1):103-18. (Year: 2003).*

Koenig et al., Mutational landscape of antibody variable domains reveals a switch modulating the interdomain conformational dynamics and antigen binding. PNAS Jan. 24, 2017 114 (4) E486-E495; first published Jan. 5, 2017; (Year: 2017).*

Kussie, Paul H., "A Single Engineered Amino Acid Substitution Changes Antibody Fine Specificity", 1994, Journal of Immunology 152(1): pp. 146-152. (Year: 1994).*

Lu et al., "Preparation of anti-HLA-G monoclonal antibody G11E5," Chin J Cell Mol Immunol. 22(2) (2006) (3 pages).

Zeng et al., "Effect of overexpression of human leukocyte antigen-G in hepatocellular carcinoma Hep3B cells on killing activity of NK cells in vitro," Chinese Journal of Pathophysiology 28(4):613-618 (2012) (6 pages).

Notice of Reasons for Rejection for Japanese Application No. 2022-505424, issued Mar. 22, 2023 (8 pages).

Allan et al., "Tetrameric complexes of HLA-E, HLA-F, and HLA-G," J Immunol Methods. 268(1):43-50 (2002).

Almagro et al., "Humanization of antibodies," Front Biosci. 13:1619-33 (2008).

Amiot et al., "Biology of HLA-G in cancer: a candidate molecule for therapeutic intervention?," Cell Mol Life Sci. 68(3):417-31 (2011).

Amiot et al., "Immunomodulatory Properties of HLA-G in Infectious Diseases," J Immunol Res. 2014:298569 (2014) (15 pages).

Amodio et al., "New insights into HLA-G mediated tolerance," Tissue Antigens. 84(3):255-63 (2014).

Apps et al., "HLA-G is present on the surface of normal extravillous trophoblast as homodimers with high avidity for the LILR receptors of decidual leukocytes," 4th International Conference on HLA-G, Jul. 10-12, Paris, France. Tissue Antigens. 68(4):359 Abstract 00020 (2006) (1 page).

Atwell et al., "Stable Heterodimers from Remodeling the Domain Interface of a Homodimer using a Phage Display Library," J Mol Biol. 270(1):26-35 (1997).

Baca et al., "Antibody Humanization Using Monovalent Phage Display," J Biol Chem. 272(16):10678-84 (1997) (8 pages).

Bacac et al., "CEA TCB: A novel head-to-tail 2:1 T cell bispecific antibody for treatment of CEA-positive solid tumors," Oncoimmunology. 5(8):e1203498 (2016) (3 pages).

Bensussan et al., "Detection of membrane-bound HLA-G translated products with a specific monoclonal antibody," Proc Natl Acad Sci U S A. 92(22):10292-6 (1995).

Boerner et al., "Production of antigen-specific human monoclonal antibodies from in vitro-primed human splenocytes," J Immunol. 147(1):86-95 (1991).

Borges et al., "Interactions of LIRs, a Family of Immunoreceptors Expressed in Myeloid and Lymphoid Cells, with Viral and Cellular MHC Class I Antigens." *Immunoreceptor Tyrosine-based Inhibition Motifs*. Marc Daëron and Eric Vivier, 123-136 (1999).

Boyson et al., "Disulfide bond-mediated dimerization of HLA-G on the cell surface," Proc Natl Acad Sci U S A. 99(25):16180-5 (2002).

Brennan et al., "Preparation of Bispecific Antibodies by Chemical Recombination of Monoclonal Immunoglobulin $G_1$ Fragments," Science. 229(4708):81-3 (1985).

Brodeur et al., "Mouse-Human Myeloma Partners for the Production of Heterohybridomas," Monoclonal Antibody Production Techniques and Applications. New York:51-63 (1987).

Brüggemann et al., "Comparison of the Effector Functions of Human Immunoglobulins Using a Matched set of Chimeric Antibodies," J Exp Med. 166(5):1351-61 (1987).

Cantoni et al., "p49, a putative HLA class I-specific inhibitory NK receptor belonging to the immunoglobulin superfamily," Eur J Immunol. 28(6):1980-90 (1998).

Carter, "Bispecific human IgG by design," J Immunol Methods. 248(1-2):7-15 (2001).

Carter et al., "Humanization of an anti-p185$^{HER2}$ antibody for human cancer therapy," Proc Natl Acad Sci U S A. 89(10):4285-9 (1992).

Chang et al., "Tolerization of dendritic cells by Ts cells: the crucial role of inhibitory receptors ILT3 and ILT4," Nat Immunol. 3(3):237-43 (2002).

Chari et al., "Immunoconjugates Containing Novel Maytansinoids: Promising Anticancer Drugs," Cancer Res. 52(1):127-31 (1992).

Charlton, "Expression and Isolation of Recombinant Antibody Fragments in *E. coli.*" Methods in Molecular Biology, vol. 248: *Antibody Engineering: Methods and Protocols*. B. K. C. Lo, 245-54 (2004).

Chen et al., "Selection and analysis of an optimized anti-VEGF antibody: crystal structure of an affinity-matured Fab in complex with antigen," J Mol Biol. 293(4):865-81 (1999).

Chowdhury, "Engineering Hot Spots for Affinity Enhancements of Antibodies," *Methods in Molecular Biology*, vol. 207: *Recombinant Antibodies for Cancer Therapy: Methods and Protocols*. M. Welschof and J. Krauss, 179-96 (2003).

Clackson et al., "Making antibody fragments using phage display libraries," Nature. 352(6336):624-8 (1991).

Clements et al., "Crystal structure of HLA-G: A nonclassical MHC class I molecule expressed at the fetal-maternal interface," Proc Natl Acad Sci U S A. 102(9):3360-5 (2005).

(56) References Cited

OTHER PUBLICATIONS

Clynes et al., "Fc receptors are required in passive and active immunity to melanoma," Proc Natl Acad Sci U S A. 95(2):652-6 (1998).
Colonna et al., "A novel family of Ig-like receptors for HLA class I molecules that modulate function of lymphoid and myeloid cells," J Leukoc Biol. 66(3):375-81 (1999).
Cragg et al., "Antibody specificity controls in vivo effector mechanisms of anti-CD20 reagents," Blood. 103(7):2738-43 (2004).
Cragg et al., "Complement-mediated lysis by anti-CD20 mAb correlates with segregation into lipid rafts," Blood. 101(3):1045-52 (2003).
Cunningham et al., "High-Resolution Epitope Mapping of hGH-Receptor Interactions by Alanine-Scanning Mutagenesis," Science. 244(4908):1081-5 (1989).
Dall'Acqua et al., "Antibody humanization by framework shuffling," Methods. 36(1):43-60 (2005).
Ding et al., "OPL077: Experimental Study of Human Umbilical Cord Blood Cells Transplantation for Treatment of Cerebral Ischemia in rats," Journal of the Neurological Sciences. 238:S65 (2005) (Abstract only) (1 page).
Dubowchik et al., "Doxorubicin Immunoconjugates Containing Bivalent, Lysosomally-Cleavable Dipeptide Linkages," Bioorg Med Chem Lett. 12(11):1529-32 (2002).
Duncan et al., "The binding site for C1q on IgG," Nature. 332(6166):738-40 (1988).
Fellouse et al., "Synthetic antibodies from a four-amino-acid code: A dominant role for tyrosine in antigen recognition," Proc Natl Acad Sci U S A. 101(34):12467-72 (2004).
Fournel et al., "Comparative reactivity of different HLA-G monoclonal antibodies to soluble HLA-G molecules," Tissue Antigens. 55(6):510-8 (2000).
Fägerstam et al., "Detection of Antigen-Antibody Interactions by Surface Plasmon Resonance: Application to Epitope Mapping," J Mol Recognit. 3(5-6):208-14 (1990).
Gazzano-Santoro et al., "A non-radioactive complement-dependent cytotoxicity assay for anti-CD20 monoclonal antibody," J Immunol Methods. 202(2):163-171 (1997).
Gerngross, "Advances in the production of human therapeutic proteins in yeasts and filamentous fungi," Nat Biotechnol. 22(11):1409-1414 (2004).
Gonen-Gross et al., "Complexes of HLA-G Protein on the Cell Surface Are Important for Leukocyte Ig-Like Receptor-1 Function," J Immunol. 171(3):1343-1351 (2003).
Gonen-Gross et al., "The CD85J/Leukocyte Inhibitory Receptor-1 Distinguishes between Conformed and beta2-Microglobulin-Free HLA-G Molecules," J Immunol. 175(8):4866-74 (2005) (10 pages).
Graham et al., "Characteristics of a Human Cell Line Transformed by DNA from Human Adenovirus Type 5," J Gen Virol. 36(1):59-72 (1977).
Griffiths et al., "Human anti-self antibodies with high specificity from phage display libraries," Embo J. 12(2):725-34 (1993).
Gruber et al., "Efficient Tumor Cell Lysis Mediated by a Bispecific Single Chain Antibody Expressed in *Escherichia coli*," J Immunol. 152(11):5368-5374 (1994).
Guyer et al., "Immunoglobulin Binding by Mouse Intestinal Epithelial Cell Receptors," J Immunol. 117(2):587-593 (1976).
Hara et al., "Altered Expression of Human Leukocyte Antigen G (HLA-G) on Extravillous Trophoblasts in Preeclampsia: Immunohistological Demonstration With Anti-HLA-G Specific Antibody '87G' and Anti-cytokeratin Antibody 'CAM5.2'," Am J Reprod Immunol. 36(8):349-358 (1996).
Hellström et al., "Antitumor effects of L6, an IgG2a antibody that reacts with most human carcinomas," Proc Natl Acad Sci U S A. 83(18):7059-63 (1986).
Hellström et al., "Strong antitumor activities of IgG3 antibodies to a human melanoma-associated ganglioside," Proc Natl Acad Sci U S A. 82(5):1499-1502 (1985).

Hinman et al., "Preparation and Characterization of Monoclonal Antibody Conjugates of the Calicheamicins: A Novel and Potent Family of Antitumor Antibodies," Cancer Res. 53(14):3336-42 (1993).
Holliger et al., "'Diabodies': Small bivalent and bispecific antibody fragments," Proc Natl Acad Sci U S A. 90(14):6444-48 (1993).
Holliger et al., "Specific killing of lymphoma cells by cytotoxic T-cells mediated by a bispecific diabody," Protein Eng. 9(3):299-305 (1996).
Hoogenboom et al., "By-passing Immunisation. Human Antibodies from Synthetic Repertoires of Gemline $V_H$ Gene Segments Rearranged in Vitro," J Mol Biol. 227(2):381-88 (1992).
Hoogenboom et al., "Overview of Antibody Phage-Display Technology and Its Applications," Methods Mol Biol. 178:1-37 (2002).
Hudson et al., "Engineered antibodies," Nat Med. 9(1):129-134 (2003).
Hunt et al., "HLA-G and immune tolerance in pregnancy," Faseb J. 19(7):681-693 (2005).
Jeffrey et al., "Dipeptide-based highly potent doxorubicin antibody conjugates," Bioorg Med Chem Lett. 16(2):358-362 (2006).
Johnson et al., "Effector Cell Recruitment with Novel Fv-based Dual-affinity Re-targeting Protein Leads to Potent Tumor Cytolysis and in Vivo B-cell Depletion," J Mol Biol. 399(3):436-449 (2010).
Ju et al., "Immunoglobulin-like transcripts ILT2, ILT3 and ILT7 are expressed by human dendritic cells and down-regulated following activation," Gene. 331:159-164 (2004).
Kam et al., "Carbon nanotubes as multifunctional biological transporters and near-infrared agents for selective cancer cell destruction," Proc Natl Acad Sci U S A. 102(33):11600-605 (2005).
Kashmiri et al., "SDR grafting—a new approach to antibody humanization," Methods. 36(1):25-34 (2005).
Kim et al., "Localization of the site of the murine IgG1 molecule that is involved in binding to the murine intestinal Fc receptor," Eur J Immunol. 24(10):2429-2434 (1994).
King et al., "Monoclonal Antibody Conjugates of Doxorubicin Prepared with Branched Peptide Linkers: Inhibition of Aggregation by Methoxytriethyleneglycol Chains," J Med Chem. 45(19):4336-43 (2002).
Kipriyanov et al., "Bispecific Tandem Diabody for Tumor Therapy with Improved Antigen Binding and Pharmacokinetics," J Mol Biol. 293(1):41-56 (1999).
Klein et al., "The use of CrossMAb technology for the generation of bi- and multispecific antibodies," MAbs. 8(6):1010-20 (2016).
Klimka et al., "Human anti-CD30 recombinant antibodies by guided phage antibody selection using cell panning," Br J Cancer. 83(2):252-260 (2000).
Kostelny et al., "Formation of a bispecific antibody by the use of leucine zippers," J Immunol. 148(5):1547-1553 (1992).
Kozbor et al., "A Human Hybrid Myeloma for Production of Human Monoclonal Antibodies," J Immunol. 133(6):3001-5 (1984).
Kratz et al., "Prodrugs of Anthracyclines in Cancer Chemotherapy," Curr Med Chem. 13(5):477-523 (2006).
Kuroki et al., "Immune modulation of HLA-G dimer in maternal-fetal interface," Eur J Immunol. 37(7):1727-29 (2007).
Lee et al., "Bivalent antibody phage display mimics natural immunoglobulin," J Immunol Methods. 284(1-2):119-32 (2004).
Lee et al., "High-affinity Human Antibodies from Phage-displayed Synthetic Fab Libraries with a Single Framework Scaffold," J Mol Biol. 340(5):1073-93 (2004).
Li et al., "Human antibodies for immunotherapy development generation via a human B cell hybridoma technology," Proc Natl Acad Sci U S A. 103(10):3557-62 (2006).
Li et al., "Optimization of humanized IgGs in glycoengineered *Pichia pastoris*," Nat Biotechnol. 24(2):210-5 (2006).
Lin et al., "Human Leukocyte Antigen-G (HLA-G) Expression in Cancers: Roles in Immune Evasion, Metastasis and Target for Therapy," Mol Med. 21(1):782-91 (2015).
Lo et al., "Effector-attenuating Substitutions That Maintain Antibody Stability and Reduce Toxicity in Mice," J Biol Chem. 292(9):3900-3908 (2017) (10 pages).
Lode et al., "Targeted Therapy with a Novel Enediyene Antibiotic Calicheamicin theta(I) 1 Effectively Suppresses Growth and Dis-

(56) References Cited

OTHER PUBLICATIONS semination of Liver Metastases in a Syngeneic Model of Murine Neuroblastoma," Cancer Res. 58(14):2925-28 (1998).
Lonberg, "Fully human antibodies from transgenic mouse and phage display platforms," Curr Opin Immunol. 20(4):450-459 (2008).
Lonberg, "Human antibodies from transgenic animals," Nat Biotechnol. 23(9):1117-25 (2005).
Lum et al., "Targeting T Cells with Bispecific Antibodies for Cancer Therapy," available in PMC Oct. 8, 2013, published in final edited form as: Biodrugs. 25(6):365-379 (2011) (24 pages).
Maric et al., "Defective Antigen Processing in GILT-Free Mice," Science. 294(5545):1361-5 (2001).
Marks et al., "By-passing Immunization Human Antibodies from V-gene Libraries Displayed on Phage," J Mol Biol. 222(3):581-97 (1991).
Marks et al., "Selection of human antibodies from phage display libraries." *Methods in Molecular Biology*, vol. 248: *Antibody Engineering: Methods and Protocols*. B.K.C. Lo, 161-176 (2004) (29 pages).
Mather et al., "Culture of Testicular Cells in Hormone-Supplemented Serum-Free Medium," Ann N Y Acad Sci. 383:44-68 (1982).
Mather, "Establishment and Characterization of Two Distinct Mouse Testicular Epithelial Cell Lines," Biol Reprod. 23(1):243-252 (1980).
McCafferty et al., "Phage antibodies: filamentous phage displaying antibody variable domains," Nature. 348(6301):552-4 (1990).
Meissner et al., "Transient Gene Expression: Recombinant Protein Production with Suspension-Adapted HEK293-EBNA Cells," Biotechnol Bioeng. 75(2):197-203 (2001).
Menier et al., "Characterization of Monoclonal Antibodies Recognizing HLA-G or HLA-E: New Tools to Analyze the Expression of Nonclassical HLA Class I Molecules," Hum Immunol. 64(3):315-26 (2003).
Menier et al., "MICA Triggering Signal for NK Cell Tumor Lysis is Counteracted by HLA-G1-Mediated Inhibitory Signal," Int J Cancer. 100(1):63-70 (2002).
Milstein et al., "Hybrid hybridomas and their use in immunohistochemistry," Nature. 305(5934):537-40 (1983).
Morrison et al., "Chimeric human antibody molecules: Mouse antigen-binding domains with human constant region domains," Proc Natl Acad Sci U S A. 81(21):6851-5 (1984).
Nagorsen et al., "Immunomodulatory therapy of cancer with T cell-engaging BiTE antibody blinatumomab," Exp Cell Res. 317(9):1255-60 (2011).
Nagy et al., "Stability of cytotoxic luteinizing hormone-releasing hormone conjugate (AN-152) containing doxorubicin 14-O-hemiglutarate in mouse and human serum in vitro: Implications for the design of preclinical studies," Proc Natl Acad Sci U S A. 97(2):829-34 (2000).
Nakajima et al., "Transcriptional Regulation of ILT Family Receptors," J Immunol. 171(12):6611-20 (2003).
Ni, "Research progress and future perspectives in antibodomics and antibodomic drugs," HCAPLUS Accession No. 2006:1101736. Xiandai Mianyixue. 26(4):265-268 (2006) (Abstract Only) (3 pages).
Osbourn et al., "From rodent reagents to human therapeutics using antibody guided selection," Methods. 36(1):61-8 (2005).
Padlan, "A possible procedure for reducing the immunogenicity of antibody variable domains while preserving their ligand-binding properties," Mol Immunol. 28(4-5):489-98 (1991).
Petkova et al., "Enhanced half-life of genetically engineered human IgG1 antibodies in a humanized FcRn mouse model: potential application in humorally mediated autoimmune disease," Int Immunol. 18(12):1759-69 (2006).
Pluckthun, Chapter 11: Antibodies from *Escherichia coli*. *The Pharmacology of Monoclonal Antibodies*. Martin Rosenberg and Gordon P. Moore, 269-315 (1994) (26 pages).
Polakova et al., "Binding analysis of HLA-G specific antibodies to hematopoietic cells isolated from leukemia patients," Neoplasma. 50(5):331-8 (2003).
Ponte et al., "Inhibitory receptors sensing HLA-G1 molecules in pregnancy: Decidua-associated natural killer cells express LIR-1 and CD94/NKG2A and acquire p49, an HLA-G1-specific receptor," Proc Natl Acad Sci U S A. 96(10):5674-9 (1999).
Presta et al., "Humanization of an Antibody Directed Against IgE," J Immunol. 151(5):2623-32 (1993).
Queen et al., "A humanized antibody that binds to the interleukin 2 receptor," Proc Natl Acad Sci U S A. 86(24):10029-33 (1989).
Rajagopalan et al., "A Human Histocompatibility Leukocyte Antigen (HLA)-G-specific Receptor Expressed on All Natural Killer Cells," J Exp Med. 189(7):1093-99 (1999).
Ridgway et al., "Knobs-into-holes' engineering of antibody CH3 domains for heavy chain heterodimerization," Protein Eng. 9(7):617-21 (1996).
Riechmann et al., "Reshaping human antibodies for therapy," Nature. 322(6162):323-7 (1988).
Ristich et al., "Tolerization of dendritic cells by HLA-G," Eur J Immunol. 35(4):1133-42 (2005).
Riteau et al., "HLA-G1 co-expression boosts the HLA class I-mediated NK lysis inhibition," Int Immunol. 13(2):193-201 (2001).
Roosnek et al., "T cell activation by a bispecific anti-CD3/anti-major histocompatibility complex class I antibody," Eur J Immunol. 20(6):1393-6 (1990).
Rosok et al., "A Combinatorial Library Strategy for the Rapid Humanization of Anticarcinoma BR96 Fab," J Biol Chem. 271(37):22611-8 (1996).
Ruan et al., "Recent progress of HLA-G in cancer," Chinese Bulletin of Life Sciences. 24(3):242-49 (2012) (English language abstract).
Rudolph et al., "Crystal Structures of Two Rat MHC Class Ia (RT1-A) Molecules that are Associated Differentially with Peptide Transporter Alleles TAP-A and TAP-B," J Mol Biol. 324(5):975-90 (2002).
Sanders et al., "Cell-Cell Adhesion Mediated by CD8 and Human Histocompatibility Leukocyte Antigen G, a Nonclassical Major Histocompatibility Complex Class 1 Molecule on Cytotrophoblasts," J Exp Med. 174(3):737-40 (1991).
Schaefer et al., "Immunoglobulin domain crossover as a generic approach for the production of bispecific IgG antibodies," Proc Natl Acad Sci U S A. 108(27):11187-92 (2011).
Seimetz et al., "Development and approval of the trifunctional antibody catumaxomab (anti-EpCAM × anti-CD3) as a targeted cancer immunotherapy," Cancer Treat Rev. 36(6):458-67 (2010).
Selvakumar et al., "NK cell receptor gene of the KIR family with two IG domains but highest homology to KIR receptors with three IG domains," Tissue Antigens. 48(4 Pt 1):285-94 (1996).
Sheu et al., "HLA-G and Immune Evasion in Cancer Cells," J Formos Med Assoc. 109(4):248-57 (2010).
Shields et al., "High Resolution Mapping of the Binding Site on Human IgG1 for FcγRI, FcγRII, FcγRIII, and FcRn and Design of IgG1 Variants with Improved Binding to the FcγR," J Biol Chem. 276(9):6591-604 (2001).
Shiroishi et al., "Efficient Leukocyte Ig-like Receptor Signaling and Crystal Structure of Disulfide-linked HLA-G Dimer," The Journal of Biological Chemistry. 281(15):10439-47 (2006) (10 pages).
Shiroishi et al., "Human inhibitory receptors Ig-like transcript 2 (ILT2) and ILT4 compete with CD8 for MHC class I binding and bind preferentially to HLA-G," Proc Natl Acad Sci U S A. 100(15):8856-61 (2003).
Shore et al., "Chain B, YTS 105.18 Antigen Binding Region Heavy Chain," GenBank, accession No. 2ARJ_B (2020) (3 pages).
Sidhu et al., "Phage-displayed Antibody Libraries of Synthetic Heavy Chain Complementarity Determining Regions," J Mol Biol. 338(2):299-310 (2004).
Sims et al., "A Humanized CD18 Antibody Can Block Function without Cell Destruction," J Immunol. 151(4):2296-308 (1993).
Spiess et al., "Alternative molecular formats and therapeutic applications for bispecific antibodies," Mol Immunol. 67(2 Pt A):95-106 (2015).
Spurny et al., "T cell infiltration into Ewing sarcomas is associated with local expression of immune-inhibitory HLA-G," Oncotarget. 9(5):6536-49 (Dec. 22, 2017).

(56) References Cited

OTHER PUBLICATIONS

Stoel et al., "Immunoglobulin heavy chain variable region, partial [Rattus norvegicus]," GenBank, accession No. CAL25600 (2016) (2 pages).
Suciu-Foca et al., "Molecular characterization of allospecific T suppressor and tolerogenic dendritic cells: review," Int Immunopharmacol. 5(1):7-11 (2005).
Torgov et al., "Generation of an Intensely Potent Anthracycline by a Monoclonal Anitbody-Beta-Galactosidase Conjugate," Bioconjug Chem. 16(3):717-21 (2005).
Traunecker et al., "Bispecific single chain molecules (Janusins) target cytotoxic lymphocytes on HIV infected cells," EMBO J. 10(12):3655-9 (1991).
Tutt et al., "Trispecific F(ab')$_3$ derivatives that use cooperative signaling via the TCR/CD3 complex and CD2 to activate and redirect resting cytotoxic T cells," J Immunol. 147(1):60-69 (1991).
Urlaub et al., "Isolation of Chinese hamster cell mutants deficient in dihydrofolate reductase activity," Proc Natl Acad Sci U S A. 77(7):4216-20 (1980).
Valiante et al., "Functionally and Structurally Distinct NK Cell Receptor Repertoires in the Peripheral Blood of Two Human Donors," Immunity. 7(6):739-51 (1997).
Valliere-Douglass et al., "Glutamine-linked and Non-consensus Asparagine-linked Oligosaccharides Present in Human Recombinant Antibodies Define Novel Protein Glycosylation Motifs," J Biol Chem. 285(21):16012-22 (2010).
Van de Bovenkamp et al., "Adaptive antibody diversification through N-linked glycosylation of the immunoglobulin variable region," Proc Natl Acad Sci U S A. 115(8):1901-1906 (Feb. 20, 2018).
Van Dijk et al., "Human antibodies as next generation therapeutics," Curr Opin Chem Biol. 5(4):368-74 (2001).
Vitetta et al., "Redesigning Nature's Poisons to Create Anti-Tumor Reagents," Science. 238(4830):1098-104 (1987).
Vollmers et al., "Death by Stress: Natural IgM-Induced Apoptosis," Methods Find Exp Clin Pharmacol. 27(3):185-91 (2005).
Vollmers et al., "The 'early birds': natural IgM antibodies and immune surveillance," Histol Histopathol. 20(3):927-37 (2005).
Wan et al., "Human Leukocyte Antigen-G Inhibits the Anti-Tumor Effect of Natural Killer Cells via Immunoglobulin-Like Transcript 2 in Gastric Cancer," Cell Physiol and Biochem. 44(5):1828-41 (2017).
Wiendl et al., "The non-classical MHC molecule HLA-G protects human muscle cells from immune-mediated lysis: implications for myoblast transplantation and gene therapy," Brain. 126(Pt. 1):176-85 (2003).
Winter et al., "Making Antibodies by Phage Display Technology," Annu Rev Immunol. 12:433-55 (1994).
Wu et al., "Rescuing lymphocytes from HLA-G immunosuppressive effects mediated by the tumor microenvironment," Oncotarget. 6(35):37385-97 (2015).
Yazaki et al., "Expression of Recombinant Antibodies in Mammalian Cell Lines." *Methods in Molecular Biology*, vol. 248: *Antibody Engineering: Methods and Procedures*. B. K. C. Lo, 255-68 (2004).
Extended European Search Report for European Patent Application No. 20214951.4, dated Jul. 20, 2021 (13 pages).
International Preliminary Report on Patentability for International Patent Application No. PCT/EP2017/079429, mailed May 31, 2019 (9 pages).
International Preliminary Report on Patentability for International Application No. PCT/EP2019/060007, mailed Oct. 29, 2020 (11 pages).
International Preliminary Report on Patentability for International Application No. PCT/EP2019/060008, issued Oct. 20, 2020 (7 pages).
International Search Report and Written Opinion for International Application No. PCT/EP2017/079429, mailed Mar. 20, 2018 (13 pages).
International Search Report and Written Opinion for International Application No. PCT/EP2019/060007, mailed Jul. 17, 2019 (19 pages).
International Search Report and Written Opinion for International Application No. PCT/EP2019/060008, mailed May 27, 2019 (12 pages).
International Search Report and Written Opinion for International Application No. PCT/EP2021/085810, mailed Apr. 7, 2022 (20 pages).
Invitation to Respond to Written Opinion for Singaporean Application No. 11202009695Q, dated Apr. 27, 2022 (12 pages).
Roitt et al., "Different antigen antibody binding is ensured by hypervariable sequences of antigen-recognizing centers," Moscow, Mir: Immunology. 110-1 (2000) (5 pages).
Singer et al., "Genes and Genomes," Moskow "MIR". 1:63-64 (1998) (7 pages).
Kuznetzova, E. A., "Brackets in text of legal document as a linguistic and cognitive phenomenon," Vestnik MGOU. Series: Russian Philology. 3:37-42 (2015) (12 pages).
Office Action for Russian Patent Application No. 2020 137 068, dated Oct. 5, 2022 (16 pages).
U.S. Appl. No. 18/446,032, Hoffmann-La Roche Inc.
"Annex 4-15E7 Specificity and Blocking Activity," experimental annex cited in opposition to patent EP2917229B1 on Oct. 6, 2020, by Regimbeau (5 pages).
"Immunologists' Toolbox: Immunization." Excerpt from Janeway's Immunobiology, eds. Murphy et al., 7th ed., p. 735 (2008) (3 pages).
Abcam Product Datasheet for "Anti-HLA G antibody [MEM-G/1] ab7759" cited in opposition to patent EP2917229B1 on Oct. 7, 2020 (3 pages).
Agaugué et al., "Role of HLA-G in tumor escape through expansion of myeloid-derived suppressor cells and cytokinic balance in favor of Th2 versus Th1/Th17," Blood. 117(26):7021-31 (Jun. 30, 2011).
Angal et al., "A single amino acid substitution abolishes the heterogeneity of chimeric mouse/human (IgG4) antibody," Mol Immunol. 30(1):105-8(1993).
Apps et al., "A critical look at HLA-G," Trends Immunol. 29(7):313-21 (2008).
Arns et al., "Structural Modeling and Molecular Dynamics of the Immune Checkpoint Molecule HLA-G," Front. Immunol. 11:575076. doi: 10.3389/fimmu.2020.575076 (Nov. 2020).
Barnstable et al., "Production of monoclonal antibodies to group A erythrocytes, HLA and other human cell surface antigens-new tools for genetic analysis," Cell 14(1) Abstract (1978).
Barnstable et al., "Production of Monoclonal Antibodies to Group A Erythrocytes, HLA and Other Human Cell Surface Antigens—New Tools for Genetic Analysis," Cell. 14(1):9-20 (1978).
Beers et al., "Type II (tositumomab) anti-CD20 monoclonal antibody out performs type I (rituximab-like) reagents in B-cell depletion regardless of complement activation," Blood 112(10):4170-4177 (2008).
Blaschitz et al., "The soluble pool of HLA-G produced by human trophoblasts does not include detectable levels of the intron 4-containing HLA-G5 and HLA-G6 isoforms," Molecular Human Reproduction 11(10):699-710 (2005).
Carosella et al., "Beyond the increasing complexity of the immunomodulatory HLA-G molecule," Blood. 111(10):4862-70 (May 15, 2008).
Carosella et al., "HLA-G: from biology to clinical benefits," Trends in Immunology. 29(3):125-32 (2008).
Chaplin, David D., "Overview of the immune response," J Allergy Clin Immunol. 125(2 Suppl 2):S3-23 (2010).
Chua et al., "Chapter 40: Production of Monoclonal Antibody by DNA Immunization with Electroporation," S. Li (ed.), Electroporation Protocols: Preclinical and Clinical Gene Medicine. From Methods in Molecular Biology. 423:509-20 (2008).
Contini et al., "Soluble HLA-A,-B,-C and -G molecules induce apoptosis in T and NK CD8$^+$ cells and inhibit cytotoxic T cell activity through CD8 ligation," Eur J Immunol. 33:125-34 (2003).
Deng et al., "Enhancing antibody patent protection using epitope mapping information," MABS 10(2):204-209 (2018) (published online: Dec. 7, 2017).
Desai et al., "Structural Relatedness of Distinct Determinants Recognized by Monoclonal Antibody TP25.99 on beta$_2$-Microglobulin-Associated and beta$_2$-Microglobulin-Free HLA Class I Heavy Chains," J Immunol. 165:3275-83 (2000).

(56) References Cited

OTHER PUBLICATIONS

Diaz-Lagares et al., "Nitric oxide produces HLA-G nitration and induces metalloprotease-dependent shedding creating a tolerogenic milieu," Immunology. 126(3):436-45 (2008).
Donadi et al., "Implications of the polymorphism of HLA-G on its function, regulation, evolution and disease association," Cell Mol Life Sci. 68:369-95 (2011).
Fioretti et al., "DNA Vaccines: Developing New Strategies against Cancer," J Biomed Biotechnol. 2010:174378 (2010) (16 pages).
Furukawa et al., "Evaluation of the Reactivity and Receptor Competition of HLA-G Isoforms toward Available Antibodies: Implications of Structural Characteristics of HLA-G Isoforms," Int J Mol Sci. 20:5947 (Nov. 26, 2019) (11 pages).
Gauster et al., "Monoclonal antibody HC10 does not bind HLA-G," Rheumatology. 46:892-3 (2007).
Geraghty et al., "A human major histocompatibility complex class I gene that encodes a protein with a shortened cytoplasmic segment," Proc Natl Acad Sci USA. 84(1):9145-9 (Dec. 1987).
Ishitani et al., "Protein Expression and Peptide Binding Suggest Unique and Interacting Functional Roles for HLA-E, F, and G in Maternal-Placental Immune Recognition," J Immunol. 171(3):1376-84 (2003).
Kobayashi et al., "Establishment of a Choriocarcinoma Model from Immortalized Normal Extravillous Trophoblast Cells Transduced with HRASV12," Am J Pathol. 179(3):1471-82 (2011).
Kovats et al., "A Class I Antigen, HLA-G, Expressed in Human Trophoblasts," Science 248:220-223 (1990).
Kutzler et al., "DNA vaccines: ready for prime time?" Nat Rev Genet. 9(10):776-88 (2008).
Laddy et al., "From Plasmids to Protection: A Review of DNA Vaccines Against Infectious Diseases," International Reviews of Immunology. 25:99-123 (2006) (26 pages).
Le Discorde et al., "HLA-G*0105N Null Allele Encodes Functional HLA-G Isoforms," Biol Reprod. 73(2):280-8 (2005).
Le Gal et al., "HLA-G-mediated inhibition of antigen-specific cytotoxic T lymphocytes," International Immunology. 11(8):1351-6 (1999).
Le Rond et al., "Alloreactive CD4$^+$ and CD8$^+$ T cells express the immunotolerant HLA-G molecule in mixed lymphocyte reactions: in vivo implications in transplanted patients," Eur J Immunol. 34(3):649-60 (2004).
Lee et al., "The Membrane-Bound and Soluble Forms of HLA-G Bind Identical Sets of Endogenous Peptides but Differ with Respect to TAP Association," Immunity. 3:591-600 (1995).
Liang et al., "HLA-G inhibits the functoins of murine dendritic cells via the PIR-B immune inhibitory receptor," Eur J Immunol. 32:2418-26 (2002).
Lin et al., "HLA-G expression in human ovarian carcinoma counteracts NK cell function," Annals of Oncology. 18(11):1804-9 (2007).
Loke et al., "Evaluation of trophoblast HLA-G antigen with a specific monoclonal antibody," Tissue Antigens. 50:135-46 (1997).
Loumagne et al., "In vivo evidence that secretion of HLA-G by immunogenic tumor cells allows their evasion from immunosurveillance," Int J Cancer. 135:2107-17 (2014).
Loustau et al., "HLA-G Neo-Expression on Tumors," Frontiers in Immunology. 11(1685) (Aug. 14, 2020) (15 pages).
Mansfield et al., "Regional immunity in melanoma: immunosuppressive changes precede nodal metastasis," Modern Pathol. 24:487-94 (2011).
Markel et al., "Preclinical Evaluation of Adoptive Cell Therapy for Patients with Metastatic Renal Cell Carcinoma," Anticancer Res. 29:145-54 (2009).
Matsushita et al., "Differential but Competitive Binding of Nogo Protein and Class I Major Histocompatibility Complex (MHCI) to the PIR-B Ectodomain Provides an Inhibition of Cells," J Biol Chem. 286(29):25739-47 (2011).
McMaster et al., "HLA-G Isoforms Produced by Placental Cytotrophoblasts and Found in Amniotic Fluid Are Due to Unusual Glycosylation," J Immunol. 160(12):5922-8 (1998).

Molek et al., "Epitope Mapping of Mono- and Polyclonal Antibodies by Screening Phage-displayed Random Peptide Libraries," Acta Chim Slov. 63:914-9 (2016).
Morales et al., "Placental Cell Expression of HLA-G2 Isoforms Is Limited to the Invasive Trophoblast Phenotype," J Immunol. 171(11):6215-24 (2003).
Naji et al., "Soluble HLA-G and HLA-G1 Expressing Antigen-Presenting Cells Inhibit T-Cell Alloproliferation through ILT-2/ILT-4/FasL-Mediated Pathways," Hum Immunol. 68(4):233-9 (2007).
Nencioni et al., "Anticancer vaccination strategies," Ann Oncol. 15(Supplement 4):iv153-iv160 (2004).
Nimmerjahn et al., "Fcgamma receptors as regulators of immune responses," Nature Reviews Immunology 8:34-47 (2008).
Nordic-MUbio Product Datasheet for "Mouse anti Human HLA Class I Heavy Chain (Restricted expression)." Catalogue No. MUB2037P (3 pages).
Parish et al., "Immunogenicity of Low-Dose Intradermal Recombinant DNA Hepatitis B Vaccine," Southern Med J. 84(4):426-30 (1991).
Paul et al., "HLA-G expression in melanoma: A way for tumor cells to escape from immunosurveillance," Proc Natl Acad Sci USA. 95(8):4510-5 (1998).
Paul et al., "HLA-G, -E, -F Preworkshop: Tools and Protocols for Analysis of Non-Classical Class I Genes Transcription and Protein Expression," Human Immunology. 61(11):1177-95 (2000).
Pelanda et al., "Central B-Cell Tolerance: Where Selection Begins," Cold Spring Harb Perspect Biol. 4(4):a007146 (2012) (16 pages).
Pirrone et al., "Applications of Hydrogen/Deuterium Exchange MS from 2012 to 2014," Anal. Chem. 87:99-118 (2015).
Product datasheets for HLA-G monoclonal antibody (MEM-G/4) from GeneTex (catalogue No. GTX21887), ThermoFisher Scientific (catalogue No. MA1-19358), and Abcore (product No. 11-394) (5 pages).
Riteau et al., "HLA-G2, -G3, and -G4 Isoforms Expressed as Nonmature Cell Surface Glycoproteins Inhibit NK and Antigen-Specific CTL Cytolysis," J Immunol. 166:5018-26 (2001) (10 pages).
Rouas-Freiss et al., "Expression of tolerogenic HLA-G molecules in cancer prevents antitumor responses," Seminars in Cancer Biol. 17:413-21 (2007).
Saade et al., "Technologies for enhanced efficacy of DNA vaccines," Expert Rev Vaccines. 11(2):189-209 (2012).
Seitz et al., "The monoclonal antibody HCA2 recognises a broadly shared epitope on a selected classical as well as several non-classical HLA class I molecules," Mol Immunol. 35:819-27 (1998).
Shiroishi et al., "Structural basis for recognition of the nonclassical MHC molecule HLA-G by the leukocyte Ig-like receptor B2 (LILRB2/LIR2/ILT4/CD85d)," PNAS. 103(44):16412-7 (2006).
Tanabe et al., "Structural and Functional Analysis of Monomorphic Determinants Recognized by Monoclonal Antibodies Reacting with the HLA Class I alpha$_3$ Domain," Journal of Immunology. 148(13):3202-9 (1992).
Temming et al., "Cross-reactivity of mouse IgG subclasses to human Fc gamma receptors: Antibody deglycosylation only eliminates IgG2b binding," Molecular Immunology 127:79-86 (Sep. 2020).
Tran et al., "The epitope recognized by pan-HLA class I-reactive monoclonal antibody W6/32 and its relationship to unusual stability of the HLA-B27/Beta$_2$-microglobulin complex," Immunogenetics. 53:440-6 (2001).
Tüting et al., "The Immunology of DNA Vaccines," excerpt from "DNA Vaccines: Methods and Protocols." 29:37-8 (2000) (3 pages).
Van Lierop et al., "Detection of HLA-G by a specific sandwich ELISA using monoclonal antibodies G233 and 56B," Mol Hum Reprod. 8(8):776-84 (2002).
Vergati et al., "Strategies for Cancer Vaccine Development," J Biomed Biotechnol. 2010:596432 (2010) (13 pages).
Vlieg et al., "Structure and flexibility of the extracellular region of the PirB receptor," J. Biol. Chem. 294(12):4634-4643 (Jan. 2019).
Xing et al., "T-Cell Tolerance: Central and Peripheral," Cold Spring Harb Perspect Biol. 4(6):a006957 (2012) (16 pages).

(56) References Cited

OTHER PUBLICATIONS

Yari et al., "Production and Characterization of Monoclonal Antibodies with Specificity for Human HLA-G Isoforms," Hybridoma and Hybridomics. 22(5):301-6 (2003).

Ye et al., "Human leukocyte antigen G expression: as a significant prognostic indicator for patients with colorectal cancer," Modern Pathology. 20(3):375-83 (2007).

Zöller et al., "Prophylactic Tumor Vaccination: Comparison of Effector Mechanisms Initiated by Protein Versus DNA Vaccination," J Immunol. 166:3440-50 (2001).

Klein et al., "Progress in overcoming the chain association issue in bispecific heterodimeric IgG antibodies" MABS 4(6):pp. 653-663 (Nov. / Dec. 2012).

Klein et al., "Engineering therapeutic bispecific antibodies using CrossMab technology" Methods (EPub: Nov. 16, 2018), 154:pp. 21-31 (2019).

Vezenkov, L. L., et al., "Structure-Activity Relationships of JMV4463, a Vectorized Cathepsin D Inhibitor with Antiproliferative Properties: The Unique Role of the AMPA-Based Vector" Chem. Med. Chem. 11:302-308 ( 2015).

Badri, H., et al., "Optimization of radiation dosing schedules for proneural glioblastoma" J Math Biol 72(5):1301-1336 (Apr. 1, 2016).

Baylot et al., "TCTP Has a Crucial Role in the Different Stages of Prostate Cancer Malignant Progression" Results Probl. Cell. Diff. 64:255-261 (2017).

Shen et al., "Single variable domain-IgG fusion. A novel recombinant approach to Fc domain-containing bispecific antibodies" J Biol Chem 281(16):10706-10714 (Apr. 21, 2006).

Padlan, "Anatomy of the Antibody Molecule" Mol Immunol 31(3):pp. 169-217 (1994).

\* cited by examiner

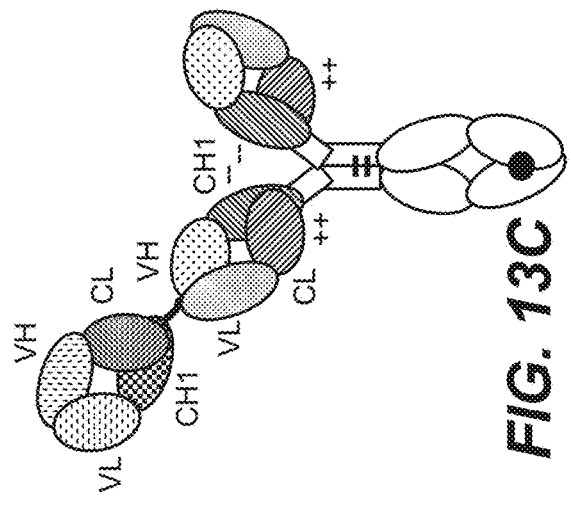
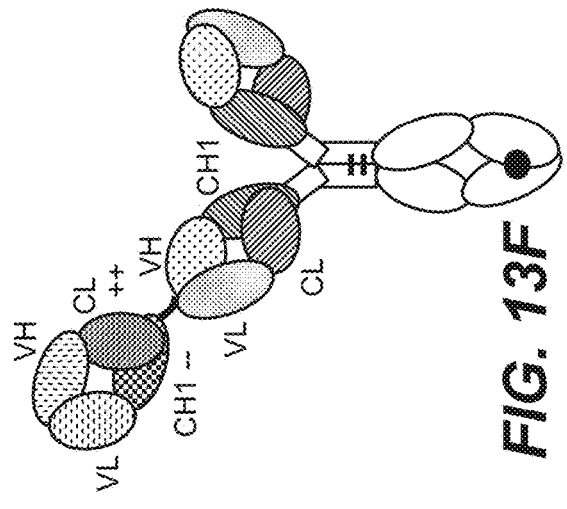
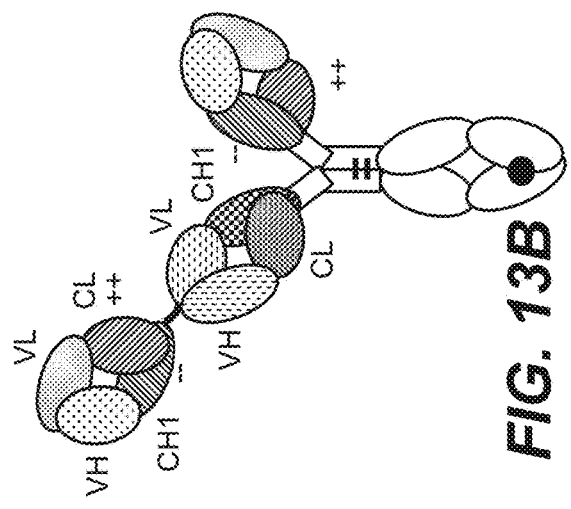
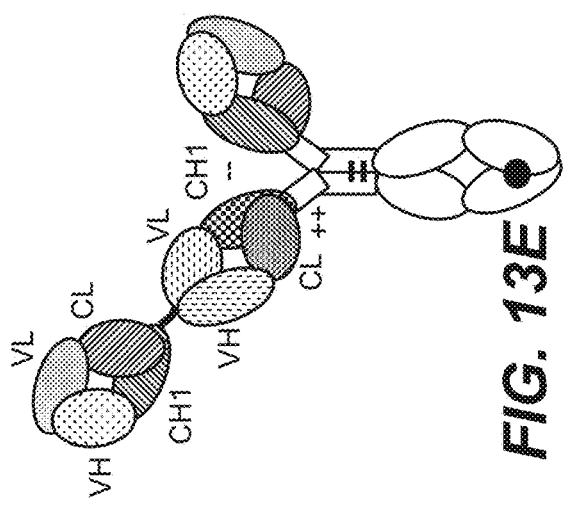
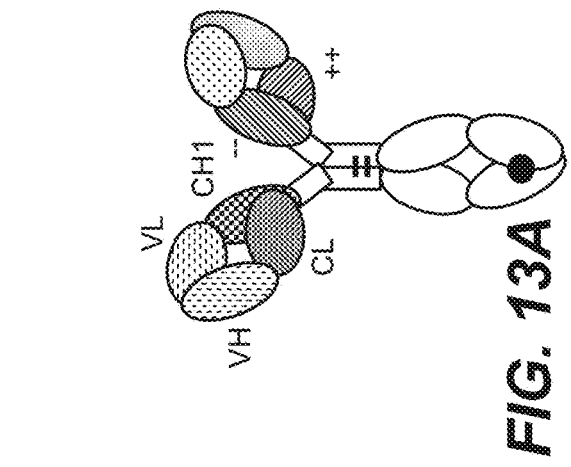
FIG. 13A
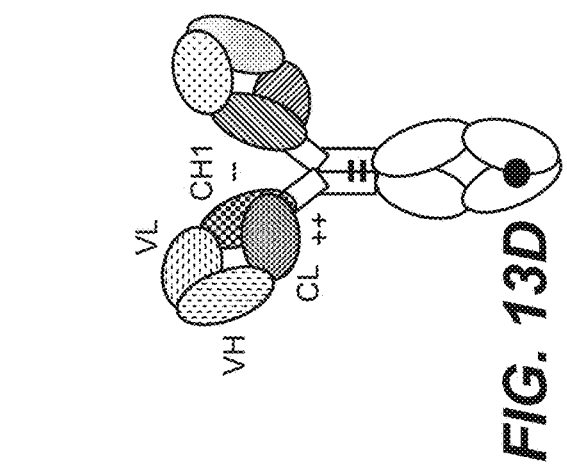
FIG. 13D

```
                        SEQUENCE LISTING

Sequence total quantity: 96
SEQ ID NO: 1            moltype = AA  length = 7
FEATURE                 Location/Qualifiers
source                  1..7
                        mol_type = protein
                        organism = Homo sapiens
SEQUENCE: 1
SNRAAWN                                                                   7

SEQ ID NO: 2            moltype = AA  length = 18
FEATURE                 Location/Qualifiers
source                  1..18
                        mol_type = protein
                        organism = Homo sapiens
SEQUENCE: 2
RTYYRSKWYN DYAVSVQG                                                      18

SEQ ID NO: 3            moltype = AA  length = 9
FEATURE                 Location/Qualifiers
source                  1..9
                        mol_type = protein
                        organism = Homo sapiens
SEQUENCE: 3
VRAVAPFDY                                                                 9

SEQ ID NO: 4            moltype = AA  length = 17
FEATURE                 Location/Qualifiers
source                  1..17
                        mol_type = protein
                        organism = Homo sapiens
SEQUENCE: 4
KSSQSVLNSS NNKNNLA                                                       17

SEQ ID NO: 5            moltype = AA  length = 7
FEATURE                 Location/Qualifiers
source                  1..7
                        mol_type = protein
                        organism = Homo sapiens
SEQUENCE: 5
WASTRES                                                                   7

SEQ ID NO: 6            moltype = AA  length = 9
FEATURE                 Location/Qualifiers
source                  1..9
                        mol_type = protein
                        organism = Homo sapiens
SEQUENCE: 6
QQYYRTPWT                                                                 9

SEQ ID NO: 7            moltype = AA  length = 121
FEATURE                 Location/Qualifiers
source                  1..121
                        mol_type = protein
                        organism = Homo sapiens
SEQUENCE: 7
QVQLQQSGPG LLKPSQTLSL TCAISGDSVS SNRAAWNWIR QSPSRGLEWL GRTYYRSKWY         60
NDYAVSVQGR ITLIPDTSKN QFSLRLNSVT PEDTAVYYCA SVRAVAPFDY WGQGVLVTVS        120
S                                                                       121

SEQ ID NO: 8            moltype = AA  length = 113
FEATURE                 Location/Qualifiers
```

```
source                      1..113
                            mol_type = protein
                            organism = Homo sapiens
SEQUENCE: 8
DIVMTQSPDS LAVSLGERAT INCKSSQSVL NSSNNKNNLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 9                moltype = AA   length = 17
FEATURE                     Location/Qualifiers
source                      1..17
                            mol_type = protein
                            note = light chain CDR-L1, HLA-G-0090-VL-N31D
                            organism = synthetic construct
SEQUENCE: 9
KSSQSVLDSS NNKNNLA                                                   17

SEQ ID NO: 10               moltype = AA   length = 113
FEATURE                     Location/Qualifiers
source                      1..113
                            mol_type = protein
                            note = light chain variable domain VL, HLA-G-0090-VL-N31D
                            organism = synthetic construct
SEQUENCE: 10
DIVMTQSPDS LAVSLGERAT INCKSSQSVL DSSNNKNNLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 11               moltype = AA   length = 17
FEATURE                     Location/Qualifiers
source                      1..17
                            mol_type = protein
                            note = light chain CDR-L1, HLA-G-0090-VL-N31L
                            organism = synthetic construct
SEQUENCE: 11
KSSQSVLLSS NNKNNLA                                                   17

SEQ ID NO: 12               moltype = AA   length = 113
FEATURE                     Location/Qualifiers
source                      1..113
                            mol_type = protein
                            note = light chain variable domain VL, HLA-G-0090-VL-N31L
                            organism = synthetic construct
SEQUENCE: 12
DIVMTQSPDS LAVSLGERAT INCKSSQSVL LSSNNKNNLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 13               moltype = AA   length = 17
FEATURE                     Location/Qualifiers
source                      1..17
                            mol_type = protein
                            note = light chain CDR-L1, HLA-G-0090-VL-N31Q
                            organism = synthetic construct
SEQUENCE: 13
KSSQSVLQSS NNKNNLA                                                   17

SEQ ID NO: 14               moltype = AA   length = 113
FEATURE                     Location/Qualifiers
source                      1..113
                            mol_type = protein
                            note = light chain variable domain VL, HLA-G-0090-VL-N31Q
                            organism = synthetic construct
SEQUENCE: 14
DIVMTQSPDS LAVSLGERAT INCKSSQSVL QSSNNKNNLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 15               moltype = AA   length = 17
FEATURE                     Location/Qualifiers
source                      1..17
                            mol_type = protein
                            note = light chain CDR-L1, HLA-G-0090-VL-N31S
                            organism = synthetic construct
SEQUENCE: 15
KSSQSVLSSS NNKNNLA                                                   17

SEQ ID NO: 16               moltype = AA   length = 113
FEATURE                     Location/Qualifiers
source                      1..113
                            mol_type = protein
                            note = light chain variable domain VL, HLA-G-0090-VL-N31S
                            organism = synthetic construct
```

```
SEQUENCE: 16
DIVMTQSPDS LAVSLGERAT INCKSSQSVL SSSNNKNNLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 17           moltype = AA  length = 17
FEATURE                 Location/Qualifiers
source                  1..17
                        mol_type = protein
                        note = light chain CDR-L1, HLA-G-0090-VL-N31T
                        organism = synthetic construct
SEQUENCE: 17
KSSQSVLTSS NNKNNLA                                                   17

SEQ ID NO: 18           moltype = AA  length = 113
FEATURE                 Location/Qualifiers
source                  1..113
                        mol_type = protein
                        note = light chain variable domain VL, HLA-G-0090-VL-N31T
                        organism = synthetic construct
SEQUENCE: 18
DIVMTQSPDS LAVSLGERAT INCKSSQSVL TSSNNKNNLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 19           moltype = AA  length = 17
FEATURE                 Location/Qualifiers
source                  1..17
                        mol_type = protein
                        note = light chain CDR-L1, HLA-G-0090-VL-N31Y
                        organism = synthetic construct
SEQUENCE: 19
KSSQSVLYSS NNKNNLA                                                   17

SEQ ID NO: 20           moltype = AA  length = 113
FEATURE                 Location/Qualifiers
source                  1..113
                        mol_type = protein
                        note = light chain variable domain VL, HLA-G-0090-VL-N31Y
                        organism = synthetic construct
SEQUENCE: 20
DIVMTQSPDS LAVSLGERAT INCKSSQSVL YSSNNKNNLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 21           moltype = AA  length = 17
FEATURE                 Location/Qualifiers
source                  1..17
                        mol_type = protein
                        note = light chain CDR-L1, HLA-G-0090-VL-N31Y-N38Y
                        organism = synthetic construct
SEQUENCE: 21
KSSQSVLYSS NNKNYLA                                                   17

SEQ ID NO: 22           moltype = AA  length = 113
FEATURE                 Location/Qualifiers
source                  1..113
                        mol_type = protein
                        note = light chain variable domain VL,
                          HLA-G-0090-VL-N31Y-N38Y
                        organism = synthetic construct
SEQUENCE: 22
DIVMTQSPDS LAVSLGERAT INCKSSQSVL YSSNNKNYLA WYQQQPGQPP KLLIYWASTR    60
ESGVPDRFSG SGSGTDFTLT ISSLQAEDVA VYFCQQYYRT PWTFGQGTKV EIK          113

SEQ ID NO: 23           moltype = AA  length = 17
FEATURE                 Location/Qualifiers
source                  1..17
                        mol_type = protein
                        note = light chain CDR-L1, HLA-G-0090-VL-S32P
                        organism = synthetic construct
SEQUENCE: 23
KSSQSVLNPS NNKNNLA                                                   17

SEQ ID NO: 24           moltype = AA  length = 113
FEATURE                 Location/Qualifiers
source                  1..113
                        mol_type = protein
                        note = light chain variable domain VL, HLA-G-0090-VL-S32P
                        organism = synthetic construct
SEQUENCE: 24
DIVMTQSPDS LAVSLGERAT INCKSSQSVL NPSNNKNNLA WYQQQPGQPP KLLIYWASTR    60
```

```
ESGVPDRFSG SGSGTDFTLT ISSLQAEDVA VYFCQQYYRT PWTFGQGTKV EIK        113

SEQ ID NO: 25            moltype = AA   length = 17
FEATURE                  Location/Qualifiers
source                   1..17
                         mol_type = protein
                         note = light chain CDR-L1, HLA-G-0090-VL-S33A
                         organism = synthetic construct
SEQUENCE: 25
KSSQSVLNSA NNKNNLA                                                 17

SEQ ID NO: 26            moltype = AA   length = 113
FEATURE                  Location/Qualifiers
source                   1..113
                         mol_type = protein
                         note = light chain variable domain VL, HLA-G-0090-VL-S33A
                         organism = synthetic construct
SEQUENCE: 26
DIVMTQSPDS LAVSLGERAT INCKSSQSVL NSANNKNNLA WYQQQPGQPP KLLIYWASTR  60
ESGVPDRFSG SGSGTDFTLT ISSLQAEDVA VYFCQQYYRT PWTFGQGTKV EIK        113

SEQ ID NO: 27            moltype = AA   length = 17
FEATURE                  Location/Qualifiers
source                   1..17
                         mol_type = protein
                         note = light chain CDR-L1, HLA-G-0090-VL-S33D
                         organism = synthetic construct
SEQUENCE: 27
KSSQSVLNSD NNKNNLA                                                 17

SEQ ID NO: 28            moltype = AA   length = 113
FEATURE                  Location/Qualifiers
source                   1..113
                         mol_type = protein
                         note = light chain variable domain VL, HLA-G-0090-VL-S33D
                         organism = synthetic construct
SEQUENCE: 28
DIVMTQSPDS LAVSLGERAT INCKSSQSVL NSDNNKNNLA WYQQQPGQPP KLLIYWASTR  60
ESGVPDRFSG SGSGTDFTLT ISSLQAEDVA VYFCQQYYRT PWTFGQGTKV EIK        113

SEQ ID NO: 29            moltype = AA   length = 17
FEATURE                  Location/Qualifiers
source                   1..17
                         mol_type = protein
                         note = light chain CDR-L1, HLA-G-0090-VL-S33P
                         organism = synthetic construct
SEQUENCE: 29
KSSQSVLNSP NNKNNLA                                                 17

SEQ ID NO: 30            moltype = AA   length = 113
FEATURE                  Location/Qualifiers
source                   1..113
                         mol_type = protein
                         note = light chain variable domain VL, HLA-G-0090-VL-S33P
                         organism = synthetic construct
SEQUENCE: 30
DIVMTQSPDS LAVSLGERAT INCKSSQSVL NSPNNKNNLA WYQQQPGQPP KLLIYWASTR  60
ESGVPDRFSG SGSGTDFTLT ISSLQAEDVA VYFCQQYYRT PWTFGQGTKV EIK        113

SEQ ID NO: 31            moltype = AA   length = 314
FEATURE                  Location/Qualifiers
source                   1..314
                         mol_type = protein
                         organism = Homo sapiens
SEQUENCE: 31
GSHSMRYFSA AVSRPGRGEP RFIAMGYVDD TQFVRFDSDS ACPRMEPRAP WVEQEGPEYW  60
EEETRNTKAH AQTDRMNLQT LRGYYNQSEA SSHTLQWMIG CDLGSDGRLL RGYEQYAYDG 120
KDYLALNEDL RSWTAADTAA QISKRKCEAA NVAEQRRAYL EGTCVEWLHR YLENGKEMLQ 180
RADPPKTHVT HHPVFDYEAT LRCWALGFYP AEIILTWQRD GEDQTQDVEL VETRPAGDGT 240
FQKWAAVVVP SGEEQRYTCH VQHEGLPEPL MLRWKQSSLP TIPIMGIVAG LVVLAAVVTG 300
AAVAAVLWRK KSSD                                                  314

SEQ ID NO: 32            moltype = AA   length = 274
FEATURE                  Location/Qualifiers
source                   1..274
                         mol_type = protein
                         organism = Homo sapiens
SEQUENCE: 32
GSHSMRYFSA AVSRPGRGEP RFIAMGYVDD TQFVRFDSDS ACPRMEPRAP WVEQEGPEYW  60
```

```
EEETRNTKAH AQTDRMNLQT LRGYYNQSEA SSHTLQWMIG CDLGSDGRLL RGYEQYAYDG    120
KDYLALNEDL RSWTAADTAA QISKRKCEAA NVAEQRRAYL EGTCVEWLHR YLENGKEMLQ    180
RADPPKTHVT HHPVFDYEAT LRCWALGFYP AEIILTWQRD GEDQTQDVEL VETRPAGDGT    240
FQKWAAVVVP SGEEQRYTCH VQHEGLPEPL MLRW                                274

SEQ ID NO: 33            moltype = AA  length = 99
FEATURE                  Location/Qualifiers
source                   1..99
                         mol_type = protein
                         organism = Homo sapiens
SEQUENCE: 33
IQRTPKIQVY SRHPAENGKS NFLNCYVSGF HPSDIEVDLL KNGERIEKVE HSDLSFSKDW     60
SFYLLYYTEF TPTEKDEYAC RVNHVTLSQP KIVKWDRDM                            99

SEQ ID NO: 34            moltype = AA  length = 275
FEATURE                  Location/Qualifiers
source                   1..275
                         mol_type = protein
                         note = modified human HLA-G (wherein the HLA-G specific
                           amino acids have been replaced by HLA-A consensus amino
                           acids (= degrafted HLA-G) ECD
                         organism = synthetic construct
SEQUENCE: 34
GSHSMRYFSA AVSRPGRGEP RFIAMGYVDD TQFVRFDSDA ASPRMEPRAP WVEQEGPEYW     60
DEETRNTKAH AQTDRVNLGT LRGCYNQSEA GSHTLQWMIG CDVGSDGRLL RGYEQYAYDG    120
KDYLALNEDL RSWTAADTAA QISKRKCEAA HVAEQRRAYL EGTCVEWLRR YLENGKETLQ    180
RADPPKTHVT HHPVSDHEAT LRCWALGFYP AEITLTWQRD GEDQTQDVEL VETRPAGDGT    240
FQKWAAVVVP SGEEQRYTCH VQHEGLPEPL TLRWK                               275

SEQ ID NO: 35            moltype = AA  length = 341
FEATURE                  Location/Qualifiers
source                   1..341
                         mol_type = protein
                         organism = Homo sapiens
SEQUENCE: 35
GSHSMRYFFT SVSRPGRGEP RFIAVGYVDD TQFVRFDSDA ASQRMEPRAP WIEQEGPEYW     60
DGETRKVKAH SQTHRVDLGT LRGYYNQSEA GSHTVQRMYG CDVGSDWRFL RGYHQYAYDG    120
KDYIALKEDL RSWTAADMAA QTTKHKWEAA HVAEQLRAYL EGTCVEWLRR YLENGKETLQ    180
RTDAPKTHMT HHAVSDHEAT LRCWALSFYP AEITLTWQRD GEDQTQDTEL VETRPAGDGT    240
FQKWAAVVVP SGQEQRYTCH VQHEGLPKPL TLRWEPSSQP TIPIVGIIAG LVLFGAVITG    300
AVVAAVMWRR KSSDRKGGSY SQAASSDSAQ GSDVSLTACK V                        341

SEQ ID NO: 36            moltype = AA  length = 275
FEATURE                  Location/Qualifiers
source                   1..275
                         mol_type = protein
                         organism = Homo sapiens
SEQUENCE: 36
GSHSMRYFFT SVSRPGRGEP RFIAVGYVDD TQFVRFDSDA ASQRMEPRAP WIEQEGPEYW     60
DGETRKVKAH SQTHRVDLGT LRGYYNQSEA GSHTVQRMYG CDVGSDWRFL RGYHQYAYDG    120
KDYIALKEDL RSWTAADMAA QTTKHKWEAA HVAEQLRAYL EGTCVEWLRR YLENGKETLQ    180
RTDAPKTHMT HHAVSDHEAT LRCWALSFYP AEITLTWQRD GEDQTQDTEL VETRPAGDGT    240
FQKWAAVVVP SGQEQRYTCH VQHEGLPKPL TLRWE                               275

SEQ ID NO: 37            moltype = AA  length = 275
FEATURE                  Location/Qualifiers
source                   1..275
                         mol_type = protein
                         organism = Mus musculus
SEQUENCE: 37
GPHSLRYFVT AVSRPGLGEP RFIAVGYVDD TQFVRFDSDA DNPRFEPRAP WMEQEGPEYW     60
EEQTQRAKSD EQWFRVSLRT AQRCYNQSKG GSHTFQRMFG CDVGSDWRLL RGYQQFAYDG    120
RDYIALNEDL KTWTAADTAA LITRRKWEQA GDAEYYRAYL EGECVEWLRR YLELGNETLL    180
RTDSPKAHVT YHPRSQVDVT LRCWALGFYP ADITLTWQLN GEDLTQDMEL VETRPAGDGT    240
FQKWAAVVVP LGKEQNYTCH VHHKGLPEPL TLRWK                               275

SEQ ID NO: 38            moltype = AA  length = 274
FEATURE                  Location/Qualifiers
source                   1..274
                         mol_type = protein
                         organism = Rattus norvegicus
SEQUENCE: 38
GSHSLRYFYT AVSRPGLGEP RFIAVGYVDD TEFVRFDSDA ENPRMEPRAR WMEREGPEYW     60
EQQTRIAKEW EQIYRVDLRT LRGCYNQSEG GSHTIQEMYG CDVGSDGSLL RGYRQDAYDG    120
RDYIALNEDL KTWTAADFAA QITRNKWERA RYAERLRAYL EGTCVEWLSR YLELGKETLL    180
RSDPPEAHVT LHPRPEGDVT LRCWALGFYP ADITLTWQLN GEDLTQDMEL VETRPAGDGT    240
FQKWASVVVP LGKEQNYTCR VEHEGLPKPL SQRW                                274

SEQ ID NO: 39            moltype = AA  length = 440
```

```
FEATURE                 Location/Qualifiers
source                  1..440
                        mol_type = protein
                        organism = Homo sapiens
SEQUENCE: 39
RIIPRHLQLG CGGSGGGGSG GGGSIQRTPK IQVYSRHPAE NGKSNFLNCY VSGFHPSDIE   60
VDLLKNGERI EKVEHSDLSF SKDWSFYLLY YTEFTPTEKD EYACRVNHVT LSQPKIVKWD  120
RDMGGGGSGG GGSGGGGSGG GGSGSHSMRY FSAAVSRPGR GEPRFIAMGY VDDTQFVRFD  180
SDSACPRMEP RAPWVEQEGP EYWEEETRNT KAHAQTDRMN LQTLRGCYNQ SEASSHTLQW  240
MIGCDLGSDG RLLRGYEQYA YDGKDYIALN EDLRSWTAAD TAAQISKRKC EAANVAEQRR  300
AYLEGTCVEW LHRYLENGKE MLQRADPPKT HVTHHPVFDY EATLRCWALG FYPAEIILTW  360
QRDGEDQTQD VELVETRPAG DGTFQKWAAV VVPSGEEQRY TCHVQHEGLP EPLMLRWGSG  420
LNDIFEAQKI EWHEHHHHHH                                              440

SEQ ID NO: 40           moltype = AA    length = 441
FEATURE                 Location/Qualifiers
source                  1..441
                        mol_type = protein
                        note = exemplary modified human HLA-G 2M MHC class I
                        complex (wherein the HLA-G specific amino acids have been
                        replaced by HLA-A consensus amino acids (= degrafted HLA-G)
                        organism = synthetic construct
SEQUENCE: 40
RIIPRHLQLG CGGSGGGGSG GGGSIQRTPK IQVYSRHPAE NGKSNFLNCY VSGFHPSDIE   60
VDLLKNGERI EKVEHSDLSF SKDWSFYLLY YTEFTPTEKD EYACRVNHVT LSQPKIVKWD  120
RDMGGGGSGG GGSGGGGSGG GGSGSHSMRY FSAAVSRPGR GEPRFIAMGY VDDTQFVRFD  180
SDAASPRMEP RAPWVEQEGP EYWDEETRNT KAHAQTDRVN LGTLRGCYNQ SEAGSHTLQW  240
MIGCDVGSDG RLLRGYEQYA YDGKDYLALN EDLRSWTAAD TAAQISKRKC EAAHVAEQRR  300
AYLEGTCVEW LRRYLENGKE TLQRADPPKT HVTHHPVSDH EATLRCWALG FYPAEITLTW  360
QRDGEDQTQD VELVETRPAG DGTFQKWAAV VVPSGEEQRY TCHVQHEGLP EPLTLRWKGG  420
GLNDIFEAQK IEWHEHHHHH H                                            441

SEQ ID NO: 41           moltype = AA    length = 441
FEATURE                 Location/Qualifiers
source                  1..441
                        mol_type = protein
                        organism = Mus musculus
SEQUENCE: 41
TYQRTRALVG CGGSGGGGSG GGGSIQKTPQ IQVYSRHPPE NGKPNILNCY VTQFHPPHIE   60
IQMLKNGKKI PKVEMSDMSF SKDWSFYILA HTEFTPTETD TYACRVKHDS MAEPKTVYWD  120
RDMGGGGSGG GGSGGGGSGG GGSGPHSLRY FVTAVSRPGL GEPRFIAVGY VDDTQFVRFD  180
SDADNPRFEP RAPWMEQEGP EYWEEQTQRA KSDEQWFRVS LRTAQRCYNQ SKGGSHTFQR  240
MFGCDVGSDW RLLRGYQQFA YDGRDYIALN EDLKTWTAAD TAALITRRKW EQAGDAEYYR  300
AYLEGECVEW LRRYLELGNE TLLRTDSPKA HVTYHPRSQV DVTLRCWALG FYPADITLTW  360
QLNGEDLTQD MELVETRPAG DGTFQKWAAV VVPLGKEQNY TCHVHHKGLP EPLTLRWKGG  420
GLNDIFEAQK IEWHEHHHHH H                                            441

SEQ ID NO: 42           moltype = AA    length = 441
FEATURE                 Location/Qualifiers
source                  1..441
                        mol_type = protein
                        note = exemplary human HLA-G/ mouse H2Kd 2M MHC class I
                        complex wherein the positions specific for human HLA-G are
                        grafted onto the mouse H2Kd framework
                        organism = synthetic construct
SEQUENCE: 42
TYQRTRALVG CGGSGGGGSG GGGSIQKTPQ IQVYSRHPPE NGKPNILNCY VTQFHPPHIE   60
IQMLKNGKKI PKVEMSDMSF SKDWSFYILA HTEFTPTETD TYACRVKHDS MAEPKTVYWD  120
RDMGGGGSGG GGSGGGGSGG GGSGPHSLRY FVTAVSRPGL GEPRFIAVGY VDDTQFVRFD  180
SDSASPRFEP RAPWVEQEGP EYWEEQTQRA KSDEQWFRMS LQTARGCYNQ SEASSHTFQR  240
MFGCDLGSDG RLLRGYQQFA YDGRDYIALN EDLRSWTAAD TAALITKRKW EAANDAEYYR  300
AYLEGECVEW LHRYLENGKE MLQRTDSPKA HVTHHPVFDY EATLRCWALG FYPAEIILTW  360
QLNGEDLTQD VELVETRPAG DGTFQKWAAV VVPSGKEQNY TCHVQHEGLP EPLMLRWKGG  420
GLNDIFEAQK IEWHEHHHHH H                                            441

SEQ ID NO: 43           moltype = AA    length = 440
FEATURE                 Location/Qualifiers
source                  1..440
                        mol_type = protein
                        organism = Rattus norvegicus
SEQUENCE: 43
AQFSASASRG CGGSGGGGSG GGGSIQKTPQ IQVYSRHPPE NGKPNFLNCY VSQFHPPQIE   60
IELLKNGKKI PNIEMSDLSF SKDWSFYILA HTEFTPTETD VYACRVKHVT LKEPKTVTWD  120
RDMGGGGSGG GGSGGGGSGG GGSGSHSLRY FYTAVSRPGL GEPRFIAVGY VDDTEFVRFD  180
SDAENPRMEP RARWMEREGP EYWEQQTRIA KEWEQIYRVD LRTLRGCYNQ SEGGSHTIQE  240
MYGCDVGSDG SLLRGYRQDA YDGRDYIALN EDLKTWTAAD FAAQITRNKW ERARYAERLR  300
AYLEGTCVEW LSRYLELGKE TLLRSDPPEA HVTLHPRPEG DVTLRCWALG FYPADITLTW  360
QLNGEDLTQD MELVETRPAG DGTFQKWASV VVPLGKEQNY TCRVEHEGLP KPLSQRWGSG  420
LNDIFEAQKI EWHEHHHHHH                                              440
```

```
SEQ ID NO: 44          moltype = AA  length = 440
FEATURE                Location/Qualifiers
source                 1..440
                       mol_type = protein
                       note = exemplary human HLA-G/ rat RT1A 2M MHC class I
                         complex wherein the positions specific for human HLA-G are
                         grafted onto the rat RT1A framework
                       organism = synthetic construct
SEQUENCE: 44
AQFSASASRG CGGSGGGGSG GGGSIQKTPQ IQVYSRHPPE NGKPNFLNCY VSQFHPPQIE   60
IELLKNGKKI PNIEMSDLSF SKDWSFYILA HTEFTPTETD VYACRVKHVT LKEPKTVTWD  120
RDMGGGGSGG GGSGGGGSGG GGSGSHSLRY FYTAVSRPGL GEPRFIAVGY VDDTEFVRFD  180
SDSASPRMEP RAPWVEQEGP EYWEQQTRIA KEWEQIYRMD LQTLRGCYNQ SEASSHTIQE  240
MYGCDLGSDG RLLRGYRQDA YDGRDYIALN EDLRSWTAAD FAAQITKRKW EAANYAERLR  300
AYLEGTCVEW LHRYLENGKE MLQRADPPEA HVTHHPVFDY EATLRCWALG FYPAEIILTW  360
QLNGEDLTQD VELVETRPAG DGTFQKWASV VVPSGKEQNY TCRVQHEGLP KPLMLRWGSG  420
LNDIFEAQKI EWHEHHHHHH                                              440

SEQ ID NO: 45          moltype = AA  length = 33
FEATURE                Location/Qualifiers
source                 1..33
                       mol_type = protein
                       note = linker and his-Tag
                       organism = synthetic construct
SEQUENCE: 45
GGGGSGGGGS GSGLNDIFEA QKIEWHEHHH HHH                                33

SEQ ID NO: 46          moltype = AA  length = 9
FEATURE                Location/Qualifiers
source                 1..9
                       mol_type = protein
                       note = peptide
                       organism = synthetic construct
SEQUENCE: 46
VLDFAPPGA                                                            9

SEQ ID NO: 47          moltype = AA  length = 107
FEATURE                Location/Qualifiers
source                 1..107
                       mol_type = protein
                       organism = Homo sapiens
SEQUENCE: 47
RTVAAPSVFI FPPSDEQLKS GTASVVCLLN NFYPREAKVQ WKVDNALQSG NSQESVTEQD   60
SKDSTYSLSS TLTLSKADYE KHKVYACEVT HQGLSSPVTK SFNRGEC                107

SEQ ID NO: 48          moltype = AA  length = 105
FEATURE                Location/Qualifiers
source                 1..105
                       mol_type = protein
                       organism = Homo sapiens
SEQUENCE: 48
QPKAAPSVTL FPPSSEELQA NKATLVCLIS DFYPGAVTVA WKADSSPVKA GVETTTPSKQ   60
SNNKYAASSY LSLTPEQWKS HRSYSCQVTH EGSTVEKTVA PTECS                  105

SEQ ID NO: 49          moltype = AA  length = 328
FEATURE                Location/Qualifiers
source                 1..328
                       mol_type = protein
                       organism = Homo sapiens
SEQUENCE: 49
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSP                                     328

SEQ ID NO: 50          moltype = AA  length = 328
FEATURE                Location/Qualifiers
source                 1..328
                       mol_type = protein
                       organism = Homo sapiens
SEQUENCE: 50
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LGAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
```

```
QQGNVFSCSV MHEALHNHYT QKSLSLSP                                           328

SEQ ID NO: 51           moltype = AA  length = 325
FEATURE                 Location/Qualifiers
source                  1..325
                        mol_type = protein
                        organism = Homo sapiens
SEQUENCE: 51
ASTKGPSVFP LAPCSRSTSE STAALGCLVK DYFPEPVTVS WNSGALTSGV HTFPAVLQSS          60
GLYSLSSVVT VPSSSLGTKT YTCNVDHKPS NTKVDKRVES KYGPPCPSCP APEFLGGPSV         120
FLFPPKPKDT LMISRTPEVT CVVVDVSQED PEVQFNWYVD GVEVHNAKTK PREEQFNSTY         180
RVVSVLTVLH QDWLNGKEYK CKVSNKGLPS SIEKTISKAK GQPREPQVYT LPPSQEEMTK         240
NQVSLTCLVK GFYPSDIAVE WESNGQPENN YKTTPPVLDS DGSFFLYSRL TVDKSRWQEG         300
NVFSCSVMHE ALHNHYTQKS LSLSL                                              325

SEQ ID NO: 52           moltype = AA  length = 6
FEATURE                 Location/Qualifiers
source                  1..6
                        mol_type = protein
                        note = heavy chain CDR-H1, P035-093 (abbreviated as P035)
                        organism = synthetic construct
SEQUENCE: 52
SYAMNW                                                                     6

SEQ ID NO: 53           moltype = AA  length = 18
FEATURE                 Location/Qualifiers
source                  1..18
                        mol_type = protein
                        note = heavy chain CDR-H2, P035-093
                        organism = synthetic construct
SEQUENCE: 53
RIRSKYNNYA TYYADSVK                                                       18

SEQ ID NO: 54           moltype = AA  length = 14
FEATURE                 Location/Qualifiers
source                  1..14
                        mol_type = protein
                        note = heavy chain CDR-H3, P035-093
                        organism = synthetic construct
SEQUENCE: 54
ASNFPASYVS YFAY                                                           14

SEQ ID NO: 55           moltype = AA  length = 14
FEATURE                 Location/Qualifiers
source                  1..14
                        mol_type = protein
                        note = light chain CDR-L1, P035-093
                        organism = synthetic construct
SEQUENCE: 55
GSSTGAVTTS NYAN                                                           14

SEQ ID NO: 56           moltype = AA  length = 7
FEATURE                 Location/Qualifiers
source                  1..7
                        mol_type = protein
                        note = light chain CDR-L2, P035-093
                        organism = synthetic construct
SEQUENCE: 56
GTNKRAP                                                                    7

SEQ ID NO: 57           moltype = AA  length = 9
FEATURE                 Location/Qualifiers
source                  1..9
                        mol_type = protein
                        note = light chain CDR-L3, P035-093
                        organism = synthetic construct
SEQUENCE: 57
ALWYSNLWV                                                                  9

SEQ ID NO: 58           moltype = AA  length = 125
FEATURE                 Location/Qualifiers
source                  1..125
                        mol_type = protein
                        note = heavy chain variable domain VH, P035-093
                        organism = synthetic construct
SEQUENCE: 58
EVQLLESGGG LVQPGGSLRL SCAASGFTFS SYAMNWVRQA PGKGLEWVSR IRSKYNNYAT          60
YYADSVKGRF TISRDDSKNT LYLQMNSLRA EDTAVYYCVR ASNFPASYVS YFAYWGQGTL         120
VTVSS                                                                    125
```

```
SEQ ID NO: 59            moltype = AA   length = 109
FEATURE                  Location/Qualifiers
source                   1..109
                         mol_type = protein
                         note = light chain variable domain VL, P035-093
                         organism = synthetic construct
SEQUENCE: 59
QAVVTQEPSL TVSPGGTVTL TCGSSTGAVT TSNYANWVQE KPGQAFRGLI GGTNKRAPGT    60
PARFSGSLLG GKAALTLSGA QPEDEAEYYC ALWYSNLWVF GGGTKLTVL               109

SEQ ID NO: 60            moltype = AA   length = 5
FEATURE                  Location/Qualifiers
source                   1..5
                         mol_type = protein
                         note = heavy chain CDR-H1, Clone 22 (abbreviated as Cl22)
                         organism = synthetic construct
SEQUENCE: 60
SYAMN                                                                 5

SEQ ID NO: 61            moltype = AA   length = 18
FEATURE                  Location/Qualifiers
source                   1..18
                         mol_type = protein
                         note = heavy chain CDR-H2, Clone 22
                         organism = synthetic construct
SEQUENCE: 61
RIRSKYNNYA TYYADSVK                                                  18

SEQ ID NO: 62            moltype = AA   length = 14
FEATURE                  Location/Qualifiers
source                   1..14
                         mol_type = protein
                         note = heavy chain CDR-H3, Clone 22
                         organism = synthetic construct
SEQUENCE: 62
HTTFPSSYVS YYGY                                                      14

SEQ ID NO: 63            moltype = AA   length = 14
FEATURE                  Location/Qualifiers
source                   1..14
                         mol_type = protein
                         note = light chain CDR-L1, Clone 22
                         organism = synthetic construct
SEQUENCE: 63
GSSTGAVTTS NYAN                                                      14

SEQ ID NO: 64            moltype = AA   length = 7
FEATURE                  Location/Qualifiers
source                   1..7
                         mol_type = protein
                         note = light chain CDR-L2, Clone 22
                         organism = synthetic construct
SEQUENCE: 64
GTNKRAP                                                               7

SEQ ID NO: 65            moltype = AA   length = 9
FEATURE                  Location/Qualifiers
source                   1..9
                         mol_type = protein
                         note = light chain CDR-L3, Clone 22
                         organism = synthetic construct
SEQUENCE: 65
ALWYSNLWV                                                             9

SEQ ID NO: 66            moltype = AA   length = 125
FEATURE                  Location/Qualifiers
source                   1..125
                         mol_type = protein
                         note = heavy chain variable domain VH, Clone 22
                         organism = synthetic construct
SEQUENCE: 66
EVQLLESGGG LVQPGGSLRL SCAASGFQFS SYAMNWVRQA PGKGLEWVSR IRSKYNNYAT    60
YYADSVKGRF TISRDDSKNT LYLQMNSLRA EDTAVYYCVR HTTFPSSYVS YYGYWGQGTL   120
VTVSS                                                               125

SEQ ID NO: 67            moltype = AA   length = 109
FEATURE                  Location/Qualifiers
source                   1..109
```

|  |  |  |
|---|---|---|
|  | mol_type = protein<br>note = light chain variable domain VL, Clone 22<br>organism = synthetic construct |  |
| SEQUENCE: 67 |  |  |
| QAVVTQEPSL TVSPGGTVTL TCGSSTGAVT TSNYANWVQE KPGQAFRGLI GGTNKRAPGT | | 60 |
| PARFSGSLLG GKAALTLSGA QPEDEAEYYC ALWYSNLWVF GGGTKLTVL | | 109 |
| SEQ ID NO: 68<br>FEATURE<br>source | moltype = AA length = 5<br>Location/Qualifiers<br>1..5<br>mol_type = protein<br>note = heavy chain CDR-H1, V9<br>organism = synthetic construct |  |
| SEQUENCE: 68 |  |  |
| GYTMN | | 5 |
| SEQ ID NO: 69<br>FEATURE<br>source | moltype = AA length = 17<br>Location/Qualifiers<br>1..17<br>mol_type = protein<br>note = heavy chain CDR-H2, V9<br>organism = synthetic construct |  |
| SEQUENCE: 69 |  |  |
| LINPYKGVST YNQKFKD | | 17 |
| SEQ ID NO: 70<br>FEATURE<br>source | moltype = AA length = 13<br>Location/Qualifiers<br>1..13<br>mol_type = protein<br>note = heavy chain CDR-H3, V9<br>organism = synthetic construct |  |
| SEQUENCE: 70 |  |  |
| SGYYGDSDWY FDV | | 13 |
| SEQ ID NO: 71<br>FEATURE<br>source | moltype = AA length = 11<br>Location/Qualifiers<br>1..11<br>mol_type = protein<br>note = heavy chain CDR-L1, V9<br>organism = synthetic construct |  |
| SEQUENCE: 71 |  |  |
| RASQDIRNYL N | | 11 |
| SEQ ID NO: 72<br>FEATURE<br>source | moltype = AA length = 7<br>Location/Qualifiers<br>1..7<br>mol_type = protein<br>note = heavy chain CDR-L2, V9<br>organism = synthetic construct |  |
| SEQUENCE: 72 |  |  |
| YTSRLES | | 7 |
| SEQ ID NO: 73<br>FEATURE<br>source | moltype = AA length = 9<br>Location/Qualifiers<br>1..9<br>mol_type = protein<br>note = heavy chain CDR-L3, V9<br>organism = synthetic construct |  |
| SEQUENCE: 73 |  |  |
| QQGNTLPWT | | 9 |
| SEQ ID NO: 74<br>FEATURE<br>source | moltype = AA length = 122<br>Location/Qualifiers<br>1..122<br>mol_type = protein<br>note = heavy chain variable domain VH, V9<br>organism = synthetic construct |  |
| SEQUENCE: 74 |  |  |
| EVQLVESGGG LVQPGGSLRL SCAASGYSFT GYTMNWVRQA PGKGLEWVAL INPYKGVSTY | | 60 |
| NQKFKDRFTI SVDKSKNTAY LQMNSLRAED TAVYYCARSG YYGDSDWYFD VWGQGTLVTV | | 120 |
| SS | | 122 |
| SEQ ID NO: 75<br>FEATURE<br>source | moltype = AA length = 107<br>Location/Qualifiers<br>1..107<br>mol_type = protein<br>note = light chain variable domain VL, V9<br>organism = synthetic construct |  |
| SEQUENCE: 75 |  |  |

```
DIQMTQSPSS LSASVGDRVT ITCRASQDIR NYLNWYQQKP GKAPKLLIYY TSRLESGVPS    60
RFSGSGSGTD YTLTISSLQP EDFATYYCQQ GNTLPWTFGQ GTKVEIK                 107

SEQ ID NO: 76            moltype = AA  length = 232
FEATURE                  Location/Qualifiers
source                   1..232
                         mol_type = protein
                         note = light chain 1 P1AF7977
                         organism = synthetic construct
SEQUENCE: 76
EVQLLESGGG LVQPGGSLRL SCAASGFTFS SYAMNWVRQA PGKGLEWVSR IRSKYNNYAT    60
YYADSVKGRF TISRDDSKNT LYLQMNSLRA EDTAVYYCVR ASNFPASYVS YFAYWGQGTL   120
VTVSSASVAA PSVFIFPPSD EQLKSGTASV VCLLNNFYPR EAKVQWKVDN ALQSGNSQES   180
VTEQDSKDST YSLSSTLTLS KADYEKHKVY ACEVTHQGLS SPVTKSFNRG EC           232

SEQ ID NO: 77            moltype = AA  length = 220
FEATURE                  Location/Qualifiers
source                   1..220
                         mol_type = protein
                         note = light chain 2 P1AF7977
                         organism = synthetic construct
SEQUENCE: 77
DIVMTQSPDS LAVSLGERAT INCKSSQSVL NPSNNKNNLA WYQQQPGQPP KLLIYWASTR    60
ESGVPDRFSG SGSGTDFTLT ISSLQAEDVA VYFCQQYYRT PWTFGQGTKV EIKRTVAAPS   120
VFIFPPSDRK LKSGTASVVC LLNNFYPREA KVQWKVDNAL QSGNSQESVT EQDSKDSTYS   180
LSSTLTLSKA DYEKHKVYAC EVTHQGLSSP VTKSFNRGEC                        220

SEQ ID NO: 78            moltype = AA  length = 449
FEATURE                  Location/Qualifiers
source                   1..449
                         mol_type = protein
                         note = heavy chain 1 P1AF7977
                         organism = synthetic construct
SEQUENCE: 78
QVQLQQSGPG LLKPSQTLSL TCAISGDSVS SNRAAWNWIR QSPSRGLEWL GRTYYRSKWY    60
NDYAVSVQGR ITLIPDTSKN QFSLRLNSVT PEDTAVYYCA SVRAVAPFDY WGQGVLVTVS   120
SASTKGPSVF PLAPSSKSTS GGTAALGCLV EDYFPEPVTV SWNSGALTSG VHTFPAVLQS   180
SGLYSLSSVV TVPSSSLGTQ TYICNVNHKP SNTKVDEKVE PKSCDKTHTC PPCPAPEAAG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALGAPIEKTI SKAKGQPREP QVCTLPPSRD   360
ELTKNQVSLS CAVKGFYPSD IAVEWESNGQ PENNYKTTPP VLDSDGSFFL VSKLTVDKSR   420
WQQGNVFSCS VMHEALHNHY TQKSLSLSP                                    449

SEQ ID NO: 79            moltype = AA  length = 674
FEATURE                  Location/Qualifiers
source                   1..674
                         mol_type = protein
                         note = heavy chain 2 P1AF7977
                         organism = synthetic construct
SEQUENCE: 79
QVQLQQSGPG LLKPSQTLSL TCAISGDSVS SNRAAWNWIR QSPSRGLEWL GRTYYRSKWY    60
NDYAVSVQGR ITLIPDTSKN QFSLRLNSVT PEDTAVYYCA SVRAVAPFDY WGQGVLVTVS   120
SASTKGPSVF PLAPSSKSTS GGTAALGCLV EDYFPEPVTV SWNSGALTSG VHTFPAVLQS   180
SGLYSLSSVV TVPSSSLGTQ TYICNVNHKP SNTKVDEKVE PKSCDGGGGS GGGGGQAVVT   240
QEPSLTVSPG GTVTLTCGSS TGAVTTSNYA NWVQEKPGQA FRGLIGGTNK RAPGTPARFS   300
GSLLGGKAAL TLSGAQPEDE AEYYCALWYS NLWVFGGGTK LTVLSSASTK GPSVFPLAPS   360
SKSTSGGTAA LGCLVKDYFP EPVTVSWNSG ALTSGVHTFP AVLQSSGLYS LSSVVTVPSS   420
SLGTQTYICN VNHKPSNTKV DKKVEPKSCD KTHTCPPCPA PEAAGGPSVF LFPPKPKDTL   480
MISRTPEVTC VVVDVSHEDP EVKFNWYVDG VEVHNAKTKP REEQYNSTYR VVSVLTVLHQ   540
DWLNGKEYKC KVSNKALGAP IEKTISKAKG QPREPQVYTL PPCRDELTKN QVSLWCLVKG   600
FYPSDIAVEW ESNGQPENNY KTTPPVLDSD GSFFLYSKLT VDKSRWQQGN VFSCSVMHEA   660
LHNHYTQKSL SLSP                                                    674

SEQ ID NO: 80            moltype = AA  length = 232
FEATURE                  Location/Qualifiers
source                   1..232
                         mol_type = protein
                         note = light chain 1 P1AF7978
                         organism = synthetic construct
SEQUENCE: 80
EVQLLESGGG LVQPGGSLRL SCAASGFQFS SYAMNWVRQA PGKGLEWVSR IRSKYNNYAT    60
YYADSVKGRF TISRDDSKNT LYLQMNSLRA EDTAVYYCVR HTTFPSSYVS YYGYWGQGTL   120
VTVSSASVAA PSVFIFPPSD EQLKSGTASV VCLLNNFYPR EAKVQWKVDN ALQSGNSQES   180
VTEQDSKDST YSLSSTLTLS KADYEKHKVY ACEVTHQGLS SPVTKSFNRG EC           232

SEQ ID NO: 81            moltype = AA  length = 220
FEATURE                  Location/Qualifiers
source                   1..220
                         mol_type = protein
```

```
                         note = light chain 2 P1AF7978
                         organism = synthetic construct
SEQUENCE: 81
DIVMTQSPDS LAVSLGERAT INCKSSQSVL NPSNNKNNLA WYQQQPGQPP KLLIYWASTR    60
ESGVPDRFSG SGSGTDFTLT ISSLQAEDVA VYFCQQYYRT PWTFGQGTKV EIKRTVAAPS   120
VFIFPPSDRK LKSGTASVVC LLNNFYPREA KVQWKVDNAL QSGNSQESVT EQDSKDSTYS   180
LSSTLTLSKA DYEKHKVYAC EVTHQGLSSP VTKSFNRGEC                         220

SEQ ID NO: 82            moltype = AA  length = 449
FEATURE                  Location/Qualifiers
source                   1..449
                         mol_type = protein
                         note = heavy chain 1 P1AF7978
                         organism = synthetic construct
SEQUENCE: 82
QVQLQQSGPG LLKPSQTLSL TCAISGDSVS SNRAAWNWIR QSPSRGLEWL GRTYYRSKWY    60
NDYAVSVQGR ITLIPDTSKN QFSLRLNSVT PEDTAVYYCA SVRAVAPFDY WGQGVLVTVS   120
SASTKGPSVF PLAPSSKSTS GGTAALGCLV EDYFPEPVTV SWNSGALTSG VHTFPAVLQS   180
SGLYSLSSVV TVPSSSLGTQ TYICNVNHKP SNTKVDEKVE PKSCDKTHTC PPCPAPEAAG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALGAPIEKTI SKAKGQPREP QVCTLPPSRD   360
ELTKNQVSLS CAVKGFYPSD IAVEWESNGQ PENNYKTTPP VLDSDGSFFL VSKLTVDKSR   420
WQQGNVFSCS VMHEALHNHY TQKSLSLSP                                    449

SEQ ID NO: 83            moltype = AA  length = 674
FEATURE                  Location/Qualifiers
source                   1..674
                         mol_type = protein
                         note = heavy chain 2 P1AF7978
                         organism = synthetic construct
SEQUENCE: 83
QVQLQQSGPG LLKPSQTLSL TCAISGDSVS SNRAAWNWIR QSPSRGLEWL GRTYYRSKWY    60
NDYAVSVQGR ITLIPDTSKN QFSLRLNSVT PEDTAVYYCA SVRAVAPFDY WGQGVLVTVS   120
SASTKGPSVF PLAPSSKSTS GGTAALGCLV EDYFPEPVTV SWNSGALTSG VHTFPAVLQS   180
SGLYSLSSVV TVPSSSLGTQ TYICNVNHKP SNTKVDEKVE PKSCDGGGGS GGGGGQAVVT   240
QEPSLTVSPG GTVTLTCGSS TGAVTTSNYA NWVQEKPGQA FRGLIGGTNK RAPGTPARFS   300
GSLLGGKAAL TLSGAQPEDE AEYYCALWYS NLWVFGGGTK LTVLSSASTK GPSVFPLAPS   360
SKSTSGGTAA LGCLVKDYFP EPVTVSWNSG ALTSGVHTFP AVLQSSGLYS LSSVVTVPSS   420
SLGTQTYICN VNHKPSNTKV DKKVEPKSCD KTHTCPPCPA PEAAGGPSVF LFPPKPKDTL   480
MISRTPEVTC VVVDVSHEDP EVKFNWYVDG VEVHNAKTKP REEQYNSTYR VVSVLTVLHQ   540
DWLNGKEYKC KVSNKALGAP IEKTISKAKG QPREPQVYTL PPCRDELTKN QVSLWCLVKG   600
FYPSDIAVEW ESNGQPENNY KTTPPVLDSD GSFFLYSKLT VDKSRWQQGN VFSCSVMHEA   660
LHNHYTQKSL SLSP                                                   674

SEQ ID NO: 84            moltype = AA  length = 229
FEATURE                  Location/Qualifiers
source                   1..229
                         mol_type = protein
                         note = light chain 1 P1AF7979
                         organism = synthetic construct
SEQUENCE: 84
EVQLVESGGG LVQPGGSLRL SCAASGYSFT GYTMNWVRQA PGKGLEWVAL INPYKGVSTY    60
NQKFKDRFTI SVDKSKNTAY LQMNSLRAED TAVYYCARSG YYGDSDWYFD VWGQGTLVTV   120
SSASVAAPSV FIFPPSDEQL KSGTASVVCL LNNFYPREAK VQWKVDNALQ SGNSQESVTE   180
QDSKDSTYSL SSTLTLSKAD YEKHKVYACE VTHQGLSSPV TKSFNRGEC               229

SEQ ID NO: 85            moltype = AA  length = 220
FEATURE                  Location/Qualifiers
source                   1..220
                         mol_type = protein
                         note = light chain 2 P1AF7979
                         organism = synthetic construct
SEQUENCE: 85
DIVMTQSPDS LAVSLGERAT INCKSSQSVL NPSNNKNNLA WYQQQPGQPP KLLIYWASTR    60
ESGVPDRFSG SGSGTDFTLT ISSLQAEDVA VYFCQQYYRT PWTFGQGTKV EIKRTVAAPS   120
VFIFPPSDRK LKSGTASVVC LLNNFYPREA KVQWKVDNAL QSGNSQESVT EQDSKDSTYS   180
LSSTLTLSKA DYEKHKVYAC EVTHQGLSSP VTKSFNRGEC                         220

SEQ ID NO: 86            moltype = AA  length = 449
FEATURE                  Location/Qualifiers
source                   1..449
                         mol_type = protein
                         note = heavy chain 1 P1AF7979
                         organism = synthetic construct
SEQUENCE: 86
QVQLQQSGPG LLKPSQTLSL TCAISGDSVS SNRAAWNWIR QSPSRGLEWL GRTYYRSKWY    60
NDYAVSVQGR ITLIPDTSKN QFSLRLNSVT PEDTAVYYCA SVRAVAPFDY WGQGVLVTVS   120
SASTKGPSVF PLAPSSKSTS GGTAALGCLV EDYFPEPVTV SWNSGALTSG VHTFPAVLQS   180
SGLYSLSSVV TVPSSSLGTQ TYICNVNHKP SNTKVDEKVE PKSCDKTHTC PPCPAPEAAG   240
```

```
GPSVFLFPPK PKDTLMISRT PEVTCVVVDV SHEDPEVKFN WYVDGVEVHN AKTKPREEQY    300
NSTYRVVSVL TVLHQDWLNG KEYKCKVSNK ALGAPIEKTI SKAKGQPREP QVCTLPPSRD    360
ELTKNQVSLS CAVKGFYPSD IAVEWESNGQ PENNYKTTPP VLDSDGSFFL VSKLTVDKSR    420
WQQGNVFSCS VMHEALHNHY TQKSLSLSP                                     449

SEQ ID NO: 87           moltype = AA  length = 672
FEATURE                 Location/Qualifiers
source                  1..672
                        mol_type = protein
                        note = heavy chain 2 P1AF7979
                        organism = synthetic construct
SEQUENCE: 87
QVQLQQSGPG LLKPSQTLSL TCAISGDSVS SNRAAWNWIR QSPSRGLEWL GRTYYRSKWY     60
NDYAVSVQGR ITLIPDTSKN QFSLRLNSVT PEDTAVYYCA SVRAVAPFDY WGQGVLVTVS    120
SASTKGPSVF PLAPSSKSTS GGTAALGCLV EDYFPEPVTV SWNSGALTSG VHTFPAVLQS    180
SGLYSLSSVV TVPSSSLGTQ TYICNVNHKP SNTKVDEKVE PKSCDGGGGS GGGGGDIQMT    240
QSPSSLSASV GDRVTITCRA SQDIRNYLNW YQQKPGKAPK LLIYYTSRLE SGVPSRFSGS    300
GSGTDYTLTI SSLQPEDFAT YYCQQGNTLP WTFGQGTKVE IKSSASTKGP SVFPLAPSSK    360
STSGGTAALG CLVKDYFPEP VTVSWNSGAL TSGVHTFPAV LQSSGLYSLS SVVTVPSSSL    420
GTQTYICNVN HKPSNTKVDK KVEPKSCDKT HTCPPCPAPE AAGGPSVFLF PPKPKDTLMI    480
SRTPEVTCVV VDVSHEDPEV KFNWYVDGVE VHNAKTKPRE EQYNSTYRVV SVLTVLHQDW    540
LNGKEYKCKV SNKALGAPIE KTISKAKGQP REPQVYTLPP CRDELTKNQV SLWCLVKGFY    600
PSDIAVEWES NGQPENNYKT TPPVLDSDGS FFLYSKLTVD KSRWQQGNVF SCSVMHEALH    660
NHYTQKSLSL SP                                                       672

SEQ ID NO: 88           moltype = AA  length = 207
FEATURE                 Location/Qualifiers
source                  1..207
                        mol_type = protein
                        organism = Homo sapiens
SEQUENCE: 88
MQSGTHWRVL GLCLLSVGVW GQDGNEEMGG ITQTPYKVSI SGTTVILTCP QYPGSEILWQ     60
HNDKNIGGDE DDKNIGSDED HLSLKEFSEL EQSGYYVCYP RGSKPEDANF YLYLRARVCE    120
NCMEMDVMSV ATIVIVDICI TGGLLLLVYY WSKNRKAKAK PVTRGAGAGG RQRGQNKERP    180
PPVPNPDYEP IRKGQRDLYS GLNQRRI                                       207

SEQ ID NO: 89           moltype = AA  length = 198
FEATURE                 Location/Qualifiers
source                  1..198
                        mol_type = protein
                        organism = Macaca fascicularis
SEQUENCE: 89
MQSGTRWRVL GLCLLSIGVW GQDGNEEMGS ITQTPYQVSI SGTTVILTCS QHLGSEAQWQ     60
HNGKNKEDSG DRLFLPEFSE MEQSGYYVCY PRGSNPEDAS HHLYLKARVC ENCMEMDVMA    120
VATIVIVDIC ITLGLLLLVY YWSKNRKAKA KPVTRGAGAG GRQRGQNKER PPPVPNPDYE    180
PIRKGQQDLY SGLNQRRI                                                 198

SEQ ID NO: 90           moltype = AA  length = 360
FEATURE                 Location/Qualifiers
source                  1..360
                        mol_type = protein
                        note = Human CD3 epsilon stalk - Fc(knob) - Avi
                        organism = synthetic construct
SEQUENCE: 90
QDGNEEMGGI TQTPYKVSIS GTTVILTCPQ YPGSEILWQH NDKNIGGDED DKNIGSDEDH     60
LSLKEFSELE QSGYYVCYPR GSKPEDANFY LYLRARVSEN CVDEQLYFQG GSPKSADKTH    120
TCPPCPAPEL LGGPSVFLFP PKPKDTLMIS RTPEVTCVVV DVSHEDPEVK FNWYVDGVEV    180
HNAKTKPREE QYNSTYRVVS VLTVLHQDWL NGKEYKCKVS NKALPAPIEK TISKAKGQPR    240
EPQVYTLPPC RDELTKNQVS LWCLVKGFYP SDIAVEWESN GQPENNYKTT PPVLDSDGSF    300
FLYSKLTVDK SRWQQGNVFS CSVMHEALHN HYTQKSLSLS PGKSGGLNDI FEAQKIEWHE    360

SEQ ID NO: 91           moltype = AA  length = 325
FEATURE                 Location/Qualifiers
source                  1..325
                        mol_type = protein
                        note = Human CD3 delta stalk - Fc (hole) - Avi
                        organism = synthetic construct
SEQUENCE: 91
FKIPIEELED RVFVNCNTSI TWVEGTVGTL LSDITRLDLG KRILDPRGIY RCNGTDIYKD     60
KESTVQVHYR MCRSEQLYFQ GDKTHTCPPC PAPELLGGPS VFLFPPKPKD TLMISRTPEV    120
TCVVVDVSHE DPEVKFNWYV DGVEVHNAKT KPREEQYNST YRVVSVLTVL HQDWLNGKEY    180
KCKVSNKALP APIEKTISKA KGQPREPQVC TLPPSRDELT KNQVSLSCAV KGFYPSDIAV    240
EWESNGQPEN NYKTTPPVLD SDGSFFLVSK LTVDKSRWQQ GNVFSCSVMH EALHNHYTQK    300
SLSLSPGKSG GLNDIFEAQK IEWHE                                         325

SEQ ID NO: 92           moltype = AA  length = 125
FEATURE                 Location/Qualifiers
source                  1..125
                        mol_type = protein
```

```
                         note = CD3orig VH
                         organism = synthetic construct
SEQUENCE: 92
EVQLLESGGG LVQPGGSLRL SCAASGFTFS TYAMNWVRQA PGKGLEWVSR IRSKYNNYAT    60
YYADSVKGRF TISRDDSKNT LYLQMNSLRA EDTAVYYCVR HGNFGNSYVS WFAYWGQGTL   120
VTVSS                                                              125

SEQ ID NO: 93            moltype = AA  length = 109
FEATURE                  Location/Qualifiers
source                   1..109
                         mol_type = protein
                         note = CD3orig VL
                         organism = synthetic construct
SEQUENCE: 93
QAVVTQEPSL TVSPGGTVTL TCGSSTGAVT TSNYANWVQE KPGQAFRGLI GGTNKRAPGT    60
PARFSGSLLG GKAALTLSGA QPEDEAEYYC ALWYSNLWVF GGGTKLTVL               109

SEQ ID NO: 94            moltype = AA  length = 453
FEATURE                  Location/Qualifiers
source                   1..453
                         mol_type = protein
                         note = CD3orig IgG HC
                         organism = synthetic construct
SEQUENCE: 94
EVQLLESGGG LVQPGGSLRL SCAASGFTFS TYAMNWVRQA PGKGLEWVSR IRSKYNNYAT    60
YYADSVKGRF TISRDDSKNT LYLQMNSLRA EDTAVYYCVR HGNFGNSYVS WFAYWGQGTL   120
VTVSSASTKG PSVFPLAPSS KSTSGGTAAL GCLVKDYFPE PVTVSWNSGA LTSGVHTFPA   180
VLQSSGLYSL SSVVTVPSSS LGTQTYICNV NHKPSNTKVD KKVEPKSCDK THTCPPCPAP   240
ELLGGPSVFL FPPKPKDTLM ISRTPEVTCV VVDVSHEDPE VKFNWYVDGV EVHNAKTKPR   300
EEQYNSTYRV VSVLTVLHQD WLNGKEYKCK VSNKALPAPI EKTISKAKGQ PREPQVYTLP   360
PSRDELTKNQ VSLTCLVKGF YPSDIAVEWE SNGQPENNYK TTPPVLDSDG SFFLYSKLTV   420
DKSRWQQGNV FSCSVMHEAL HNHYTQKSLS LSP                                453

SEQ ID NO: 95            moltype = AA  length = 453
FEATURE                  Location/Qualifiers
source                   1..453
                         mol_type = protein
                         note = P035 IgG HC
                         organism = synthetic construct
SEQUENCE: 95
EVQLLESGGG LVQPGGSLRL SCAASGFQFS SYAMNWVRQA PGKGLEWVSR IRSKYNNYAT    60
YYADSVKGRF TISRDDSKNT LYLQMNSLRA EDTAVYYCVR HTTFPSSYVS YYGYWGQGTL   120
VTVSSASTKG PSVFPLAPSS KSTSGGTAAL GCLVKDYFPE PVTVSWNSGA LTSGVHTFPA   180
VLQSSGLYSL SSVVTVPSSS LGTQTYICNV NHKPSNTKVD KKVEPKSCDK THTCPPCPAP   240
EAAGGPSVFL FPPKPKDTLM ISRTPEVTCV VVDVSHEDPE VKFNWYVDGV EVHNAKTKPR   300
EEQYNSTYRV VSVLTVLHQD WLNGKEYKCK VSNKALGAPI EKTISKAKGQ PREPQVYTLP   360
PSRDELTKNQ VSLTCLVKGF YPSDIAVEWE SNGQPENNYK TTPPVLDSDG SFFLYSKLTV   420
DKSRWQQGNV FSCSVMHEAL HNHYTQKSLS LSP                                453

SEQ ID NO: 96            moltype = AA  length = 216
FEATURE                  Location/Qualifiers
source                   1..216
                         mol_type = protein
                         note = CD3orig / P035 IgG LC
                         organism = synthetic construct
SEQUENCE: 96
QAVVTQEPSL TVSPGGTVTL TCGSSTGAVT TSNYANWVQE KPGQAFRGLI GGTNKRAPGT    60
PARFSGSLLG GKAALTLSGA QPEDEAEYYC ALWYSNLWVF GGGTKLTVLR TVAAPSVFIF   120
PPSDEQLKSG TASVVCLLNN FYPREAKVQW KVDNALQSGN SQESVTEQDS KDSTYSLSST   180
LTLSKADYEK HKVYACEVTH QGLSSPVTKS FNRGEC                             216
```

ANTI-HLA-G ANTIBODIES AND USE THEREOF

CROSS REFERENCE TO RELATED APPLICATIONS

This application is a continuation of U.S. patent application Ser. No. 17/644,525, filed Dec. 15, 2021, which claims priority to European Patent Application No. 21203272.6, filed Oct. 18, 2021, and European Patent Application No. 20214951.4, filed Dec. 17, 2020, each of which is incorporated herein by reference in its entirety.

SEQUENCE LISTING

This application contains a Sequence Listing which has been submitted electronically in XML format and is hereby incorporated by reference in its entirety. Said XML copy, created on Oct. 17, 2022, is named 50474-285002_Sequence_Listing_10_17_22.XML and is 113,137 bytes in size.

FIELD OF INVENTION

The present invention relates to anti-HLA-G antibodies, their preparation, formulations and methods of using the same.

BACKGROUND OF THE INVENTION

The human major histocompatibility complex, class I, 6, also known as human leukocyte antigen G (HLA-G), is a protein that in humans is encoded by the HLA-G gene. HLA-G belongs to the HLA nonclassical class I heavy chain paralogues. This class I molecule is a heterodimer consisting of a heavy chain and a light chain (beta-2 microglobulin). The heavy chain is anchored in the membrane but can also be shedded/secreted.

The heavy chain consists of three domains: alpha 1, alpha 2 and alpha 3. The alpha 1 and alpha 2 domains form a peptide binding groove flanked by two alpha helices. Small peptides (approximately 9-mers) can bind to this groove akin to other MHC I proteins.

The second chain is beta 2 microglobulin which binds to the heavy chain similar to other MHC I proteins.

For HLA-G there exist 7 isoforms, 3 secreted and 4 membrane bound forms (as schematically shown in FIG. 1).

HLA-G can form functionally active complex oligomeric structures (Kuroki, K et al. Eur J Immunol. 37 (2007) 1727-1729). Disulfide-linked dimers are formed between Cys 42 of two HLA-G molecules. (Shiroishi M et al., J Biol Chem 281 (2006) 10439-10447. Trimers and Tetrameric complexes have also been described e.g. in Kuroki, K et al. Eur J Immunol. 37 (2007) 1727-1729, Allan D. S., et al. J Immunol Methods. 268 (2002) 43-50 and T Gonen-Gross et al., J Immunol 171 (2003) 1343-1351).

HLA-G is predominantly expressed on cytotrophoblasts in the placenta. Several tumors (including pancreatic, breast, skin, colorectal, gastric & ovarian) express HLA-G (Lin, A. et al., Mol Med. 21 (2015) 782-791; Amiot, L., et al., Cell Mol Life Sci. 68 (2011) 417-431). The expression has also been reported to be associated with pathological conditions like inflammatory diseases, GvHD and cancer. Expression of HLA-G has been reported to be associated with poor prognosis in cancer. Tumor cells escape host immune surveillance by inducing immune tolerance/suppression via HLA-G expression.

| Overview polymorphisms HLA family | | |
|---|---|---|
| HLA-A: | 2579 seqs | classical class I MHC |
| HLA-A: | 3283 seqs | |
| HLA-C: | 2133 seqs | |
| HLA-E: | 15 seqs | non-classical class I MHC |
| HLA-F: | 22 seqs | |
| HLA-G: | 50 seqs | |

HLA-G shares high homology (>98%) with other MHC I molecules, therefore truly HLA-G specific antibodies with no crossreactivity to other MHC I molecules are difficult to generate.

Certain antibodies which interact in different ways with HLA-G were described previously: Tissue Antigens, 55 (2000) 510-518 relates to monoclonal antibodies e.g. 87G, and MEM-G/9; Neoplasma 50 (2003) 331-338 relates to certain monoclonal antibodies recognizing both, intact HLA-G oligomeric complex (e.g. 87G and MEM-G9) as well as HLA-G free heavy chain (e.g. 4H84, MEM-G/1 and MEM-G/2); Hum Immunol. 64 (2003) 315-326 relates to several antibodies tested on HLA-G expressing JEG3 tumor cells (e.g. MEM-G/09 and -G/13 which react exclusively with native HLA-G1 molecules. MEM-G/01 recognizes (similar to the 4H84 mAb) the denatured HLA-G heavy chain of all isoforms, whereas MEM-G/04 recognizes selectively denatured HLA-G1, -G2, and -G5 isoforms; Wiendl et al Brain 2003 176-85 relates to different monoclonal HLA-G antibodies as e.g. 87G, 4H84, MEM-G/9.

The above publications report antibodies, which bind to human HLA-G or the human HLA-G-β2M MHC complex. However, due to the high polymorphism and high homology of the HLA family most of the antibodies lack either truly specific HLA-G binding properties and often also bind or crossreact with other HLA family members (either as MHC complex with β2M or in its β2M-free form) or they simply do not inhibit binding of HLA-Gβ2M MHC complex to its receptors ILT2 and/or ILT4 (and are regarded as non-antagonistic antibodies).

WO2019/202040 relates to HLA-G antibodies including antibody HLA-G-0090. WO 2019/202041 relates to multi-specific HLA-G antibodies including antibody HLA-G-0090.

SUMMARY OF THE INVENTION

The invention described herein provides an antibody that binds to human HLA-G comprising
A) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23; (ii) CDR-L2 comprising the amino acid sequence of SEQ ID NO:5 and (iii) CDR-L3 comprising the amino acid sequence of SEQ ID NO:6, or
B) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:25; (ii) CDR-L2 comprising the amino acid sequence of SEQ ID NO:5 and (iii) CDR-L3 comprising the amino acid sequence of SEQ ID NO:6.

One embodiment of the invention is an antibody that binds to human HLA-G wherein the antibody
A) comprises a VH domain comprising the amino acid sequence of SEQ ID NO:7 and a VL domain comprising the amino acid sequence of SEQ ID NO:24; or
B) comprises a VH domain comprising the amino acid sequence of SEQ ID NO:7 and a VL domain comprising the amino acid sequence of SEQ ID NO:26.

One embodiment of the invention is an antibody that binds to human HLA-G wherein the antibody comprises a VH domain comprising the amino acid sequence of SEQ ID NO:7 and a VL domain comprising the amino acid sequence of SEQ ID NO:24.

One embodiment of the invention is an antibody that binds to human HLA-G wherein the antibody comprises a VH domain comprising the amino acid sequence of SEQ ID NO:7 and a VL domain comprising the amino acid sequence of SEQ ID NO:26.

Such antibodies have highly valuable properties like their binding properties, their high specificity towards HLA-G with no crossreactivity to HLA-A and HLA MHC I complexes from other species. They can bind to HLA-G on cells and inhibit ILT2 and/or ILT4 binding to HLA-G expressed on these cells. They have been generated from the HLA-G antibody HLA-G-0090.

As the HLA-G antibody HLA-G-0090 described in WO 2019/202040 comprises a glycosylation site in one of the CDRs (CDR-L1 which comprises a NSS motif at amino acids 31, 32 and 33 of the light chain (LC)), its binding properties are impacted by the N-glycosylation which constitutes a potential developability liability.

A homology model of the variable region of HLA-G-0090 indicated that light chain (LC) positions 31 to 33 are highly solvent accessible. Furthermore, the side chains of N31 and S32 are predicted to point inwards, in the direction of CDR-H3, making them likely candidates for being part of the antibody paratope. In fact, a number of published antibody-antigen X-ray complex structures document these residues to be undergoing chemical interactions with the antigen. Therefore, the risk of worsening the binding affinity of the antibody by introducing mutations at LC positions 31-33 was high. Therefore various variants of antibody HLA-G-0090 with mutations on LC positions 31, 32, and 33 were designed from which however most variants worsened binding properties or expressibility. Surprisingly it was found that among these various variants of HLAG-0090 in which the glycosylation site was removed only the two variants HLA-G-0090-VL-S32P and HLA-G-0090-VL-S33A show even improved binding properties, good expressibility and stability, while showing no more N-glycosylation at the CDR-L1 of the LC (so no Fab glycosylation could be detected). As all recently approved pharmaceutical antibody products are produced in mammalian cells, especially CHO cells (see e.g. Walsh G., Nature Biotech (2018) 1136-1145), providing an antibody without glycosylation sites in the binding region (VH and VL and especially the CDRs) represents a valuable advantage, as these antibodies can readily be used for production in mammalian expression systems without the risk of (at least partially) impairing the binding properties by glycosylation.

In a further embodiment the HLA-G antibody of the present invention comprises a Fc domain of human origin. In one embodiment the Fc domain is of the IgG isotype, in one preferred embodiment of the IgG1 isotype.

In a further embodiment the HLA-G antibody of the present invention is a bispecific antibody, in particular an a bispecific antibody that binds to human HLA-G and to human CD3, comprising a first antigen binding moiety that binds to human HLA-G and a second antigen binding moiety that binds to human CD3.

In one embodiment the HLA-G antibody of the present invention is a bispecific antibody that binds to human HLA-G and to human CD3, comprising a first antigen binding moiety that binds to human HLA-G and a second antigen binding moiety that binds to human CD3, wherein the first antigen binding moiety that binds to human HLA-G comprises
A) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23; (ii) CDR-L2 comprising the amino acid sequence of SEQ ID NO:5 and (iii) CDR-L3 comprising the amino acid sequence of SEQ ID NO:6, or
B) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:25; (ii) CDR-L2 comprising the amino acid sequence of SEQ ID NO:5 and (iii) CDR-L3 comprising the amino acid sequence of SEQ ID NO:6; and wherein the second antigen binding moiety that binds to a T cell activating antigen binds to human CD3 comprises
C) (a) a VH domain comprising (i) CDR-H1 comprising the amino acid sequence of SEQ ID NO:52, (ii) CDR-H2 comprising the amino acid sequence of SEQ ID NO:53, and (iii) CDR-H3 comprising the amino acid sequence of SEQ ID NO:54; and (b) a VL domain comprising (i) CDR-L1 comprising the amino acid sequence of SEQ ID NO:55; (ii) CDR-L2 comprising the amino acid sequence of SEQ ID NO:56 and (iii) CDR-L3 comprising the amino acid sequence of SEQ ID NO:57, or
D) (a) a VH domain comprising (i) CDR-H1 comprising the amino acid sequence of SEQ ID NO:60, (ii) CDR-H2 comprising the amino acid sequence of SEQ ID NO:61, and (iii) CDR-H3 comprising the amino acid sequence of SEQ ID NO:62; and (b) a VL domain comprising (i) CDR-L1 comprising the amino acid sequence of SEQ ID NO:63; (ii) CDR-L2 comprising the amino acid sequence of SEQ ID NO:64 and (iii) CDR-L3 comprising the amino acid sequence of SEQ ID NO:65, or
E) (a) a VH domain comprising (i) CDR-H1 comprising the amino acid sequence of SEQ ID NO:68, (ii) CDR-H2 comprising the amino acid sequence of SEQ ID NO:69, and (iii) CDR-H3 comprising the amino acid sequence of SEQ ID NO:70; and (b) a VL domain comprising (i) CDR-L1 comprising the amino acid sequence of SEQ ID NO:71; (ii) CDR-L2 comprising the amino acid sequence of SEQ ID NO:72 and (iii) CDR-L3 comprising the amino acid sequence of SEQ ID NO:73.

One embodiment of the invention is such bispecific antibody,
wherein the first antigen binding moiety
A) comprises a VH domain comprising the amino acid sequence of SEQ ID NO:7 and a VL domain comprising the amino acid sequence of SEQ ID NO:24; or B) comprises a VH domain comprising the amino acid sequence of SEQ ID NO:7 and a VL domain comprising the amino acid sequence of SEQ ID NO:26, and wherein the second antigen binding moiety C) comprises a VH domain comprising the amino acid sequence of SEQ ID NO:58 and a VL domain comprising the amino acid sequence of SEQ ID NO:59; or D) comprises a VH domain comprising the amino acid sequence of SEQ ID NO:66 and a VL domain comprising the amino acid sequence of SEQ ID NO:67; or E) comprises a VH domain comprising the amino acid sequence of SEQ ID NO:74 and a VL domain comprising the amino acid sequence of SEQ ID NO:75.

One embodiment of the invention is such bispecific antibody, wherein the first antigen binding moiety comprises a VH domain comprising the amino acid sequence of SEQ ID NO:7 and a VL domain comprising the amino acid sequence of SEQ ID NO:24;

and wherein the second antigen binding moiety comprises a VH domain comprising the amino acid sequence of SEQ ID NO:58 and a VL domain comprising the amino acid sequence of SEQ ID NO:59.

One embodiment of the invention is such bispecific antibody, wherein the first antigen binding moiety comprises a VH domain comprising the amino acid sequence of SEQ ID NO:7 and a VL domain comprising the amino acid sequence of SEQ ID NO:24;

and wherein the second antigen binding moiety comprises a VH domain comprising the amino acid sequence of SEQ ID NO:66 and a VL domain comprising the amino acid sequence of SEQ ID NO:67.

One embodiment of the invention is such bispecific antibody, wherein the first antigen binding moiety comprises a VH domain comprising the amino acid sequence of SEQ ID NO:7 and a VL domain comprising the amino acid sequence of SEQ ID NO:24;

and wherein the second antigen binding moiety comprises a VH domain comprising the amino acid sequence of SEQ ID NO:74 and a VL domain comprising the amino acid sequence of SEQ ID NO:75.

Such bispecific antibodies binding to human HLA-G and human CD3 show in addition to the properties of the HLA-G-antibodies further valuable properties like the induction of antibody mediated IFN gamma secretion by T cells on HLA-G expressing cells, T cell activation in the presence of HLA-G expressing tumor cells, induction of T cell mediated tumor cell killing on HLA-G expressing cells and in vivo anti-tumor efficacy and even tumor regression in different cancer xenograft mouse models.

The invention provides an isolated nucleic acid encoding the antibody or bispecific antibody as described herein.

The invention provides a host cell comprising such nucleic acid.

The invention provides a method of producing an antibody comprising culturing the host cell so that the antibody is produced.

The invention provides such method of producing an antibody, further comprising recovering the antibody from the host cell.

The invention provides an antibody produced by such an host cell where the host cell is eukaryotic.

The invention provides a pharmaceutical formulation comprising the antibody described herein and a pharmaceutically acceptable carrier.

The invention provides the antibody described herein for use as a medicament.

The invention provides the antibody described herein for use in treating cancer.

The invention provides the use of the antibody described herein in the manufacture of a medicament. In one embodiment the medicament is for treatment of cancer.

The invention provides a method of treating an individual having cancer comprising administering to the individual an effective amount of the antibody described herein.

DESCRIPTION OF THE FIGURES

FIGS. 13A-13N: Exemplary configurations of the bispecific antigen binding molecules of the invention.

FIG. 13A: Illustration of the "1+1 CrossMab" molecule.

FIG. 13B: Illustration of the "2+1 IgG Crossfab" molecule with alternative order of Crossfab and Fab components ("inverted").

FIG. 13C: Illustration of the "2+1 IgG Crossfab" molecule.

FIG. 13D: Illustration of the "1+1 CrossMab" molecule.

FIG. 13E: Illustration of the "2+1 IgG Crossfab" molecule with alternative order of Crossfab and Fab components ("inverted").

FIG. 13F: Illustration of the "2+1 IgG Crossfab" molecule.

FIG. 13N: Illustration of the "2+1 IgG Crossfab" molecule with two CrossFabs and with alternative order of Crossfab and Fab components ("inverted").

Black dot: optional modification in the Fc domain promoting heterodimerization. ++, --: amino acids of opposite charges optionally introduced in the CH1 and CL domains. Crossfab molecules are depicted as comprising an exchange of VH and VL regions, but may— in embodiments wherein no charge modifications are introduced in CH1 and CL domains—alternatively comprise an exchange of the CH1 and CL domains.

Figure 14:
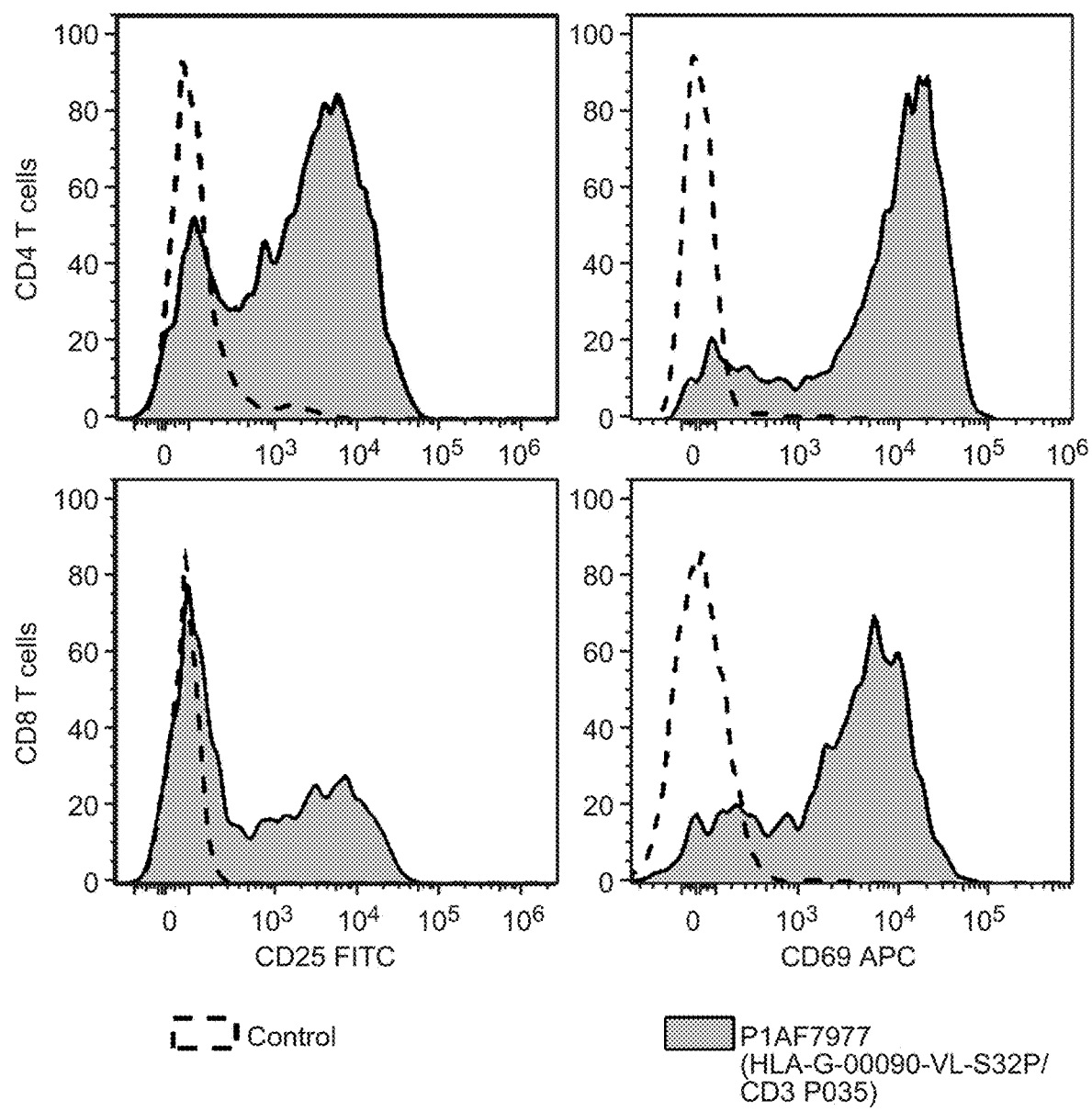

FIG. 14: Induction of T cell activation by bispecific anti-HLA-G/anti-CD3 antibody P1AF7977 (HLA-G-0090-VL-S32P/CD3 P035) in the presence of SKOV3 HLAG cells.

Figure 15:
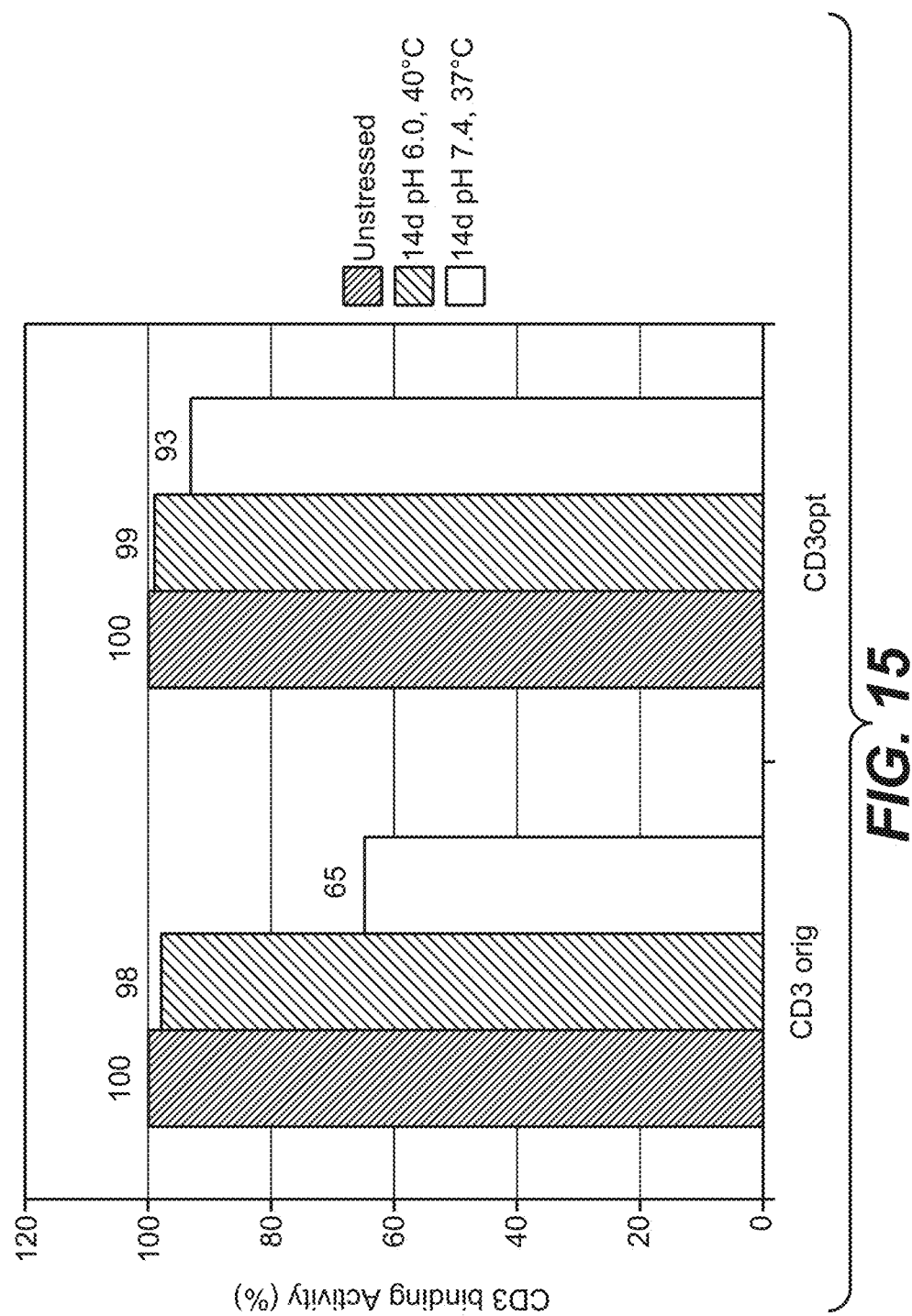

FIG. 15: Relative binding activity of original and optimized CD3 binders, $CD3_{orig}$ and $CD3_{opt}$ (=P035-093 (P035)), to recombinant CD3 as measured by SPR in unstressed condition, after 14 d at 40° C. pH 6, or after 14 d at 37° C. pH 7.4 (IgG format).

Figure 16:
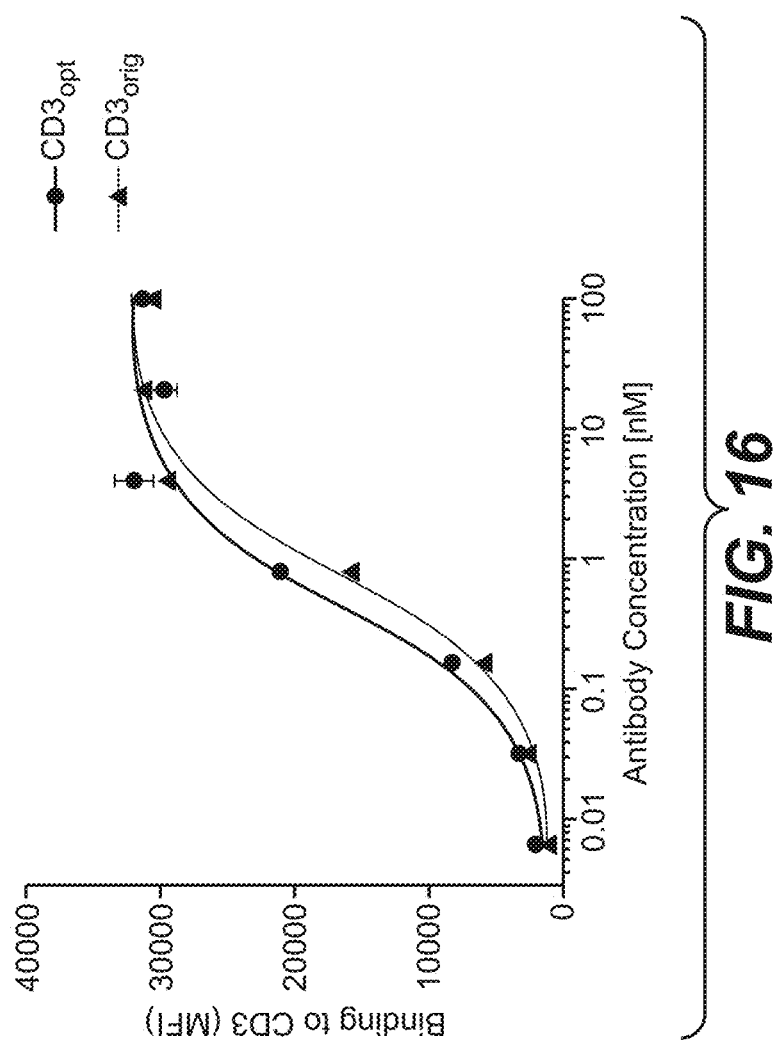

FIG. 16: Binding of original and optimized CD3 binders, $CD3_{orig}$ and $CD3_{opt}$(=P035-093 (P035)), to Jurkat NFAT cells as measured by flow cytometry (IgG format). Antibodies bound to Jurkat NFAT cells were detected with a fluorescently labeled anti-human Fc specific secondary antibody.

Figure 17:
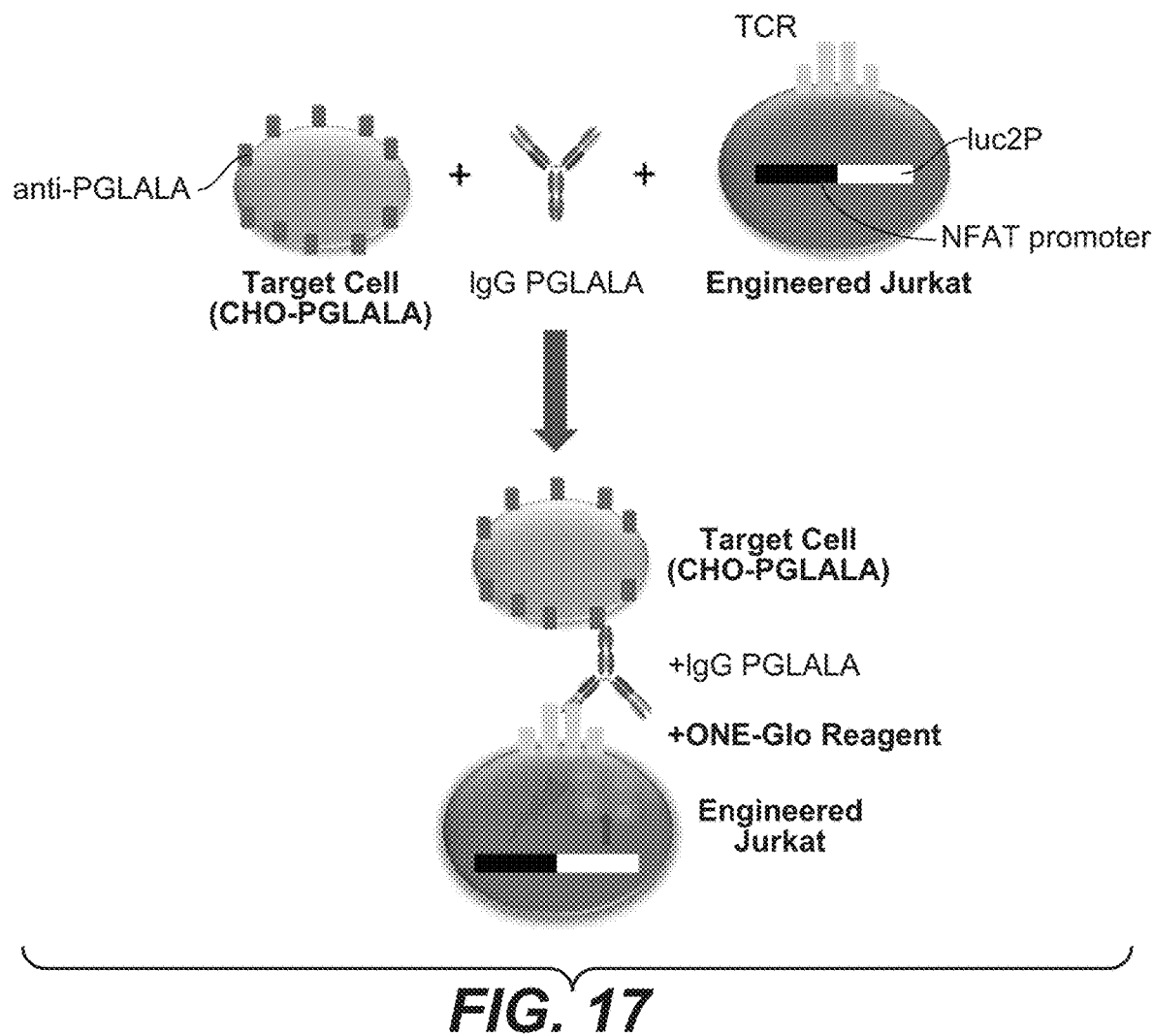

FIG. 17: Schematic illustration of the CD3 activation assay used in Example 8.

Figure 18:
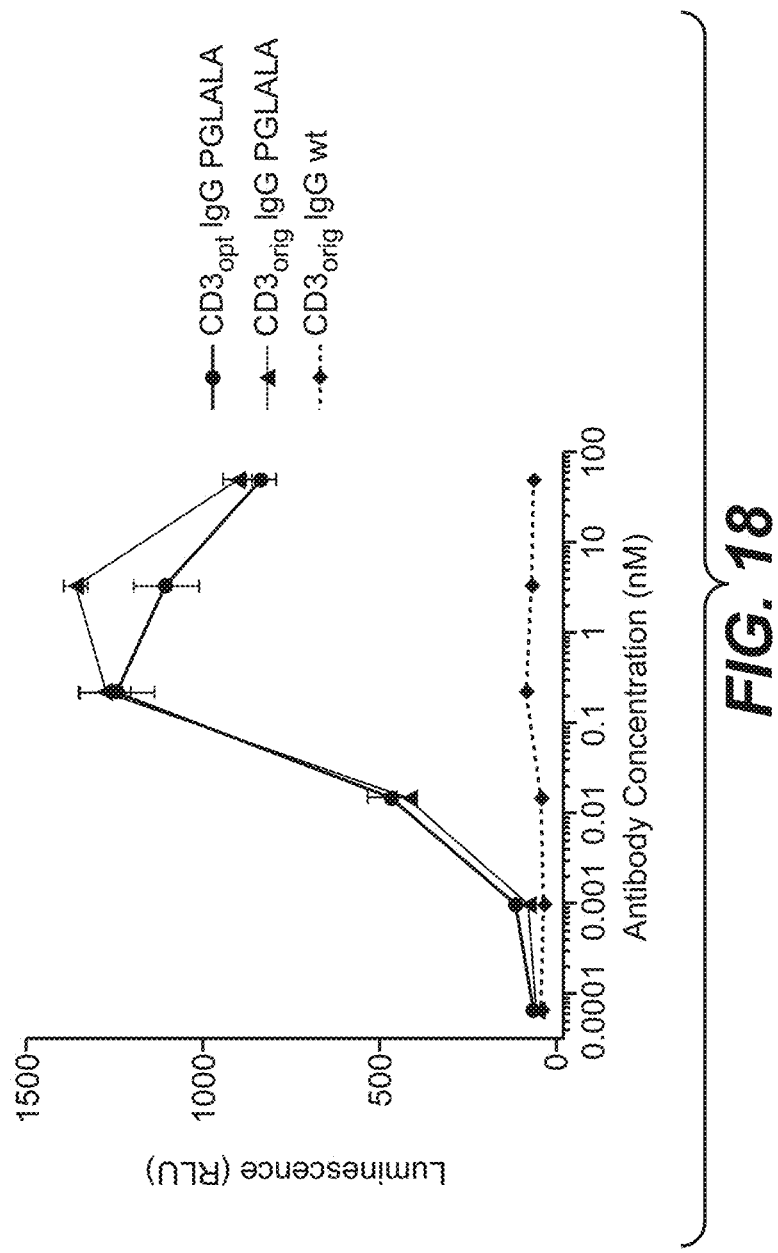

FIG. 18: Jurkat NFAT activation with original and optimized CD3 binders, $CD3_{orig}$ and $CD3_{opt}$ (=P035-093 (P035)) (IgG format). Jurkat NFAT reporter cells were co-incubated with anti-PGLALA expressing CHO (CHO-PGLALA) cells in the presence of $CD3_{orig}$ or $CD3_{opt}$ (=P035-093 (P035)) IgG PGLALA, or $CD3_{opt}$ IgG wt as negative control. CD3 activation was quantified by measuring luminescence after 24 h.

DETAILED DESCRIPTION OF THE INVENTION

When used herein, the term "HLA-G", "human HLA-G", "HLAG", refers to the HLA-G human major histocompatibility complex, class I, G, also known as human leukocyte antigen G (HLA-G) (exemplary SEQ ID NO: 35). Typically, HLA-G forms a MHC class I complex together with β2 microglobulin (B2M or β2m). In one embodiment HLA-G refers to the MHC class I complex of HLA-G and β2 microglobulin. In one preferred embodiment HLA-G refers to the cell surface bound MHC class I complex of HLA-G and β2 microglobulin, also known as HLA-G1 (see FIG. 1 of this description and e.g. Blaschitz et al., Molecular Human Reproduction, 11(2005) 699-710, inter alia FIG. 1)

As used herein, an antibody (either mono-, multi- or bispecific) or antigen binding moiety "binding to human HLA-G", "specifically binding to human HLA-G", "that binds to human HLA-G" or "anti-HLA-G" refers to an antibody/antigen binding moiety specifically binding to the human HLA-G antigen or its extracellular domain (ECD) with a binding affinity of a $K_D$-value of $5.0 \times 10^{-8}$ mol/l or lower, in one embodiment of a $K_D$-value of $1.0 \times 10^{-9}$ mol/l or lower, in one embodiment of a $K_D$-value of $5.0 \times 10^{-8}$ mol/l to $1.0 \times 10^{-13}$ mol/l. In one embodiment the antibody binds to HLA-G β2M MHC I complex comprising SEQ ID NO: 39)

The binding affinity is determined with a standard binding assay, such as surface plasmon resonance technique (BIAcore®, GE-Healthcare Uppsala, Sweden) e.g. using constructs comprising HLA-G extracellular domain (e.g. in its natural occurring 3 dimensional structure). In one embodiment binding affinity is determined with a standard binding assay using exemplary soluble HLA-G comprising MHC class I complex comprising SEQ ID NO: 39.

HLA-G has the regular MHC I fold and consists of two chains: Chain 1 consists of three domains: alpha 1, alpha 2 and alpha 3. The alpha 1 and alpha 2 domains form a peptide binding groove flanked by two alpha helices. Small peptides (approximately 9mers) can bind to this groove akin to other MHCI proteins. Chain 2 is beta 2 microglobulin (β2M) which is shared with various other MHCI proteins.

HLA-G can form functionally active complex oligomeric structures (Kuroki, K et al. Eur J Immunol. 37 (2007) 1727-1729). Disulfide-linked dimers are formed between Cys 42 of two HLA-G molecules. (Shiroishi M et al., J Biol Chem 281 (2006) 10439-10447. Trimers and Tetrameric complexes have also been described e.g. in Kuroki, K et al. Eur J Immunol. 37 (2007) 1727-1729, Allan D. S., et al. J Immunol Methods. 268 (2002) 43-50 and T Gonen-Gross et al., J Immunol 171 (2003) 1343-1351). HLA-G has several free cysteine residues, unlike most of the other MHC class I molecules. Boyson et al., Proc Nat Acad Sci USA, 99: 16180 (2002) reported that the recombinant soluble form of HLA-G5 could form a disulfide-linked dimer with the intermolecular Cys42-Cys42 disulfide bond. In addition, the membrane-bound form of HLA-G1 can also form a disulfide-linked dimer on the cell surface of the JEG3 cell line, which endogenously expresses HLA-G. Disulfide-linked dimer forms of HLA-G1 and HLA-G5 have been found on the cell surface of trophoblast cells as well (Apps, R., Tissue Antigens, 68:359 (2006)).

HLA-G is predominantly expressed on cytotrophoblasts in the placenta. Several tumors (including pancreatic, breast, skin, colorectal, gastric & ovarian) express HLA-G (Lin, A. et al., Mol Med. 21 (2015) 782-791; Amiot, L., et al., Cell Mol Life Sci. 68 (2011) 417-431). The expression has also been reported to be associated with pathological conditions like inflammatory diseases, GvHD and cancer. Expression of HLA-G has been reported to be associated with poor prognosis in cancer. Tumor cells escape host immune surveillance by inducing immune tolerance/suppression via HLA-G expression.

Figure 1:
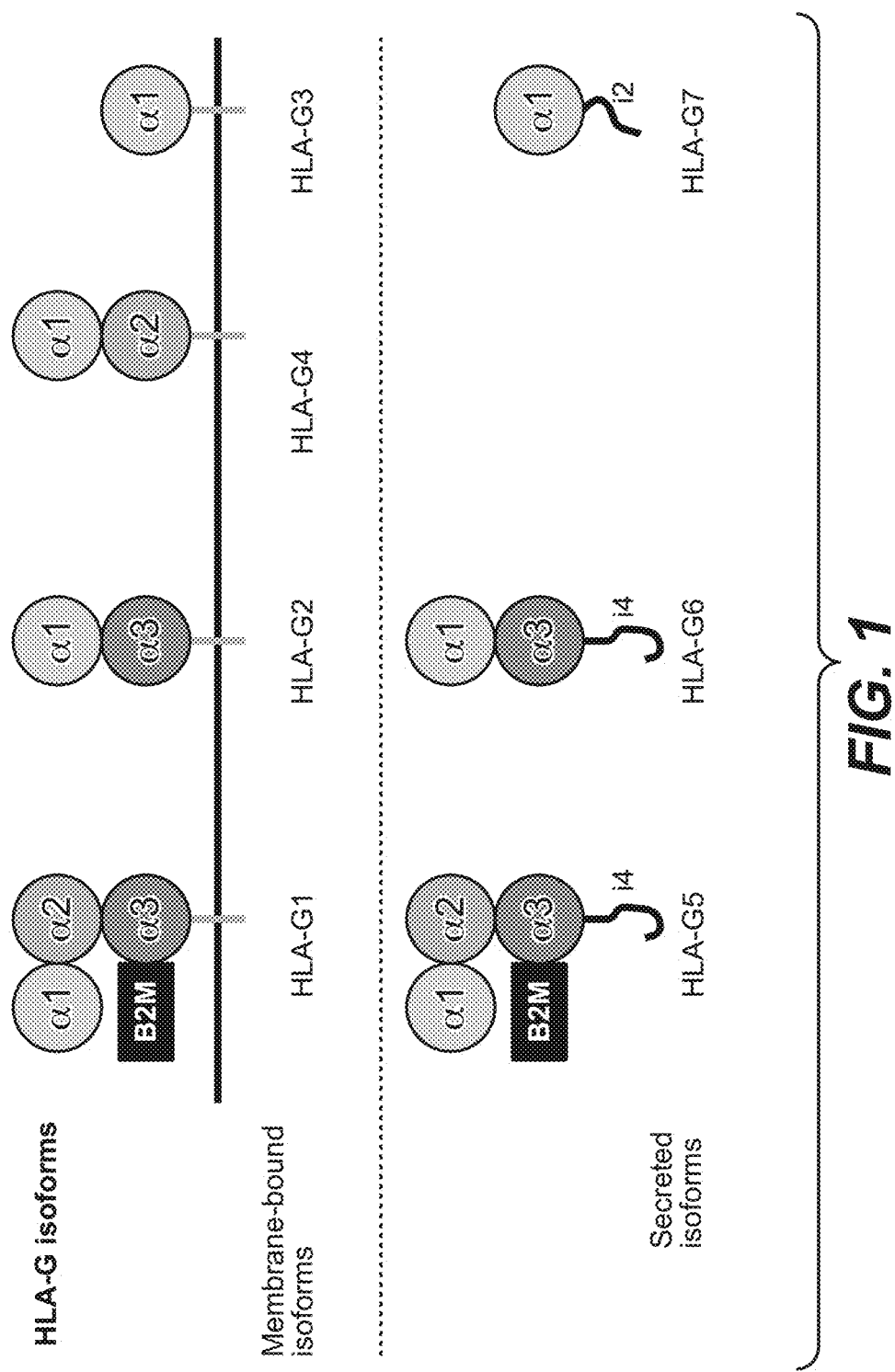
FIG. 1: Different isoforms of HLA-G.
Figure 2A:
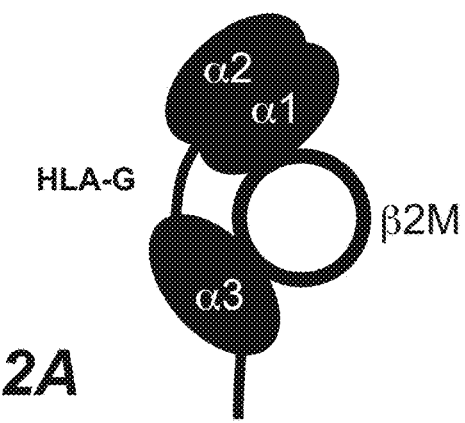
FIG. 2A: Schematic representation of the HLA-G molecule in association with β2M:
Schematic representation of the HLA-G wt molecule.
Figure 2B:
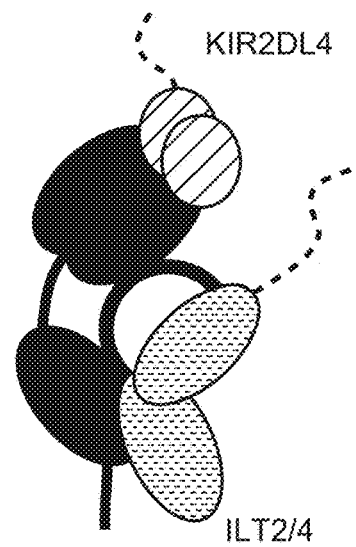
FIG. 2B: Schematic representation of the HLA-G molecule in association with β2M:
The KIR2DL4 and ILT2/4 interactions are extracted from crystal structures: the HLA-G:ILT4 complex structure (PDB code: 2DYP). The KIR2DL1 structure is taken from PDB code 1 IM9 (KIR2DL1:HLA-Cw4 complex structure) and was positioned on HLA-G by superposition of the HLA-Cw4 and HLA-G structures.
Figure 2C:
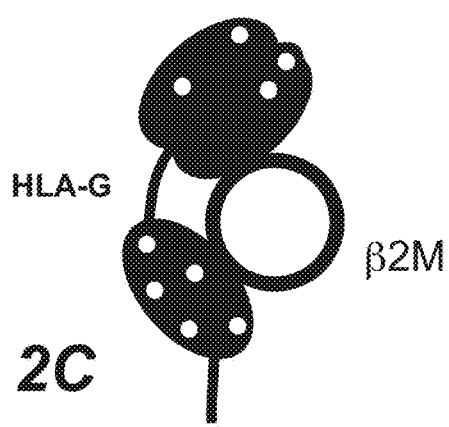
FIG. 2C: Schematic representation of the HLA-G molecule in association with β2M:
Schematic representation of the HLA-G chimeric molecule that was used as a counter antigen for the identification of specific HLA-G binders. White dots represent surface residues that were identified as unique for HLA-G. These residues were replaced by a HLA consensus sequence in the chimeric molecule.
Figure 2D:
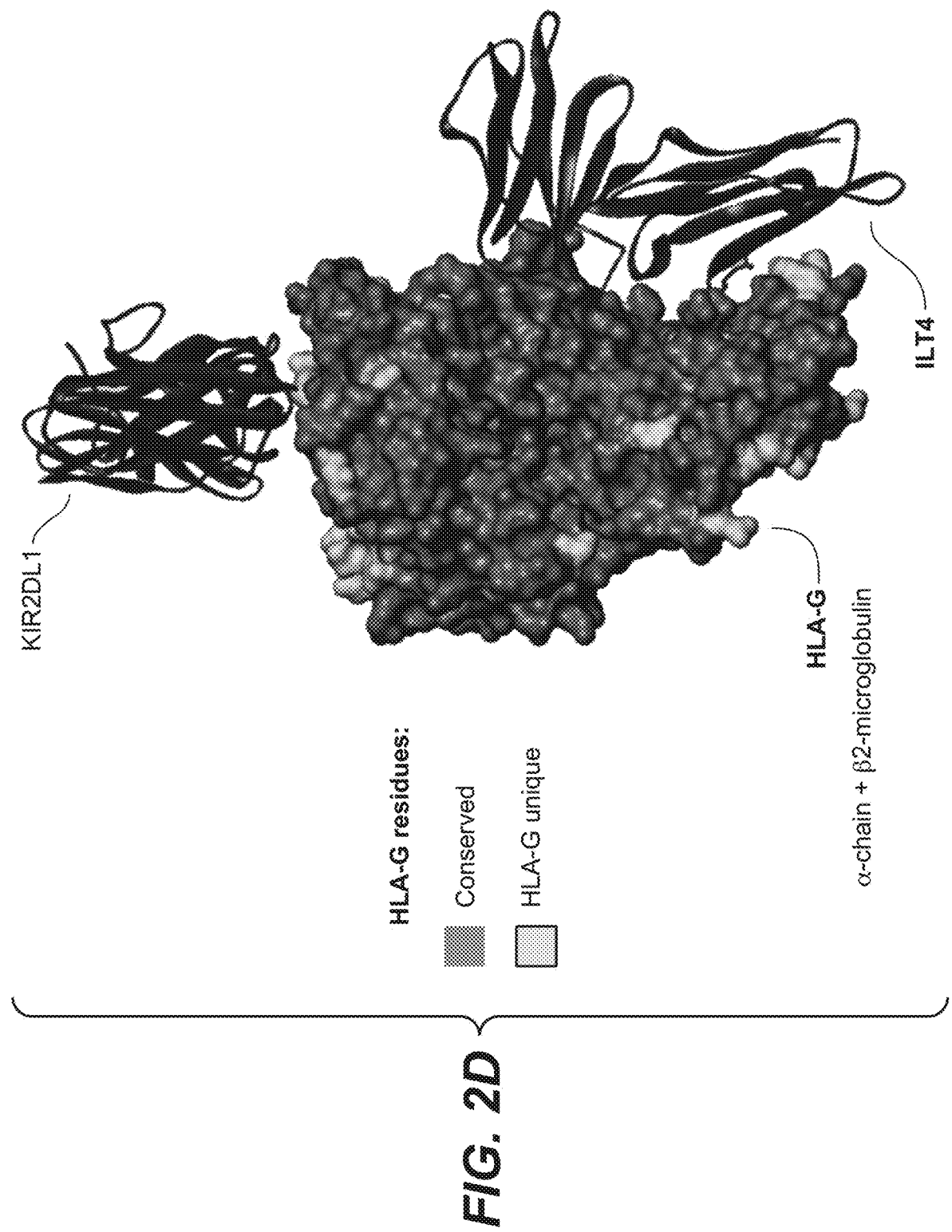
FIG. 2D: Structure of HLA-G molecule in association with certain receptors:
HLA-G structure in complex with given receptors such as ILT4 and KIR2DL1. ILT4 structure (PDB code: 2DYP). The KIR2DL1 structure is taken from PDB code 1 IM9 (KIR2DL1: HLA-Cw4 complex structure) and was positioned on HLA-G by superposition of the HLA-Cw4 and HLA-G structures. Receptors are shown in a ribbon representation, HLA-G is shown in a molecular surface representation. HLA-G residues that are unique or conserved in other HLA paralogs are colored in white and gray, respectively. Unique surface residues were replaced by a HLA consensus sequence in the chimeric counter antigen.

For HLA-G there exist 7 isoforms, 3 secreted and 4 membrane bound forms (as schematically shown in FIG. 1). The most important functional isoforms of HLA-G include b2-microglobulin (β2M)-associated HLA-G1 and HLA-G5. However, the tolerogenic immunological effect of these isoforms is different and is dependent on the form (monomer, dimer) of ligands and the affinity of the ligand-receptor interaction.

HLA-G protein can be produced using standard molecular biology techniques. The nucleic acid sequence for HLA-G isoforms is known in the art. See for example GENBANK Accession No. AY359818.

The HLA-G isomeric forms promote signal transduction through ILTs, in particular ILT2, ILT4, or a combination thereof.

ILTs: ILTs represent Ig types of activating and inhibitory receptors that are involved in regulation of immune cell activation and control the function of immune cells (Borges, L., et al., Curr Top Microbial Immunol, 244:123-136 (1999)). ILTs are categorized into three groups: (i) inhibitory, those containing a cytoplasmic immunoreceptor tyrosine-based inhibitory motif (ITIM) and transducing an inhibitory signal (ILT2, ILT3, ILT4, ILT5, and LIR8); (ii) activating, those containing a short cytoplasmic tail and a charged amino acid residue in the transmembrane domain (ILT1, ILT7, ILT8, and LIR6alpha) and delivering an activating signal through the cytoplasmic immunoreceptor tyrosine-based activating motif (ITAM) of the associated common gamma chain of Fc receptor; and (iii) the soluble molecule ILT6 lacking the transmembrane domain. A number of recent studies have highlighted immunoregulatory roles for ILTs on the surface of antigen presenting cells (APC). ILT2, ILT3, and ILT4 receptors, the most characterized immune inhibitory receptors, are expressed on a wide range of immune cells including monocytes, B cells, dendritic cells, plasmacytoid dendritic cells and a subset of NK and T cells. ILT2 is expressed on T cells subsets has been shown to inhibit activation and proliferation of these cells upon ligation (Colonna M. et al., J Immunol. 20011, 66:2514-2521, J Immunol 2000; 165:3742-3755). ILT3 and ILT4 are upregulated by exposing immature DC to known immunosuppressive factors, including IL-10, vitamin D3, or suppressor CD8 T cells (Chang, C. C., et al., Nat Immunol, 3:237-243 (2002)). The expression of ILTs on DC is tightly controlled by inflammatory stimuli, cytokines, and growth factors, and is down-regulated following DC activation (Ju, X. S., et al., Gene, 331:159-164 (2004)). The expression of ILT2 and ILT4 receptors is highly regulated by histone acetylation, which contributes to strictly controlled gene expression exclusively in the myeloid lineage of cells (Nakajima, H., J Immunol, 171:6611-6620 (2003)).

Engagement of the inhibitory receptors ILT2 and ILT4 alters the cytokine and chemokine secretion/release profile of monocytes and can inhibit Fc receptor signaling (Colonna, M., et al. J Leukoc Biol, 66:375-381 (1999)). The role and function of ILT3 on DC have been precisely described by the Suciu-Foca group (Suciu-Foca, N., Int Immunopharmacol, 5:7-11 (2005)). Although the ligand for ILT3 is unknown, ILT4 is known to bind to the third domain of HLA class I molecules (HLA-A, HLA-B, HLA-C, and HLA-G), competing with CD8 for MHC class I binding (Shiroishi, M., Proc Natl Acad Sci USA, 100:8856-8861 (2003)). The preferential ligand for several inhibitory ILT receptors is HLA-G. HLA-G plays a potential role in maternal-fetal tolerance and in the mechanisms of escape of tumor cells from immune recognition and destruction (Hunt, J. S., et al., Faseb J, 19:681-693 (2005)). It is most likely that regulation of DC function by HLA-G-ILT interactions is an important pathway in the biology of DC. It has been determined that human monocyte-derived DC that highly express ILT2 and ILT4 receptors, when treated with HLA-G and stimulated with allogeneic T cells, still maintain a stable tolerogenic-like phenotype (CD80low, CD86low, HLA-DRlow) with the potential to induce T cell anergy (Ristich, V., et al., Eur J Immunol, 35:1133-1142 (2005)). Moreover, the HLA-G interaction with DC that highly express ILT2 and ILT4 receptors resulted in down-regulation of several genes involved in the MHC class II presentation pathway. A lysosomal thiol reductase, IFN-gamma inducible lysosomal thiol reductase (GILT), abundantly expressed by professional APC, was greatly reduced in HLA-G-modified DC. The repertoire of primed CD4+ T cells can be influenced by DC expression of GILT, as in vivo T cell responses to select antigens were reduced in animals lacking GILT after targeted gene disruption (Marie, M., et al., Science, 294:1361-1365 (2001)). The HLA-G/ILT interaction on DC interferes with the assembly and transport of MHC class II molecules to the cell surface, which might result in less efficient presentation or expression of structurally abnormal MHC class II molecules. It was determined that HLA-G markedly decreased the transcription of invariant chain (CD74), HLA-DMA, and HLA-DMB genes on human monocyte-derived DC highly expressing ILT inhibitory receptors (Ristich, V., et al; Eur J Immunol 35:1133-1142 (2005)).

Another receptor of HLA-G is KIR2DL4 because KIR2DL4 binds to cells expressing HLA-G (US2003232051; Cantoni, C. et al. Eur J Immunol 28 (1998) 1980; Rajagopalan, S. and E. O. Long. [published erratum appears in J Exp Med 191 (2000) 2027] J Exp Med 189 (1999) 1093; Ponte, M. et al. PNAS USA 96 (1999) 5674).

KIR2DL4 (also referred to as 2DL4) is a KIR family member (also designated CD158d) that shares structural features with both activating and inhibitory receptors (Selvakumar, A. et al. Tissue Antigens 48 (1996) 285). 2DL4 has a cytoplasmic ITIM, suggesting inhibitory function, and a positively charged amino acid in the transmembrane region, a feature typical of activating KIR. Unlike other clonally distributed KIRs, 2DL4 is transcribed by all NK cells (Valiante, N. M. et al. Immunity 7 (1997) 739; Cantoni, C. et al. Eur J Immunol 28 (1998) 1980; Rajagopalan, S. and E. O. Long. [published erratum appears in J Exp Med 191 (2000) 2027] J Exp Med 189 (1999) 1093).

HLA-G has also been shown to interact with CD8 (Sanders et al, J. Exp. Med., 174 (1991), 737-740) on cytotoxic T cells and induce CD95 mediated apoptosis in activated CD8 positive cytotoxic T cells (Fournel et al, J. Immun., 164 (2000), 6100-6104). This mechanism of elimination of cytotoxic T cells has been reported to one of the mechanisms of immune escape and induction of tolerance in pregnancy, inflammatory diseases and cancer (Amodio G. et al, Tissue Antigens, 84 (2014), 255-263).

As used herein an anti-HLA-G antibody (either mono-, multi- or bispecific) or antigen binding moiety that "does not crossreact with" or that "does not (specifically) bind to" a modified human HLA-G β2M MHC I complex, wherein the HLA-G specific amino acids have been replaced by HLA-A consensus amino acids, the complex comprising SEQ ID NO:40; a mouse H2Kd β2M MHC I complex comprising SEQ ID NO:41 rat RT1A β2M MHC I complex comprising SEQ ID NO:43, human HLA-A2 β2M MHC I complex comprising SEQ ID NO:35 and SEQ ID NO: 33 refers to an anti-HLA-G antibody (either mono-, multi- or bispecific) or antigen binding moiety that does substantially not bind to any of these counterantigens. In one embodiment an anti-HLA-G antibody (either mono-, multi- or bispecific) or antigen binding moiety that "does not crossreact with" or that "does not specifically bind to" a modified human HLA-G β2M MHC I complex, wherein the HLA-G specific amino acids have been replaced by HLA-A consensus amino acids, the complex comprising SEQ ID NO:40; a mouse H2Kd β2M MHC I complex comprising SEQ ID NO:41, a rat RT1A β2M MHC I complex comprising SEQ ID NO:43, and/or a human HLA-A2 β2M MHC I complex comprising SEQ ID NO:35 and SEQ ID NO: 33 refers to an anti-HLA-G antibody (either mono-, multi- or bispecific) or antigen binding moiety that shows no significant binding/interaction in e.g. a Surface plasmon resonance assay (as described e.g. in Example 2) The binding binding/interaction is determined with a standard binding assay, such as surface plasmon resonance technique (BIAcore®, GE-Healthcare Uppsala, Sweden) with the respective antigen: a modified human HLA-G β2M MHC I complex, wherein the HLA-G specific amino acids have been replaced by HLA-A consensus amino acids, the complex comprising SEQ ID NO:40; a mouse H2Kd β2M MHC I complex comprising SEQ ID NO:41 rat RT1A β2M MHC I complex comprising SEQ ID NO:43, and/or a human HLA-A2 β2M MHC I complex comprising SEQ ID NO:35 and SEQ ID NO: 33 The assay setup as well as the construction/preparation of the antigens is described in the Examples.

The term "inhibits ILT2 binding to HLA-G on JEG-3 cells (ATCC HTB36)" refers to the inhibition of binding interaction of (recombinant) ILT2 e.g in an assay as described in Example 5.

An "activating T cell antigen" as used herein refers to an antigenic determinant expressed on the surface of a T lymphocyte, particularly a cytotoxic T lymphocyte, which is capable of inducing T cell activation upon interaction with an antibody. Specifically, interaction of an antibody with an activating T cell antigen may induce T cell activation by triggering the signaling cascade of the T cell receptor complex. In a particular embodiment the activating T cell antigen is CD3, particularly the epsilon subunit of CD3 (see UniProt no. P07766 (version 189), NCBI RefSeq no. NP_000724.1, SEQ ID NO: 88 for the human sequence; or UniProt no. Q95LI5 (version 49), NCBI GenBank no. BAB71849.1, SEQ ID NO: 108 for the cynomolgus [*Macaca fascicularis*] sequence).

"CD3" refers to any native CD3 from any vertebrate source, including mammals such as primates (e.g. humans), non-human primates (e.g. cynomolgus monkeys) and rodents (e.g. mice and rats), unless otherwise indicated. CD3 is an exemplary activated T cell antigen. The term "CD3" encompasses "full-length," unprocessed CD3 as well as any form of CD3 that results from processing in the cell. The term also encompasses naturally occurring variants of CD3, e.g., splice variants or allelic variants. In one embodiment, CD3 is human CD3, particularly the epsilon subunit of human CD3 (CD3ε). The amino acid sequence of human CD3ε is shown in UniProt (www.uniprot.org) accession no. P07766 (version 189), or NCBI (www.ncbi.nlm.nih.gov/) RefSeq NP_000724.1. See also SEQ ID NO: 88. The amino acid sequence of cynomolgus [*Macaca fascicularis*] CD3ε is shown in NCBI GenBank no. BAB71849.1. See also SEQ ID NO: 89.

As used herein, an antibody (either mono-, multi- or bispecific) or antigen binding moiety "binding to human CD3", "specifically binding to human CD3", "that binds to human CD3" or "anti-CD3" refers to an anti-antibody (either mono-, multi- or bispecific) or antigen binding moiety specifically binding to the human CD3 antigen or its extracellular domain (ECD) which shows significant binding/interaction in a surface plasmon resonance assay. In one embodiment with a binding affinity of a $K_D$-value of $5.0 \times 10^{-8}$ mol/l or lower, in one embodiment of a $K_D$-value of $1.0 \times 10^{-9}$ mol/l or lower, in one embodiment of a $K_D$-value of $5.0 \times 10^{-8}$ mol/l to $1.0 \times 10^{-13}$ mol/l. In one embodiment the antibody binds to CD3 comprising SEQ ID NO: 88.

The binding affinity is determined with a standard binding assay, such as surface plasmon resonance technique (BIAcore®, GE-Healthcare Uppsala, Sweden) e.g. using constructs comprising HLA-G extracellular domain (e.g. in its natural occurring 3 dimensional structure). In one embodiment binding affinity is determined with a standard binding assay using exemplary CD3 comprising SEQ ID NO: 88.

Accordingly a multispecific or bispecific that binds to human HLA-G and to human CD3, comprising a first antigen binding moiety that binds to human HLA-G and a second antigen binding moiety that binds to human CD3 refers to an antibody that binds with an (first) antigen binding moiety to human HLA-G as described herein and that binds with another (second) antigen binding moiety to human CD3 as described herein.

"T cell activation" as used herein refers to one or more cellular response of a T lymphocyte, particularly a cytotoxic T lymphocyte, selected from: proliferation, differentiation, cytokine secretion, cytotoxic effector molecule release, cytotoxic activity, and expression of activation markers. Suitable assays to measure T cell activation are known in the art and described herein.

An "acceptor human framework" for the purposes herein is a framework comprising the amino acid sequence of a light chain variable domain (VL) framework or a heavy chain variable domain (VH) framework derived from a human immunoglobulin framework or a human consensus framework, as defined below. An acceptor human framework "derived from" a human immunoglobulin framework or a human consensus framework may comprise the same amino acid sequence thereof, or it may contain amino acid sequence changes. In some embodiments, the number of amino acid changes are 10 or less, 9 or less, 8 or less, 7 or less, 6 or less, 5 or less, 4 or less, 3 or less, or 2 or less. In some embodiments, the VL acceptor human framework is identical in sequence to the VL human immunoglobulin framework sequence or human consensus framework sequence.

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')$_2$; diabodies; linear antibodies; single-chain antibody molecules (e.g. scFv); and multispecific antibodies formed from antibody fragments.

The term "bispecific" means that the antibody is able to specifically bind to at least two distinct antigenic determinants. Typically, a bispecific antibody comprises two antigen binding sites or moieties, each of which is specific for a different antigenic determinant. In certain embodiments the bispecific antibody is capable of simultaneously binding two antigenic determinants, particularly two antigenic determinants expressed on two distinct cells.

The term "valent" as used herein denotes the presence of a specified number of antigen binding sites in an antibody. As such, the term "monovalent binding to an antigen" denotes the presence of one (and not more than one) antigen binding site specific for the antigen in the antibody.

The terms "antigen binding site" and "antigen binding moiety" as used herein are interchangeable and refer to the site, i.e. one or more amino acid residues, of an antibody which provides interaction with the antigen. For example, the antigen binding site of an antibody comprises amino acid residues from the complement determining regions (CDRs). A native immunoglobulin molecule typically has two antigen binding sites, a Fab molecule typically has a single antigen binding site. "Antigen binding site" and "antigen binding moiety" refers to a polypeptide molecule that specifically binds to an antigenic determinant. In one embodiment, an antigen binding moiety is able to direct the entity to which it is attached (e.g. a second antigen binding moiety) to a target site, for example to a specific type of tumor cell bearing the antigenic determinant. In another embodiment an antigen binding moiety is able to activate signaling through its target antigen, for example a T cell receptor complex antigen. Antigen binding moieties include antibodies and fragments thereof as further defined herein. Particular antigen binding moieties include an antigen binding domain of an antibody, comprising an antibody heavy chain variable region and an antibody light chain variable region. In certain embodiments, the antigen binding moieties may comprise antibody constant regions as further defined herein and known in the art. Useful heavy chain constant regions include any of the five isotypes: α, δ, ε, γ, or μ. Useful light chain constant regions include any of the two isotypes: K and A. In one preferred embodiment such constant regions are of human origin.

As used herein, the term "antigenic determinant" or "antigen" refers to a site on a polypeptide macromolecule to which an antigen binding moiety binds, forming an antigen binding moiety-antigen complex. Useful antigenic determinants can be found, for example, on the surfaces of tumor cells, on the surfaces of virus-infected cells, on the surfaces of other diseased cells, on the surface of immune cells, free in blood serum, and/or in the extracellular matrix (ECM).

The term "chimeric" antibody refers to an antibody in which a portion of the heavy and/or light chain is derived from a particular source or species, while the remainder of the heavy and/or light chain is derived from a different source or species.

The "class" of an antibody refers to the type of constant domain or constant region possessed by its heavy chain. There are five major classes of antibodies: IgA, IgD, IgE, IgG, and IgM, and several of these may be further divided into subclasses (isotypes), e.g., IgG$_1$, IgG$_2$, IgG$_3$, IgG$_4$, IgA$_1$, and IgA$_2$. The heavy chain constant domains that correspond to the different classes of immunoglobulins are called α, δ, ε, γ, and μ, respectively In one preferred embodiment such subclasses (isotypes) are of human origin. In one preferred embodiment the antibodies of the present invention are of the IgG isotype, in another preferred embodiment of the IgG1 isotype In one aspect, the antibody comprises a constant region of human origin. In one aspect, the antibody is an immunoglobulin molecule comprising a human constant region, particularly of the IgG isotype, more particularly of the IgG1 isotype, comprising a human CH1, CH2, CH3 and/or CL domain. Exemplary sequences of human constant domains are given in SEQ ID Nos: 47 and 48 (human kappa and lambda CL domains, respectively) and SEQ ID NO: 49 (human IgG1 heavy chain constant domains CH1-CH2-CH3) or SEQ ID NO: 50 (human IgG1 heavy chain constant region with mutations L234A, L235A and P329G). An "effective amount" of an agent, e.g., a pharmaceutical formulation, refers to an amount effective, at dosages and for periods of time necessary, to achieve the desired therapeutic or prophylactic result.

The term "Fc domain" or "Fc region" herein is used to define a C-terminal region of an immunoglobulin heavy chain that contains at least a portion of the constant region. The term includes native sequence Fc regions and variant Fc regions. Although the boundaries of the Fc region of an IgG heavy chain might vary slightly, the human IgG heavy chain Fc region is usually defined to extend from Cys226, or from Pro230, to the carboxyl-terminus of the heavy chain. However, antibodies produced by host cells may undergo post-translational cleavage of one or more, particularly one or two, amino acids from the C-terminus of the heavy chain. Therefore an antibody produced by a host cell by expression of a specific nucleic acid molecule encoding a full-length heavy chain may include the full-length heavy chain, or it may include a cleaved variant of the full-length heavy chain (also referred to herein as a "cleaved variant heavy chain"). This may be the case where the final two C-terminal amino acids of the heavy chain are glycine (G446) and lysine (K447, numbering according to Kabat EU index). Therefore, the C-terminal lysine (Lys447), or the C-terminal glycine (Gly446) and lysine (K447), of the Fc region may or may not be present. Amino acid sequences of heavy chains including Fc domains (or a subunit of an Fc domain as defined herein) are denoted herein without C-terminal glycine-lysine dipeptide if not indicated otherwise. In one embodiment of the invention, a heavy chain including a subunit of an Fc domain as specified herein, comprised in an antibody or bispecific antibody according to the invention, comprises an additional C-terminal glycine-lysine dipeptide (G446 and K447, numbering according to EU index of Kabat). In one embodiment of the invention, a heavy chain including a subunit of an Fc domain as specified herein, comprised in an antibody or bispecific antibody according to the invention, comprises an additional C-terminal glycine residue (G446, numbering according to EU index of Kabat). Compositions/formulations of the invention, such as the pharmaceutical compositions/formulations described herein, comprise a population of antibodies or bispecific antibodies of the invention. The population of antibodies or bispecific antibodies may comprise molecules having a full-length heavy chain and molecules having a cleaved variant heavy chain. The population of antibodies or bispecific antibodies may consist of a mixture of molecules having a full-length heavy chain and molecules having a cleaved variant heavy chain, wherein at least 50%, at least 60%, at least 70%, at least 80% or at least 90% of the antibodies or bispecific antibodies have a cleaved variant heavy chain. In one embodiment of the invention a composition comprising a population of antibodies or bispecific antibodies of the invention comprises an antibody or bispecific antibody comprising a heavy chain including a subunit of an Fc domain as specified herein with an additional C-terminal glycine-lysine dipeptide (G446 and K447, numbering according to EU index of Kabat). In one embodiment of the invention a composition comprising a population of antibodies or bispecific antibodies of the invention comprises an antibody or bispecific antibody comprising a heavy chain including a subunit of an Fc domain as specified herein with an additional C-terminal glycine residue (G446, numbering according to EU index of Kabat). In one embodiment of the invention such a composition comprises a population of antibodies or bispecific antibodies comprised of molecules comprising a heavy chain including a subunit of an Fc domain as specified herein; molecules comprising a heavy chain including a subunit of a Fc domain as specified herein with an additional C-terminal glycine residue (G446, numbering according to EU index of Kabat); and molecules comprising a heavy chain including a subunit of an Fc domain as specified herein with an additional C-terminal glycine-lysine dipeptide (G446 and K447, numbering according to EU index of Kabat). Unless otherwise specified herein, numbering of amino acid residues in the Fc region or constant region is according to the EU numbering system, also called the EU index, as described in Kabat et al., Sequences of Proteins of Immunological Interest, 5th Ed. Public Health Service, National Institutes of Health, Bethesda, MD, 1991 (see also above). A "subunit" of an Fc domain as used herein refers to one of the two polypeptides forming the dimeric Fc domain, i.e. a polypeptide comprising C-terminal constant regions of an immunoglobulin heavy chain, capable of stable self-association. For example, a subunit of an IgG Fc domain comprises an IgG CH2 and an IgG CH3 constant domain. In one preferred embodiment such an Fc domain is of human origin, in one preferred of the IgG isotype, in another preferred embodiment of the IgG1 isotype.

"Framework" or "FR" refers to variable domain residues other than complement determining region (CDR) residues. The FR of a variable domain generally consists of four FR domains: FR1, FR2, FR3, and FR4. Accordingly, the CDR and FR sequences generally appear in the following sequence in VH (or VL): FR1-H1(L1)-FR2-H2(L2)-FR3-H3(L3)-FR4.

The terms "full length antibody", "intact antibody", and "whole antibody" are used herein interchangeably to refer to an antibody having a structure substantially similar to a native antibody structure or having heavy chains that contain an Fc region as defined herein.

By "fused" is meant that the components (e.g. a Fab molecule and an Fc domain subunit) are linked by peptide bonds, either directly or via one or more peptide linkers.

A "Fab molecule" refers to a protein consisting of the VH and CH1 domain of the heavy chain (the "Fab heavy chain") and the VL and CL domain of the light chain (the "Fab light chain") of an immunoglobulin.

By a "crossover" Fab molecule (also termed "Crossfab") is meant a Fab molecule wherein the variable domains or the constant domains of the Fab heavy and light chain are exchanged (i.e. replaced by each other), i.e. the crossover Fab molecule comprises a peptide chain composed of the light chain variable domain VL and the heavy chain constant domain 1 CH1 (VL-CH1, in N- to C-terminal direction), and a peptide chain composed of the heavy chain variable domain VH and the light chain constant domain CL (VH-CL, in N- to C-terminal direction). For clarity, in a crossover Fab molecule wherein the variable domains of the Fab light chain and the Fab heavy chain are exchanged, the peptide chain comprising the heavy chain constant domain 1 CH1 is referred to herein as the "heavy chain" of the (crossover) Fab molecule. Conversely, in a crossover Fab molecule wherein the constant domains of the Fab light chain and the Fab heavy chain are exchanged, the peptide chain comprising the heavy chain variable domain VH is referred to herein as the "heavy chain" of the (crossover) Fab molecule.

In contrast thereto, by a "conventional" Fab molecule is meant a Fab molecule in its natural format, i.e. comprising a heavy chain composed of the heavy chain variable and constant domains (VH-CH1, in N- to C-terminal direction), and a light chain composed of the light chain variable and constant domains (VL-CL, in N- to C-terminal direction). The terms "host cell," "host cell line," and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

A "human antibody" is one which possesses an amino acid sequence which corresponds to that of an antibody produced by a human or a human cell or derived from a non-human source that utilizes human antibody repertoires or other human antibody-encoding sequences. This definition of a human antibody specifically excludes a humanized antibody comprising non-human antigen-binding residues.

A "humanized" antibody refers to a chimeric antibody comprising amino acid residues from non-human CDRs and amino acid residues from human FRs. In certain embodiments, a humanized antibody will comprise substantially all of at least one, and typically two, variable domains, in which all or substantially all of the CDRs (e.g., CDRs) correspond to those of a non-human antibody, and all or substantially all of the FRs correspond to those of a human antibody. A humanized antibody optionally may comprise at least a portion of an antibody constant region derived from a human antibody. A "humanized form" of an antibody, e.g., a non-human antibody, refers to an antibody that has undergone humanization.

The term "complementarity determining regions" or "CDRs" as used herein refers to each of the regions of an antibody variable domain which are hypervariable in sequence and/or form structurally defined loops ("hypervariable loops") and/or contain the antigen-contacting residues ("antigen contacts"). Generally, antibodies comprise six CDRs: three in the VH (CDR-H1, CDR-H2, CDR-H3), and three in the VL (CDR-L1, CDR-L2, CDR-L3). Exemplary CDRs herein include:

(a) hypervariable loops occurring at amino acid residues 26-32 (CDR-L1), 50-52 (CDR-L2), 91-96 (CDR-L3), 26-32 (CDR-H1), 53-55 (CDR-H2), and 96-101 (CDR-H3) (Chothia and Lesk, *J. Mol. Biol.* 196:901-917 (1987));

(b) CDRs occurring at amino acid residues 24-34 (CDR-L1), 50-56 (CDR-L2), 89-97 (CDR-L3), 31-35b (CDR-H1), 50-65 (CDR-H2), and 95-102 (CDR-H3) (Kabat et al., *Sequences of Proteins of Immunological Interest,* 5th Ed. Public Health Service, National Institutes of Health, Bethesda, MD (1991));

(c) antigen contacts occurring at amino acid residues 27c-36 (CDR-L1), 46-55 (CDR-L2), 89-96 (CDR-L3), 30-35b (CDR-H1), 47-58 (CDR-H2), and 93-101 (CDR-H3) (MacCallum et al. *J. Mol. Biol.* 262: 732-745 (1996)); and (d) combinations of (a), (b), and/or (c), including CDR amino acid residues 24-34 (CDR-L1), 50-56 (CDR-L2), 89-97 (vL3), 31-35 (CDR-H1), 50-63 (CDR-H2), and 95-102 (CDR-H3).

Unless otherwise indicated, CDR-residues and other residues in the variable domain (e.g., FR residues) are numbered herein according to Kabat et al., *Sequences of Proteins of Immunological Interest,* 5th Ed. Public Health Service, National Institutes of Health, Bethesda, MD (1991).

An "individual" or "subject" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

An "isolated" antibody is one which has been separated from a component of its natural environment. In one embodiment the antibody is an isolated antibody. In some embodiments, an antibody is purified to greater than 95% or 99% purity as determined by, for example, electrophoretic (e.g., SDS-PAGE, isoelectric focusing (IEF), capillary electrophoresis) or chromatographic (e.g., ion exchange or reverse phase HPLC). For review of methods for assessment of antibody purity see, e.g., Flatman, S. et al., J. Chromatogr. B 848 (2007) 79-87.

An "isolated" nucleic acid refers to a nucleic acid molecule that has been separated from a component of its natural environment. An isolated nucleic acid includes a nucleic acid molecule contained in cells that ordinarily contain the nucleic acid molecule, but the nucleic acid molecule is present extrachromosomally or at a chromosomal location that is different from its natural chromosomal location.

"Isolated nucleic acid encoding an anti-HLA-G antibody" refers to one or more nucleic acid molecules encoding antibody heavy and light chains (or fragments thereof), including such nucleic acid molecule(s) in a single vector or separate vectors, and such nucleic acid molecule(s) present at one or more locations in a host cell.

The term "monoclonal antibody" as used herein refers to an antibody obtained from a population of substantially homogeneous antibodies, i.e., the individual antibodies comprising the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made by a variety of techniques, including but not limited to the hybridoma method, recombinant DNA methods, phage-display methods, and methods utilizing transgenic animals containing all or part of the human immunoglobulin loci, such methods and other exemplary methods for making monoclonal antibodies being described herein.

A "modification promoting the association of the first and the second subunit of the Fc domain" is a manipulation of the peptide backbone or the post-translational modifications of an Fc domain subunit that reduces or prevents the association of a polypeptide comprising the Fc domain subunit with an identical polypeptide to form a homodimer. A modification promoting association as used herein particularly includes separate modifications made to each of the two Fc domain subunits desired to associate (i.e. the first and the second subunit of the Fc domain), wherein the modifications are complementary to each other so as to promote association of the two Fc domain subunits. For example, a modification promoting association may alter the structure or charge of one or both of the Fc domain subunits so as to make their association sterically or electrostatically favorable, respectively. Thus, (hetero)dimerization occurs between a polypeptide comprising the first Fc domain subunit and a polypeptide comprising the second Fc domain subunit, which might be non-identical in the sense that further components fused to each of the subunits (e.g. antigen binding moieties) are not the same. In some embodiments the modification promoting association comprises an amino acid mutation in the Fc domain, specifically an amino acid substitution. In a particular embodiment, the modification promoting association comprises a separate amino acid mutation, specifically an amino acid substitution, in each of the two subunits of the Fc domain. Such modification promoting the association of the first and the second subunit of the Fc domain play an important role in the heterodimerization of multi- or bispecific antibodies (see e.g. also below under A.2 Exemplary multispecific anti-HLA-G/anti-CD3 Antibodies)

"Native antibodies" refer to naturally occurring immunoglobulin molecules with varying structures. For example, native IgG antibodies are heterotetrameric glycoproteins of about 150,000 daltons, composed of two identical light chains and two identical heavy chains that are disulfide-bonded. From N- to C-terminus, each heavy chain has a variable region (VH), also called a variable heavy domain or a heavy chain variable domain, followed by three constant domains (CH1, CH2, and CH3). Similarly, from N- to C-terminus, each light chain has a variable region (VL), also called a variable light domain or a light chain variable domain, followed by a constant light (CL) domain. The light chain of an antibody may be assigned to one of two types, called kappa (κ) and lambda (λ), based on the amino acid sequence of its constant domain.

The term "package insert" is used to refer to instructions customarily included in commercial packages of therapeutic products, that contain information about the indications, usage, dosage, administration, combination therapy, contraindications and/or warnings concerning the use of such therapeutic products.

"Percent (%) amino acid sequence identity" with respect to a reference polypeptide sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared. For purposes herein, however, % amino acid sequence identity values are generated using the sequence comparison computer program ALIGN-2. The ALIGN-2 sequence comparison computer program was authored by Genentech, Inc., and the source code has been filed with user documentation in the U.S. Copyright Office, Washington D.C., 20559, where it is registered under U.S. Copyright Registration No. TXU510087. The ALIGN-2 program is publicly available from Genentech, Inc., South San Francisco, California, or may be compiled from the source code. The ALIGN-2 program should be compiled for use on a UNIX operating system, including digital UNIX V4.0D. All sequence comparison parameters are set by the ALIGN-2 program and do not vary.

In situations where ALIGN-2 is employed for amino acid sequence comparisons, the % amino acid sequence identity of a given amino acid sequence A to, with, or against a given amino acid sequence B (which can alternatively be phrased as a given amino acid sequence A that has or comprises a certain % amino acid sequence identity to, with, or against a given amino acid sequence B) is calculated as follows:

100 times the fraction X/Y where X is the number of amino acid residues scored as identical matches by the sequence alignment program ALIGN-2 in that program's alignment of A and B, and where Y is the total number of amino acid residues in B. It will be appreciated that where the length of amino acid sequence A is not equal to the length of amino acid sequence B, the % amino acid sequence identity of A to B will not equal the % amino acid sequence identity of B to A. Unless specifically stated otherwise, all % amino acid sequence identity values used herein are obtained as described in the immediately preceding paragraph using the ALIGN-2 computer program.

The term "pharmaceutical formulation" refers to a preparation which is in such form as to permit the biological activity of an active ingredient contained therein to be effective, and which contains no additional components which are unacceptably toxic to a subject to which the formulation would be administered.

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

As used herein, "treatment" (and grammatical variations thereof such as "treat" or "treating") refers to clinical intervention in an attempt to alter the natural course of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. In some embodiments, antibodies of the invention are used to delay development of a disease or to slow the progression of a disease.

The term "variable region" or "variable domain" refers to the domain of an antibody heavy or light chain that is involved in binding the antibody to antigen. The variable domains of the heavy chain and light chain (VH and VL, respectively) of a native antibody generally have similar structures, with each domain comprising four conserved framework regions (FRs) and three complement determining regions (CDRs). (See, e.g., Kindt, T. J. et al. Kuby Immunology, 6th ed., W.H. Freeman and Co., N.Y. (2007), page 91) A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively. See e.g., Portolano, S. et al., J. Immunol. 150 (1993) 880-887; Clackson, T. et al., Nature 352 (1991) 624-628).

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors".

I. Compositions and Methods

In one aspect, the invention is based, in part, on the finding that surprisingly among various variants of HLA-G-0090 in which the glcyosylation site was removed only the two variants HLA-G-0090-VL-S32P and HLA-G-0090-VL-S33A show even improved binding properties, good expressability and stability, while showing no more glycosylation at the CDR-L1 of the LC (so no Fab glycosylation could be detected). As all recently approved pharmaceutical antibody products are produced in mammalian cells, especially CHO cells (see e.g. Walsh G., Nature Biotech (2018) 1136-1145) providing an antibody without glycosylation sites in the binding region (VH and VL and especially the CDRs) represents a valuable advantage, as these antibodies can then be readily used for production in mammalian expression systems without the risk of (at least partially impairing the binding properties by glycosylation. In particular for Fc domain-comprising antibodies, manufacturing the antibody in a host cell lacking a glycosylation machinery (such as a prokaryotic host cell) would not results in a product of comparable quality, since the N-glycans attached to amino acid residue ASN297 (numbering according to EU index of Kabat) in the Fc region are required to maintain solubility and thermal stability, and to prevent aggregation of the antibody in an aqueous solution (e.g. in pharmaceutical compositions).

A.1 Exemplary Anti-HLA-G Antibodies

One embodiment of the invention is an antibody that binds to human HLA-G comprising
- A) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23; (ii) CDR-L2 comprising the amino acid sequence of SEQ ID NO:5 and (iii) CDR-L3 comprising the amino acid sequence of SEQ ID NO:6, or
- B) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:25; (ii) CDR-L2 comprising the amino acid sequence of SEQ ID NO:5 and (iii) CDR-L3 comprising the amino acid sequence of SEQ ID NO:6.

One embodiment of the invention is an antibody that binds to human HLA-G wherein the antibody
- A) comprises a VH domain comprising the amino acid sequence of SEQ ID NO:7 and a VL domain comprising the amino acid sequence of SEQ ID NO:24; or
- B) comprises a VH domain comprising the amino acid sequence of SEQ ID NO:7 and a VL domain comprising the amino acid sequence of SEQ ID NO:26.

One embodiment of the invention is an antibody that binds to human HLA-G wherein the antibody comprises a VH domain comprising the amino acid sequence of SEQ ID NO:7 and a VL domain comprising the amino acid sequence of SEQ ID NO:24.

One embodiment of the invention is an antibody that binds to human HLA-G wherein the antibody comprises a VH domain comprising the amino acid sequence of SEQ ID NO:7 and a VL domain comprising the amino acid sequence of SEQ ID NO:24.

In embodiment such anti-HLA-G antibody has improved binding properties with respect to maximal binding (Rmax) and/or binding affinity (KD) compared to the (parental) antibody that comprises a VH domain comprising the amino acid sequence of SEQ ID NO:7 and a VL domain comprising the amino acid sequence of SEQ ID NO:8 (as shown in Example 2). In a further embodiment the HLA-G antibody of the present invention comprises an Fc domain of human origin, in one embodiment the Fc domain is of the IgG isotype, in one preferred embodiment of the IgG1 isotype. In one embodiment, such an IgG1 isotype Fc domain of human origin comprises the amino acid mutations L234A, L235A and P329G ("P329G LALA", "PGLALA" or "LALAPG") (numberings according to Kabat EU index).

In a further embodiment the HLA-G antibody of the present invention comprises a constant region of human origin, particularly of the IgG isotype, more particularly of the IgG1 isotype, comprising a human CH1, CH2, CH3 and/or CL domain.

In one embodiment such constant region of the IgG1 isotype comprises the amino acid mutations L234A, L235A and P329G ("P329G LALA", "PGLALA" or "LALAPG") (numberings according to Kabat EU index).

Such Fc domain-comprising antibodies can be typically N-glycosylated at position ASN-297 (numbering according to Kabat EU index) e.g. when produced in eukaryotic cells, like mammalian cells, in particular CHO cells. N-glycosylation at position ASN-297 (numbering according to EU index (see Kabat) represents a valuable contribution to e.g. the high stability, low aggregation tendency and/or good pharmacokinetic and other critical quality properties of such an antibody (see e.g. Zheng et al, mAbs (2011) 568-576; and Reusch et al, Glycobiology (2015) 1325-133). Therefore such an Fc domain-comprising antibody of the present invention is easily ready for production in in eukaryotic cells, like mammalian cells, in particular CHO cells, without the risk of being glycosylated in the binding region (which would interfere with its binding properties), but at the same time with the benefit and valuable quality attributes of the N-glycosylation at position ASN-297.

One embodiment of the invention is an antibody that binds to human HLA-G wherein the antibody comprises a VH domain comprising the amino acid sequence of SEQ ID NO:7 and a VL domain comprising the amino acid sequence of SEQ ID NO:24, wherein antibody has improved binding properties with respect to maximal binding (Rmax) and/or binding affinity (KD) compared to the (parental) antibody that comprises a VH domain comprising the amino acid sequence of SEQ ID NO:7 and a VL domain comprising the amino acid sequence of SEQ ID NO:8 (as shown in Example 2).

In embodiment the anti-HLA-G antibody
- a) does not crossreact with a modified human HLA-G β2M MHC I complex, wherein the HLA-G specific amino acids have been replaced by HLA-A consensus amino acids, the complex comprising SEQ ID NO:40; and/or
- b) does not crossreact with a mouse H2Kd β2M MHC I complex comprising SEQ ID NO:41; and/or
- c) does not crossreact with rat RT1A β2M MHC I complex comprising SEQ ID NO:43.

In embodiment the anti-HLA-G antibody
- a) inhibits ILT2 binding to (HLA-G expressed on) JEG3 cells (ATCC No. HTB36); or
- b) binds to (HLA-G expressed on) JEG3 cells (ATCC No. HTB36), and inhibits ILT2 binding to (HLA-G expressed on) JEG-3 cells (ATCC No. HTB36).

In another aspect, the invention relates to multispecific antibodies comprising the anti-HLA-G antigen binding moiety. These multispecific antibodies (e.g. the bispecific antibodies) as described herein use the selected, improved anti-HLA-G antibodies as first antigen binding moiety/site. These anti-HLA-G antibodies bind to HLA-G with high specificity and affinity (improved binding properties, no crossreactivity with other species and human HLA-A consensus sequences), and have ability to specifically inhibit ILT2 and or ILT4 binding to HLA-G.

In one embodiment the invention relates to a multispecific (preferably bispecific) that binds to human HLA-G and to human CD3. In one embodiment the invention relates to a multispecific (preferably bispecific) anti-HLA-G/anti-CD3 antibody, wherein the multispecific (preferably bispecific) antibody that binds to human HLA-G and to human CD3, comprises a first antigen binding moiety that binds to human HLA-G and a second antigen binding moiety that binds to human CD3. This bispecific antibody as described herein binds with specific, second antigen binding moieties/sites to CD3, especially CD3epsilon and are therefore able to attract CD3 expressing T-cells to HLA-G expressing tumor cells and at the same time to inhibit the HLA-G induced immune suppression in the tumor environment by blocking ILT2/4 binding to HLA-G. Thus these bispecific anti-HLA-G/anti-CD3 antibodies show strong tumor growth inhibition and tumor regression in vivo.

A.2 Exemplary Multispecific Anti-HLA-G/Anti-CD3 Antibodies

One embodiment of the invention is a bispecific antibody that binds to human HLA-G and to human CD3, comprising a first antigen binding moiety that binds to human HLA-G and a second antigen binding moiety that binds to human CD3, wherein the first antigen binding moiety that binds to human HLA-G comprises
- A) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23; (ii) CDR-L2 comprising the amino acid sequence of SEQ ID NO:5 and (iii) CDR-L3 comprising the amino acid sequence of SEQ ID NO:6, or
- B) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:25; (ii) CDR-L2 comprising the amino acid sequence of SEQ ID NO:5 and (iii) CDR-L3 comprising the amino acid sequence of SEQ ID NO:6;

and wherein the second antigen binding moiety that binds to a T cell activating antigen binds to human CD3 comprises
- C) (a) a VH domain comprising (i) CDR-H1 comprising the amino acid sequence of SEQ ID NO:52, (ii) CDR-H2 comprising the amino acid sequence of SEQ ID NO:53, and (iii) CDR-H3 comprising the amino acid sequence of SEQ ID NO:54; and (b) a VL domain comprising (i) CDR-L1 comprising the amino acid sequence of SEQ ID NO:55; (ii) CDR-L2 comprising the amino acid sequence of SEQ ID NO:56 and (iii) CDR-L3 comprising the amino acid sequence of SEQ ID NO:57, or
- C) (a) a VH domain comprising (i) CDR-H1 comprising the amino acid sequence of SEQ ID NO:60, (ii) CDR-H2 comprising the amino acid sequence of SEQ ID NO:61, and (iii) CDR-H3 comprising the amino acid sequence of SEQ ID NO:62; and (b) a VL domain comprising (i) CDR-L1 comprising the amino acid sequence of SEQ ID NO:63; (ii) CDR-L2 comprising the amino acid sequence of SEQ ID NO:64 and (iii) CDR-L3 comprising the amino acid sequence of SEQ ID NO:65, or
- D) (a) a VH domain comprising (i) CDR-H1 comprising the amino acid sequence of SEQ ID NO:68, (ii) CDR-H2 comprising the amino acid sequence of SEQ ID NO:69, and (iii) CDR-H3 comprising the amino acid sequence of SEQ ID NO:70; and (b) a VL domain comprising (i) CDR-L1 comprising the amino acid sequence of SEQ ID NO:71; (ii) CDR-L2 comprising the amino acid sequence of SEQ ID NO:72 and (iii) CDR-L3 comprising the amino acid sequence of SEQ ID NO:73.

Another embodiment of the invention is a bispecific antibody that binds to human HLA-G and to human CD3, comprising a first antigen binding moiety that binds to human HLA-G and a second antigen binding moiety that binds to human CD3, wherein the first antigen binding moiety
- A) comprises a VH domain comprising the amino acid sequence of SEQ ID NO:7 and a VL domain comprising the amino acid sequence of SEQ ID NO:24; or
- B) comprises a VH domain comprising the amino acid sequence of SEQ ID NO:7 and a VL domain comprising the amino acid sequence of SEQ ID NO:26, and wherein the second antigen binding moiety
- C) comprises a VH domain comprising the amino acid sequence of SEQ ID NO:58 and a VL domain comprising the amino acid sequence of SEQ ID NO:59; or
- D) comprises a VH domain comprising the amino acid sequence of SEQ ID NO:66 and a VL domain comprising the amino acid sequence of SEQ ID NO:67; or
- E) comprises a VH domain comprising the amino acid sequence of SEQ ID NO:74 and a VL domain comprising the amino acid sequence of SEQ ID NO:75.

Another embodiment of the invention is a bispecific antibody that binds to human HLA-G and to human CD3, comprising a first antigen binding moiety that binds to human HLA-G and a second antigen binding moiety that binds to human CD3,
wherein the first antigen binding moiety comprises a VH domain comprising the amino acid sequence of SEQ ID NO:7 and a VL domain comprising the amino acid sequence of SEQ ID NO:24;
and wherein the second antigen binding moiety comprises a VH domain comprising the amino acid sequence of SEQ ID NO:58 and a VL domain comprising the amino acid sequence of SEQ ID NO:59.

Another embodiment of the invention is a bispecific antibody that binds to human HLA-G and to human CD3, comprising a first antigen binding moiety that binds to human HLA-G and a second antigen binding moiety that binds to human CD3,
wherein the first antigen binding moiety comprises a VH domain comprising the amino acid sequence of SEQ ID NO:7 and a VL domain comprising the amino acid sequence of SEQ ID NO:24;
and wherein the second antigen binding moiety comprises a VH domain comprising the amino acid sequence of SEQ ID NO:66 and a VL domain comprising the amino acid sequence of SEQ ID NO:67.

Another embodiment of the invention is a bispecific antibody that binds to human HLA-G and to human CD3, comprising a first antigen binding moiety that binds to human HLA-G and a second antigen binding moiety that binds to human CD3,
wherein the first antigen binding moiety comprises a VH domain comprising the amino acid sequence of SEQ ID NO:7 and a VL domain comprising the amino acid sequence of SEQ ID NO:24;
and wherein the second antigen binding moiety comprises a VH domain comprising the amino acid sequence of SEQ ID NO:74 and a VL domain comprising the amino acid sequence of SEQ ID NO:75.

In one embodiment these bispecific antibodies are characterized by one or more of the following properties:
a) induction of T cell mediated cytotoxicity/tumor cell killing in the presence of HLA-G expressing tumor cells (preferably in the presence of JEG3 cells (ATCC No. HTB36)); and/or
b) induction IFN gamma secretion by T cells in the presence of HLA-G expressing tumor cells (preferably in the presence of JEG3 cells (ATCC No. HTB36)); and/or c) inhibition of tumor growth in vivo (in a mouse xenograft tumor model),
d) in vivo anti-tumor efficacy/tumor regression in humanized NSG mice bearing SKOV3 human ovarian carcinoma transfected with recombinant HLA-G (SKOV3 HLA-G) humanized NSG mice (see Example 13); and/or
e) in vivo anti-tumor efficacy/tumor of HLA-G CD3 T cell bi-specific in humanized NSG mice bearing human breast cancer PDX tumors (BC004) (see Example 14).

In one embodiment these bispecific antibodies are characterized in addition by one or more of the following properties: the bispecific antibody
a) does not crossreact with a modified human HLA-G β2M MHC I complex, wherein the HLA-G specific amino acids have been replaced by HLA-A consensus amino acids, the complex comprising SEQ ID NO:44; and/or
b) does not crossreact with a mouse H2Kd β2M MHC I complex comprising SEQ ID NO:41; and/or
c) does not crossreact with rat RT1A β2M MHC I complex comprising SEQ ID NO:43.

In one embodiment these bispecific antibodies are characterized in addition by one or more of the following properties: the bispecific antibody
a) inhibits ILT2 binding to (HLA-G expressed on) JEG3 cells (ATCC No. HTB36); or
b) binds to (HLA-G expressed on) JEG3 cells (ATCC No. HTB36), and inhibits ILT2 binding to (HLA-G expressed on) JEG-3 cells (ATCC No. HTB36).

Multispecific Antibodies

Multispecific antibodies are monoclonal antibodies that have binding specificities for at least two different sites, i.e., different epitopes on different antigens or different epitopes on the same antigen. In certain embodiments, the multispecific antibody has three or more binding specificities. In a preferred embodiment the multispecific antibody provided herein is a bispecific antibody. In certain embodiments, one of the binding specificities is for HLA-G and the other specificity is for CD3. In certain embodiments, bispecific antibodies may bind to two (or more) different epitopes of HLA-G. Multispecific antibodies can be prepared as full length antibodies or antibody fragments.

Techniques for making multispecific and in particular bispecific antibodies include, but are not limited to, recombinant co-expression of two immunoglobulin heavy chain-light chain pairs having different specificities (see Milstein and Cuello, *Nature* 305: 537 (1983)) and "knob-in-hole" engineering (see, e.g., U.S. Pat. No. 5,731,168, and Atwell et al., *J. Mol. Biol.* 270:26 (1997)). Multi-specific antibodies may also be made by engineering electrostatic steering effects for making antibody Fc-heterodimeric molecules (see, e.g., WO 2009/089004); cross-linking two or more antibodies or fragments (see, e.g., U.S. Pat. No. 4,676,980, and Brennan et al., *Science,* 229: 81 (1985)); using leucine zippers to produce bi-specific antibodies (see, e.g., Kostelny et al., *J. Immunol.,* 148(5):1547-1553 (1992) and WO 2011/034605); using the common light chain technology for circumventing the light chain mis-pairing problem (see, e.g., WO 98/50431); using "diabody" technology for making bispecific antibody fragments (see, e.g., Hollinger et al., *Proc. Natl. Acad. Sci. USA,* 90:6444-6448 (1993)); and using single-chain Fv (sFv) dimers (see, e.g. Gruber et al., *J. Immunol.,* 152:5368 (1994)); and preparing trispecific antibodies as described, e.g., in Tutt et al. *J. Immunol.* 147: 60 (1991).

Engineered antibodies with three or more antigen binding sites, including for example, "Octopus antibodies," or DVD-Ig are also included herein (see, e.g. WO 2001/77342 and WO 2008/024715). Other examples of multispecific antibodies with three or more antigen binding sites can be found in WO 2010/115589, WO 2010/112193, WO 2010/136172, WO2010/145792, and WO 2013/026831. The bispecific antibody or antigen binding fragment thereof also includes a "Dual Acting FAb" or "DAF" comprising an antigen binding site that binds to HLA-G as well as another different antigen, or two different epitopes of HLA-G (see, e.g., US 2008/0069820 and WO 2015/095539).

Multi-specific antibodies may also be provided in an asymmetric form with a domain crossover in one or more binding arms of the same antigen specificity, i.e. by exchanging the VH/VL domains (see e.g., WO 2009/080252 and WO 2015/150447), the CH1/CL domains (see e.g., WO 2009/080253) or the complete Fab arms (see e.g., WO 2009/080251, WO 2016/016299, also see Schaefer et al, PNAS, 108 (2011) 1187-1191, and Klein at al., MAbs 8 (2016) 1010-20). Asymmetrical Fab arms can also be engineered by introducing charged or non-charged amino acid mutations into domain interfaces to direct correct Fab pairing. See e.g., WO 2016/172485.

Various further molecular formats for multispecific antibodies are known in the art and are included herein (see e.g., Spiess et al., Mol Immunol 67 (2015) 95-106).

A particular type of multispecific antibodies, also included herein, are bispecific antibodies designed to simultaneously bind to a surface antigen on a target cell, e.g., a tumor cell, and to an activating, invariant component of the T cell receptor (TCR) complex, such as CD3, for retargeting of T cells to kill target cells. Hence, in certain embodiments, an antibody provided herein is a multispecific antibody, particularly a bispecific antibody, wherein one of the binding specificities is for HLA-G and the other is for CD3.

Examples of bispecific antibody formats that may be useful for this purpose include, but are not limited to, the so-called "BiTE" (bispecific T cell engager) molecules wherein two scFv molecules are fused by a flexible linker (see, e.g., WO2004/106381, WO2005/061547, WO2007/042261, and WO2008/119567, Nagorsen and Bäuerle, Exp Cell Res 317, 1255-1260 (2011)); diabodies (Holliger et al., Prot Eng 9, 299-305 (1996)) and derivatives thereof, such as tandem diabodies ("TandAb"; Kipriyanov et al., J Mol Biol 293, 41-56 (1999)); "DART" (dual affinity retargeting) molecules which are based on the diabody format but feature a C-terminal disulfide bridge for additional stabilization (Johnson et al., J Mol Biol 399, 436-449 (2010)), and so-called triomabs, which are whole hybrid mouse/rat IgG molecules (reviewed in Seimetz et al., Cancer Treat Rev 36, 458-467 (2010)). Particular T cell bispecific antibody formats included herein are described in WO 2013/026833, WO2013/026839, WO 2016/020309; Bacac et al., Oncoimmunology 5(8) (2016) e1203498.

Bispecific Antibodies that Bind to HLA-G and to CD3

The invention also provides a bispecific antibody, i.e. an antibody that comprises at least two antigen binding moieties capable of specific binding to two distinct antigenic determinants (a first and a second antigen).

Based on the anti-HLA-G antigen binding moieties and anti-CD3 antigen binding moieties they developed, the present inventors have developed bispecific antibodies that bind to HLA-G and to CD3.

As shown in the Examples, these bispecific antibodies have a number of remarkable properties, including good efficacy and low toxicity.

Thus, in certain aspects, the invention provides a bispecific antibody, comprising (a) a first antigen binding moiety that binds to human HLA-G, and (b) a second antigen binding moiety which specifically binds to human CD3, wherein the bispecific antibody has any of the following features: The bispecific antibody of the invention specifically induces T-cell mediated killing of cells expressing HLA-G. In some embodiments, the bispecific antibody of the invention specifically induces T-cell mediated killing of cells expressing HLA-G. In a more specific embodiment, the bispecific antibody specifically induces T-cell mediated killing of cells expressing HLA-G.

In one embodiment, induction of T-cell mediated killing by the bispecific antibody is determined using HLA-G-expressing cells.

In one embodiment, activation of T cells by the bispecific antibody is determined by measuring, particularly by flow cytometry, expression of CD25 and/or CD69 by T cells after incubation with the bispecific antibody in the presence of HLA-G-expressing cells.

In a specific embodiment, induction of T-cell mediated killing by the bispecific antibody is determined as follows:

Ability of anti HLA-G/anti CD3 TCB to activate T cells in the presence of HLA-G expressing tumor cells is tested on SKOV3 cells transfected with recombinant HLA-G (SKOV3HLA-G). Activation of T cells is assessed by FACS analysis of cell surface activation markers CD25 and early activation marker CD69 on T cells. Briefly, Peripheral Blood Mononuclear Cells (PBMCs) are isolated from human peripheral blood by density gradient centrifugation using Lymphocyte Separating Medium Tubes (PAN #P04-60125). PBMC's and SKOV3HLA-G cells are seeded at a ratio of 10:1 in 96-well U bottom plates. The co-culture is then incubated with HLA-G-TCB at different concentrations as described in the Example 12 and incubated for 24 h at 37° C. in an incubator with 5% Co2. On the next day, expression of CD25 and CD69 is measured by flow cytometry.

For flow cytometry analysis, cells are stained with PerCP-Cy5.5 Mouse Anti-Human CD8 (BD Pharmingen #565310), PE Mouse Anti-Human CD25 (eBioscience #9012-0257) and APC Mouse Anti-Human CD69 (BD Pharmingen #555533) at 4° C. Briefly, antibodies are diluted in a 2-fold concentration and 25 µl of antibody dilution are added in each well with 25 µl of pre-washed co-cultures. Cells are stained for 30 min at 4° C. and washed twice with 200 µl/well staining buffer and centrifugation at 300 g for 5 min. Cell pellets are resuspended in 200 µl of staining buffer and stained with DAPI for live dead discrimination at a final concentration of 2 µg/ml. Samples are then measured using BD LSR flow cytometer. Data analysis is performed using FlowJo V.10.1 software.

The bispecific antibody of the invention specifically activates T cells in the presence of cells expressing HLA-G. In some embodiments, the bispecific antibody of the invention specifically activates T cells in the presence of cells expressing HLA-G. In a more specific embodiment, the bispecific antibody specifically activates T cells in the presence of cells expressing HLA-G.

In one embodiment, the bispecific antibody induces T cell mediated killing of, or activate T cells in the presence of, cells expressing HLA-G. In one embodiment, the bispecific antibody induces T cell mediated killing of, and/or activates T cells in the presence of, cells expressing HLA-G with an EC50 that is at least 5, at least 10, at least 15, at least 20, at least 25, at least 50, at least 75 or at least 100 times lower than the EC50 for induction of T cell mediated killing of, or activation of T cells in the presence of, cells expressing HLA-G According to particular embodiments of the invention, the antigen binding moieties comprised in the bispecific antibody are Fab molecules (i.e. antigen binding domains composed of a heavy and a light chain, each comprising a variable and a constant domain). In one embodiment, the first and/or the second antigen binding moiety is a Fab molecule. In one embodiment, said Fab molecule is human. In a particular embodiment, said Fab molecule is humanized. In yet another embodiment, said Fab molecule comprises human heavy and light chain constant domains.

Preferably, at least one of the antigen binding moieties is a crossover Fab molecule. Such modification reduces mispairing of heavy and light chains from different Fab molecules, thereby improving the yield and purity of the bispecific antibody of the invention in recombinant production. In a particular crossover Fab molecule useful for the bispecific antibody of the invention, the variable domains of the Fab light chain and the Fab heavy chain (VL and VH, respectively) are exchanged. Even with this domain exchange, however, the preparation of the bispecific antibody may comprise certain side products due to a so-called Bence Jones-type interaction between mispaired heavy and light chains (see Schaefer et al, PNAS, 108 (2011) 11187-11191). To further reduce mispairing of heavy and light chains from different Fab molecules and thus increase the purity and yield of the desired bispecific antibody, charged amino acids with opposite charges may be introduced at specific amino acid positions in the CH1 and CL domains of either the Fab molecule(s) binding to the first antigen (HLA-G), or the Fab molecule binding to the second antigen an activating T cell antigen such as CD3, as further described herein. Charge modifications are made either in the conventional Fab molecule(s) comprised in the bispecific antibody (such as shown e.g. in FIGS. 13A-13C and 13G-13J), or in the VH/VL crossover Fab molecule(s) comprised in the bispecific antibody (such as shown e.g. in FIGS. 13D-13F and 13K-13N) (but not in both). In particular embodiments, the charge modifications are made in the conventional Fab molecule(s) comprised in the bispecific antibody (which in particular embodiments bind(s) to the first antigen, i.e. HLA-G).

In a particular embodiment according to the invention, the bispecific antibody is capable of simultaneous binding to the first antigen (i.e. HLA-G), and the second antigen (e.g. an activating T cell antigen, particularly CD3). In one embodiment, the bispecific antibody is capable of crosslinking a T cell and a target cell by simultaneous binding HLA-G and an activating T cell antigen. In an even more particular embodiment, such simultaneous binding results in lysis of the target cell, particularly a HLA-G expressing tumor cell. In one embodiment, such simultaneous binding results in activation of the T cell. In other embodiments, such simultaneous binding results in a cellular response of a T lymphocyte, particularly a cytotoxic T lymphocyte, selected from the group of: proliferation, differentiation, cytokine secretion, cytotoxic effector molecule release, cytotoxic activity, and expression of activation markers. In one embodiment, binding of the bispecific antibody to the activating T cell antigen, particularly CD3, without simultaneous binding to HLA-G does not result in T cell activation.

In one embodiment, the bispecific antibody is capable of re-directing cytotoxic activity of a T cell to a target cell. In a particular embodiment, said re-direction is independent of MHC-mediated peptide antigen presentation by the target cell and/or specificity of the T cell.

Particularly, a T cell according to any of the embodiments of the invention is a cytotoxic T cell. In some embodiments the T cell is a CD4+ or a CD8+ T cell, particularly a CD8+ T cell.

First Antigen Binding Moiety that Binds to Human HLA-G

The bispecific antibody of the invention comprises at least one antigen binding moiety, particularly a Fab molecule, that binds to human HLA-G (first antigen). In certain embodiments, the bispecific antibody comprises two antigen binding moieties, particularly Fab molecules, which bind to human HLA-G. In a particular such embodiment, each of these antigen binding moieties binds to the same antigenic determinant. In an even more particular embodiment, all of these antigen binding moieties are identical, i.e. they comprise the same amino acid sequences including the same amino acid substitutions in the CH1 and CL domain as described herein (if any). In one embodiment, the bispecific antibody comprises not more than two antigen binding moieties, particularly Fab molecules, which bind to human HLA-G.

In particular embodiments, the antigen binding moiety(ies) which bind to human HLA-G is/are a conventional Fab molecule. In such embodiments, the antigen binding moiety(ies) that binds to a second antigen is a crossover Fab molecule as described herein, i.e. a Fab molecule wherein the variable domains VH and VL or the constant domains CH1 and CL of the Fab heavy and light chains are exchanged/replaced by each other.

In alternative embodiments, the antigen binding moiety(ies) which bind to human HLA-G is/are a crossover Fab molecule as described herein, i.e. a Fab molecule wherein the variable domains VH and VL or the constant domains CH1 and CL of the Fab heavy and light chains are exchanged/replaced by each other. In such embodiments, the antigen binding moiety(ies) that binds a second antigen is a conventional Fab molecule.

The HLA-G binding moiety is able to direct the bispecific antibody to a target site, for example to a specific type of tumor cell that expresses human HLA-G.

The first antigen binding moiety of the bispecific antibody may incorporate any of the features, singly or in combination, described herein in relation to the antibody that binds HLA-G, unless scientifically clearly unreasonable or impossible.

Thus, in one aspect, the invention provides a bispecific antibody, comprising a first antigen binding moiety that binds to a first antigen, wherein the first antigen is human HLA-G (in one embodiment the antibody binds to HLA-G β2M MHC I complex comprising SEQ ID NO: 39), and the first antigen binding moiety comprises
  (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising an amino acid sequence of SEQ ID NO:3; and wherein the VH domain comprises an amino acid sequence of at least 95%, 96%, 97%, 98%, 99% or 100% (in one preferred embodiment 98% or 99% or 100%) sequence identity to the amino acid sequence of SEQ ID NO: 7; and (b) a VL domain comprising (i) CDR-L1 comprising the amino acid sequence of SEQ ID NO:23; (ii) CDR-L2 comprising the amino acid sequence of SEQ ID NO:5 and (iii) CDR-L3 comprising the amino acid sequence of SEQ ID NO:6; and wherein the VL domain comprises an amino acid sequence of at least 95%, 96%, 97%, 98%, 99% or 100% (in one preferred embodiment 98% or 99% or 100%) sequence identity to the amino acid sequence of SEQ ID NO: 24.

The term like "a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising an amino acid sequence of SEQ ID NO:3; and wherein the VH domain comprises an amino acid sequence of at least 95%, 96%, 97%, 98%, 99% or 100% (in one preferred embodiment 98% or 99% or 100%) sequence identity to the amino acid sequence of SEQ ID NO: 7" refers to a VH domain with an amino acid sequence of SEQ ID NO: 7 wherein the 3 CDRs are unchanged (i.e. the same as in SEQ ID NO:7) but e.g. no, one, two, three, four or five amino acid residues in the framework regions of the VH is/are changed/substituted with another amino acid without affecting the binding properties of the VH and the antigen binding site. As the framework residues with a high probability to influence on the binding properties are well known (see e.g. Foote J. and Winter G., J. Mol. Biol. (1992) 224, 487-499), the framework residues with no or minor influence can be chosen for substitution. The same applies to analogues terms used herein relating to another VH or VL.

In one embodiment the first antigen binding moiety comprises a VH domain comprising the amino acid sequence of SEQ ID NO:7 and a VL domain comprising the amino acid sequence of SEQ ID NO:24.

In one embodiment the first binding moiety that binds to human HLA-G (in one embodiment to HLA-G β2M MHC I complex comprising SEQ ID NO: 39), comprises
  (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising an amino acid sequence of SEQ ID NO:3; and wherein the VH domain comprises an amino acid sequence of at least 95%, 96%, 97%, 98%, 99% or 100% (in one preferred embodiment 98% or 99% or 100%) sequence identity to the amino acid sequence of SEQ ID NO: 7; and (b) a VL domain comprising (i) CDR-L1 comprising the amino acid sequence of SEQ ID NO:25; (ii) CDR-L2 comprising the amino acid sequence of SEQ ID NO:5 and (iii) CDR-L3 comprising the amino acid sequence of SEQ ID NO:6; and wherein the VL domain comprises an amino acid sequence of at least 95%, 96%, 97%, 98%, 99% or 100% (in one preferred embodiment 98% or 99% or 100%) sequence identity to the amino acid sequence of SEQ ID NO: 26.

In one embodiment the first antigen binding moiety comprises a VH domain comprising the amino acid sequence of SEQ ID NO:7 and a VL domain comprising the amino acid sequence of SEQ ID NO:26.

Such anti-HLA-G antibodies show highly valuable properties, as they have no N-glycosylation in the antigen binding site (and the CDR-L1) (as shown in Example 2), have improved binding properties with respect to maximal binding (Rmax) and/or binding affinity (KD) compared to the (parental) antibody that comprises a VH domain comprising the amino acid sequence of SEQ ID NO:7 and a VL domain comprising the amino acid sequence of SEQ ID NO:8 (as shown in Example 2), do not crossreact with a HLA-A MHC I complexes, or murine or rat MHC I complexes and bind to (HLA-G expressed on) JEG3 cells (ATCC No. HTB36), and inhibits ILT2 binding to (HLA-G expressed on) JEG-3 cells (ATCC No. HTB36).

Second Antigen Binding Moiety that Binds to Human CD3

The bispecific antibody of the invention comprises at least one antigen binding moiety, particularly a Fab molecule, that binds to human CD3.

In particular embodiments, the antigen binding moiety that binds human CD3, is a crossover Fab molecule as described herein, i.e. a Fab molecule wherein the variable domains VH and VL or the constant domains CH1 and CL of the Fab heavy and light chains are exchanged/replaced by each other. In such embodiments, the antigen binding moiety(ies) that binds to human HLA-G is preferably a conventional Fab molecule. In embodiments where there is more than one antigen binding moiety, particularly Fab molecule, that binds to human CD3 comprised in the bispecific antibody, the antigen binding moiety that binds human CD3 preferably is a crossover Fab molecule and the antigen binding moieties that bind to human HLA-G are conventional Fab molecules.

In alternative embodiments, the antigen binding moiety that binds to the second antigen is a conventional Fab molecule. In such embodiments, the antigen binding moiety(ies) that binds to the first antigen (i.e. HLA-G) is a crossover Fab molecule as described herein, i.e. a Fab molecule wherein the variable domains VH and VL or the constant domains CH1 and CL of the Fab heavy and light chains are exchanged/replaced by each other. In embodiments where there is more than one antigen binding moiety, particularly Fab molecule, that binds to a second antigen comprised in the bispecific antibody, the antigen binding moiety that binds to human HLA-G preferably is a crossover Fab molecule and the antigen binding moieties that bind to human CD3 are conventional Fab molecules.

In some embodiments, the second antigen is an activating T cell antigen (also referred to herein as an "activating T cell antigen binding moiety, or activating T cell antigen binding Fab molecule"). In a particular embodiment, the bispecific antibody comprises not more than one antigen binding moiety capable of specific binding to an activating T cell antigen. In one embodiment the bispecific antibody provides monovalent binding to the activating T cell antigen.

In particular embodiments, the second antigen is CD3, particularly human CD3 (SEQ ID NO: 88) or cynomolgus CD3 (SEQ ID NO: 89), most particularly human CD3. In one embodiment the second antigen binding moiety is cross-reactive for (i.e. specifically binds to) human and cynomolgus CD3. In some embodiments, the second antigen is the epsilon subunit of CD3 (CD3 epsilon).

In one embodiment, the second antigen binding moiety that binds to human CD3 comprises (a) a VH domain comprising (i) CDR-H1 comprising the amino acid sequence of SEQ ID NO:52, (ii) CDR-H2 comprising the amino acid sequence of SEQ ID NO:53, and (iii) CDR-H3 comprising the amino acid sequence of SEQ ID NO:54; and wherein the VH domain comprises an amino acid sequence of at least 95%, 96%, 97%, 98%, 99% or 100% (in one preferred embodiment 98% or 99% or 100%) sequence identity to the amino acid sequence of SEQ ID NO: 58; and (b) a VL domain comprising (i) CDR-L1 comprising the amino acid sequence of SEQ ID NO:55; (ii) CDR-L2 comprising the amino acid sequence of SEQ ID NO:56 and (iii) CDR-L3 comprising the amino acid sequence of SEQ ID NO:57, and wherein the VL domain comprises an amino acid sequence of at least 95%, 96%, 97%, 98%, 99% or 100% (in one preferred embodiment 98% or 99% or 100%) sequence identity to the amino acid sequence of SEQ ID NO: 59.

In one embodiment, the second antigen binding moiety that binds to human CD3 comprises (a) a VH domain comprising (i) CDR-H1 comprising the amino acid sequence of SEQ ID NO:60, (ii) CDR-H2 comprising the amino acid sequence of SEQ ID NO:61, and (iii) CDR-H3 comprising the amino acid sequence of SEQ ID NO:62, and wherein the VH domain comprises an amino acid sequence of at least 95%, 96%, 97%, 98%, 99% or 100% (in one preferred embodiment 98% or 99% or 100%) sequence identity to the amino acid sequence of SEQ ID NO: 66; and (b) a VL domain comprising (i) CDR-L1 comprising the amino acid sequence of SEQ ID NO:63; (ii) CDR-L2 comprising the amino acid sequence of SEQ ID NO:64 and (iii) CDR-L3 comprising the amino acid sequence of SEQ ID NO:65, and wherein the VL domain comprises an amino acid sequence of at least 95%, 96%, 97%, 98%, 99% or 100% (in one preferred embodiment 98% or 99% or 100%) sequence identity to the amino acid sequence of SEQ ID NO: 67.

In one embodiment, the second antigen binding moiety that binds to human CD3 comprises (a) a VH domain comprising (i) CDR-H1 comprising the amino acid sequence of SEQ ID NO:68, (ii) CDR-H2 comprising the amino acid sequence of SEQ ID NO:69, and wherein the VH domain comprises an amino acid sequence of at least 95%, 96%, 97%, 98%, 99% or 100% (in one preferred embodiment 98% or 99% or 100%) sequence identity to the amino acid sequence of SEQ ID NO: 74; and (iii) CDR-H3 comprising the amino acid sequence of SEQ ID NO:70; and (b) a VL domain comprising (i) CDR-L1 comprising the amino acid sequence of SEQ ID NO:71; (ii) CDR-L2 comprising the amino acid sequence of SEQ ID NO:72 and (iii) CDR-L3 comprising the amino acid sequence of SEQ ID NO:73, and wherein the VL domain comprises an amino acid sequence of at least 95%, 96%, 97%, 98%, 99% or 100% (in one preferred embodiment 98% or 99% or 100%) sequence identity to the amino acid sequence of SEQ ID NO: 75.

In one embodiment, the second antigen binding moiety that binds to human CD3 comprises a VH domain comprising the amino acid sequence of SEQ ID NO: 58, and a VL domain comprising the amino acid sequence of SEQ ID NO: 59.

In one embodiment, the second antigen binding moiety that binds to human CD3 comprises a VH domain comprising the amino acid sequence of SEQ ID NO: 66, and a VL domain comprising the amino acid sequence of SEQ ID NO: 67.

In one embodiment, the second antigen binding moiety that binds to human CD3 comprises a VH domain comprising the amino acid sequence of SEQ ID NO: 74, and a VL domain comprising the amino acid sequence of SEQ ID NO: 75.

Such CD3 antigen binding moieties/sites show highly valuable properties (e.g. when provided as bispecific antibodies binding to CD3 and HLA-G (with the HLA-G antigen binding moieties as described herein). They show
  a) good thermal stability
  b) induction IFN gamma secretion by T cells in the presence of HLA-G expressing tumor cells (preferably in the presence of JEG3 cells (ATCC No. HTB36)) (Example 11); and/or
  c) induction of T cell mediated cytotoxicity/tumor cell killing in the presence of HLA-G expressing tumor cells (preferably in the presence of JEG3 cells (ATCC No. HTB36)) (Example 12); and/or
  d) inhibition of tumor growth in vivo (in a mouse xenograft tumor model),
  e) in vivo anti-tumor efficacy/tumor regression in humanized NSG mice bearing SKOV3 human ovarian carcinoma transfected with recombinant HLA-G (SKOV3 HLA-G) humanized NSG mice (see
   f) in vivo anti-tumor efficacy/tumor of HLA-G CD3 T cell bi-specific in humanized NSG mice bearing human breast cancer PDX tumors (BC004) (see Example 14).

In some embodiments, the second antigen binding moiety is a Fab molecule wherein the variable domains VL and VH or the constant domains CL and CH1, particularly the variable domains VL and VH, of the Fab light chain and the Fab heavy chain are replaced by each other (i.e. according to such embodiment, the second antigen binding moiety is a crossover Fab molecule wherein the variable or constant domains of the Fab light chain and the Fab heavy chain are exchanged). In one such embodiment, the first (and the third, if any) antigen binding moiety is a conventional Fab molecule.

In one embodiment, not more than one antigen binding moiety that binds to the second antigen (e.g. an activating T cell antigen such as CD3) is present in the bispecific antibody (i.e. the bispecific antibody provides monovalent binding to the second antigen).

Charge Modifications

The bispecific antibodies of the invention may comprise amino acid substitutions in Fab molecules comprised therein which are particularly efficient in reducing mispairing of light chains with non-matching heavy chains (Bence-Jones-type side products), which can occur in the production of Fab-based bi-/antibodies with a VH/VL exchange in one (or more, in case of molecules comprising more than two antigen-binding Fab molecules) of their binding arms (see also PCT publication no. WO 2015/150447, particularly the examples therein, incorporated herein by reference in its entirety). The ratio of a desired bispecific antibody compared to undesired side products, in particular Bence Jones-type side products occurring in bispecific antibodies with a VH/VL domain exchange in one of their binding arms, can be improved by the introduction of charged amino acids with opposite charges at specific amino acid positions in the CH1 and CL domains (sometimes referred to herein as "charge modifications").

Accordingly, in some embodiments wherein the first and the second antigen binding moiety of the bispecific antibody are both Fab molecules, and in one of the antigen binding moieties (particularly the second antigen binding moiety) the variable domains VL and VH of the Fab light chain and the Fab heavy chain are replaced by each other,
   i) in the constant domain CL of the first antigen binding moiety the amino acid at position 124 is substituted by a positively charged amino acid (numbering according to Kabat), and wherein in the constant domain CH1 of the first antigen binding moiety the amino acid at position 147 or the amino acid at position 213 is substituted by a negatively charged amino acid (numbering according to Kabat EU index); or
   ii) in the constant domain CL of the second antigen binding moiety the amino acid at position 124 is substituted by a positively charged amino acid (numbering according to Kabat), and wherein in the constant domain CH1 of the second antigen binding moiety the amino acid at position 147 or the amino acid at position 213 is substituted by a negatively charged amino acid (numbering according to Kabat EU index).

The bispecific antibody does not comprise both modifications mentioned under i) and ii). The constant domains CL and CH1 of the antigen binding moiety having the VH/VL exchange are not replaced by each other (i.e. remain unexchanged).

In a more specific embodiment,
   i) in the constant domain CL of the first antigen binding moiety the amino acid at position 124 is substituted independently by lysine (K), arginine (R) or histidine (H) (numbering according to Kabat), and in the constant domain CH1 of the first antigen binding moiety the amino acid at position 147 or the amino acid at position 213 is substituted independently by glutamic acid (E), or aspartic acid (D) (numbering according to Kabat EU index); or
   ii) in the constant domain CL of the second antigen binding moiety the amino acid at position 124 is substituted independently by lysine (K), arginine (R) or histidine (H) (numbering according to Kabat), and in the constant domain CH1 of the second antigen binding moiety the amino acid at position 147 or the amino acid at position 213 is substituted independently by glutamic acid (E), or aspartic acid (D) (numbering according to Kabat EU index).

In one such embodiment, in the constant domain CL of the first antigen binding moiety the amino acid at position 124 is substituted independently by lysine (K), arginine (R) or histidine (H) (numbering according to Kabat), and in the constant domain CH1 of the first antigen binding moiety the amino acid at position 147 or the amino acid at position 213 is substituted independently by glutamic acid (E), or aspartic acid (D) (numbering according to Kabat EU index).

In a further embodiment, in the constant domain CL of the first antigen binding moiety the amino acid at position 124 is substituted independently by lysine (K), arginine (R) or histidine (H) (numbering according to Kabat), and in the constant domain CH1 of the first antigen binding moiety the amino acid at position 147 is substituted independently by glutamic acid (E), or aspartic acid (D) (numbering according to Kabat EU index).

In a particular embodiment, in the constant domain CL of the first antigen binding moiety the amino acid at position 124 is substituted independently by lysine (K), arginine (R) or histidine (H) (numbering according to Kabat) and the amino acid at position 123 is substituted independently by lysine (K), arginine (R) or histidine (H) (numbering according to Kabat), and in the constant domain CH1 of the first antigen binding moiety the amino acid at position 147 is substituted independently by glutamic acid (E), or aspartic acid (D) (numbering according to Kabat EU index) and the amino acid at position 213 is substituted independently by glutamic acid (E), or aspartic acid (D) (numbering according to Kabat EU index).

In a more particular embodiment, in the constant domain CL of the first antigen binding moiety the amino acid at position 124 is substituted by lysine (K) (numbering according to Kabat) and the amino acid at position 123 is substituted by lysine (K) (numbering according to Kabat), and in the constant domain CH1 of the first antigen binding moiety the amino acid at position 147 is substituted by glutamic acid (E) (numbering according to Kabat EU index) and the amino acid at position 213 is substituted by glutamic acid (E) (numbering according to Kabat EU index).

In an even more particular embodiment, in the constant domain CL of the first antigen binding moiety the amino acid at position 124 is substituted by lysine (K) (numbering according to Kabat) and the amino acid at position 123 is substituted by arginine (R) (numbering according to Kabat), and in the constant domain CH1 of the first antigen binding moiety the amino acid at position 147 is substituted by glutamic acid (E) (numbering according to Kabat EU index)

and the amino acid at position 213 is substituted by glutamic acid (E) (numbering according to Kabat EU index).

In particular embodiments, if amino acid substitutions according to the above embodiments are made in the constant domain CL and the constant domain CH1 of the first antigen binding moiety, the constant domain CL of the first antigen binding moiety is of kappa isotype.

Alternatively, the amino acid substitutions according to the above embodiments may be made in the constant domain CL and the constant domain CH1 of the second antigen binding moiety instead of in the constant domain CL and the constant domain CH1 of the first antigen binding moiety. In particular such embodiments, the constant domain CL of the second antigen binding moiety is of kappa isotype.

Accordingly, in one embodiment, in the constant domain CL of the second antigen binding moiety the amino acid at position 124 is substituted independently by lysine (K), arginine (R) or histidine (H) (numbering according to Kabat), and in the constant domain CH1 of the second antigen binding moiety the amino acid at position 147 or the amino acid at position 213 is substituted independently by glutamic acid (E), or aspartic acid (D) (numbering according to Kabat EU index).

In a further embodiment, in the constant domain CL of the second antigen binding moiety the amino acid at position 124 is substituted independently by lysine (K), arginine (R) or histidine (H) (numbering according to Kabat), and in the constant domain CH1 of the second antigen binding moiety the amino acid at position 147 is substituted independently by glutamic acid (E), or aspartic acid (D) (numbering according to Kabat EU index).

In still another embodiment, in the constant domain CL of the second antigen binding moiety the amino acid at position 124 is substituted independently by lysine (K), arginine (R) or histidine (H) (numbering according to Kabat) and the amino acid at position 123 is substituted independently by lysine (K), arginine (R) or histidine (H) (numbering according to Kabat), and in the constant domain CH1 of the second antigen binding moiety the amino acid at position 147 is substituted independently by glutamic acid (E), or aspartic acid (D) (numbering according to Kabat EU index) and the amino acid at position 213 is substituted independently by glutamic acid (E), or aspartic acid (D) (numbering according to Kabat EU index).

In one embodiment, in the constant domain CL of the second antigen binding moiety the amino acid at position 124 is substituted by lysine (K) (numbering according to Kabat) and the amino acid at position 123 is substituted by lysine (K) (numbering according to Kabat), and in the constant domain CH1 of the second antigen binding moiety the amino acid at position 147 is substituted by glutamic acid (E) (numbering according to Kabat EU index) and the amino acid at position 213 is substituted by glutamic acid (E) (numbering according to Kabat EU index).

In another embodiment, in the constant domain CL of the second antigen binding moiety the amino acid at position 124 is substituted by lysine (K) (numbering according to Kabat) and the amino acid at position 123 is substituted by arginine (R) (numbering according to Kabat), and in the constant domain CH1 of the second antigen binding moiety the amino acid at position 147 is substituted by glutamic acid (E) (numbering according to Kabat EU index) and the amino acid at position 213 is substituted by glutamic acid (E) (numbering according to Kabat EU index).

In a particular embodiment, the bispecific antibody of the invention comprises

I) a first antigen binding moiety that binds to human HLA-G, and the first antigen binding moiety is a Fab molecule comprising
A) comprises a VH domain comprising the amino acid sequence of SEQ ID NO:7 and a VL domain comprising the amino acid sequence of SEQ ID NO:32;24
B) comprises a VH domain comprising the amino acid sequence of SEQ ID NO:7 and a VL domain comprising the amino acid sequence of SEQ ID NO:26; and
II) a second antigen binding moiety that binds to human CD3,
wherein the second antigen binding moiety is a Fab molecule wherein the variable domains VL and VH of the Fab light chain and the Fab heavy chain are replaced by each other, comprising
C) comprises a VH domain comprising the amino acid sequence of SEQ ID NO:58 and a VL domain comprising the amino acid sequence of SEQ ID NO:59, or
D) comprises a VH domain comprising the amino acid sequence of SEQ ID NO:66 and a VL domain comprising the amino acid sequence of SEQ ID NO:67, or
E) comprises a VH domain comprising the amino acid sequence of SEQ ID NO:74 and a VL domain comprising the amino acid sequence of SEQ ID NO:75; and
III) wherein in the constant domain CL of the first antigen binding moiety the amino acid at position 124 is substituted independently by lysine (K), arginine (R) or histidine (H) (numbering according to Kabat) (in a particular embodiment independently by lysine (K) or arginine (R)) and the amino acid at position 123 is substituted independently by lysine (K), arginine (R) or histidine (H) (numbering according to Kabat) (in a particular embodiment independently by lysine (K) or arginine (R)), and in the constant domain CH1 of the first antigen binding moiety the amino acid at position 147 is substituted independently by glutamic acid (E), or aspartic acid (D) (numbering according to Kabat EU index) and the amino acid at position 213 is substituted independently by glutamic acid (E), or aspartic acid (D) (numbering according to Kabat EU index).

Bispecific Antibody Formats

The components of the bispecific antibody according to the present invention can be fused to each other in a variety of configurations. Exemplary configurations are depicted in FIG. 13.

In particular embodiments, the antigen binding moieties comprised in the bispecific antibody are Fab molecules. In such embodiments, the first, second, third etc. antigen binding moiety may be referred to herein as first, second, third etc. Fab molecule, respectively.

In one embodiment, the first and the second antigen binding moiety of the bispecific antibody are fused to each other, optionally via a peptide linker. In particular embodiments, the first and the second antigen binding moiety are each a Fab molecule. In one such embodiment, the second antigen binding moiety is fused at the C-terminus of the Fab heavy chain to the N-terminus of the Fab heavy chain of the first antigen binding moiety. In another such embodiment, the first antigen binding moiety is fused at the C-terminus of the Fab heavy chain to the N-terminus of the Fab heavy chain of the second antigen binding moiety. In embodiments wherein either (i) the second antigen binding moiety is fused at the C-terminus of the Fab heavy chain to the N-terminus of the Fab heavy chain of the first antigen binding moiety or (ii) the first antigen binding moiety is fused at the C-terminus of the Fab heavy chain to the N-terminus of the Fab heavy chain of the second antigen binding moiety, additionally the Fab light chain of the first antigen binding moiety and the Fab light chain of the second antigen binding moiety may be fused to each other, optionally via a peptide linker.

A bispecific antibody with a single antigen binding moiety (such as a Fab molecule) capable of specific binding to a target cell antigen such as HLA-G (for example as shown in FIG. 13A, 13D, 13G, 13H, 13K, or 13L) is useful, particularly in cases where internalization of the target cell antigen is to be expected following binding of a high affinity antigen binding moiety. In such cases, the presence of more than one antigen binding moiety specific for the target cell antigen may enhance internalization of the target cell antigen, thereby reducing its availability.

In other cases, however, it will be advantageous to have a bispecific antibody comprising two or more antigen binding moieties (such as Fab molecules) specific for a target cell antigen (see examples shown in FIG. 13B, 13C, 13E, 13F, 13I, 13J, 13M or 13N), for example to optimize targeting to the target site or to allow crosslinking of target cell antigens.

Accordingly, in particular embodiments, the bispecific antibody according to the present invention comprises a third antigen binding moiety.

In one embodiment, the third antigen binding moiety binds to the first antigen, i.e. HLA-G. In one embodiment, the third antigen binding moiety is a Fab molecule.

In particular embodiments, the third antigen moiety is identical to the first antigen binding moiety.

The third antigen binding moiety of the bispecific antibody may incorporate any of the features, singly or in combination, described herein in relation to the first antigen binding moiety and/or the antibody that binds HLA-G, unless scientifically clearly unreasonable or impossible.

In one embodiment, the third antigen binding moiety comprises a VH domain comprising the amino acid sequence of SEQ ID NO:7 and a VL domain comprising the amino acid sequence of SEQ ID NO:24; or comprises a VH domain comprising the amino acid sequence of SEQ ID NO:7 and a VL domain comprising the amino acid sequence of SEQ ID NO:26; or In particular embodiments, the third and the first antigen binding moiety are each a Fab molecule and the third antigen binding moiety is identical to the first antigen binding moiety. Thus, in these embodiments the first and the third antigen binding moiety comprise the same heavy and light chain amino acid sequences and have the same arrangement of domains (i.e. conventional or crossover)). Furthermore, in these embodiments, the third antigen binding moiety comprises the same amino acid substitutions, if any, as the first antigen binding moiety. For example, the amino acid substitutions described herein as "charge modifications" will be made in the constant domain CL and the constant domain CH1 of each of the first antigen binding moiety and the third antigen binding moiety. Alternatively, said amino acid substitutions may be made in the constant domain CL and the constant domain CH1 of the second antigen binding moiety (which in particular embodiments is also a Fab molecule), but not in the constant domain CL and the constant domain CH1 of the first antigen binding moiety and the third antigen binding moiety.

Like the first antigen binding moiety, the third antigen binding moiety particularly is a conventional Fab molecule. Embodiments wherein the first and the third antigen binding moieties are crossover Fab molecules (and the second antigen binding moiety is a conventional Fab molecule) are, however, also contemplated. Thus, in particular embodiments, the first and the third antigen binding moieties are each a conventional Fab molecule, and the second antigen binding moiety is a crossover Fab molecule as described herein, i.e. a Fab molecule wherein the variable domains VH and VL or the constant domains CL and CH1 of the Fab heavy and light chains are exchanged/replaced by each other. In other embodiments, the first and the third antigen binding moieties are each a crossover Fab molecule and the second antigen binding moiety is a conventional Fab molecule.

If a third antigen binding moiety is present, in a particular embodiment the first and the third antigen moiety bind to human HLA-G, and the second antigen binding moiety binds to a second antigen human CD3, most particularly CD3 epsilon.

In particular embodiments, the bispecific antibody comprises an Fc domain composed of a first and a second subunit. The first and the second subunit of the Fc domain are capable of stable association.

The bispecific antibody according to the invention can have different configurations, i.e. the first, second (and optionally third) antigen binding moiety may be fused to each other and to the Fc domain in different ways. The components may be fused to each other directly or, preferably, via one or more suitable peptide linkers. Where fusion of a Fab molecule is to the N-terminus of a subunit of the Fc domain, it is typically via an immunoglobulin hinge region.

In some embodiments, the first and the second antigen binding moiety are each a Fab molecule and the second antigen binding moiety is fused at the C-terminus of the Fab heavy chain to the N-terminus of the first or the second subunit of the Fc domain. In such embodiments, the first antigen binding moiety may be fused at the C-terminus of the Fab heavy chain to the N-terminus of the Fab heavy chain of the second antigen binding moiety or to the N-terminus of the other one of the subunits of the Fc domain. In particular such embodiments, said first antigen binding moiety is a conventional Fab molecule, and the second antigen binding moiety is a crossover Fab molecule as described herein, i.e. a Fab molecule wherein the variable domains VH and VL or the constant domains CL and CH1 of the Fab heavy and light chains are exchanged/replaced by each other. In other such embodiments, said first Fab molecule is a crossover Fab molecule and the second Fab molecule is a conventional Fab molecule.

Figure 13G:
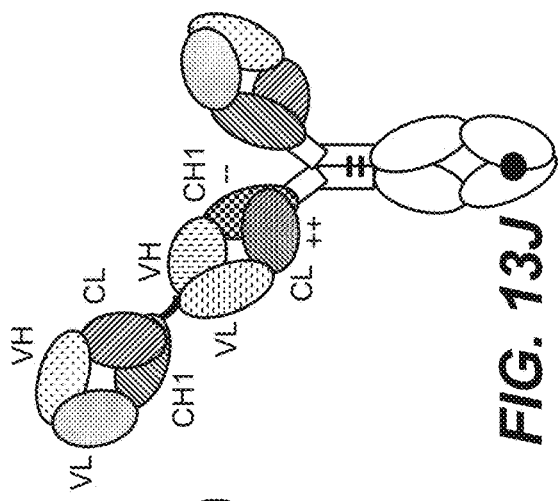
FIG. 13G: Illustration of the "1+1 IgG Crossfab" molecule with alternative order of Crossfab and Fab components ("inverted").
Figure 13H:
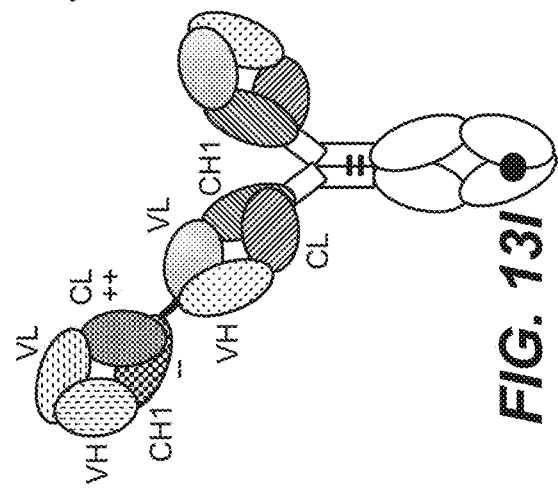
FIG. 13H: Illustration of the "1+1 IgG Crossfab" molecule.
Figure 13I:
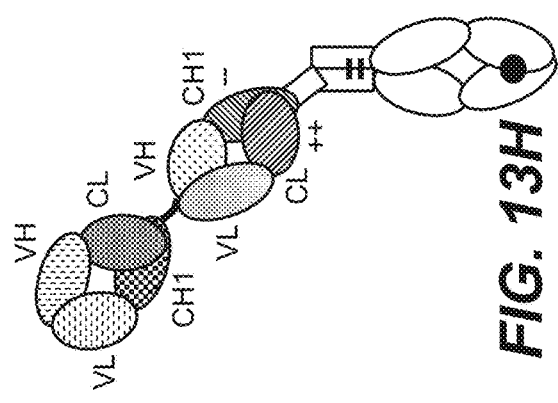
FIG. 13I: Illustration of the "2+1 IgG Crossfab" molecule with two CrossFabs.
Figure 13J:
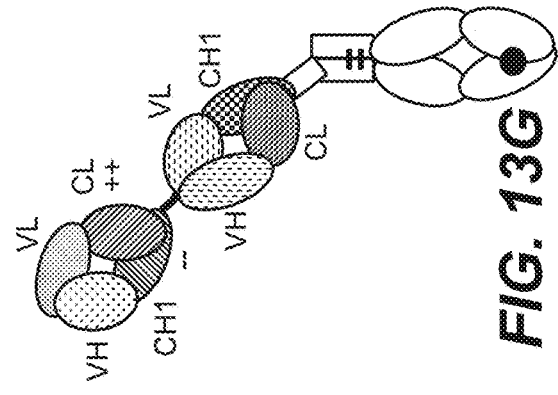
FIG. 13J: Illustration of the "2+1 IgG Crossfab" molecule with two CrossFabs and with alternative order of Crossfab and Fab components ("inverted").
Figure 13K:
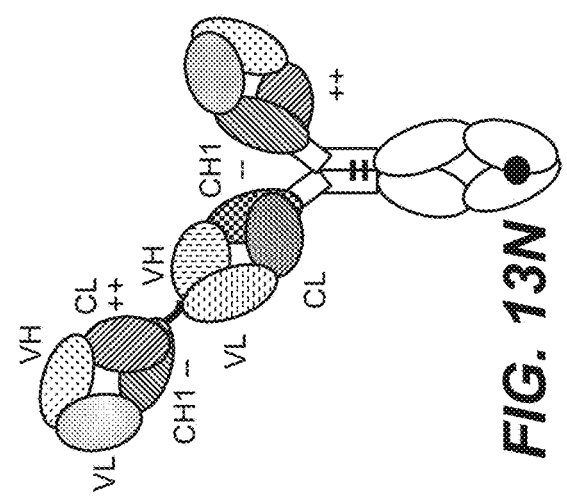
FIG. 13K: Illustration of the "1+1 IgG Crossfab" molecule with alternative order of Crossfab and Fab components ("inverted").

In one embodiment, the first and the second antigen binding moiety are each a Fab molecule, the second antigen binding moiety is fused at the C-terminus of the Fab heavy chain to the N-terminus of the first or the second subunit of the Fc domain, and the first antigen binding moiety is fused at the C-terminus of the Fab heavy chain to the N-terminus of the Fab heavy chain of the second antigen binding moiety. In a specific embodiment, the bispecific antibody essentially consists of the first and the second Fab molecule, the Fc domain composed of a first and a second subunit, and optionally one or more peptide linkers, wherein the first Fab molecule is fused at the C-terminus of the Fab heavy chain to the N-terminus of the Fab heavy chain of the second Fab molecule, and the second Fab molecule is fused at the C-terminus of the Fab heavy chain to the N-terminus of the first or the second subunit of the Fc domain. Such a configuration is schematically depicted in FIGS. 13G and 13K (with the second antigen binding domain in these examples being a VH/VL crossover Fab molecule). Optionally, the Fab light chain of the first Fab molecule and the Fab light chain of the second Fab molecule may additionally be fused to each other.

In another embodiment, the first and the second antigen binding moiety are each a Fab molecule and the first and the second antigen binding moiety are each fused at the C-terminus of the Fab heavy chain to the N-terminus of one of the subunits of the Fc domain. In a specific embodiment, the bispecific antibody essentially consists of the first and the second Fab molecule, the Fc domain composed of a first and a second subunit, and optionally one or more peptide linkers, wherein the first and the second Fab molecule are each fused at the C-terminus of the Fab heavy chain to the N-terminus of one of the subunits of the Fc domain. Such a configuration is schematically depicted in FIGS. 13A and 13D (in these examples with the second antigen binding domain being a VH/VL crossover Fab molecule and the first antigen binding moiety being a conventional Fab molecule). The first and the second Fab molecule may be fused to the Fc domain directly or through a peptide linker. In a particular embodiment the first and the second Fab molecule are each fused to the Fc domain through an immunoglobulin hinge region. In a specific embodiment, the immunoglobulin hinge region is a human $IgG_1$ hinge region, particularly where the Fc domain is an $IgG_1$ Fc domain.

In some embodiments, the first and the second antigen binding moiety are each a Fab molecule and the first antigen binding moiety is fused at the C-terminus of the Fab heavy chain to the N-terminus of the first or the second subunit of the Fc domain. In such embodiments, the second antigen binding moiety may be fused at the C-terminus of the Fab heavy chain to the N-terminus of the Fab heavy chain of the second antigen binding moiety or (as described above) to the N-terminus of the other one of the subunits of the Fc domain. In particular such embodiments, said first antigen binding moiety is a conventional Fab molecule, and the second antigen binding moiety is a crossover Fab molecule as described herein, i.e. a Fab molecule wherein the variable domains VH and VL or the constant domains CL and CH1 of the Fab heavy and light chains are exchanged/replaced by each other. In other such embodiments, said first Fab molecule is a crossover Fab molecule and the second Fab molecule is a conventional Fab molecule.

Figure 13L:
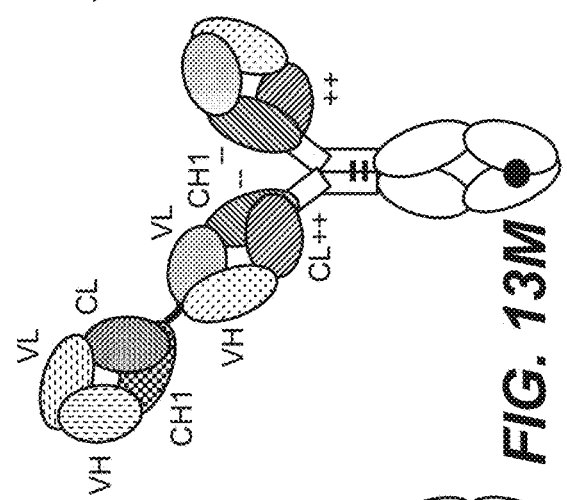
FIG. 13L: Illustration of the "1+1 IgG Crossfab" molecule.
Figure 13M:
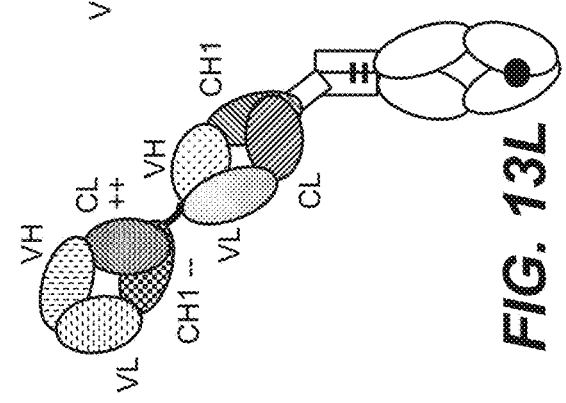
FIG. 13M: Illustration of the "2+1 IgG Crossfab" molecule with two CrossFabs.
Figure 13N:
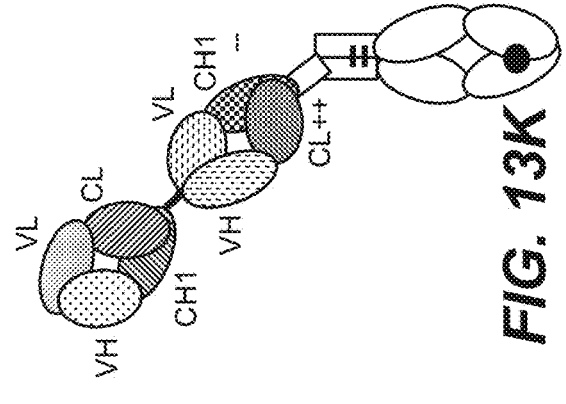

In one embodiment, the first and the second antigen binding moiety are each a Fab molecule, the first antigen binding moiety is fused at the C-terminus of the Fab heavy chain to the N-terminus of the first or the second subunit of the Fc domain, and the second antigen binding moiety is fused at the C-terminus of the Fab heavy chain to the N-terminus of the Fab heavy chain of the first antigen binding moiety. In a specific embodiment, the bispecific antibody essentially consists of the first and the second Fab molecule, the Fc domain composed of a first and a second subunit, and optionally one or more peptide linkers, wherein the second Fab molecule is fused at the C-terminus of the Fab heavy chain to the N-terminus of the Fab heavy chain of the first Fab molecule, and the first Fab molecule is fused at the C-terminus of the Fab heavy chain to the N-terminus of the first or the second subunit of the Fc domain. Such a configuration is schematically depicted in FIGS. 13H and 13L (in these examples with the second antigen binding domain being a VH/VL crossover Fab molecule and the first antigen binding moiety being a conventional Fab molecule). Optionally, the Fab light chain of the first Fab molecule and the Fab light chain of the second Fab molecule may additionally be fused to each other.

In some embodiments, a third antigen binding moiety, particularly a third Fab molecule, is fused at the C-terminus of the Fab heavy chain to the N-terminus of the first or second subunit of the Fc domain. In particular such embodiments, said first and third Fab molecules are each a conventional Fab molecule, and the second Fab molecule is a crossover Fab molecule as described herein, i.e. a Fab molecule wherein the variable domains VH and VL or the constant domains CL and CH1 of the Fab heavy and light chains are exchanged/replaced by each other. In other such embodiments, said first and third Fab molecules are each a crossover Fab molecule and the second Fab molecule is a conventional Fab molecule.

In a particular such embodiment, the second and the third antigen binding moiety are each fused at the C-terminus of the Fab heavy chain to the N-terminus of one of the subunits of the Fc domain, and the first antigen binding moiety is fused at the C-terminus of the Fab heavy chain to the N-terminus of the Fab heavy chain of the second Fab molecule. In a specific embodiment, the bispecific antibody essentially consists of the first, the second and the third Fab molecule, the Fc domain composed of a first and a second subunit, and optionally one or more peptide linkers, wherein the first Fab molecule is fused at the C-terminus of the Fab heavy chain to the N-terminus of the Fab heavy chain of the second Fab molecule, and the second Fab molecule is fused at the C-terminus of the Fab heavy chain to the N-terminus of the first subunit of the Fc domain, and wherein the third Fab molecule is fused at the C-terminus of the Fab heavy chain to the N-terminus of the second subunit of the Fc domain. Such a configuration is schematically depicted in FIGS. 13B and 13E (in these examples with the second antigen binding moiety being a VH/VL crossover Fab molecule, and the first and the third antigen binding moiety being a conventional Fab molecule), and FIGS. 13J and 13N (in these examples with the second antigen binding moiety being a conventional Fab molecule, and the first and the third antigen binding moiety being a VH/VL crossover Fab molecule). The second and the third Fab molecule may be fused to the Fc domain directly or through a peptide linker. In a particular embodiment the second and the third Fab molecule are each fused to the Fc domain through an immunoglobulin hinge region. In a specific embodiment, the immunoglobulin hinge region is a human $IgG_1$ hinge region, particularly where the Fc domain is an $IgG_1$ Fc domain. Optionally, the Fab light chain of the first Fab molecule and the Fab light chain of the second Fab molecule may additionally be fused to each other.

In another such embodiment, the first and the third antigen binding moiety are each fused at the C-terminus of the Fab heavy chain to the N-terminus of one of the subunits of the Fc domain, and the second antigen binding moiety is fused at the C-terminus of the Fab heavy chain to the N-terminus of the Fab heavy chain of the first antigen binding moiety. In a specific embodiment, the bispecific antibody essentially consists of the first, the second and the third Fab molecule, the Fc domain composed of a first and a second subunit, and optionally one or more peptide linkers, wherein the second Fab molecule is fused at the C-terminus of the Fab heavy chain to the N-terminus of the Fab heavy chain of the first Fab molecule, and the first Fab molecule is fused at the C-terminus of the Fab heavy chain to the N-terminus of the first subunit of the Fc domain, and wherein the third Fab molecule is fused at the C-terminus of the Fab heavy chain to the N-terminus of the second subunit of the Fc domain. Such a configuration is schematically depicted in FIGS. 13C and 13F (in these examples with the second antigen binding moiety being a VH/VL crossover Fab molecule, and the first and the third antigen binding moiety being a conventional Fab molecule) and in FIGS. 13I and 13M (in these examples with the second antigen binding moiety being a conventional Fab molecule, and the first and the third antigen binding moiety being a VH/VL crossover Fab molecule). The first and the third Fab molecule may be fused to the Fc domain directly or through a peptide linker. In a particular embodiment the first and the third Fab molecule are each fused to the Fc domain through an immunoglobulin hinge region. In a specific embodiment, the immunoglobulin hinge region is a human IgG$_1$ hinge region, particularly where the Fc domain is an IgG$_1$ Fc domain. Optionally, the Fab light chain of the first Fab molecule and the Fab light chain of the second Fab molecule may additionally be fused to each other.

In configurations of the bispecific antibody wherein a Fab molecule is fused at the C-terminus of the Fab heavy chain to the N-terminus of each of the subunits of the Fc domain through an immunoglobulin hinge regions, the two Fab molecules, the hinge regions and the Fc domain essentially form an immunoglobulin molecule. In a particular embodiment the immunoglobulin molecule is an IgG class immunoglobulin. In an even more particular embodiment the immunoglobulin is an IgG$_1$ subclass immunoglobulin. In another embodiment the immunoglobulin is an IgG$_4$ subclass immunoglobulin. In a further particular embodiment the immunoglobulin is a human immunoglobulin. In other embodiments the immunoglobulin is a chimeric immunoglobulin or a humanized immunoglobulin. In one embodiment, the immunoglobulin comprises a human constant region, particularly a human Fc region.

In some of the bispecific antibody of the invention, the Fab light chain of the first Fab molecule and the Fab light chain of the second Fab molecule are fused to each other, optionally via a peptide linker. Depending on the configuration of the first and the second Fab molecule, the Fab light chain of the first Fab molecule may be fused at its C-terminus to the N-terminus of the Fab light chain of the second Fab molecule, or the Fab light chain of the second Fab molecule may be fused at its C-terminus to the N-terminus of the Fab light chain of the first Fab molecule. Fusion of the Fab light chains of the first and the second Fab molecule further reduces mispairing of unmatched Fab heavy and light chains, and also reduces the number of plasmids needed for expression of some of the bispecific antibodies of the invention.

The antigen binding moieties may be fused to the Fc domain or to each other directly or through a peptide linker, comprising one or more amino acids, typically about 2-20 amino acids. Peptide linkers are known in the art and are described herein. Suitable, non-immunogenic peptide linkers include, for example, (G4S)n, (SG$_4$)$_n$, (G$_4$S)$_n$ or G$_4$(SG$_4$)$_n$ peptide linkers. "n" is generally an integer from 1 to 10, typically from 2 to 4. In one embodiment said peptide linker has a length of at least 5 amino acids, in one embodiment a length of 5 to 100, in a further embodiment of 10 to 50 amino acids. In one embodiment said peptide linker is (GxS)$_n$ or (GxS)$_n$G$_m$ with G=glycine, S=serine, and (x=3, n=3, 4, 5 or 6, and m=0, 1, 2 or 3) or (x=4, n=2, 3, 4 or 5 and m=0, 1, 2 or 3), in one embodiment x=4 and n=2 or 3, in a further embodiment x=4 and n=2. In one embodiment said peptide linker is (G$_4$S)$_2$. A particularly suitable peptide linker for fusing the Fab light chains of the first and the second Fab molecule to each other is (G$_4$S)$_2$. An exemplary peptide linker suitable for connecting the Fab heavy chains of the first and the second Fab fragments comprises the sequence (D)-(G$_4$S)$_2$. Another suitable such linker comprises the sequence (G$_4$S)$_4$. Additionally, linkers may comprise (a portion of) an immunoglobulin hinge region. Particularly where a Fab molecule is fused to the N-terminus of an Fc domain subunit, it may be fused via an immunoglobulin hinge region or a portion thereof, with or without an additional peptide linker.

In certain embodiments the bispecific antibody according to the invention comprises a polypeptide wherein the Fab light chain variable region of the second Fab molecule shares a carboxy-terminal peptide bond with the Fab heavy chain constant region of the second Fab molecule (i.e. the second Fab molecule comprises a crossover Fab heavy chain, wherein the heavy chain variable region is replaced by a light chain variable region), which in turn shares a carboxy-terminal peptide bond with an Fc domain subunit (VL$_{(2)}$-CH1$_{(2)}$-CH2-CH3(-CH4)), and a polypeptide wherein the Fab heavy chain of the first Fab molecule shares a carboxy-terminal peptide bond with an Fc domain subunit (VH$_{(1)}$-CH$_{(1)}$-CH2-CH3(-CH4)). In some embodiments the bispecific antibody further comprises a polypeptide wherein the Fab heavy chain variable region of the second Fab molecule shares a carboxy-terminal peptide bond with the Fab light chain constant region of the second Fab molecule (VH$_{(2)}$-CL$_{(2)}$) and the Fab light chain polypeptide of the first Fab molecule (VL$_{(1)}$-CL$_{(1)}$). In certain embodiments the polypeptides are covalently linked, e.g., by a disulfide bond.

In certain embodiments the bispecific antibody according to the invention comprises a polypeptide wherein the Fab heavy chain variable region of the second Fab molecule shares a carboxy-terminal peptide bond with the Fab light chain constant region of the second Fab molecule (i.e. the second Fab molecule comprises a crossover Fab heavy chain, wherein the heavy chain constant region is replaced by a light chain constant region), which in turn shares a carboxy-terminal peptide bond with an Fc domain subunit (VH$_{(2)}$-CL$_{(2)}$-CH2-CH3(-CH4)), and a polypeptide wherein the Fab heavy chain of the first Fab molecule shares a carboxy-terminal peptide bond with an Fc domain subunit (VH$_{(1)}$-CH1$_{(1)}$-CH2-CH3(-CH4)). In some embodiments the bispecific antibody further comprises a polypeptide wherein the Fab light chain variable region of the second Fab molecule shares a carboxy-terminal peptide bond with the Fab heavy chain constant region of the second Fab molecule (VL$_{(2)}$-CH1$_{(2)}$) and the Fab light chain polypeptide of the first Fab molecule (VL$_{(1)}$-CL$_{(1)}$). In certain embodiments the polypeptides are covalently linked, e.g., by a disulfide bond.

In some embodiments, the bispecific antibody comprises a polypeptide wherein the Fab light chain variable region of the second Fab molecule shares a carboxy-terminal peptide bond with the Fab heavy chain constant region of the second Fab molecule (i.e. the second Fab molecule comprises a crossover Fab heavy chain, wherein the heavy chain variable region is replaced by a light chain variable region), which in turn shares a carboxy-terminal peptide bond with the Fab heavy chain of the first Fab molecule, which in turn shares a carboxy-terminal peptide bond with an Fc domain subunit (VL$_{(2)}$-CH1$_{(2)}$-VH$_{(1)}$-CH1$_{(1)}$-CH2-CH3(-CH4)). In other embodiments, the bispecific antibody comprises a polypeptide wherein the Fab heavy chain of the first Fab molecule shares a carboxy-terminal peptide bond with the Fab light chain variable region of the second Fab molecule which in turn shares a carboxy-terminal peptide bond with the Fab heavy chain constant region of the second Fab molecule (i.e. the second Fab molecule comprises a crossover Fab heavy chain, wherein the heavy chain variable region is replaced by a light chain variable region), which in turn shares a carboxy-terminal peptide bond with an Fc domain subunit (VH$_{(1)}$-CH1$_{(1)}$-VL$_{(2)}$-CH1$_{(2)}$-CH2-CH3(-CH4)).

In some of these embodiments the bispecific antibody further comprises a crossover Fab light chain polypeptide of the second Fab molecule, wherein the Fab heavy chain variable region of the second Fab molecule shares a carboxy-terminal peptide bond with the Fab light chain constant region of the second Fab molecule ($VH_{(2)}$-$CL_{(2)}$), and the Fab light chain polypeptide of the first Fab molecule ($VL_{(1)}$-$CL_{(1)}$). In others of these embodiments the bispecific antibody further comprises a polypeptide wherein the Fab heavy chain variable region of the second Fab molecule shares a carboxy-terminal peptide bond with the Fab light chain constant region of the second Fab molecule which in turn shares a carboxy-terminal peptide bond with the Fab light chain polypeptide of the first Fab molecule ($VH_{(2)}$-$CL_{(2)}$-$VL_{(1)}$-$CL_{(1)}$), or a polypeptide wherein the Fab light chain polypeptide of the first Fab molecule shares a carboxy-terminal peptide bond with the Fab heavy chain variable region of the second Fab molecule which in turn shares a carboxy-terminal peptide bond with the Fab light chain constant region of the second Fab molecule ($VL_{(1)}$-$CL_{(1)}$-$VH_{(2)}$-$CL_{(2)}$), as appropriate.

The bispecific antibody according to these embodiments may further comprise (i) an Fc domain subunit polypeptide (CH2-CH3(-CH4)), or (ii) a polypeptide wherein the Fab heavy chain of a third Fab molecule shares a carboxy-terminal peptide bond with an Fc domain subunit ($VH_{(3)}$-$CH1_{(3)}$-CH2-CH3(-CH4)) and the Fab light chain polypeptide of a third Fab molecule ($VL_{(3)}$-$CL_{(3)}$). In certain embodiments the polypeptides are covalently linked, e.g., by a disulfide bond.

In some embodiments, the bispecific antibody comprises a polypeptide wherein the Fab heavy chain variable region of the second Fab molecule shares a carboxy-terminal peptide bond with the Fab light chain constant region of the second Fab molecule (i.e. the second Fab molecule comprises a crossover Fab heavy chain, wherein the heavy chain constant region is replaced by a light chain constant region), which in turn shares a carboxy-terminal peptide bond with the Fab heavy chain of the first Fab molecule, which in turn shares a carboxy-terminal peptide bond with an Fc domain subunit ($VH_{(2)}$-$CL_{(2)}$-$VH_{(1)}$-$CH1_{(1)}$-CH2-CH3(-CH4)). In other embodiments, the bispecific antibody comprises a polypeptide wherein the Fab heavy chain of the first Fab molecule shares a carboxy-terminal peptide bond with the Fab heavy chain variable region of the second Fab molecule which in turn shares a carboxy-terminal peptide bond with the Fab light chain constant region of the second Fab molecule (i.e. the second Fab molecule comprises a crossover Fab heavy chain, wherein the heavy chain constant region is replaced by a light chain constant region), which in turn shares a carboxy-terminal peptide bond with an Fc domain subunit ($VH_{(1)}$-$CH1_{(1)}$-$VH_{(2)}$-$CL_{(2)}$-CH2-CH3(-CH4)).

In some of these embodiments the bispecific antibody further comprises a crossover Fab light chain polypeptide of the second Fab molecule, wherein the Fab light chain variable region of the second Fab molecule shares a carboxy-terminal peptide bond with the Fab heavy chain constant region of the second Fab molecule ($VL_{(2)}$-$CH1_{(2)}$), and the Fab light chain polypeptide of the first Fab molecule ($VL_{(1)}$-$CL_{(1)}$). In others of these embodiments the bispecific antibody further comprises a polypeptide wherein the Fab light chain variable region of the second Fab molecule shares a carboxy-terminal peptide bond with the Fab heavy chain constant region of the second Fab molecule which in turn shares a carboxy-terminal peptide bond with the Fab light chain polypeptide of the first Fab molecule ($VL_{(2)}$-$CH1_{(2)}$-$VL_{(1)}$-$CL_{(1)}$), or a polypeptide wherein the Fab light chain polypeptide of the first Fab molecule shares a carboxy-terminal peptide bond with the Fab heavy chain variable region of the second Fab molecule which in turn shares a carboxy-terminal peptide bond with the Fab light chain constant region of the second Fab molecule ($VL_{(1)}$-$CL_{(1)}$-$VH_{(2)}$-$CL_{(2)}$), as appropriate.

The bispecific antibody according to these embodiments may further comprise (i) an Fc domain subunit polypeptide (CH2-CH3(-CH4)), or (ii) a polypeptide wherein the Fab heavy chain of a third Fab molecule shares a carboxy-terminal peptide bond with an Fc domain subunit ($VH_{(3)}$-$CH1_{(3)}$-CH2-CH3(-CH4)) and the Fab light chain polypeptide of a third Fab molecule ($VL_{(3)}$-$CL_{(3)}$). In certain embodiments the polypeptides are covalently linked, e.g., by a disulfide bond.

In all of the different configurations of the bispecific antibody according to the invention, the amino acid substitutions described herein, if present, may either be in the CH1 and CL domains of the first and (if present) the third antigen binding moiety/Fab molecule, or in the CH1 and CL domains of the second antigen binding moiety/Fab molecule. Preferably, they are in the CH1 and CL domains of the first and (if present) the third antigen binding moiety/Fab molecule. In accordance with the concept of the invention, if amino acid substitutions as described herein are made in the first (and, if present, the third) antigen binding moiety/Fab molecule, no such amino acid substitutions are made in the second antigen binding moiety/Fab molecule. Conversely, if amino acid substitutions as described herein are made in the second antigen binding moiety/Fab molecule, no such amino acid substitutions are made in the first (and, if present, the third) antigen binding moiety/Fab molecule. Amino acid substitutions are particularly made in bispecific antibodies comprising a Fab molecule wherein the variable domains VL and VH1 of the Fab light chain and the Fab heavy chain are replaced by each other.

In particular embodiments of the bispecific antibody according to the invention, particularly wherein amino acid substitutions as described herein are made in the first (and, if present, the third) antigen binding moiety/Fab molecule, the constant domain CL of the first (and, if present, the third) Fab molecule is of kappa isotype. In other embodiments of the bispecific antibody according to the invention, particularly wherein amino acid substitutions as described herein are made in the second antigen binding moiety/Fab molecule, the constant domain CL of the second antigen binding moiety/Fab molecule is of kappa isotype. In some embodiments, the constant domain CL of the first (and, if present, the third) antigen binding moiety/Fab molecule and the constant domain CL of the second antigen binding moiety/Fab molecule are of kappa isotype.

In a particular aspect, the invention provides a bispecific antibody comprising
  a) a first and a third antigen binding moiety that binds to a first antigen; wherein the first antigen is HLA-G, and wherein the first and the second antigen binding moiety are each a (conventional) Fab molecule comprising a heavy chain variable region comprising the amino acid sequence of SEQ ID NO: 7 and a light chain variable region comprising the amino acid sequence of SEQ ID NO: 24,
  b) a second antigen binding moiety that binds to a second antigen; wherein the second antigen is CD3 and wherein the second antigen binding moiety is Fab molecule wherein the variable domains VL and VH of the Fab light chain and the Fab heavy chain are replaced by each other, comprising (i) a heavy chain variable region comprising the amino acid sequence of SEQ ID NO: 58 and a light chain variable region comprising the amino acid sequence of SEQ ID NO: 59; or (ii) a heavy chain variable region comprising the amino acid sequence of SEQ ID NO: 66 and a light chain variable region comprising the amino acid sequence of SEQ ID NO: 67; or (iii) a heavy chain variable region comprising the amino acid sequence of SEQ ID NO: 74 and a light chain variable region comprising the amino acid sequence of SEQ ID NO: 75; and c) an Fc domain composed of a first and a second subunit; wherein in the constant domain CL of the first and the third antigen binding moiety under a) the amino acid at position 124 is substituted by lysine (K) (numbering according to Kabat) and the amino acid at position 123 is substituted by lysine (K) or arginine (R) (numbering according to Kabat) (most particularly by arginine (R)), and wherein in the constant domain CH1 of the first and the third antigen binding moiety under a) the amino acid at position 147 is substituted by glutamic acid (E) (numbering according to Kabat EU index) and the amino acid at position 213 is substituted by glutamic acid (E) (numbering according to Kabat EU index); and wherein further the first antigen binding moiety under a) is fused at the C-terminus of the Fab heavy chain to the N-terminus of the Fab heavy chain of the second antigen binding moiety under b), and the second antigen binding moiety under b) and the third antigen binding moiety under a) are each fused at the C-terminus of the Fab heavy chain to the N-terminus of one of the subunits of the Fc domain under c).

In one embodiment according to these aspects of the invention, in the first subunit of the Fc domain the threonine residue at position 366 is replaced with a tryptophan residue (T366W), and in the second subunit of the Fc domain the tyrosine residue at position 407 is replaced with a valine residue (Y407V) and optionally the threonine residue at position 366 is replaced with a serine residue (T366S) and the leucine residue at position 368 is replaced with an alanine residue (L368A) (numberings according to Kabat EU index).

In a further embodiment according to these aspects of the invention, in the first subunit of the Fc domain additionally the serine residue at position 354 is replaced with a cysteine residue (S354C) or the glutamic acid residue at position 356 is replaced with a cysteine residue (E356C) (particularly the serine residue at position 354 is replaced with a cysteine residue), and in the second subunit of the Fc domain additionally the tyrosine residue at position 349 is replaced by a cysteine residue (Y349C) (numberings according to Kabat EU index).

In still a further embodiment according to these aspects of the invention, in each of the first and the second subunit of the Fc domain the leucine residue at position 234 is replaced with an alanine residue (L234A), the leucine residue at position 235 is replaced with an alanine residue (L235A) and the proline residue at position 329 is replaced by a glycine residue (P329G) (numbering according to Kabat EU index).

In still a further embodiment according to these aspects of the invention, the Fc domain is a human IgG$_1$ Fc domain.

A specific embodiment of the invention is a bispecific antibody that binds to human HLA-G and to human CD3 wherein the antibody comprises a polypeptide comprising an amino acid sequence that is at least 98%, or 99% identical to the sequence of SEQ ID NO: 76, a polypeptide comprising an amino acid sequence that is at least 98%, or 99% identical to the sequence of SEQ ID NO: 77, a polypeptide comprising an amino acid sequence that is at least 98%, or 99% identical to the sequence of SEQ ID NO: 78, and a polypeptide comprising an amino acid sequence that is at least 98%, or 99% identical to the sequence of SEQ ID NO: 79 (wherein in the VH or VL framework regions or in the constant regions amino acids are substituted without affecting the specific binding properties and the properties of constant regions of such bispecific antibody)

A specific embodiment of the invention is a bispecific antibody that binds to human HLA-G and to human CD3 wherein the antibody comprises a polypeptide comprising an amino acid sequence that is at least 98%, or 99% identical to the sequence of SEQ ID NO: 76, a polypeptide comprising an amino acid sequence that is at least 98%, or 99% identical to the sequence of SEQ ID NO: 77, a polypeptide comprising an amino acid sequence that is at least 98%, or 99% identical to the sequence of SEQ ID NO: 78, and a polypeptide comprising an amino acid sequence that is at least 98%, or 99% identical to the sequence of SEQ ID NO: 79, and wherein the bispecific antibody has one or more of the of the following properties: the bispecific antibody shows a) inhibition of ILT2 and/or ILT4 binding to HLA-G (see Example 10); and/or b) antibody mediated IFN gamma secretion by T cells on SKOV3 cells transfected with recombinant HLA-G (SKOV3 HLA-G) and/or on JEG3 cells expressing endogenous HLA-G wherein the IFN gamma secretion was detected (by Luminex technology) (see Example 11); and or c) T cell mediated cytotoxicity/tumor cell killing on SKOV3 cells transfected with recombinant HLA-G (SKOV 3HLA-G) and/or JEG3 cells expressing endogenous HLA-G wherein the cytotoxicity was detected by measuring Caspase 8 activation in cells after treatment with bispecific antibody (see Example 12); and/or d) in vivo anti-tumor efficacy/tumor regression in humanized NSG mice bearing SKOV3 human ovarian carcinoma transfected with recombinant HLA-G (SKOV3 HLA-G) humanized NSG mice (see Example 13); an/or e) in vivo anti-tumor efficacy/tumor of HLA-G CD3 T cell bi-specific in humanized NSG mice bearing human breast cancer PDX tumors (BC004) (see Example 14).

In a further specific embodiment, the bispecific antibody comprises a polypeptide comprising the amino acid sequence of SEQ ID NO: 76, a polypeptide comprising the amino acid sequence of SEQ ID NO: 77, a polypeptide comprising the amino acid sequence of SEQ ID NO: 78 and a polypeptide comprising the amino acid sequence of SEQ ID NO: 79.

A further specific embodiment of the invention is a bispecific antibody that binds to human HLA-G and to human CD3 wherein the antibody comprises a polypeptide comprising an amino acid sequence that is at least 98%, or 99% identical to the sequence of SEQ ID NO: 80, a polypeptide comprising an amino acid sequence that is at least 98%, or 99% identical to the sequence of SEQ ID NO: 81, a polypeptide comprising an amino acid sequence that is at least 98%, or 99% identical to the sequence of SEQ ID NO: 82, and a polypeptide comprising an amino acid sequence that is at least 98%, or 99% identical to the sequence of SEQ ID NO: 83 (wherein in the VH or VL framework regions or in the constant regions amino acids are substituted without affecting the specific binding properties and the properties of constant regions of such bispecific antibody)

A specific embodiment of the invention is a bispecific antibody that binds to human HLA-G and to human CD3 wherein the antibody comprises a polypeptide comprising an amino acid sequence that is at least 98%, or 99% identical to the sequence of SEQ ID NO: 80, a polypeptide comprising an amino acid sequence that is at least 98%, or 99% identical to the sequence of SEQ ID NO: 81, a polypeptide comprising an amino acid sequence that is at least 98%, or 99% identical to the sequence of SEQ ID NO: 82, and a polypeptide comprising an amino acid sequence that is at least 98%, or 99% identical to the sequence of SEQ ID NO: 83, and wherein the bispecific antibody has one or more of the of the following properties: the bispecific antibody shows
a) inhibition of ILT2 and/or ILT4 binding to HLA-G (see Example 10); and/or
b) antibody mediated IFN gamma secretion by T cells on SKOV3 cells transfected with recombinant HLA-G (SKOV3 HLA-G) and/or on JEG3 cells expressing endogenous HLA-G wherein the IFN gamma secretion was detected (by Luminex technology) (see Example 11); and or
c) T cell mediated cytotoxicity/tumor cell killing on SKOV3 cells transfected with recombinant HLA-G (SKOV 3HLA-G) and/or JEG3 cells expressing endogenous HLA-G wherein the cytotoxicity was detected by measuring Caspase 8 activation in cells after treatment with bispecific antibody (see Example 12); and/or
d) in vivo anti-tumor efficacy/tumor regression in humanized NSG mice bearing SKOV3 human ovarian carcinoma transfected with recombinant HLA-G (SKOV3 HLA-G) humanized NSG mice (see Example 13); and/or
e) in vivo anti-tumor efficacy/tumor of HLA-G CD3 T cell bi-specific in humanized NSG mice bearing human breast cancer PDX tumors (BC004) (see Example 14).

In a further specific embodiment, the bispecific antibody comprises a polypeptide comprising the amino acid sequence of SEQ ID NO: 80, a polypeptide comprising the amino acid sequence of SEQ ID NO: 81, a polypeptide comprising the amino acid sequence of SEQ ID NO: 82 and a polypeptide comprising the amino acid sequence of SEQ ID NO: 83.

A further specific embodiment of the invention is a bispecific antibody that binds to human HLA-G and to human CD3 wherein the antibody comprises a polypeptide comprising an amino acid sequence that is at least 98%, or 99% identical to the sequence of SEQ ID NO: 84, a polypeptide comprising an amino acid sequence that is at least 98%, or 99% identical to the sequence of SEQ ID NO: 85, a polypeptide comprising an amino acid sequence that is at least 98%, or 99% identical to the sequence of SEQ ID NO: 86, and a polypeptide comprising an amino acid sequence that is at least 98%, or 99% identical to the sequence of SEQ ID NO: 87 (wherein in the VH or VL framework regions or in the constant regions amino acids are substituted without affecting the specific binding properties and the properties of constant regions of such bispecific antibody)

A specific embodiment of the invention is a bispecific antibody that binds to human HLA-G and to human CD3 wherein the antibody comprises a polypeptide comprising an amino acid sequence that is at least 98%, or 99% identical to the sequence of SEQ ID NO: 84, a polypeptide comprising an amino acid sequence that is at least 98%, or 99% identical to the sequence of SEQ ID NO: 85, a polypeptide comprising an amino acid sequence that is at least 98%, or 99% identical to the sequence of SEQ ID NO: 86, and a polypeptide comprising an amino acid sequence that is at least 98%, or 99% identical to the sequence of SEQ ID NO: 87, and wherein the bispecific antibody has one or more of the of the following properties: the bispecific antibody shows
a) inhibition of ILT2 and/or ILT4 binding to HLA-G (see Example 10); and/or
b) antibody mediated IFN gamma secretion by T cells on SKOV3 cells transfected with recombinant HLA-G (SKOV3 HLA-G) and/or on JEG3 cells expressing endogenous HLA-G wherein the IFN gamma secretion was detected (by Luminex technology) (see Example 11); and or
c) T cell mediated cytotoxicity/tumor cell killing on SKOV3 cells transfected with recombinant HLA-G (SKOV 3HLA-G) and/or JEG3 cells expressing endogenous HLA-G wherein the cytotoxicity was detected by measuring Caspase 8 activation in cells after treatment with bispecific antibody (see Example 12); and/or
d) in vivo anti-tumor efficacy/tumor regression in humanized NSG mice bearing SKOV3 human ovarian carcinoma transfected with recombinant HLA-G (SKOV3 HLA-G) humanized NSG mice (see Example 13); and/or
e) in vivo anti-tumor efficacy/tumor of HLA-G CD3 T cell bi-specific in humanized NSG mice bearing human breast cancer PDX tumors (BC004) (see Example 14).

In a further specific embodiment, the bispecific antibody comprises a polypeptide comprising the amino acid sequence of SEQ ID NO: 84, a polypeptide comprising the amino acid sequence of SEQ ID NO: 85, a polypeptide comprising the amino acid sequence of SEQ ID NO: 86 and a polypeptide comprising the amino acid sequence of SEQ ID NO: 87.

Fc Domain

In particular embodiments, the bispecific antibody of the invention comprises an Fc domain composed of a first and a second subunit. It is understood, that the features of the Fc domain described herein in relation to the bispecific antibody can equally apply to an Fc domain comprised in a monospecific anti-HLAG antibody of the invention except for those modifications relevant for Fc heterodimerization.

The Fc domain of the bispecific antibody consists of a pair of polypeptide chains comprising heavy chain domains of an immunoglobulin molecule. For example, the Fc domain of an immunoglobulin G (IgG) molecule is a dimer, each subunit of which comprises the CH2 and CH3 IgG heavy chain constant domains. The two subunits of the Fc domain are capable of stable association with each other. In one embodiment, the bispecific antibody of the invention comprises not more than one Fc domain.

In one embodiment, the Fc domain of the bispecific antibody is an IgG Fc domain. In a particular embodiment, the Fc domain is an $IgG_1$ Fc domain. In another embodiment the Fc domain is an IgG4 Fc domain. In a more specific embodiment, the Fc domain is an IgG4 Fc domain comprising an amino acid substitution at position S228 (Kabat EU index numbering), particularly the amino acid substitution S228P. This amino acid substitution reduces in vivo Fab arm exchange of IgG4 antibodies (see Stubenrauch et al., Drug Metabolism and Disposition 38, 84-91 (2010)). In a further particular embodiment, the Fc domain is a human Fc domain. In an even more particular embodiment, the Fc domain is a human IgG$_1$ Fc domain.

Fc Domain Modifications Promoting Heterodimerization

Bispecific antibodies according to the invention comprise different antigen binding moieties, which may be fused to one or the other of the two subunits of the Fc domain, thus the two subunits of the Fc domain are typically comprised in two non-identical polypeptide chains. Recombinant co-expression of these polypeptides and subsequent dimerization leads to several possible combinations of the two polypeptides. To improve the yield and purity of bispecific antibodies in recombinant production, it will thus be advantageous to introduce in the Fc domain of the bispecific antibody a modification promoting the association of the desired polypeptides.

Accordingly, in particular embodiments, the Fc domain of the bispecific antibody according to the invention comprises a modification promoting the association of the first and the second subunit of the Fc domain. The site of most extensive protein-protein interaction between the two subunits of a human IgG Fc domain is in the CH3 domain of the Fc domain. Thus, in one embodiment said modification is in the CH3 domain of the Fc domain.

There exist several approaches for modifications in the CH3 domain of the Fc domain in order to enforce heterodimerization, which are well described e.g. in WO 96/27011, WO 98/050431, EP 1870459, WO 2007/110205, WO 2007/147901, WO 2009/089004, WO 2010/129304, WO 2011/90754, WO 2011/143545, WO 2012058768, WO 2013157954, WO 2013096291. Typically, in all such approaches the CH3 domain of the first subunit of the Fc domain and the CH3 domain of the second subunit of the Fc domain are both engineered in a complementary manner so that each CH3 domain (or the heavy chain comprising it) can no longer homodimerize with itself but is forced to heterodimerize with the complementarily engineered other CH3 domain (so that the first and second CH3 domain heterodimerize and no homodimers between the two first or the two second CH3 domains are formed). These different approaches for improved heavy chain heterodimerization are contemplated as different alternatives in combination with the heavy-light chain modifications (e.g. VH and VL exchange/replacement in one binding arm and the introduction of substitutions of charged amino acids with opposite charges in the CH1/CL interface) in the bispecific antibody which reduce heavy/light chain mispairing and Bence Jones-type side products.

In a specific embodiment said modification promoting the association of the first and the second subunit of the Fc domain is a so-called "knob-into-hole" modification, comprising a "knob" modification in one of the two subunits of the Fc domain and a "hole" modification in the other one of the two subunits of the Fc domain.

The knob-into-hole technology is described e.g. in U.S. Pat. Nos. 5,731,168; 7,695,936; Ridgway et al., Prot Eng 9, 617-621 (1996) and Carter, J Immunol Meth 248, 7-15 (2001). Generally, the method involves introducing a protuberance ("knob") at the interface of a first polypeptide and a corresponding cavity ("hole") in the interface of a second polypeptide, such that the protuberance can be positioned in the cavity so as to promote heterodimer formation and hinder homodimer formation. Protuberances are constructed by replacing small amino acid side chains from the interface of the first polypeptide with larger side chains (e.g. tyrosine or tryptophan). Compensatory cavities of identical or similar size to the protuberances are created in the interface of the second polypeptide by replacing large amino acid side chains with smaller ones (e.g. alanine or threonine).

Accordingly, in a particular embodiment, in the CH3 domain of the first subunit of the Fc domain of the bispecific antibody an amino acid residue is replaced with an amino acid residue having a larger side chain volume, thereby generating a protuberance within the CH3 domain of the first subunit which is positionable in a cavity within the CH3 domain of the second subunit, and in the CH3 domain of the second subunit of the Fc domain an amino acid residue is replaced with an amino acid residue having a smaller side chain volume, thereby generating a cavity within the CH3 domain of the second subunit within which the protuberance within the CH3 domain of the first subunit is positionable.

Preferably said amino acid residue having a larger side chain volume is selected from the group consisting of arginine (R), phenylalanine (F), tyrosine (Y), and tryptophan (W).

Preferably said amino acid residue having a smaller side chain volume is selected from the group consisting of alanine (A), serine (S), threonine (T), and valine (V).

The protuberance and cavity can be made by altering the nucleic acid encoding the polypeptides, e.g. by site-specific mutagenesis, or by peptide synthesis.

In a specific embodiment, in (the CH3 domain of) the first subunit of the Fc domain (the "knobs" subunit) the threonine residue at position 366 is replaced with a tryptophan residue (T366W), and in (the CH3 domain of) the second subunit of the Fc domain (the "hole" subunit) the tyrosine residue at position 407 is replaced with a valine residue (Y407V). In one embodiment, in the second subunit of the Fc domain additionally the threonine residue at position 366 is replaced with a serine residue (T366S) and the leucine residue at position 368 is replaced with an alanine residue (L368A) (numberings according to Kabat EU index).

In yet a further embodiment, in the first subunit of the Fc domain additionally the serine residue at position 354 is replaced with a cysteine residue (S354C) or the glutamic acid residue at position 356 is replaced with a cysteine residue (E356C) (particularly the serine residue at position 354 is replaced with a cysteine residue), and in the second subunit of the Fc domain additionally the tyrosine residue at position 349 is replaced by a cysteine residue (Y349C) (numberings according to Kabat EU index). Introduction of these two cysteine residues results in formation of a disulfide bridge between the two subunits of the Fc domain, further stabilizing the dimer (Carter, J Immunol Methods 248, 7-15 (2001)).

In a particular embodiment, the first subunit of the Fc domain comprises the amino acid substitutions S354C and T366W, and the second subunit of the Fc domain comprises the amino acid substitutions Y349C, T366S, L368A and Y407V (numbering according to Kabat EU index).

In a particular embodiment the antigen binding moiety that binds to the second antigen (e.g. an activating T cell antigen) is fused (optionally via the first antigen binding moiety, which binds to HLA-G, and/or a peptide linker) to the first subunit of the Fc domain (comprising the "knob" modification). Without wishing to be bound by theory, fusion of the antigen binding moiety that binds a second antigen, such as an activating T cell antigen, to the knob-containing subunit of the Fc domain will (further) minimize the generation of antibodies comprising two antigen binding moieties that bind to an activating T cell antigen (steric clash of two knob-containing polypeptides).

Other techniques of CH3-modification for enforcing the heterodimerization are contemplated as alternatives according to the invention and are described e.g. in WO 96/27011, WO 98/050431, EP 1870459, WO 2007/110205, WO 2007/147901, WO 2009/089004, WO 2010/129304, WO 2011/90754, WO 2011/143545, WO 2012/058768, WO 2013/157954, WO 2013/096291.

In one embodiment, the heterodimerization approach described in EP 1870459, is used alternatively. This approach is based on the introduction of charged amino acids with opposite charges at specific amino acid positions in the CH3/CH3 domain interface between the two subunits of the Fc domain. One preferred embodiment for the bispecific antibody of the invention are amino acid mutations R409D; K370E in one of the two CH3 domains (of the Fc domain) and amino acid mutations D399K; E357K in the other one of the CH3 domains of the Fc domain (numbering according to Kabat EU index).

In another embodiment, the bispecific antibody of the invention comprises amino acid mutation T366W in the CH3 domain of the first subunit of the Fc domain and amino acid mutations T366S, L368A, Y407V in the CH3 domain of the second subunit of the Fc domain, and additionally amino acid mutations R409D; K370E in the CH3 domain of the first subunit of the Fc domain and amino acid mutations D399K; E357K in the CH3 domain of the second subunit of the Fc domain (numberings according to Kabat EU index).

In another embodiment, the bispecific antibody of the invention comprises amino acid mutations S354C, T366W in the CH3 domain of the first subunit of the Fc domain and amino acid mutations Y349C, T366S, L368A, Y407V in the CH3 domain of the second subunit of the Fc domain, or said bispecific antibody comprises amino acid mutations Y349C, T366W in the CH3 domain of the first subunit of the Fc domain and amino acid mutations S354C, T366S, L368A, Y407V in the CH3 domains of the second subunit of the Fc domain and additionally amino acid mutations R409D; K370E in the CH3 domain of the first subunit of the Fc domain and amino acid mutations D399K; E357K in the CH3 domain of the second subunit of the Fc domain (all numberings according to Kabat EU index).

In one embodiment, the heterodimerization approach described in WO 2013/157953 is used alternatively. In one embodiment, a first CH3 domain comprises amino acid mutation T366K and a second CH3 domain comprises amino acid mutation L351 D (numberings according to Kabat EU index). In a further embodiment, the first CH3 domain comprises further amino acid mutation L351 K. In a further embodiment, the second CH3 domain comprises further an amino acid mutation selected from Y349E, Y349D and L368E (preferably L368E) (numberings according to Kabat EU index).

In one embodiment, the heterodimerization approach described in WO 2012/058768 is used alternatively. In one embodiment a first CH3 domain comprises amino acid mutations L351Y, Y407A and a second CH3 domain comprises amino acid mutations T366A, K409F. In a further embodiment the second CH3 domain comprises a further amino acid mutation at position T411, D399, S400, F405, N390, or K392, e.g. selected from a) T411 N, T411R, T411Q, T411 K, T411 D, T411E or T411W, b) D399R, D399W, D399Y or D399K, c) S400E, 5400D, S400R, or 5400K, d) F4051, F405M, F405T, F4055, F405V or F405W, e) N390R, N390K or N390D, f) K392V, K392M, K392R, K392L, K392F or K392E (numberings according to Kabat EU index). In a further embodiment a first CH3 domain comprises amino acid mutations L351Y, Y407A and a second CH3 domain comprises amino acid mutations T366V, K409F. In a further embodiment, a first CH3 domain comprises amino acid mutation Y407A and a second CH3 domain comprises amino acid mutations T366A, K409F. In a further embodiment, the second CH3 domain further comprises amino acid mutations K392E, T411 E, D399R and S400R (numberings according to Kabat EU index).

In one embodiment, the heterodimerization approach described in WO 2011/143545 is used alternatively, e.g. with the amino acid modification at a position selected from the group consisting of 368 and 409 (numbering according to Kabat EU index).

In one embodiment, the heterodimerization approach described in WO 2011/090762, which also uses the knobs-into-holes technology described above, is used alternatively. In one embodiment a first CH3 domain comprises amino acid mutation T366W and a second CH3 domain comprises amino acid mutation Y407A. In one embodiment, a first CH3 domain comprises amino acid mutation T366Y and a second CH3 domain comprises amino acid mutation Y407T (numberings according to Kabat EU index).

In one embodiment, the bispecific antibody or its Fc domain is of IgG2 subclass and the heterodimerization approach described in WO 2010/129304 is used alternatively.

In an alternative embodiment, a modification promoting association of the first and the second subunit of the Fc domain comprises a modification mediating electrostatic steering effects, e.g. as described in PCT publication WO 2009/089004. Generally, this method involves replacement of one or more amino acid residues at the interface of the two Fc domain subunits by charged amino acid residues so that homodimer formation becomes electrostatically unfavorable but heterodimerization electrostatically favorable. In one such embodiment, a first CH3 domain comprises amino acid substitution of K392 or N392 with a negatively charged amino acid (e.g. glutamic acid (E), or aspartic acid (D), preferably K392D or N392D) and a second CH3 domain comprises amino acid substitution of D399, E356, D356, or E357 with a positively charged amino acid (e.g. lysine (K) or arginine (R), preferably D399K, E356K, D356K, or E357K, and more preferably D399K and E356K). In a further embodiment, the first CH3 domain further comprises amino acid substitution of K409 or R409 with a negatively charged amino acid (e.g. glutamic acid (E), or aspartic acid (D), preferably K409D or R409D). In a further embodiment the first CH3 domain further or alternatively comprises amino acid substitution of K439 and/or K370 with a negatively charged amino acid (e.g. glutamic acid (E), or aspartic acid (D)) (all numberings according to Kabat EU index).

In yet a further embodiment, the heterodimerization approach described in WO 2007/147901 is used alternatively. In one embodiment, a first CH3 domain comprises amino acid mutations K253E, D282K, and K322D and a second CH3 domain comprises amino acid mutations D239K, E240K, and K292D (numberings according to Kabat EU index).

In still another embodiment, the heterodimerization approach described in WO 2007/110205 can be used alternatively.

In one embodiment, the first subunit of the Fc domain comprises amino acid substitutions K392D and K409D, and the second subunit of the Fc domain comprises amino acid substitutions D356K and D399K (numbering according to Kabat EU index).

Fc Domain Modifications Reducing Fc Receptor Binding and/or Effector Function

The Fc domain confers to the bispecific antibody (or the antibody) favorable pharmacokinetic properties, including a long serum half-life which contributes to good accumulation in the target tissue and a favorable tissue-blood distribution ratio. At the same time it may, however, lead to undesirable targeting of the bispecific antibody (or the antibody) to cells expressing Fc receptors rather than to the preferred antigen-bearing cells. Moreover, the co-activation of Fc receptor signaling pathways may lead to cytokine secretion/release which, in combination with the T cell activating properties (e.g. in embodiments of the bispecific antibody wherein the second antigen binding moiety binds to an activating T cell antigen) and the long half-life of the bispecific antibody, results in excessive activation of cytokine receptors and severe side effects upon systemic administration. Activation of (Fc receptor-bearing) immune cells other than T cells may even reduce efficacy of the bispecific antibody (particularly a bispecific antibody wherein the second antigen binding moiety binds to an activating T cell antigen) due to the potential destruction of T cells e.g. by NK cells.

Accordingly, in particular embodiments, the Fc domain of the bispecific antibody according to the invention exhibits reduced binding affinity to an Fc receptor and/or reduced effector function, as compared to a native $IgG_1$ Fc domain. In one such embodiment the Fc domain (or the bispecific antibody comprising said Fc domain) exhibits less than 50%, preferably less than 20%, more preferably less than 10% and most preferably less than 5% of the binding affinity to an Fc receptor, as compared to a native $IgG_1$ Fc domain (or a bispecific antibody comprising a native $IgG_1$ Fc domain), and/or less than 50%, preferably less than 20%, more preferably less than 10% and most preferably less than 5% of the effector function, as compared to a native $IgG_1$ Fc domain domain (or a bispecific antibody comprising a native $IgG_1$ Fc domain). In one embodiment, the Fc domain domain (or the bispecific antibody comprising said Fc domain) does not substantially bind to an Fc receptor and/or induce effector function. In a particular embodiment the Fc receptor is an Fcγ receptor. In one embodiment the Fc receptor is a human Fc receptor. In one embodiment the Fc receptor is an activating Fc receptor. In a specific embodiment the Fc receptor is an activating human Fcγ receptor, more specifically human FcγRIIIa, FcγRI or FcγRIIa, most specifically human FcγRIIIa. In one embodiment the effector function is one or more selected from the group of CDC, ADCC, ADCP, and cytokine secretion. In a particular embodiment, the effector function is ADCC. In one embodiment, the Fc domain domain exhibits substantially similar binding affinity to neonatal Fc receptor (FcRn), as compared to a native $IgG_1$ Fc domain domain. Substantially similar binding to FcRn is achieved when the Fc domain (or the bispecific antibody comprising said Fc domain) exhibits greater than about 70%, particularly greater than about 80%, more particularly greater than about 90% of the binding affinity of a native $IgG_1$ Fc domain (or the bispecific antibody comprising a native $IgG_1$ Fc domain) to FcRn.

In certain embodiments the Fc domain is engineered to have reduced binding affinity to an Fc receptor and/or reduced effector function, as compared to a non-engineered Fc domain. In particular embodiments, the Fc domain of the bispecific antibody comprises one or more amino acid mutation that reduces the binding affinity of the Fc domain to an Fc receptor and/or effector function. Typically, the same one or more amino acid mutation is present in each of the two subunits of the Fc domain. In one embodiment, the amino acid mutation reduces the binding affinity of the Fc domain to an Fc receptor. In one embodiment, the amino acid mutation reduces the binding affinity of the Fc domain to an Fc receptor by at least 2-fold, at least 5-fold, or at least 10-fold. In embodiments where there is more than one amino acid mutation that reduces the binding affinity of the Fc domain to the Fc receptor, the combination of these amino acid mutations may reduce the binding affinity of the Fc domain to an Fc receptor by at least 10-fold, at least 20-fold, or even at least 50-fold. In one embodiment the bispecific antibody comprising an engineered Fc domain exhibits less than 20%, particularly less than 10%, more particularly less than 5% of the binding affinity to an Fc receptor as compared to a bispecific antibody comprising a non-engineered Fc domain. In a particular embodiment, the Fc receptor is an Fcγ receptor. In some embodiments, the Fc receptor is a human Fc receptor. In some embodiments, the Fc receptor is an activating Fc receptor. In a specific embodiment, the Fc receptor is an activating human Fcγ receptor, more specifically human FcγRIIIa, FcγRI or FcγRIIa, most specifically human FcγRIIIa. Preferably, binding to each of these receptors is reduced. In some embodiments, binding affinity to a complement component, specifically binding affinity to C1q, is also reduced. In one embodiment, binding affinity to neonatal Fc receptor (FcRn) is not reduced. Substantially similar binding to FcRn, i.e. preservation of the binding affinity of the Fc domain to said receptor, is achieved when the Fc domain (or the bispecific antibody comprising said Fc domain) exhibits greater than about 70% of the binding affinity of a non-engineered form of the Fc domain (or the bispecific antibody comprising said non-engineered form of the Fc domain) to FcRn. The Fc domain, or bispecific antibodies of the invention comprising said Fc domain, may exhibit greater than about 80% and even greater than about 90% of such affinity. In certain embodiments, the Fc domain of the bispecific antibody is engineered to have reduced effector function, as compared to a non-engineered Fc domain. The reduced effector function can include, but is not limited to, one or more of the following: reduced complement dependent cytotoxicity (CDC), reduced antibody-dependent cell-mediated cytotoxicity (ADCC), reduced antibody-dependent cellular phagocytosis (ADCP), reduced cytokine secretion, reduced immune complex-mediated antigen uptake by antigen-presenting cells, reduced binding to NK cells, reduced binding to macrophages, reduced binding to monocytes, reduced binding to polymorphonuclear cells, reduced direct signaling inducing apoptosis, reduced crosslinking of target-bound antibodies, reduced dendritic cell maturation, or reduced T cell priming. In one embodiment, the reduced effector function is one or more selected from the group of reduced CDC, reduced ADCC, reduced ADCP, and reduced cytokine secretion. In a particular embodiment, the reduced effector function is reduced ADCC. In one embodiment the reduced ADCC is less than 20% of the ADCC induced by a non-engineered Fc domain (or a bispecific antibody comprising a non-engineered Fc domain).

In one embodiment, the amino acid mutation that reduces the binding affinity of the Fc domain to an Fc receptor and/or effector function is an amino acid substitution. In one embodiment, the Fc domain comprises an amino acid substitution at a position selected from the group of E233, L234, L235, N297, P331 and P329 (numberings according to Kabat EU index). In a more specific embodiment, the Fc domain comprises an amino acid substitution at a position selected from the group of L234, L235 and P329 (numberings according to Kabat EU index). In some embodiments, the Fc domain comprises the amino acid substitutions L234A and L235A (numberings according to Kabat EU index). In one such embodiment, the Fc domain is an $IgG_1$ Fc domain, particularly a human $IgG_1$ Fc domain. In one embodiment, the Fc domain comprises an amino acid substitution at position P329. In a more specific embodiment, the amino acid substitution is P329A or P329G, particularly P329G (numberings according to Kabat EU index). In one embodiment, the Fc domain comprises an amino acid substitution at position P329 and a further amino acid substitution at a position selected from E233, L234, L235, N297 and P331 (numberings according to Kabat EU index). In a more specific embodiment, the further amino acid substitution is E233P, L234A, L235A, L235E, N297A, N297D or P331S. In particular embodiments, the Fc domain comprises amino acid substitutions at positions P329, L234 and L235 (numberings according to Kabat EU index). In more particular embodiments, the Fc domain comprises the amino acid mutations L234A, L235A and P329G ("P329G LALA", "PGLALA" or "LALAPG"). Specifically, in particular embodiments, each subunit of the Fc domain comprises the amino acid substitutions L234A, L235A and P329G (Kabat EU index numbering), i.e. in each of the first and the second subunit of the Fc domain the leucine residue at position 234 is replaced with an alanine residue (L234A), the leucine residue at position 235 is replaced with an alanine residue (L235A) and the proline residue at position 329 is replaced by a glycine residue (P329G) (numbering according to Kabat EU index).

In one such embodiment, the Fc domain is an $IgG_1$ Fc domain, particularly a human $IgG_1$ Fc domain. The "P329G LALA" combination of amino acid substitutions almost completely abolishes Fcγ receptor (as well as complement) binding of a human $IgG_1$ Fc domain, as described in PCT publication no. WO 2012/130831, which is incorporated herein by reference in its entirety. WO 2012/130831 also describes methods of preparing such mutant Fc domains and methods for determining its properties such as Fc receptor binding or effector functions.

$IgG_4$ antibodies exhibit reduced binding affinity to Fc receptors and reduced effector functions as compared to $IgG_1$ antibodies. Hence, in some embodiments, the Fc domain of the bispecific antibodies of the invention is an $IgG_4$ Fc domain, particularly a human $IgG_4$ Fc domain. In one embodiment, the $IgG_4$ Fc domain comprises amino acid substitutions at position S228, specifically the amino acid substitution S228P (numberings according to Kabat EU index). To further reduce its binding affinity to an Fc receptor and/or its effector function, in one embodiment, the $IgG_4$ Fc domain comprises an amino acid substitution at position L235, specifically the amino acid substitution L235E (numberings according to Kabat EU index). In another embodiment, the $IgG_4$ Fc domain comprises an amino acid substitution at position P329, specifically the amino acid substitution P329G (numberings according to Kabat EU index). In a particular embodiment, the $IgG_4$ Fc domain comprises amino acid substitutions at positions S228, L235 and P329, specifically amino acid substitutions S228P, L235E and P329G (numberings according to Kabat EU index). Such $IgG_4$ Fc domain mutants and their Fcγ receptor binding properties are described in PCT publication no. WO 2012/130831, incorporated herein by reference in its entirety.

In a particular embodiment, the Fc domain exhibiting reduced binding affinity to an Fc receptor and/or reduced effector function, as compared to a native $IgG_1$ Fc domain, is a human $IgG_1$ Fc domain comprising the amino acid substitutions L234A, L235A and optionally P329G, or a human $IgG_4$ Fc domain comprising the amino acid substitutions S228P, L235E and optionally P329G (numberings according to Kabat EU index).

Mutant Fc domains can be prepared by amino acid deletion, substitution, insertion or modification using genetic or chemical methods well known in the art. Genetic methods may include site-specific mutagenesis of the encoding DNA sequence, PCR, gene synthesis, and the like. The correct nucleotide changes can be verified for example by sequencing.

Binding to Fc receptors can be easily determined e.g. by ELISA, or by Surface Plasmon Resonance (SPR) using standard instrumentation such as a BIAcore instrument (GE Healthcare), and Fc receptors such as may be obtained by recombinant expression. Alternatively, binding affinity of Fc domains or bispecific antibodies comprising an Fc domain for Fc receptors may be evaluated using cell lines known to express particular Fc receptors, such as human NK cells expressing FcγIIIa receptor.

Effector function of an Fc domain, or a bispecific antibody comprising an Fc domain, can be measured by methods known in the art. Examples of in vitro assays to assess ADCC activity of a molecule of interest are described in U.S. Pat. No. 5,500,362; Hellstrom et al. Proc Natl Acad Sci USA 83, 7059-7063 (1986) and Hellstrom et al., Proc Natl Acad Sci USA 82, 1499-1502 (1985); U.S. Pat. No. 5,821, 337; Bruggemann et al., J Exp Med 166, 1351-1361 (1987). Alternatively, non-radioactive assays methods may be employed (see, for example, ACTI™ non-radioactive cytotoxicity assay for flow cytometry (CellTechnology, Inc. Mountain View, CA); and CytoTox 96® non-radioactive cytotoxicity assay (Promega, Madison, WI)). Useful effector cells for such assays include peripheral blood mononuclear cells (PBMC) and Natural Killer (NK) cells. Alternatively, or additionally, ADCC activity of the molecule of interest may be assessed in vivo, e.g. in a animal model such as that disclosed in Clynes et al., Proc Natl Acad Sci USA 95, 652-656 (1998).

In some embodiments, binding of the Fc domain to a complement component, specifically to C1q, is reduced. Accordingly, in some embodiments wherein the Fc domain is engineered to have reduced effector function, said reduced effector function includes reduced CDC. C1q binding assays may be carried out to determine whether the Fc domain, or the bispecific antibody comprising the Fc domain, is able to bind C1q and hence has CDC activity. See e.g., C1q and C3c binding ELISA in WO 2006/029879 and WO 2005/100402. To assess complement activation, a CDC assay may be performed (see, for example, Gazzano-Santoro et al., J Immunol Methods 202, 163 (1996); Cragg et al., Blood 101, 1045-1052 (2003); and Cragg and Glennie, Blood 103, 2738-2743 (2004)).

FcRn binding and in vivo clearance/half life determinations can also be performed using methods known in the art (see, e.g., Petkova, S. B. et al., *Int'l. Immunol.* 18(12):1759-1769 (2006); WO 2013/120929).

In a further aspect, an anti-HLA-G antibody according to any of the above embodiments may incorporate any of the features, singly or in combination, as described in Sections 1-6 below:

1. Antibody Affinity

In certain embodiments, an antibody provided herein has a dissociation constant KD of ≤1 μM, ≤100 nM, ≤10 nM, ≤1 nM, ≤0.1 nM, ≤0.01 nM, or ≤0.001 nM (e.g. $10^{-8}$ M or less, e.g. from $10^{-8}$ M to $10^{-13}$ M, e.g., from $10^{-9}$ M to $10^{-13}$ M).

In one preferred embodiment, KD is measured using surface plasmon resonance assays using a BIACORE®) at 25° C. with immobilized antigen CM5 chips at ~10 response units (RU). Briefly, carboxymethylated dextran biosensor chips (CM5, BIACORE, Inc.) are activated with N-ethyl- N'-(3-dimethylaminopropyl)-carbodiimide hydrochloride (EDC) and N-hydroxysuccinimide (NHS) according to the supplier's instructions. Antigen is diluted with 10 mM sodium acetate, pH 4.8, to 5 µg/ml (~0.2 µM) before injection at a flow rate of 5 µl/minute to achieve approximately 10 response units (RU) of coupled protein. Following the injection of antigen, 1 M ethanolamine is injected to block unreacted groups. For kinetics measurements, two-fold serial dilutions of Fab (0.78 nM to 500 nM) are injected in PBS with 0.05% polysorbate 20 (TWEEN-20™) surfactant (PBST) at 25° C. at a flow rate of approximately 25 µl/min. Association rates ($k_{on}$ or ka) and dissociation rates ($k_{off}$ or kd) are calculated using a simple one-to-one Langmuir binding model (BIACORE Evaluation Software version 3.2) by simultaneously fitting the association and dissociation sensorgrams. The equilibrium dissociation constant KD is calculated as the ratio kd/ka ($k_{off}/k_{on}$) See, e.g., Chen, Y. et al., J. Mol. Biol. 293 (1999) 865-881. If the on-rate exceeds $10^6$ $M^{-1}$ $s^{-1}$ by the surface plasmon resonance assay above, then the on-rate can be determined by using a fluorescent quenching technique that measures the increase or decrease in fluorescence emission intensity (excitation=295 nm; emission=340 nm, 16 nm band-pass) at 25° C. of a 20 nM anti-antigen antibody (Fab form) in PBS, pH 7.2, in the presence of increasing concentrations of antigen as measured in a spectrometer, such as a stop-flow equipped spectrophotometer (Aviv Instruments) or a 8000-series SLM-AMINCO™ spectrophotometer (ThermoSpectronic) with a stirred cuvette.

2. Antibody Fragments

In certain embodiments, an antibody provided herein is an antibody fragment. Antibody fragments include, but are not limited to, Fab, Fab', Fab'-SH, F(ab')$_2$, Fv, and scFv fragments, and other fragments described below. For a review of certain antibody fragments, see Hudson, P. J. et al., Nat. Med. 9 (2003) 129-134. For a review of scFv fragments, see, e.g., Plueckthun, A., In; The Pharmacology of Monoclonal Antibodies, Vol. 113, Rosenburg and Moore (eds.), Springer-Verlag, New York (1994), pp. 269-315; see also WO 93/16185; and U.S. Pat. Nos. 5,571,894 and 5,587,458. For discussion of Fab and F(ab')2 fragments comprising salvage receptor binding epitope residues and having increased in vivo half-life, see U.S. Pat. No. 5,869,046.

Diabodies are antibody fragments with two antigen-binding sites that may be bivalent or bispecific. See, for example, EP 0 404 097; WO 1993/01161; Hudson, P. J. et al., Nat. Med. 9 (2003) 129-134; and Holliger, P. et al., Proc. Natl. Acad. Sci. USA 90 (1993) 6444-6448. Triabodies and tetrabodies are also described in Hudson, P. J. et al., Nat. Med. 9 (20039 129-134).

Single-domain antibodies are antibody fragments comprising all or a portion of the heavy chain variable domain or all or a portion of the light chain variable domain of an antibody. In certain embodiments, a single-domain antibody is a human single-domain antibody (Domantis, Inc., Waltham, MA; see, e.g., U.S. Pat. No. 6,248,516 B1).

Antibody fragments can be made by various techniques, including but not limited to proteolytic digestion of an intact antibody as well as production by recombinant host cells (e.g. E. coli or phage), as described herein.

3. Chimeric and Humanized Antibodies

In certain embodiments, an antibody provided herein is a chimeric antibody. Certain chimeric antibodies are described, e.g., in U.S. Pat. No. 4,816,567; and Morrison, S. L. et al., Proc. Natl. Acad. Sci. USA 81 (1984) 6851-6855). In one example, a chimeric antibody comprises a non-human variable region (e.g., a variable region derived from a mouse, rat, hamster, rabbit, or non-human primate, such as a monkey) and a human constant region. In a further example, a chimeric antibody is a "class switched" antibody in which the class or subclass has been changed from that of the parental antibody. Chimeric antibodies include antigen-binding fragments thereof.

In certain embodiments, a chimeric antibody is a humanized antibody. Typically, a non-human antibody is humanized to reduce immunogenicity to humans, while retaining the specificity and affinity of the parental non-human antibody. Generally, a humanized antibody comprises one or more variable domains in which CDRs, e.g., CDRs, (or portions thereof) are derived from a non-human antibody, and FRs (or portions thereof) are derived from human antibody sequences. A humanized antibody optionally will also comprise at least a portion of a human constant region. In some embodiments, some FR residues in a humanized antibody are substituted with corresponding residues from a non-human antibody (e.g., the antibody from which the CDR residues are derived), e.g., to restore or improve antibody specificity or affinity.

Humanized antibodies and methods of making them are reviewed, e.g., in Almagro, J. C. and Fransson, J., Front. Biosci. 13 (2008) 1619-1633, and are further described, e.g., in Riechmann, I. et al., Nature 332 (1988) 323-329; Queen, C. et al., Proc. Natl. Acad. Sci. USA 86 (1989) 10029-10033; U.S. Pat. Nos. 5,821,337, 7,527,791, 6,982,321, and 7,087,409; Kashmiri, S. V. et al., Methods 36 (2005) 25-34 (describing SDR (a-CDR) grafting); Padlan, E. A., Mol. Immunol. 28 (1991) 489-498 (describing "resurfacing"); Dall'Acqua, W. F. et al., Methods 36 (2005) 43-60 (describing "FR shuffling"); and Osbourn, J. et al., Methods 36 (2005) 61-68 and Klimka, A. et al., Br. J. Cancer 83 (2000) 252-260 (describing the "guided selection" approach to FR shuffling).

Human framework regions that may be used for humanization include but are not limited to: framework regions selected using the "best-fit" method (see, e.g., Sims, M. J. et al., J. Immunol. 151 (1993) 2296-2308; framework regions derived from the consensus sequence of human antibodies of a particular subgroup of light or heavy chain variable regions (see, e.g., Carter, P. et al., Proc. Natl. Acad. Sci. USA 89 (1992) 4285-4289; and Presta, L. G. et al., J. Immunol. 151 (1993) 2623-2632); human mature (somatically mutated) framework regions or human germline framework regions (see, e.g., Almagro, J. C. and Fransson, J., Front. Biosci. 13 (2008) 1619-1633); and framework regions derived from screening FR libraries (see, e.g., Baca, M. et al., J. Biol. Chem. 272 (1997) 10678-10684 and Rosok, M. J. et al., J. Biol. Chem. 271 (19969 22611-22618).

4. Human Antibodies

In certain embodiments, an antibody provided herein is a human antibody. Human antibodies can be produced using various techniques known in the art. Human antibodies are described generally in van Dijk, M. A. and van de Winkel, J. G., Curr. Opin. Pharmacol. 5 (2001) 368-374 and Lonberg, N., Curr. Opin. Immunol. 20 (2008) 450-459.

Human antibodies may be prepared by administering an immunogen to a transgenic animal that has been modified to produce intact human antibodies or intact antibodies with human variable regions in response to antigenic challenge. Such animals typically contain all or a portion of the human immunoglobulin loci, which replace the endogenous immunoglobulin loci, or which are present extrachromosomally or integrated randomly into the animal's chromosomes. In such transgenic mice, the endogenous immunoglobulin loci have generally been inactivated. For review of methods for obtaining human antibodies from transgenic animals, see Lonberg, N., Nat. Biotech. 23 (2005) 1117-1125. See also, e.g., U.S. Pat. Nos. 6,075,181 and 6,150,584 describing XENOMOUSE™ technology; U.S. Pat. No. 5,770,429 describing HUMAB® technology; U.S. Pat. No. 7,041,870 describing K-M MOUSE® technology, and U.S. Patent Application Publication No. US 2007/0061900, describing VELOCIMOUSE® technology). Human variable regions from intact antibodies generated by such animals may be further modified, e.g., by combining with a different human constant region.

Human antibodies can also be made by hybridoma-based methods. Human myeloma and mouse-human heteromyeloma cell lines for the production of human monoclonal antibodies have been described. (See, e.g., Kozbor, D., J. Immunol. 133 (1984) 3001-3005; Brodeur, B. R. et al., Monoclonal Antibody Production Techniques and Applications, Marcel Dekker, Inc., New York (1987), pp. 51-63; and Boerner, P. et al., J. Immunol. 147 (1991) 86-95) Human antibodies generated via human B-cell hybridoma technology are also described in Li, J. et al., Proc. Natl. Acad. Sci. USA 103 (2006) 3557-3562. Additional methods include those described, for example, in U.S. Pat. No. 7,189,826 (describing production of monoclonal human IgM antibodies from hybridoma cell lines) and Ni, J., Xiandai Mianyixue 26 (2006) 265-268 (describing human-human hybridomas). Human hybridoma technology (Trioma technology) is also described in Vollmers, H. P. and Brandlein, S., Histology and Histopathology 20 (2005) 927-937 and Vollmers, H. P. and Brandlein, S., Methods and Findings in Experimental and Clinical Pharmacology 27 (2005) 185-191.

Human antibodies may also be generated by isolating Fv clone variable domain sequences selected from human-derived phage display libraries. Such variable domain sequences may then be combined with a desired human constant domain. Techniques for selecting human antibodies from antibody libraries are described below.

5. Library-Derived Antibodies

Antibodies of the invention may be isolated by screening combinatorial libraries for antibodies with the desired activity or activities. For example, a variety of methods are known in the art for generating phage display libraries and screening such libraries for antibodies possessing the desired binding characteristics. Such methods are reviewed, e.g., in Hoogenboom, H. R. et al., Methods in Molecular Biology 178 (2001) 1-37 and further described, e.g., in the McCafferty, J. et al., Nature 348 (1990) 552-554; Clackson, T. et al., Nature 352 (1991) 624-628; Marks, J. D. et al., J. Mol. Biol. 222 (1992) 581-597; Marks, J. D. and Bradbury, A., Methods in Molecular Biology 248 (2003) 161-175; Sidhu, S. S. et al., J. Mol. Biol. 338 (2004) 299-310; Lee, C. V. et al., J. Mol. Biol. 340 (2004) 1073-1093; Fellouse, F. A., Proc. Natl. Acad. Sci. USA 101 (2004) 12467-12472; and Lee, C. V. et al., J. Immunol. Methods 284 (2004) 119-132.

In certain phage display methods, repertoires of VH and VL genes are separately cloned by polymerase chain reaction (PCR) and recombined randomly in phage libraries, which can then be screened for antigen-binding phage as described in Winter, G. et al., Ann. Rev. Immunol. 12 (1994) 433-455. Phage typically display antibody fragments, either as single-chain Fv (scFv) fragments or as Fab fragments. Libraries from immunized sources provide high-affinity antibodies to the immunogen without the requirement of constructing hybridomas. Alternatively, the naive repertoire can be cloned (e.g., from human) to provide a single source of antibodies to a wide range of non-self and also self antigens without any immunization as described by Griffiths, A. D. et al., EMBO J. 12 (1993) 725-734. Finally, naive libraries can also be made synthetically by cloning non-rearranged V-gene segments from stem cells, and using PCR primers containing random sequence to encode the highly variable CDR3 regions and to accomplish rearrangement in vitro, as described by Hoogenboom, H. R. and Winter, G., J. Mol. Biol. 227 (1992) 381-388. Patent publications describing human antibody phage libraries include, for example: U.S. Pat. No. 5,750,373, and US Patent Publication Nos. 2005/0079574, 2005/0119455, 2005/0266000, 2007/0117126, 2007/0160598, 2007/0237764, 2007/0292936, and 2009/0002360.

Antibodies or antibody fragments isolated from human antibody libraries are considered human antibodies or human antibody fragments herein.

6. Antibody Variants

In certain embodiments, amino acid sequence variants of the antibodies provided herein are contemplated. For example, it may be desirable to improve the binding affinity and/or other biological properties of the antibody. Amino acid sequence variants of an antibody may be prepared by introducing appropriate modifications into the nucleotide sequence encoding the antibody, or by peptide synthesis. Such modifications include, for example, deletions from, and/or insertions into and/or substitutions of residues within the amino acid sequences of the antibody. Any combination of deletion, insertion, and substitution can be made to arrive at the final construct, provided that the final construct possesses the desired characteristics, e.g., antigen-binding.

a) Substitution, Insertion, and Deletion Variants

In certain embodiments, antibody variants having one or more amino acid substitutions are provided. Sites of interest for substitutional mutagenesis include the CDRs and FRs (in a preferred embodiment framework residues not relevant for the binding properties of the antibodies (see e.g. (see e.g. Foote J. and Winter G., J. Mol. Biol. (1992) 224, 487-499). Exemplary changes are provided in Table 1 under the heading of "exemplary substitutions", and as further described below in reference to amino acid side chain classes. Conservative substitutions are shown in Table 1 under the heading of "preferred substitutions". Amino acid substitutions may be introduced into an antibody of interest and the products screened for a desired activity, e.g., retained/improved antigen binding, decreased immunogenicity, or improved ADCC or CDC.

TABLE 1

| Original Residue | Exemplary Substitutions | Preferred Substitutions |
|---|---|---|
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |

TABLE 1-continued

| Original Residue | Exemplary Substitutions | Preferred Substitutions |
|---|---|---|
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Amino acids may be grouped according to common side-chain properties:
 (1) hydrophobic: Norleucine, Met, Ala, Val, Leu, Ile;
 (2) neutral hydrophilic: Cys, Ser, Thr, Asn, Gln;
 (3) acidic: Asp, Glu;
 (4) basic: His, Lys, Arg;
 (5) residues that influence chain orientation: Gly, Pro;
 (6) aromatic: Trp, Tyr, Phe.

Non-conservative substitutions will entail exchanging a member of one of these classes for another class.

One type of substitutional variant involves substituting one or more CDRs of a parent antibody (e.g. a humanized or human antibody). Generally, the resulting variant(s) selected for further study will have modifications (e.g., improvements) in certain biological properties (e.g., increased affinity, reduced immunogenicity) relative to the parent antibody and/or will have substantially retained certain biological properties of the parent antibody. An exemplary substitutional variant is an affinity matured antibody, which may be conveniently generated, e.g., using phage display-based affinity maturation techniques such as those described herein. Briefly, one or more CDR residues are mutated and the variant antibodies displayed on phage and screened for a particular biological activity (e.g. binding affinity).

Alterations (e.g., substitutions) may be made in CDRs, e.g., to improve antibody affinity. Such alterations may be made in CDR "hotspots," i.e., residues encoded by codons that undergo mutation at high frequency during the somatic maturation process (see, e.g., Chowdhury, P. S., Methods Mol. Biol. 207 (2008) 179-196), and/or SDRs (a-CDRs), with the resulting variant VH or VL being tested for binding affinity. Affinity maturation by constructing and reselecting from secondary libraries has been described, e.g., in Hoogenboom, H. R. et al. in Methods in Molecular Biology 178 (2002) 1-37. In some embodiments of affinity maturation, diversity is introduced into the variable genes chosen for maturation by any of a variety of methods (e.g., error-prone PCR, chain shuffling, or oligonucleotide-directed mutagenesis). A secondary library is then created. The library is then screened to identify any antibody variants with the desired affinity. Another method to introduce diversity involves CDR-directed approaches, in which several CDR residues (e.g., 4-6 residues at a time) are randomized. CDR residues involved in antigen binding may be specifically identified, e.g., using alanine scanning mutagenesis or modeling. CDR-H3 and CDR-L3 in particular are often targeted.

In certain embodiments, substitutions, insertions, or deletions may occur within one or more CDRs so long as such alterations do not substantially reduce the ability of the antibody to bind antigen. For example, conservative alterations (e.g., conservative substitutions as provided herein) that do not substantially reduce binding affinity may be made in CDRs. Such alterations may be outside of CDR "hotspots" or SDRs. In certain embodiments of the variant VH and VL sequences provided above, each CDR either is unaltered, or contains no more than one, two or three amino acid substitutions.

A useful method for identification of residues or regions of an antibody that may be targeted for mutagenesis is called "alanine scanning mutagenesis" as described by Cunningham, B. C. and Wells, J. A., Science 244 (1989) 1081-1085. In this method, a residue or group of target residues (e.g., charged residues such as arg, asp, his, lys, and glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions. Alternatively, or additionally, a crystal structure of an antigen-antibody complex to identify contact points between the antibody and antigen. Such contact residues and neighboring residues may be targeted or eliminated as candidates for substitution. Variants may be screened to determine whether they contain the desired properties.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme (e.g. for ADEPT) or a polypeptide which increases the serum half-life of the antibody.

b) Fc Region Variants

In certain embodiments, one or more amino acid modifications may be introduced into the Fc region of an antibody provided herein, thereby generating an Fc region variant. The Fc region variant may comprise a human Fc region sequence (e.g., a human IgG1, IgG2, IgG3 or IgG4 Fc region) comprising an amino acid modification (e.g. a substitution) at one or more amino acid positions.

Antibodies with reduced effector function include those with substitution of one or more of Fc region residues 238, 265, 269, 270, 297, 327 and 329 (U.S. Pat. No. 6,737,056). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. No. 7,332,581).

Certain antibody variants with improved or diminished binding to FcRs are described. (See, e.g., U.S. Pat. No. 6,737,056; WO 2004/056312, and Shields, R. L. et al., J. Biol. Chem. 276 (2001) 6591-6604)

In one embodiment the invention such antibody is a $IgG_1$ with mutations L234A and L235A or with mutations L234A, L235A and P329G. In another embodiment or $IgG_4$ with mutations S228P and L235E or S228P, L235E or and P329G (numbering according to EU index of Kabat et al, Kabat et al., Sequences of Proteins of Immunological Interest, 5th Ed. Public Health Service, National Institutes of Health, Bethesda, MD, 1991).

Antibodies with increased half lives and improved binding to the neonatal Fc receptor (FcRn), which is responsible for the transfer of maternal IgGs to the fetus (Guyer, R. L. et al., J. Immunol. 117 (1976) 587-593, and Kim, J. K. et al., J. Immunol. 24 (1994) 2429-2434), are described in US 2005/0014934. Those antibodies comprise an Fc region with one or more substitutions therein which improve binding of the Fc region to FcRn. Such Fc variants include those with substitutions at one or more of Fc region residues: 238, 256, 265, 272, 286, 303, 305, 307, 311, 312, 317, 340, 356, 360, 362, 376, 378, 380, 382, 413, 424 or 434, e.g., substitution of Fc region residue 434 (U.S. Pat. No. 7,371,826).

See also Duncan, A. R. and Winter, G., Nature 322 (1988) 738-740; U.S. Pat. Nos. 5,648,260; 5,624,821; and WO 94/29351 concerning other examples of Fc region variants.

c) Cysteine Engineered Antibody Variants

In certain embodiments, it may be desirable to create cysteine engineered antibodies, e.g., "thioMAbs," in which one or more residues of an antibody are substituted with cysteine residues. In particular embodiments, the substituted residues occur at accessible sites of the antibody. By substituting those residues with cysteine, reactive thiol groups are thereby positioned at accessible sites of the antibody and may be used to conjugate the antibody to other moieties, such as drug moieties or linker-drug moieties, to create an immunoconjugate, as described further herein. In certain embodiments, any one or more of the following residues may be substituted with cysteine: V205 (Kabat numbering) of the light chain; A118 (EU numbering) of the heavy chain; and S400 (EU numbering) of the heavy chain Fc region. Cysteine engineered antibodies may be generated as described, e.g., in U.S. Pat. No. 7,521,541.

d) Antibody Derivatives

In certain embodiments, an antibody provided herein may be further modified to contain additional non-proteinaceous moieties that are known in the art and readily available. The moieties suitable for derivatization of the antibody include but are not limited to water soluble polymers. Non-limiting examples of water soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), and dextran or poly(n-vinyl pyrrolidone) polyethylene glycol, propropylene glycol homopolymers, prolypropylene oxide/ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight, and may be branched or unbranched. The number of polymers attached to the antibody may vary, and if more than one polymer is attached, they can be the same or different molecules. In general, the number and/or type of polymers used for derivatization can be determined based on considerations including, but not limited to, the particular properties or functions of the antibody to be improved, whether the antibody derivative will be used in a therapy under defined conditions, etc.

In another embodiment, conjugates of an antibody and non-proteinaceous moiety that may be selectively heated by exposure to radiation are provided. In one embodiment, the non-proteinaceous moiety is a carbon nanotube (Kam, N. W. et al., Proc. Natl. Acad. Sci. USA 102 (2005) 11600-11605). The radiation may be of any wavelength, and includes, but is not limited to, wavelengths that do not harm ordinary cells, but which heat the non-proteinaceous moiety to a temperature at which cells proximal to the antibody-non-proteinaceous moiety are killed.

B. Recombinant Methods and Compositions

Antibodies may be produced using recombinant methods and compositions, e.g., as described in U.S. Pat. No. 4,816,567. In one embodiment, isolated nucleic acid encoding an anti-HLA-G antibody described herein is provided. Such nucleic acid may encode an amino acid sequence comprising the VL and/or an amino acid sequence comprising the VH of the antibody (e.g., the light and/or heavy chains of the antibody). In a further embodiment, one or more vectors (e.g., expression vectors) comprising such nucleic acid are provided. In a further embodiment, a host cell comprising such nucleic acid is provided. In one such embodiment, a host cell comprises (e.g., has been transformed with): (1) a vector comprising a nucleic acid that encodes an amino acid sequence comprising the VL of the antibody and an amino acid sequence comprising the VH of the antibody, or (2) a first vector comprising a nucleic acid that encodes an amino acid sequence comprising the VL of the antibody and a second vector comprising a nucleic acid that encodes an amino acid sequence comprising the VH of the antibody. In one preferred embodiment, the host cell is eukaryotic, e.g. a Chinese Hamster Ovary (CHO) cell, a HEK293 cell or lymphoid cell (e.g., Y0, NS0, Sp20 cell). In one embodiment, a method of making an anti-HLA-G antibody or bispecific antibody is provided, wherein the method comprises culturing a host cell comprising a nucleic acid encoding the antibody, as provided above, under conditions suitable for expression of the antibody, and optionally recovering the antibody from the host cell (or host cell culture medium).

For recombinant production of an anti-HLA-G antibody, nucleic acid encoding an antibody, e.g., as described above, is isolated and inserted into one or more vectors for further cloning and/or expression in a host cell. Such nucleic acid may be readily isolated and sequenced using conventional procedures (e.g., by using oligonucleotide probes that are capable of binding specifically to genes encoding the heavy and light chains of the antibody).

The most suitable host cells for cloning or expression of antibody-encoding vectors eukaryotic cells, preferably mammalian cells, described herein.

Vertebrate cells may be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham, F. L. et al., J. Gen Virol. 36 (1977) 59-74); baby hamster kidney cells (BHK); mouse sertoli cells (TM4 cells as described, e.g., in Mather, J. P., Biol. Reprod. 23 (1980) 243-252); monkey kidney cells (CV1); African green monkey kidney cells (VERO-76); human cervical carcinoma cells (HELA); canine kidney cells (MDCK; buffalo rat liver cells (BRL 3A); human lung cells (W138); human liver cells (Hep G2); mouse mammary tumor (MMT 060562); TRI cells, as described, e.g., in Mather, J. P. et al., Annals N.Y. Acad. Sci. 383 (1982) 44-68; MRC 5 cells; and FS4 cells. Most useful mammalian host cell lines include Chinese hamster ovary (CHO) cells, including DHFR$^-$ CHO cells (Urlaub, G. et al., Proc. Natl. Acad. Sci. USA 77 (1980) 4216-4220); and myeloma cell lines such as Y0, NS0 and Sp2/0. For a review of certain mammalian host cell lines suitable for antibody production, see, e.g., Yazaki, P. and Wu, A. M., Methods in Molecular Biology, Vol. 248, Lo, B. K. C. (ed.), Humana Press, Totowa, NJ (2004), pp. 255-268.

To some extent also prokaryotic cells may be used, however with the disadvantage of sometimes higher efforts and more complex procedures. For expression of antibody fragments and polypeptides in bacteria, see, e.g., U.S. Pat. Nos. 5,648,237, 5,789,199, and 5,840,523. (See also Charlton, K. A., In: Methods in Molecular Biology, Vol. 248, Lo, B. K. C. (ed.), Humana Press, Totowa, NJ (2003), pp. 245-254, describing expression of antibody fragments in *E.* coli.) After expression, the antibody may be isolated from the bacterial cell paste in a soluble fraction and can be further purified.

Plant cell cultures can also be utilized as hosts. See, e.g., U.S. Pat. Nos. 5,959,177, 6,040,498, 6,420,548, 7,125,978, and 6,417,429 (describing PLANTIBODIES™ technology for producing antibodies in transgenic plants).

C. Assays

Anti-HLA-G antibodies provided herein may be identified, screened for, or characterized for their physical/chemical properties and/or biological activities by various assays known in the art.

1. Binding Assays and Other Assays

In one aspect, an antibody of the invention is tested for its antigen binding activity, e.g., by known methods such as ELISA, Western blot, etc. Detailed exemplary methods for mapping an epitope to which an antibody binds are provided in Morris, G. E. (ed.), Epitope Mapping Protocols, In: Methods in Molecular Biology, Vol. 66, Humana Press, Totowa, NJ (1996).

2. Activity Assays

In one aspect, assays are provided for identifying anti-HLA-G antibodies thereof having biological activity. Biological activity may include, e.g., the ability to enhance the activation and/or proliferation of different immune cells including T-cells. E.g. they enhance secretion of immunomodulating cytokines (e.g. interferon-gamma (IFN-gamma) and/or tumor necrosis factor alpha (TNF alpha)). Other immunomodulating cytokines which are or can be enhance are e.g. IL1β, IL6, IL12, Granzyme B etc. binding to different cell types. Antibodies having such biological activity in vivo and/or in vitro are also provided.

In certain embodiments, an antibody of the invention is tested for such biological activity as described e.g. in Examples below.

D. Methods and Compositions for Diagnostics and Detection

In certain embodiments, any of the anti-HLA-G antibodies provided herein is useful for detecting the presence of HLA-G in a biological sample. The term "detecting" as used herein encompasses quantitative or qualitative detection. In certain embodiments, a biological sample comprises a cell or tissue, such as immune cell or T cell infiltrates and or tumor cells.

In one embodiment, an anti-HLA-G antibody for use in a method of diagnosis or detection is provided. In a further aspect, a method of detecting the presence of HLA-G in a biological sample is provided. In certain embodiments, the method comprises contacting the biological sample with an anti-HLA-G antibody as described herein under conditions permissive for binding of the anti-HLA-G antibody to HLA-G, and detecting whether a complex is formed between the anti-HLA-G antibody and HLA-G. Such method may be an in vitro or in vivo method. In one embodiment, an anti-HLA-G antibody is used to select subjects eligible for therapy with an anti-HLA-G antibody, e.g. where HLA-G is a biomarker for selection of patients.

In certain embodiments, labeled anti-HLA-G antibodies are provided. Labels include, but are not limited to, labels or moieties that are detected directly (such as fluorescent, chromophoric, electron-dense, chemiluminescent, and radioactive labels), as well as moieties, such as enzymes or ligands, that are detected indirectly, e.g., through an enzymatic reaction or molecular interaction. Exemplary labels include, but are not limited to, the radioisotopes $^{32}$P, $^{14}$C, $^{125}$I, $^{3}$H, and $^{131}$I, fluorophores such as rare earth chelates or fluorescein and its derivatives, rhodamine and its derivatives, dansyl, umbelliferone, luciferases, e.g., firefly luciferase and bacterial luciferase (U.S. Pat. No. 4,737,456), luciferin, 2,3-dihydrophthalazinediones, horseradish peroxidase (HRP), alkaline phosphatase, β-galactosidase, glucoamylase, lysozyme, saccharide oxidases, e.g., glucose oxidase, galactose oxidase, and glucose-6-phosphate dehydrogenase, heterocyclic oxidases such as uricase and xanthine oxidase, coupled with an enzyme that employs hydrogen peroxide to oxidize a dye precursor such as HRP, lactoperoxidase, or microperoxidase, biotin/avidin, spin labels, bacteriophage labels, stable free radicals, and the like.

E. Pharmaceutical Formulations

Pharmaceutical formulations of anti-HLA-G antibodies or the anti-HLA-G/anti-CD3 bispecific antibodies as described herein are prepared by mixing such antibodies having the desired degree of purity with one or more optional pharmaceutically acceptable carriers (Remington's Pharmaceutical Sciences, 16th edition, Osol, A. (ed.) (1980)), in the form of lyophilized formulations or aqueous solutions. Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyl dimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as poly(vinylpyrrolidone); amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/ or non-ionic surfactants such as polyethylene glycol (PEG). Exemplary pharmaceutically acceptable carriers herein further include interstitial drug dispersion agents such as soluble neutral-active hyaluronidase glycoproteins (sHASEGP), for example, human soluble PH-20 hyaluronidase glycoproteins, such as rhuPH20 (HYLENEX®, Baxter International, Inc.). Certain exemplary sHASEGPs and methods of use, including rhuPH20, are described in US Patent Publication Nos. 2005/0260186 and 2006/0104968. In one aspect, a sHASEGP is combined with one or more additional glycosaminoglycanases such as chondroitinases.

Exemplary lyophilized antibody formulations are described in U.S. Pat. No. 6,267,958. Aqueous antibody formulations include those described in U.S. Pat. No. 6,171, 586 and WO 2006/044908, the latter formulations including a histidine-acetate buffer.

The formulation herein may also contain more than one active ingredients as necessary for the particular indication being treated, preferably those with complementary activities that do not adversely affect each other. For example, it may be desirable to further provide. Such active ingredients are suitably present in combination in amounts that are effective for the purpose intended.

Active ingredients may be entrapped in microcapsules prepared, for example, by coacervation techniques or by interfacial polymerization, for example, hydroxymethylcellulose or gelatin-microcapsules and poly-(methyl methacrylate) microcapsules, respectively, in colloidal drug delivery systems (for example, liposomes, albumin microspheres, microemulsions, nano-particles and nanocapsules) or in macroemulsions. Such techniques are disclosed in Remington's Pharmaceutical Sciences, 16th edition, Osol, A. (ed.) (1980).

Sustained-release preparations may be prepared. Suitable examples of sustained-release preparations include semipermeable matrices of solid hydrophobic polymers containing the antibody, which matrices are in the form of shaped articles, e.g. films, or microcapsules.

The formulations to be used for in vivo administration are generally sterile. Sterility may be readily accomplished, e.g., by filtration through sterile filtration membranes.

F. Therapeutic Methods and Compositions

Any of the anti-HLA-G antibodies or the anti-HLA-G/anti-CD3 bispecific antibodies provided herein may be used in therapeutic methods.

In one aspect, an anti-HLA-G antibody or an anti-HLA-G/anti-CD3 bispecific antibody for use as a medicament is provided. In further aspects, an anti-HLA-G antibody or an anti-HLA-G/anti-CD3 bispecific antibody for use in treating cancer is provided. In certain embodiments, an anti-HLA-G antibody or an anti-HLA-G/anti-CD3 bispecific antibody for use in a method of treatment is provided. In certain embodiments, the invention provides an anti-HLA-G antibody or an anti-HLA-G/anti-CD3 bispecific antibody for use in a method of treating an individual having cancer comprising administering to the individual an effective amount of the anti-HLA-G/anti-CD3 bispecific antibody.

In further embodiments, the invention provides an anti-HLA-G antibody or an anti-HLA-G/anti-CD3 bispecific antibody for use as immunomodulatory agent/to directly or indirectly induce proliferation and/or activation of immune cells (like T cells, B cells and myeloid cells including monocytes, macrophages, dendritic cells, plasmacytoid dendritic cells) e.g. by secretion of immunostimulatory cytokines like TNFalpha (TNFa) and IFNgamma (IFNg) or further recruitment of immune cells. In certain embodiments, the invention provides an anti-HLA-G antibody or an anti-HLA-G/anti-CD3 bispecific antibody for use in a method of immunomodulatory agent/to directly or indirectly induce proliferation, activation of immune cells e.g. by secretion of immunostimulatory cytokines like TNFa and IFNgamma or further recruitment of immune cells in an individual comprising administering to the individual an effective of the anti-HLA-G antibody or anti-HLA-G/anti-CD3 bispecific antibody for immunomodulation/or directly or indirectly induce proliferation, activation of immune cells e.g. by secretion of immunostimulatory cytokines like TNFa and IFNgamma or further recruitment of immune cells.

In further embodiments, the invention provides an anti-HLA-G antibody or an anti-HLA-G/anti-CD3 bispecific antibody for use as immunostimulatory agent/or stimulating tumor necrosis factor alpha (TNF alpha) secretion. In certain embodiments, the invention provides an anti-HLA-G antibody or an anti-HLA-G/anti-CD3 bispecific antibody for use in a method of immunomodulation to directly or indirectly induce proliferation, activation e.g. by secretion of immunostimulatory cytokines like TNFa and IFNg or further recruitment of immune cells in an individual comprising administering to the individual an effective of the anti-HLA-G antibody or anti-HLA-G/anti-CD3 bispecific antibody immunomodulation to directly or indirectly induce proliferation, activation e.g. by secretion of immunostimulatory cytokines like TNFa and IFNg or further recruitment of immune cells The term "cancer" as used herein may be, for example, lung cancer, non small cell lung (NSCL) cancer, bronchioloalveolar cell lung cancer, bone cancer, pancreatic cancer, skin cancer, cancer of the head or neck, cutaneous or intraocular melanoma, uterine cancer, ovarian cancer, rectal cancer, cancer of the anal region, stomach cancer, gastric cancer, colon cancer, breast cancer, uterine cancer, carcinoma of the fallopian tubes, carcinoma of the endometrium, carcinoma of the cervix, carcinoma of the vagina, carcinoma of the vulva, Hodgkin's Disease, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, prostate cancer, cancer of the bladder, cancer of the kidney or ureter, renal cell carcinoma, carcinoma of the renal pelvis, mesothelioma, hepatocellular cancer, biliary cancer, neoplasms of the central nervous system (CNS), spinal axis tumors, brain stem glioma, glioblastoma multiforme, astrocytomas, schwanomas, ependymonas, medulloblastomas, meningiomas, squamous cell carcinomas, pituitary adenoma, lymphoma, lymphocytic leukemia, including refractory versions of any of the above cancers, or a combination of one or more of the above cancers.

An "individual" according to any of the above embodiments is preferably a human. In a further aspect, the invention provides for the use of an anti-HLA-G antibody in the manufacture or preparation of a medicament. In one embodiment, the medicament is for treatment of cancer. In a further embodiment, the medicament is for use in a method of treating cancer comprising administering to an individual having cancer an effective amount of the medicament. In a further embodiment, the medicament is for inducing cell mediated lysis of cancer cells In a further embodiment, the medicament is for use in a method of inducing cell mediated lysis of cancer cells in an individual suffering from cancer comprising administering to the individual an amount effective of the medicament to induce apoptosis in a cancer cell/or to inhibit cancer cell proliferation. An "individual" according to any of the above embodiments may be a human.

In a further aspect, the invention provides a method for treating cancer. In one embodiment, the method comprises administering to an individual having cancer an effective amount of an anti-HLA-G antibody or an anti-HLA-G/anti-CD3 bispecific antibody. An "individual" according to any of the above embodiments may be a human.

In a further aspect, the invention provides a method for inducing cell mediated lysis of cancer cells in an individual suffering from cancer. In one embodiment, the method comprises administering to the individual an effective amount of an anti-HLA-G antibody or an anti-HLA-G/anti-CD3 bispecific antibody to induce cell mediated lysis of cancer cells in the individual suffering from cancer. In one embodiment, an "individual" is a human.

In a further aspect, the invention provides pharmaceutical formulations comprising any of the anti-HLA-G antibodies or anti-HLA-G/anti-CD3 bispecific antibodies provided herein, e.g., for use in any of the above therapeutic methods. In one embodiment, a pharmaceutical formulation comprises any of the anti-HLA-G antibodies or anti-HLA-G/anti-CD3 bispecific antibodies provided herein and a pharmaceutically acceptable carrier.

An antibody of the invention (and any additional therapeutic agent) can be administered by any suitable means, including parenteral, intrapulmonary, and intranasal, and, if desired for local treatment, intralesional administration. Parenteral infusions include intramuscular, intravenous, intra-arterial, intraperitoneal, or subcutaneous administration. Dosing can be by any suitable route, e.g. by injections, such as intravenous or subcutaneous injections, depending in part on whether the administration is brief or chronic. Various dosing schedules including but not limited to single or multiple administrations over various time-points, bolus administration, and pulse infusion are contemplated herein.

Antibodies of the invention would be formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners. The antibody need not be, but is optionally formulated with one or more agents currently used to prevent or treat the disorder in question. The effective amount of such other agents depends on the amount of antibody present in the formulation, the type of disorder or treatment, and other factors discussed above. These are generally used in the same dosages and with administration routes as described herein, or about from 1 to 99% of the dosages described herein, or in any dosage and by any route that is empirically/clinically determined to be appropriate.

For the prevention or treatment of disease, the appropriate dosage of an antibody of the invention (when used alone or in combination with one or more other additional therapeutic agents) will depend on the type of disease to be treated, the type of antibody, the severity and course of the disease, whether the antibody is administered for preventive or therapeutic purposes, previous therapy, the patient's clinical history and response to the antibody, and the discretion of the attending physician. The antibody is suitably administered to the patient at one time or over a series of treatments. Depending on the type and severity of the disease, about 1 µg/kg to 15 mg/kg (e.g. 0.5 mg/kg-10 mg/kg) of antibody can be an initial candidate dosage for administration to the patient, whether, for example, by one or more separate administrations, or by continuous infusion. One typical daily dosage might range from about 1 µg/kg to 100 mg/kg or more, depending on the factors mentioned above. For repeated administrations over several days or longer, depending on the condition, the treatment would generally be sustained until a desired suppression of disease symptoms occurs. One exemplary dosage of the antibody would be in the range from about 0.05 mg/kg to about 10 mg/kg. Thus, one or more doses of about 0.5 mg/kg, 2.0 mg/kg, 4.0 mg/kg or 10 mg/kg (or any combination thereof) may be administered to the patient. Such doses may be administered intermittently, e.g. every week or every three weeks (e.g. such that the patient receives from about two to about twenty, or e.g. about six doses of the antibody). An initial higher loading dose, followed by one or more lower doses may be administered. An exemplary dosing regimen comprises administering an initial loading dose of about 4 mg/kg, followed by a weekly maintenance dose of about 2 mg/kg of the antibody. However, other dosage regimens may be useful. The progress of this therapy is easily monitored by conventional techniques and assays.

It is understood that any of the above formulations or therapeutic methods may be carried out using an immunoconjugate of the invention in place of or in addition to an anti-HLA-G antibody or an anti-HLA-G/anti-CD3 bispecific antibody.

It is understood that any of the above formulations or therapeutic methods may be carried out using an immunoconjugate of the invention in place of or in addition to an anti-HLA-G antibody or an anti-HLA-G/anti-CD3 bispecific antibody.

II. Articles of Manufacture

In another aspect of the invention, an article of manufacture containing materials useful for the treatment, prevention and/or diagnosis of the disorders described above is provided. The article of manufacture comprises a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). At least one active agent in the composition is an antibody of the invention. The label or package insert indicates that the composition is used for treating the condition of choice. Moreover, the article of manufacture may comprise (a) a first container with a composition contained therein, wherein the composition comprises an antibody of the invention; and (b) a second container with a composition contained therein, wherein the composition comprises a further cytotoxic or otherwise therapeutic agent. The article of manufacture in this embodiment of the invention may further comprise a package insert indicating that the compositions can be used to treat a particular condition. Alternatively, or additionally, the article of manufacture may further comprise a second (or third) container comprising a pharmaceutically-acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

The following examples and figures are provided to aid the understanding of the present invention, the true scope of which is set forth in the appended claims. It is understood that modifications can be made in the procedures set forth without departing from the spirit of the invention.
Description of the Amino Acid Sequences
Anti-HLA-G Antibodies/Antigen Binding Moieties (SEQ ID Nos of Variable Regions and Complement Determining Regions (CDRs)):

SEQ ID NO: 1 heavy chain CDR-H1, HLA-G-0090
SEQ ID NO: 2 heavy chain CDR-H2, HLA-G-0090
SEQ ID NO: 3 heavy chain CDR-H3, HLA-G-0090
SEQ ID NO: 4 light chain CDR-L1, HLA-G-0090
SEQ ID NO: 5 light chain CDR-L2, HLA-G-0090
SEQ ID NO: 6 light chain CDR-L3, HLA-G-0090
SEQ ID NO: 7 heavy chain variable domain VH, HLA-G-0090
SEQ ID NO: 8 light chain variable domain VL, HLA-G-0090
SEQ ID NO: 9 light chain CDR-L1, HLA-G-0090-VL-N31 D
SEQ ID NO: 10 light chain variable domain VL, HLA-G-0090-VL-N31 D
SEQ ID NO: 11 light chain CDR-L1, HLA-G-0090-VL-N31 L SEQ ID NO: 12 light chain variable domain VL, HLA-G-0090-VL-N31 L
SEQ ID NO: 13 light chain CDR-L1, HLA-G-0090-VL-N31Q
SEQ ID NO: 14 light chain variable domain VL, HLA-G-0090-VL-N31Q
SEQ ID NO: 15 light chain CDR-L1, HLA-G-0090-VL-N31S
SEQ ID NO: 16 light chain variable domain VL, HLA-G-0090-VL-N31 S
SEQ ID NO: 17 light chain CDR-L1, HLA-G-0090-VL-N31T
SEQ ID NO: 18 light chain variable domain VL, HLA-G-0090-VL-N31T
SEQ ID NO: 19 light chain CDR-L1, HLA-G-0090-VL-N31Y
SEQ ID NO: 20 light chain variable domain VL, HLA-G-0090-VL-N31Y
SEQ ID NO: 21 light chain CDR-L1, HLA-G-0090-VL-N31Y-N38Y
SEQ ID NO: 22 light chain variable domain VL, HLA-G-0090-VL-N31Y-N38Y
SEQ ID NO: 23 light chain CDR-L1, HLA-G-0090-VL-S32P
SEQ ID NO: 24 light chain variable domain VL, HLA-G-0090-VL-S32P
SEQ ID NO: 25 light chain CDR-L1, HLA-G-0090-VL-S33A
SEQ ID NO: 26 light chain variable domain VL, HLA-G-0090-VL-S33A
SEQ ID NO: 27 light chain CDR-L1, HLA-G-0090-VL-S33D
SEQ ID NO: 28 light chain variable domain VL, HLA-G-0090-VL-S33D
SEQ ID NO: 29 light chain CDR-L1, HLA-G-0090-VL-S33P
SEQ ID NO: 30 light chain variable domain VL, HLA-G-0090-VL-S33P
Further Sequences
SEQ ID NO: 31 exemplary human HLA-G
SEQ ID NO: 32 exemplary human HLA-G extracellular domain (ECD)
SEQ ID NO: 33 exemplary human β2M
SEQ ID NO: 34 modified human HLA-G (wherein the HLA-G specific amino acids have been replaced by HLA-A consensus amino acids (=degrafted HLA-G see also FIG. 1) ECD)
SEQ ID NO: 35 exemplary human HLA-A2
SEQ ID NO: 36 exemplary human HLA-A2 ECD
SEQ ID NO: 37 exemplary mouse H2Kd ECD
SEQ ID NO: 38 exemplary rat RT1A ECD
SEQ ID NO: 39 exemplary human HLA-G β2M MHC class I complex
SEQ ID NO: 40 exemplary modified human HLA-G β2M MHC class I complex (wherein the HLA-G specific amino acids have been replaced by HLA-A consensus amino acids (=degrafted HLA-G) see also FIG. 2)
SEQ ID NO: 41 exemplary mouse H2Kd β2M MHC class I complex
SEQ ID NO: 42 exemplary human HLA-G/mouse H2Kd β2M MHC class I complex wherein the positions specific for human HLA-G are grafted onto the mouse H2Kd framework
SEQ ID NO: 43 exemplary rat RT1A β2M MHC class I complex
SEQ ID NO: 44 exemplary human HLA-G/rat RT1A β2M MHC class I complex wherein the positions specific for human HLA-G are grafted onto the rat RT1A framework
SEQ ID NO: 45 linker and his-Tag
SEQ ID NO: 46 peptide
SEQ ID NO: 47 human kappa light chain constant region
SEQ ID NO: 48 human lambda light chain constant region
SEQ ID NO: 49 human heavy chain constant region derived from IgG1
SEQ ID NO: 50 human heavy chain constant region derived from IgG1 with mutations L234A, L235A and P329G
SEQ ID NO: 51 human heavy chain constant region derived from IgG4
Anti-CD3 Antibodies/Antigen Binding Moieties (Variable Regions and Complementarity Determining Regions (CDRs)):
SEQ ID NO: 52 heavy chain CDR-H1, P035-093 (abbreviated as P035)
SEQ ID NO: 53 heavy chain CDR-H2, P035-093
SEQ ID NO: 54 heavy chain CDR-H3, P035-093
SEQ ID NO: 55 light chain CDR-L1, P035-093
SEQ ID NO: 56 light chain CDR-L2, P035-093
SEQ ID NO: 57 light chain CDR-L3, P035-093
SEQ ID NO: 58 heavy chain variable domain VH, P035-093
SEQ ID NO: 59 light chain variable domain VL, P035-093
SEQ ID NO: 60 heavy chain CDR-H1, Clone 22 (abbreviated as Cl22)
SEQ ID NO: 61 heavy chain CDR-H2, Clone 22
SEQ ID NO: 62 heavy chain CDR-H3, Clone 22
SEQ ID NO: 63 light chain CDR-L1, Clone 22
SEQ ID NO: 64 light chain CDR-L2, Clone 22
SEQ ID NO: 65 light chain CDR-L3, Clone 22
SEQ ID NO: 66 heavy chain variable domain VH, Clone 22
SEQ ID NO: 67 light chain variable domain VL, Clone 22
SEQ ID NO: 68 heavy chain CDR-H1, V9
SEQ ID NO: 69 heavy chain CDR-H2, V9
SEQ ID NO: 70 heavy chain CDR-H3, V9
SEQ ID NO: 71 light chain CDR-L1, V9
SEQ ID NO: 72 light chain CDR-L2, V9
SEQ ID NO: 73 light chain CDR-L3, V9
SEQ ID NO: 74 heavy chain variable domain VH, V9
SEQ ID NO: 75 light chain variable domain VL, V9
Bispecific Anti-HLA-G/Anti-CD3 T Cell Bispecific (TCB) Antibodies:
P1AF7977 (HLA-G-0090-VL-S32P/CD3 P035-093 (P035)):
SEQ ID NO: 76 light chain 1 P1AF7977
SEQ ID NO: 77 light chain 2 P1AF7977
SEQ ID NO: 78 heavy chain 1 P1AF7977
SEQ ID NO: 79 heavy chain 2 P1AF7977
P1AF7978 (HLA-G-0090-VL-S32P/CD3 Clone 22 (Cl22)):
SEQ ID NO: 80 light chain 1 P1AF7978
SEQ ID NO: 81 light chain 2 P1AF7978
SEQ ID NO: 82 heavy chain 1 P1AF7978
SEQ ID NO: 83 heavy chain 2 P1AF7978
P1AF7979 (HLA-G-0090-VL-S32P/CD3 V9):
SEQ ID NO: 84 light chain 1 P1AF7979
SEQ ID NO: 85 light chain 2 P1AF7979
SEQ ID NO: 86 heavy chain 1 P1AF7979
SEQ ID NO:87 heavy chain 2 P1AF7979

Further Sequences

SEQ ID NO: 88 exemplary human CD3
SEQ ID NO: 89 exemplary cynomolgus CD3
SEQ ID NO: 90 Human CD3 epsilon stalk-Fc(knob)-Avi
SEQ ID NO: 91 Human CD3 delta stalk-Fc (hole)-Avi
SEQ ID NO: 92 CD3$_{orig}$ VH
SEQ ID NO: 93 CD3$_{orig}$ VL
SEQ ID NO: 94 CD3$_{orig}$ IgG HC
SEQ ID NO: 95 P035 IgG HC
SEQ ID NO: 96 CD3$_{orig}$/P035 IgG LC The Amino Acid Sequences of HLA-G-0090 Antibody (Variable Regions with Underlined Complementarity Determining Regions (CDRs) and Unmodified N-Glycosylation Site in CDR-L1 (Bold)):

```
SEQ ID NO: 7: heavy chain variable
domain VH, HLA-G-0090:
QVQLQQSGPGLLKPSQTLSLTCAISGDSVSSNRAAWNW

IRQSPSRGLEWLGRTYYRSKWYNDYAVSVQGRITLIPD

TSKNQFSLRLNSVTPEDTAVYYCASVRAVAPFDYWGQG

VLVTVSS

SEQ ID NO: 8: light chain variable
domain VL, HLA-G-0090
DIVMTOSPDSLAVSLGERATINCKSSQSVLNSSNNKNN

LAWYQQQPGQPPKLLIYWASTRESGVPDRFSGSGSGTD

FTLTISSLQAEDVAVYFCQQYYRTPWTFGQGTKVEIK
```

The Amino Acid Sequences of Modified HLA-G-0090 Antibody Light Chain Variable Regions (with Underlined Complementarity Determining Regions (CDRs) and Modified N-Glycosylation Site in CDR-L1 (Bold)):

```
SEQ ID NO:10: light chain variable domain
VL, HLA-G-0090-N31D
DIVMTOSPDSLAVSLGERATINCKSSQSVD SSNNKNNLA

WYQQQPGQPPKLLIYWASTRESGVPDRFSGSGSGTDFTLTI

SSLQAEDVAVYFCQQYYRTPWTFGQGTKVEIK

SEQ ID NO: 12: light chain variable domain
VL, HLA-G-0090-N31L
DIVMTOSPDSLAVSLGERATINCKSSQSVL SSNNKNNLA

WYQQQPGQPPKLLIYWASTRESGVPDRFSGSGSGTDFTLTI

SSLQAEDVAVYFCQQYYRTPWTFGQGTKVEIK

SEQ ID NO: 14: light chain variable domain
VL, HLA-G-0090-N31Q
DIVMTOSPDSLAVSLGERATINCKSSQSVQ SSNNKNNLA

WYQQQPGQPPKLLIYWASTRESGVPDRFSGSGSGTDFTLTI

SSLQAEDVAVYFCQQYYRTPWTFGQGTKVEIK

SEQ ID NO: 16: light chain variable domain
VL, HLA-G-0090-N31S
DIVMTOSPDSLAVSLGERATINCKSSQSVS SSNNKNNLA

WYQQQPGQPPKLLIYWASTRESGVPDRFSGSGSGTDFTLT

ISSLQAEDVAVYFCQQYYRTPWTFGQGTKVEIK

SEQ ID NO: 18: light chain variable domain
VL, HLA-G-0090-N31T
DIVMTQSPDSLAVSLGERATINCKSSQSVT SSNNKNNLA

WYQQQPGQPPKLLIYWASTRESGVPDRFS

GSGSGTDFTLTISSLQAEDVAVYFCQQYYRTPWTFGQGTKVEIK

SEQ ID NO: 20: light chain variable domain
VL, HLA-G-0090-N31Y
DIVMTQSPDSLAVSLGERATINCKSSQSVY SSNNKNNLA

WYQQQPGQPPKLLIYWASTRESGVPDRFS

GSGSGTDFTLTISSLQAEDVAVYFCQQYYRTPWTFGQGTKVEIK

SEQ ID NO: 22: light chain variable domain
VL, HLA-G-0090-N31Y-N38Y
DIVMTQSPDSLAVSLGERATINCKSSQSVY SSNNKNYLA

WYQQQPGQPPKLLIYWASTRESGVPDRFS

GSGSGTDFTLTISSLQAEDVAVYFCQQYYRTPWTFGQGTKVEIK

SEQ ID NO: 24: light chain variable domain
VL, HLA-G-0090-S32P
DIVMTOSPDSLAVSLGERATINCKSSQSVLNPSNNKNNLA

WYQQQPGQPPKLLIYWASTRESGVPDRFS

GSGSGTDFTLTISSLQAEDVAVYFCQQYYRTPWTFGQGTKVEIK

SEQ ID NO: 26: light chain variable domain
VL, HLA-G-0090-S33A
DIVMTOSPDSLAVSLGERATINCKSSQSVLNSANNKNNLA

WYQQQPGQPPKLLIYWASTRESGVPDRFS

GSGSGTDFTLTISSLQAEDVAVYFCQQYYRTPWTFGQGTKVEIK

SEQ ID NO: 28: light chain variable domain
VL, HLA-G-0090-S33D
DIVMTOSPDSLAVSLGERATINCKSSQSVLNSDNNKNNLA

WYQQQPGQPPKLLIYWASTRESGVPDRFS

GSGSGTDFTLTISSLQAEDVAVYFCQQYYRTPWTFGQGTKVEIK

SEQ ID NO: 30: light chain variable domain
VL, HLA-G-0090-S33P
DIVMTOSPDSLAVSLGERATINCKSSQSVLNSPNNKNNLA

WYQQQPGQPPKLLIYWASTRESGVPDRFS

GSGSGTDFTLTISSLQAEDVAVYFCQQYYRTPWTFGQGTKVEIK
```

The Amino Acid Sequences of Anti-CD3 Binding Moieties (Variable Regions with Underlined Complementarity Determining Regions (CDRs)):

```
heavy chain variable domain VH,
P035-093 (abbreviates as P035)
                                    SEQ ID NO: 58
EVQLLESGGGLVQPGGSLRLSCAASGFTFSSYAMN

WVRQAPGKGLEWVSRIRSKYNNYATYYADSVKGRF

TISRDDSKNTLYLQMNSLRAEDTAVYYCVRASNFP

ASYVSYFAYWGQGTLVTVSS
``` light chain variable domain VL,
P035-093 (PO35)
SEQ ID NO: 59
QAVVTQEPSLTVSPGGTVTLTCGSSTGAVTTSNYA

NWVQEKPGQAFRGLIGGTNKRAPGTPARFSGSLLG

GKAALTLSGAQPEDEAEYYCALWYSNLWVFGGGTK

LTVL heavy chain variable domain VH,
Clone 22 (abbreviated as 022)
SEQ ID NO: 66
EVQLLESGGGLVQPGGSLRLSCAASGFQFSSYAMN

WVRQAPGKGLEWVSRIRSKYNNYATYYADSVKGRF

TISRDDSKNTLYLQMNSLRAEDTAVYYCVRHTTFP

SSYVSYYGYWGQGTLVTVSS

SEQ ID NO: 67
light chain variable domain VL, Clone 22
(CI22)
QAVVTQEPSLTVSPGGTVTLTCGSSTGAVTTSNYA

NWVQEKPGQAFRGLIGGTNKRAPGTPARFSGSLLG

GKAALTLSGAQPEDEAEYYCALWYSNLWVFGGGTK

LTVL heavy chain variable domain VH, V9
SEQ ID NO: 74
EVQLVESGGGLVQPGGSLRLSCAASGYSFTGYTMN

WVRQAPGKGLEWVALINPYKGVSTYNQKFKDRFTI

SVDKSKNTAYLQMNSLRAEDTAVYYCARSGYYGDS

DWYFDVWGQGTLVTVSS light chain variable domain VL, V9
SEQ ID NO: 75
DIQMTQSPSSLSASVGDRVTITCRASQDIRNYLNW

YQQKPGKAPKLLIYYTSRLESGVPSRFSGSGSGTD

YTLTISSLQPEDFATYYCQQGNTLPWTFGQGTKVE

IK

The Amino Acid Sequences of Bispecific Anti-HLA-G/Anti-CD3 T Cell Bispecific (TCB) Antibodies:
P1AF7977 (HLA-G-0090-VL-S32P/CD3 P035-093 (P035)):

light chain 1 P1AF7977
SEQ ID NO: 76
EVQLLESGGGLVQPGGSLRLSCAASGFTFSSYAMN

WVRQAPGKGLEWVSRIRSKYNNYATYYADSVKGRF

TISRDDSKNTLYLQMNSLRAEDTAVYYCVRASNFP

ASYVSYFAYWGQGTLVTVSSASVAAPSVFIFPPSD

EQLKSGTASVVCLLNNFYPREAKVQWKVDNALQSG

NSQESVTEQDSKDSTYSLSSTLTLSKADYEKHKVY

ACEVTHQGLSSPVTKSFNRGEC light chain 2 P1AF7977
SEQ ID NO: 77
DIVMTQSPDSLAVSLGERATINCKSSQSVLNPSNN

KNNLAWYQQKPGQPPKLLIYWASTRESGVPDRFSG

SGSGTDFTLTISSLQAEDVAVYFCQQYYRTPWTFG

QGTKVEIKRTVAAPSVFIFPPSDRKLKSGTASVVC

LLNNFYPREAKVQWKVDNALQSGNSQESVTEQDSK

DSTYSLSSTLTLSKADYEKHKVYACEVTHQGLSSP

VTKSFNRGEC heavy chain 1 P1AF7977
SEQ ID NO: 78
QVQLQQSGPGLLKPSQTLSLTCAISGDSVSSNRAA

WNWIRQSPSRGLEWLGRTYYRSKWYNDYAVSVQGR

ITLIPDTSKNQFSLRLNSVTPEDTAVYYCASVRAV

APFDYWGQGVLVTVSSASTKGPSVFPLAPSSKSTS

GGTAALGCLVEDYFPEPVTVSWNSGALTSGVHTFP

AVLQSSGLYSLSSVVTVPSSSLGTQTYICNVNHKP

SNTKVDEKVEPKSCDKTHTCPPCPAPEAAGGPSVF

LFPPKPKDTLMISRTPEVTCVVVDVSHEDPEVKFN

WYVDGVEVHNAKTKPREEQYNSTYRVVSVLTVLHQ

DWLNGKEYKCKVSNKALGAPIEKTISKAKGQPREP

QVCTLPPSRDELTKNQVSLSCAVKGFYPSDIAVEW

ESNGQPENNYKTTPPVLDSDGSFFLVSKLTVDKSR

WQQGNVFSCSVMHEALHNHYTQKSLSLSP heavy chain 2 P1AF7977
SEQ ID NO: 79
QVQLQQSGPGLLKPSQTLSLTCAISGDSVSSNRAA

WNWIRQSPSRGLEWLGRTYYRSKWYNDYAVSVQGR

ITLIPDTSKNQFSLRLNSVTPEDTAVYYCASVRAV

APFDYWGQGVLVTVSSASTKGPSVFPLAPSSKSTS

GGTAALGCLVEDYFPEPVTVSWNSGALTSGVHTFP

AVLQSSGLYSLSSVVTVPSSSLGTQTYICNVNHKP

SNTKVDEKVEPKSCDGGGSGGGGGQAVVTQEPSL

TVSPGGTVTLTCGSSTGAVTTSNYANWVQEKPGQA

FRGLIGGTNKRAPGTPARFSGSLLGGKAALTLSGA

QPEDEAEYYCALWYSNLWVFGGGTKLTVLSSASTK

GPSVFPLAPSSKSTSGGTAALGCLVKDYFPEPVTV

SWNSGALTSGVHTFPAVLQSSGLYSLSSVVTVPSS

SLGTQTYICNVNHKPSNTKVDKKVEPKSCDKTHTC

PPCPAPEAAGGPSVFLFPPKPKDTLMISRTPEVTC

VVVDVSHEDPEVKFNWYVDGVEVHNAKTKPREEQY

NSTYRVVSVLTVLHQDWLNGKEYKCKVSNKALGAP

IEKTISKAKGQPREPQVYTLPPCRDELTKNQVSLW

CLVKGFYPSDIAVEWESNGQPENNYKTTPPVLDSD

GSFFLYSKLTVDKSRWQQGNVFSCSVMHEALHNHY

TQKSLSLSP

P1AF7978 (HLA-G-0090-VL-S32P/CD3 Clone 22 (CI22)):

light chain 1 P1AF7978
SEQ ID NO: 80
EVQLLESGGGLVQPGGSLRLSCAASGFQFSSYAMN
WVRQAPGKGLEWVSRIRSKYNNYATYYADSVKGRF
TISRDDSKNTLYLQMNSLRAEDTAVYYCVRHTTFP
SSYVSYYGYWGQGTLVTVSSASVAAPSVFIFPPSD
EQLKSGTASVVCLLNNFYPREAKVQWKVDNALQSG
NSQESVTEQDSKDSTYSLSSTLTLSKADYEKHKVY
ACEVTHQGLSSPVTKSFNRGEC light chain 2 P1AF7978
SEQ ID NO: 81
DIVMTQSPDSLAVSLGERATINCKSSQSVLNPSNN
KNNLAWYQQKPGQPPKLLIYWASTRESGVPDRFSG
SGSGTDFTLTISSLQAEDVAVYFCQQYYRTPWTFG
QGTKVEIKRTVAAPSVFIFPPSDRKLKSGTASVVC
LLNNFYPREAKVQWKVDNALQSGNSQESVTEQDSK
DSTYSLSSTLTLSKADYEKHKVYACEVTHQGLSSP
VTKSFNRGEC heavy chain 1 P1AF7978
SEQ ID NO: 82
QVQLQQSGPGLLKPSQTLSLTCAISGDSVSSNRAA
WNWIRQSPSRGLEWLGRTYYRSKWYNDYAVSVQGR
ITLIPDTSKNQFSLRLNSVTPEDTAVYYCASVRAV
APFDYWGQGVLVTVSSASTKGPSVFPLAPSSKSTS
GGTAALGCLVEDYFPEPVTVSWNSGALTSGVHTFP
AVLQSSGLYSLSSVVTVPSSSLGTQTYICNVNHKP
SNTKVDEKVEPKSCDKTHTCPPCPAPEAAGGPSVF
LFPPKPKDTLMISRTPEVTCVVVDVSHEDPEVKFN
WYVDGVEVHNAKTKPREEQYNSTYRVVSVLTVLHQ
DWLNGKEYKCKVSNKALGAPIEKTISKAKGQPREP
QVCTLPPSRDELTKNQVSLSCAVKGFYPSDIAVEW
ESNGQPENNYKTTPPVLDSDGSFFLVSKLTVDKSR
WQQGNVFSCSVMHEALHNHYTQKSLSLSP heavy chain 2 P1AF7978
SEQ ID NO: 83
QVQLQQSGPGLLKPSQTLSLTCAISGDSVSSNRAA
WNWIRQSPSRGLEWLGRTYYRSKWYNDYAVSVQGR
ITLIPDTSKNQFSLRLNSVTPEDTAVYYCASVRAV
APFDYWGQGVLVTVSSASTKGPSVFPLAPSSKSTS
GGTAALGCLVEDYFPEPVTVSWNSGALTSGVHTFP
AVLQSSGLYSLSSVVTVPSSSLGTQTYICNVNHKP
SNTKVDEKVEPKSCDGGGGSGGGGGQAVVTQEPSL
TVSPGGTVTLTCGSSTGAVTTSNYANWVQEKPGQA -continued
FRGLIGGTNKRAPGTPARFSGSLLGGKAALTLSGA
QPEDEAEYYCALWYSNLWVFGGGTKLTVLSSASTK
GPSVFPLAPSSKSTSGGTAALGCLVKDYFPEPVTV
SWNSGALTSGVHTFPAVLQSSGLYSLSSVVTVPSS
SLGTQTYICNVNHKPSNTKVDKKVEPKSCDKTHTC
PPCPAPEAAGGPSVFLFPPKPKDTLMISRTPEVTC
VVVDVSHEDPEVKFNWYVDGVEVHNAKTKPREEQY
NSTYRVVSVLTVLHQDWLNGKEYKCKVSNKALGAP
IEKTISKAKGQPREPQVYTLPPCRDELTKNQVSLW
CLVKGFYPSDIAVEWESNGQPENNYKTTPPVLDSD
GSFFLYSKLTVDKSRWQQGNVFSCSVMHEALHNHY
TQKSLSLSP

P1AF7979 (HLA-G-0090-VL-S32P/CD3 V9):

light chain 1 P1 AF7979
SEQ ID NO: 84
EVQLVESGGGLVQPGGSLRLSCAASGYSFTGYTMN
WVRQAPGKGLEWVALINPYKGVSTYNQKFKDRFTI
SVDKSKNTAYLQMNSLRAEDTAVYYCARSGYYGDS
DWYFDVWGQGTLVTVSSASVAAPSVFIFPPSDEQL
KSGTASVVCLLNNFYPREAKVQWKVDNALQSGNSQ
ESVTEQDSKDSTYSLSSTLTLSKADYEKHKVYACE
VTHQGLSSPVTKSFNRGEC light chain 2 P1AF7979
SEQ ID NO: 85
DIVMTQSPDSLAVSLGERATINCKSSQSVLNPSNN
KNNLAWYQQKPGQPPKLLIYWASTRESGVPDRFSG
SGSGTDFTLTISSLQAEDVAVYFCQQYYRTPWTFG
QGTKVEIKRTVAAPSVFIFPPSDRKLKSGTASVVC
LLNNFYPREAKVQWKVDNALQSGNSQESVTEQDSK
DSTYSLSSTLTLSKADYEKHKVYACEVTHQGLSSP
VTKSFNRGEC heavy chain 1 P1AF7979
SEQ ID NO: 86
QVQLQQSGPGLLKPSQTLSLTCAISGDSVSSNRAA
WNWIRQSPSRGLEWLGRTYYRSKWYNDYAVSVQGR
ITLIPDTSKNQFSLRLNSVTPEDTAVYYCASVRAV
APFDYWGQGVLVTVSSASTKGPSVFPLAPSSKSTS
GGTAALGCLVEDYFPEPVTVSWNSGALTSGVHTFP
AVLQSSGLYSLSSVVTVPSSSLGTQTYICNVNHKP
SNTKVDEKVEPKSCDKTHTCPPCPAPEAAGGPSVF
LFPPKPKDTLMISRTPEVTCVVVDVSHEDPEVKFN
WYVDGVEVHNAKTKPREEQYNSTYRVVSVLTVLHQ
DWLNGKEYKCKVSNKALGAPIEKTISKAKGQPREP -continued

```
QVCTLPPSRDELTKNQVSLSCAVKGFYPSDIAVEW

ESNGQPENNYKTTPPVLDSDGSFFLVSKLTVDKSR

WQQGNVFSCSVMHEALHNHYTQKSLSLSP heavy chain 2 P1AF7979
                                   SEQ ID NO: 87
QVQLQQSGPGLLKPSQTLSLTCAISGDSVSSNRAA

WNWIRQSPSRGLEWLGRTYYRSKWYNDYAVSVQGR

ITLIPDTSKNQFSLRLNSVTPEDTAVYYCASVRAV

APFDYWGQGVLVTVSSASTKGPSVFPLAPSSKSTS

GGTAALGCLVEDYFPEPVTVSWNSGALTSGVHTFP

AVLQSSGLYSLSSVVTVPSSSLGTQTYICNVNHKP

SNTKVDEKVEPKSCDGGGSGGGGGDIQMTQSPSS

LSASVGDRVTITCRASQDIRNYLNWYQQKPGKAPK

LLIYYTSRLESGVPSRFSGSGSGTDYTLTISSLQP

EDFATYYCQQGNTLPWTFGQGTKVEIKSSASTKGP

SVFPLAPSSKSTSGGTAALGCLVKDYFPEPVTVSW

NSGALTSGVHTFPAVLQSSGLYSLSSVVTVPSSSL

GTQTYICNVNHKPSNTKVDKKVEPKSCDKTHTCPP

CPAPEAAGGPSVFLFPPKPKDTLMISRTPEVTCVV

VDVSHEDPEVKFNWYVDGVEVHNAKTKPREEQYNS

TYRVVSVLTVLHQDWLNGKEYKCKVSNKALGAPIE

KTISKAKGQPREPQVYTLPPCRDELTKNQVSLWCL

VKGFYPSDIAVEWESNGQPENNYKTTPPVLDSDGS

FFLYSKLTVDKSRWQQGNVFSCSVMHEALHNHYTQ

KSLSLSP
```

In the Following Specific Embodiments of the Invention are Listed:

1. An antibody that binds to human HLA-G comprising
   A) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23; (ii) CDR-L2 comprising the amino acid sequence of SEQ ID NO:5 and (iii) CDR-L3 comprising the amino acid sequence of SEQ ID NO:6, or
   B) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:25; (ii) CDR-L2 comprising the amino acid sequence of SEQ ID NO:5 and (iii) CDR-L3 comprising the amino acid sequence of SEQ ID NO:6.
2. The antibody according to embodiment 1, wherein the antibody
   A) comprises a VH domain comprising the amino acid sequence of SEQ ID NO:7 and a VL domain comprising the amino acid sequence of SEQ ID NO:24; or
   B) comprises a VH domain comprising the amino acid sequence of SEQ ID NO:7 and a VL domain comprising the amino acid sequence of SEQ ID NO:26.
3. The antibody according to any one of embodiments 1 or 2, wherein the antibody comprises a Fc domain of human origin, particularly of the IgG isotype, more particularly of the IgG$_1$ isotype.
4. The antibody according to any one of embodiments 1 or 2, wherein the antibody comprises a constant region of human origin, particularly of the IgG isotype, more particularly of the IgG$_1$ isotype, comprising a human CH1, CH2, CH3 and/or CL domain.
5. The antibody according to any one of embodiment 1 to 4, wherein the antibody
   a) has improved binding properties with respect to maximal binding (Rmax) and/or binding affinity (KD) compared to the (parental) antibody that comprises a VH domain comprising the amino acid sequence of SEQ ID NO:7 and a VL domain comprising the amino acid sequence of SEQ ID NO:8 (as shown in Example 2).
   b) does not crossreact with a modified human HLA-G β2M MHC I complex, wherein the HLA-G specific amino acids have been replaced by HLA-A consensus amino acids, the complex comprising SEQ ID NO:40 (as shown in Example 2); and/or
   c) does not crossreact with a mouse H2Kd β2M MHC I complex comprising SEQ ID NO:41 (as shown in Example 2); and/or
   d) does not crossreact with rat RT1A β2M MHC I complex comprising SEQ ID NO:43 (as shown in Example 2).
6. The antibody according to any one of embodiments 1 to 3, wherein the antibody
   a) inhibits ILT2 binding to (HLA-G expressed on) JEG3 cells (ATCC No. HTB36) (as shown in Example 5); or
   b) binds to (HLA-G expressed on) JEG3 cells (ATCC No. HTB36), and inhibits ILT2 binding to (HLA-G expressed on) JEG-3 cells (ATCC No. HTB36) (as shown in Example 5).
7. The antibody according to any one of embodiments 1 to 4, wherein the antibody is a multispecific antibody (preferably a bispecific antibody).
8. The antibody according to embodiment 7, wherein the antibody is a bispecific antibody that binds to human HLA-G and to human CD3.
9. The antibody according to embodiment 7, wherein the antibody is a bispecific antibody that binds to human HLA-G and to human CD3, comprising a first antigen binding moiety that binds to human HLA-G and a second antigen binding moiety that binds to human CD3, wherein the first antigen binding moiety that binds to human HLA-G comprises
   A) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23; (ii) CDR-L2 comprising the amino acid sequence of SEQ ID NO:5 and (iii) CDR-L3 comprising the amino acid sequence of SEQ ID NO:6, or
   B) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:25; (ii) CDR-L2 comprising the amino acid sequence of SEQ ID NO:5 and (iii) CDR-L3 comprising the amino acid sequence of SEQ ID NO:6;

and wherein the second antigen binding moiety that binds to a T cell activating antigen binds to human CD3 comprises C) (a) a VH domain comprising (i) CDR-H1 comprising the amino acid sequence of SEQ ID NO:52, (ii) CDR-H2 comprising the amino acid sequence of SEQ ID NO:53, and (iii) CDR-H3 comprising the amino acid sequence of SEQ ID NO:54; and (b) a VL domain comprising (i) CDR-L1 comprising the amino acid sequence of SEQ ID NO:55; (ii) CDR-L2 comprising the amino acid sequence of SEQ ID NO:56 and (iii) CDR-L3 comprising the amino acid sequence of SEQ ID NO:57, or D) (a) a VH domain comprising (i) CDR-H1 comprising the amino acid sequence of SEQ ID NO:60, (ii) CDR-H2 comprising the amino acid sequence of SEQ ID NO:61, and (iii) CDR-H3 comprising the amino acid sequence of SEQ ID NO:62; and (b) a VL domain comprising (i) CDR-L1 comprising the amino acid sequence of SEQ ID NO:63; (ii) CDR-L2 comprising the amino acid sequence of SEQ ID NO:64 and (iii) CDR-L3 comprising the amino acid sequence of SEQ ID NO:65, or E) (a) a VH domain comprising (i) CDR-H1 comprising the amino acid sequence of SEQ ID NO:68, (ii) CDR-H2 comprising the amino acid sequence of SEQ ID NO:69, and (iii) CDR-H3 comprising the amino acid sequence of SEQ ID NO:70; and (b) a VL domain comprising (i) CDR-L1 comprising the amino acid sequence of SEQ ID NO:71; (ii) CDR-L2 comprising the amino acid sequence of SEQ ID NO:72 and (iii) CDR-L3 comprising the amino acid sequence of SEQ ID NO:73.

10. The bispecific antibody according to embodiment 9, wherein the first antigen binding moiety A) comprises a VH domain comprising the amino acid sequence of SEQ ID NO:7 and a VL domain comprising the amino acid sequence of SEQ ID NO:24; or B) comprises a VH domain comprising the amino acid sequence of SEQ ID NO:7 and a VL domain comprising the amino acid sequence of SEQ ID NO:26, and wherein the second antigen binding moiety C) comprises a VH domain comprising the amino acid sequence of SEQ ID NO:58 and a VL domain comprising the amino acid sequence of SEQ ID NO:59; or D) comprises a VH domain comprising the amino acid sequence of SEQ ID NO:66 and a VL domain comprising the amino acid sequence of SEQ ID NO:67; or E) comprises a VH domain comprising the amino acid sequence of SEQ ID NO:74 and a VL domain comprising the amino acid sequence of SEQ ID NO:75.

11. The bispecific antibody according to embodiment 10, wherein the first antigen binding moiety comprises a VH domain comprising the amino acid sequence of SEQ ID NO:7 and a VL domain comprising the amino acid sequence of SEQ ID NO:24;

and wherein the second antigen binding moiety comprises a VH domain comprising the amino acid sequence of SEQ ID NO:58 and a VL domain comprising the amino acid sequence of SEQ ID NO:59.

12. The bispecific antibody according to embodiment 108, wherein the first antigen binding moiety comprises a VH domain comprising the amino acid sequence of SEQ ID NO:7 and a VL domain comprising the amino acid sequence of SEQ ID NO:24;

and wherein the second antigen binding moiety comprises a VH domain comprising the amino acid sequence of SEQ ID NO:66 and a VL domain comprising the amino acid sequence of SEQ ID NO:67.

13. The bispecific antibody according to embodiment 10, wherein the first antigen binding moiety comprises a VH domain comprising the amino acid sequence of SEQ ID NO:7 and a VL domain comprising the amino acid sequence of SEQ ID NO:24;

and wherein the second antigen binding moiety comprises a VH domain comprising the amino acid sequence of SEQ ID NO:74 and a VL domain comprising the amino acid sequence of SEQ ID NO:75.

14. The bispecific antibody according to any one of embodiments 8 to 13, wherein the bispecific antibody shows a) inhibition of ILT2 and/or ILT4 binding to HLA-G (as shown in Example 13); and/or b) antibody mediated IFN gamma secretion by T cells on SKOV3 cells transfected with recombinant HLA-G (SKOV3 HLA-G) and/or on JEG3 cells expressing endogenous HLA-G wherein the IFN gamma secretion was detected (by Luminex technology) (as shown in Example 14); and or c) T cell mediated cytotoxicity/tumor cell killing on SKOV3 cells transfected with recombinant HLA-G (SKOV 3HLA-G) and/or JEG3 cells expressing endogenous HLA-G wherein the cytotoxicity was detected by measuring Caspase 8 activation in cells after treatment with bispecific antibody (as shown in Example 15); and/or d) in vivo anti-tumor efficacy/tumor regression in humanized NSG mice bearing SKOV3 human ovarian carcinoma transfected with recombinant HLA-G (SKOV3 HLA-G) humanized NSG mice (as shown in Example 16); and/or e) in vivo anti-tumor efficacy/tumor of HLA-G CD3 T cell bi-specific in humanized NSG mice bearing human breast cancer PDX tumors (BC004) (as shown in Example 17).

15. The bispecific antibody of any one of embodiments 9 to 14, wherein the first and the second antigen binding moiety is a Fab molecule.

16. The bispecific antibody of any one of embodiments 9 to 15, wherein the second antigen binding moiety is a Fab molecule wherein the variable domains VL and VH or the constant domains CL and CH1, particularly the variable domains VL and VH, of the Fab light chain and the Fab heavy chain are replaced by each other.

17. The bispecific antibody of any one of embodiments 9 to 16, wherein the first antigen binding moiety is a Fab molecule wherein in the constant domain the amino acid at position 124 is substituted independently by lysine (K), arginine (R) or histidine (H) (numbering according to Kabat) and the amino acid at position 123 is substituted independently by lysine (K), arginine (R) or histidine (H) (numbering according to Kabat), and in the constant domain CH1 the amino acid at position 147 is substituted independently by glutamic acid (E), or aspartic acid (D) (numbering according to Kabat EU index) and the amino acid at position 213 is substituted independently by glutamic acid (E), or aspartic acid (D) (numbering according to Kabat EU index).

18. The bispecific antibody of any one of embodiments 9 to 17, comprising a third antigen binding moiety, wherein the third antigen moiety is identical to the first antigen binding moiety.
19. The bispecific antibody of any one of embodiments 9 to 18, comprising an Fc domain composed of a first and a second subunit.
20. The bispecific antibody of embodiment 19 wherein the first, the second and, where present, the third antigen binding moiety are each a Fab molecule; and wherein either (i) the second antigen binding moiety is fused at the C-terminus of the Fab heavy chain to the N-terminus of the Fab heavy chain of the first antigen binding moiety and the first antigen binding moiety is fused at the C-terminus of the Fab heavy chain to the N-terminus of the first subunit of the Fc domain, or (ii) the first antigen binding moiety is fused at the C-terminus of the Fab heavy chain to the N-terminus of the Fab heavy chain of the second antigen binding moiety and the second antigen binding moiety is fused at the C-terminus of the Fab heavy chain to the N-terminus of the first subunit of the Fc domain;
and wherein the third antigen binding moiety, where present, is fused at the C-terminus of the Fab heavy chain to the N-terminus of the second subunit of the Fc domain.
21. The bispecific antibody of embodiment 19 or 20, wherein the Fc domain is a human IgG Fc domain, particularly of the $IgG_1$ isotype.
22. The bispecific antibody of any one of embodiments 19 or 20, wherein the Fc domain comprises one or more amino acid substitution that reduces binding to an Fc receptor and/or effector function.
23. The bispecific antibody according to embodiment 22, wherein the antibody is of the $IgG_1$ isotype with mutations L234A, L235A and P329G (numbering according to the EU index of Kabat).
24. The bispecific antibody of any one of embodiments 19 to 23, wherein an amino acid residue in the CH3 domain of the first subunit of the Fc domain is replaced with an amino acid residue having a larger side chain volume, thereby generating a protuberance within the CH3 domain of the first subunit which is positionable in a cavity within the CH3 domain of the second subunit, and an amino acid residue in the CH3 domain of the second subunit of the Fc domain is replaced with an amino acid residue having a smaller side chain volume, thereby generating a cavity within the CH3 domain of the second subunit within which the protuberance within the CH3 domain of the first subunit is positionable.
25. The bispecific antibody according to embodiment 24, wherein the antibody is of IgG1 isotype with mutation T366W in the first subunit of the Fc domain and with mutations Y407V, T366S and L368A in the second subunit of the Fc domain (numberings according to Kabat EU index).
26. The bispecific antibody according to embodiment 25, wherein the antibody comprises an additional mutation S354C in the first subunit of the Fc domain and an additional mutation Y349C in the second subunit of the Fc domain (numberings according to Kabat EU index).
27. The bispecific antibody according to embodiment 25, wherein the antibody comprises an additional mutation Y349C in the first subunit of the Fc domain and an additional S354C mutation in the second subunit of the Fc domain (numberings according to Kabat EU index).
28. Isolated nucleic acid encoding the antibody according to any one of embodiments 1–4 or the bispecific antibody according to any one of embodiments 9-27.
29. A host cell, preferably an eukaryotic host cell, comprising the nucleic acid of embodiment 28.
30. A method of producing the antibody according to any one of embodiments 1-4 or the bispecific antibody according to any one of embodiments 9-227 comprising culturing the host cell of embodiment 29 so that the antibody or bispecific antibody is produced.
31. The method of embodiment 30, further comprising recovering the antibody or bispecific antibody from the host cell.
32. The antibody according to any one of embodiments 1-4 or the bispecific antibody according to any one of embodiments 9-27, wherein the antibody is produced according to a method of embodiments 30 to 31 and wherein the host cell is an eukaryotic host cell (in one preferred embodiment a mammalian host cell, in another preferred embodiment a CHO cell).
33. The antibody according to any one of embodiments 1-4 or the bispecific antibody according to any one of embodiments 9-27, wherein the antibody is produced in an eukaryotic host cell (in one preferred embodiment a mammalian host cell, in another preferred embodiment a CHO cell).
34. The antibody according to any one of embodiments 1-4 or the bispecific antibody according to any one of embodiments 9-27 for use as a medicament.
35. The antibody according to any one of embodiments 1-4 or the bispecific antibody according to any one of embodiments 9-27 for use in treating cancer.
36. Use of the antibody according to any one of embodiments 1-4 or the bispecific antibody according to any one of embodiments 9-27 in the manufacture of a medicament.
37. The use of embodiment 36, wherein the medicament is for treatment of cancer.
38. A method of treating an individual having cancer comprising administering to the individual an effective amount of the antibody according to any one of embodiments 1-4 or the bispecific antibody according to any one of embodiments 9-27.

EXAMPLES

Recombinant DNA Techniques

Standard methods were used to manipulate DNA as described in Sambrook, J. et al., Molecular cloning: A laboratory manual; Cold Spring Harbor Laboratory Press, Cold Spring Harbor, New York, 1989. The molecular biological reagents were used according to the manufacturer's instructions.

Gene and Oligonucleotide Synthesis

Desired gene segments were prepared by chemical synthesis at Geneart GmbH (Regensburg, Germany). The synthesized gene fragments were cloned into an *E. coli* plasmid for propagation/amplification. The DNA sequences of subcloned gene fragments were verified by DNA sequencing. Alternatively, short synthetic DNA fragments were assembled by annealing chemically synthesized oligonucleotides or via PCR. The respective oligonucleotides were prepared by metabion GmbH (Planegg-Martinsried, Germany)

Description of the Basic/Standard Mammalian Expression Plasmid

For the expression of a desired gene/protein (e.g. full length antibody heavy chain, full length antibody light chain, or an MHC class I molecule, e.g. HLA-G, or an MHC class I molecule fused to peptide and beta-2 microglobulin, e.g. HLA-G fused to HLA-G binding peptide and or beta-2 microglobulin) a transcription unit comprising the following functional elements is used:

- the immediate early enhancer and promoter from the human cytomegalovirus (P-CMV) including intron A,
- a human heavy chain immunoglobulin 5'-untranslated region (5'UTR),
- a murine immunoglobulin heavy chain signal sequence,
- a gene/protein to be expressed (e.g. full length antibody heavy chain or MHC class I molecule), and
- the bovine growth hormone polyadenylation sequence (BGH pA).

Beside the expression unit/cassette including the desired gene to be expressed the basic/standard mammalian expression plasmid contains

- an origin of replication from the vector pUC18 which allows replication of this plasmid in *E. coli*, and
- a beta-lactamase gene which confers ampicillin resistance in *E. coli*.

Protein Determination

The protein concentration of purified polypeptides was determined by determining the optical density (OD) at 280 nm, using the molar extinction coefficient calculated on the basis of the amino acid sequence of the polypeptide.

Example 1

Generation of HLA-G Chimeric Molecules

Due to high homology (>98%) with other MHC I molecules, immunisation with HLA-G molecules results in generation of polyclonal sera, composed of a mixture of MHC-I crossreactive antibodies as well as truly HLA-G specific antibodies.

So far no tools have been provided to select truly HLA-G specific antibodies without crossreactivity to other human MHC-I (e.g. HLA-A), and to further select those with receptor blocking function.

We identified unique HLA-G positions in combination to positions necessary for structural conformity and receptor interaction (ILT2/4 and KIR2DL4.)

Unique and proximal positions of human HLA-G were then "grafted" on MHC class I complex molecules from different rodent species (such as rat RT1A and mouse H2kd) to generate "chimeric" immunogen/screening antigens.

Antibodies generated were subjected to stringent screening/testing for binding/specificity, (and no crossreactivity/no specificity to counter antigens, respectively)

Antigens for Binding Testing:
- rec. HLA-G expressed as human HLA-G β2M MHC complex comprising SEQ ID NO: 43
- HLA-G specific sequences grafted onto rat RT-1 and mouse H2kd (SEQ ID NO: 46: human HLA-G/mouse H2Kd β2M MHC class I complex wherein the positions specific for human HLA-G are grafted onto the mouse H2Kd framework and SEQ ID NO: 48: human HLA-G/rat RT1A β2M MHC class I complex wherein the positions specific for human HLA-G are grafted onto the rat RT1A framework)
- Natural HLA-G MHC class I complex expressing cells (e.g. Jeg3 cells), or human HLA-G transfected cell lines SKOV3 HLA-G+ and PA-TU-8902 HLA-G+

Counter Antigens for Crossreactivity Testing:
- Counter antigens (MHC class I complexes) with other HLA-A sequences (HLA-A2 and HLA-G$^{degrafted\ with\ HLA-A\ consensus\ sequence}$) combined with different peptides) (see e.g. SEQ ID NO 35 (HLA-A2) and SEQ ID NO: 40 HLA-A consensus sequence on HLA-G framework)
- Counter antigens (MHC class I complexes) from other species such as rat RT-1 and mouse H2kd (SEQ ID NO: 43 and SEQ ID NO: 41)
- Unmodified tumor cell lines SKOV3 and PA-TU-8902, which are characterized by absence of HLA-G expression.

Design of Chimeric HLA-G Antigens to Determine the Specific Binding of Anti-HLA-G Antibodies (See FIG. 2):

Design of a chimeric rat MHC I molecule (RT1-A) carrying HLA-G unique positions (SEQ ID NO: 44) for use in for use in binding assays:

HLA-G unique positions were identified by the alignment of 2579 HLA-A, 3283 HLA-B, 2133 HLA-C, 15 HLA-E, 22 HLA-F, and 50 HLA-G sequences from IMGT (as available on 6 Feb. 2014). Those residues of HLA-G that occur in less than 1% (mostly ~0%) of the sequences of any of the 3 sequence sets HLA-A, HLA-B, and a combined set of HLA-C+HLA-E+HLA-F are called HLA-G unique positions.

The 4 core HLA-G unique positions (2 in alpha-1 and 2 in alpha-3) show no polymorphism in the set of HLA-G sequences and none of the other HLA genes contain the HLA-G specific residues at these positions (except 1×HLA-A for M100, 1×HLA-B for 0103, and 1×HLA-C for 0103).

The crystal structure of rat RT1-A (Rudolph, M. G. et al. J. Mol. Biol. 324: 975-990 (2002); PDB code: 1 KJM) was superimposed on the crystal structure of human HLA-G (Clements, C. S. et al. PROC. NATL. ACAD. SCI. USA 102: 3360-3365 (2005); PDB code: 1YDP). The overall structure of the alpha-chain and the associated beta-2-microglobulin is conserved.

HLA-G unique positions were identified in the RT1-A structure by comparison of the sequence and structural alignments. In a first step, unique HLA-G positions were identified that are exposed on the molecular surface of HLA-G and RT1-A and thus accessible for an antibody. Unique positions that are buried within the protein fold were excluded for engineering. In a second step, structurally proximal residues were identified, that also need to be exchanged to make the corresponding region "HLA-G-like", i.e. to generate real HLA-G epitopes containing the unique positions rather than generating HLA-G/rat RT1-A chimeric epitopes that would be artificial. All the positions that were thus selected for mutation were analyzed for structural fit of the respective residue from HLA-G to avoid possible local disturbances of the molecular structure upon mutation.

A chimeric mouse MHC I molecule (H2Kd) carrying HLA-G unique positions (SEQ ID NO: 42) for use in binding assays was generated analogously.

Design of HLA-A Based Counter Antigens by "De-Grafting" of HLA-G Unique Positions Towards a HLA-A Consensus Sequence for Crossreactivity Testing (SEQ ID NO:40=Modified Human HLA-G β2M MHC Class I Complex (Wherein the HLA-G Specific Amino Acids have been Replaced by HLA-A Consensus Amino Acids (=Degrafted HLA-G))

Unique positions derived from the multiple sequence alignment were analyzed in a crystal structure of human HLA-G (PDB code: 1YDP). First, positions that are not exposed on the HLA-G surface and are thus not accessible for an antibody were excluded for engineering. Second, the surface exposed residues were analyzed for feasibility of amino acid exchange (i.e. exclusion of possible local disturbances of the molecular structure upon mutation of the relevant position). In total, 14 positions were validated for exchange. The amino acids in the validated positions were mutated towards a HLA-A consensus sequence derived from a multiple sequence alignment of 2579 HLA-A sequences downloaded from IMGT (as available on 6 Feb. 2014).

Generation of Expression Plasmids for Soluble Classical and Non-Classical MHC Class I Molecules The recombinant MHC class I genes encode N-terminally extended fusion molecules consisting of a peptide know to be bound by the respective MHC class I molecule, beta-2 microglobulin, and the respective MHC class I molecule.

The expression plasmids for the transient expression of soluble MHC class I molecules comprised besides the soluble MHC class I molecule expression cassette an origin of replication from the vector pUC18, which allows replication of this plasmid in *E. coli*, and a beta-lactamase gene which confers ampicillin resistance in *E. coli*.

The transcription unit of the soluble MHC class I molecule comprised the following functional elements:
- the immediate early enhancer and promoter from the human cytomegalovirus (P-CMV) including intron A,
- a human heavy chain immunoglobulin 5'-untranslated region (5'UTR),
- a murine immunoglobulin heavy chain signal sequence,
- an N-terminally truncated *S. aureus* sortase A encoding nucleic acid, and
- the bovine growth hormone polyadenylation sequence (BGH pA).

The amino acid sequences of the mature soluble MHC class I molecules derived from the various species are:
- SEQ ID NO: 39: exemplary human HLA-G β2M MHC class I complex
- SEQ ID NO: 40: exemplary modified human HLA-G β2M MHC class I complex (wherein the HLA-G specific amino acids have been replaced by HLA consensus amino acids (=degrafted HLA-G see also FIG. 2)
- SEQ ID NO: 41: exemplary mouse H2Kd β2M MHC class I complex
- SEQ ID NO: 42: exemplary human HLA-G/mouse H2Kd β2M MHC complex wherein the positions specific for human HLA-G are grafted onto the mouse H2Kd framework
- SEQ ID NO: 43: exemplary rat RT1A β2M MHC class I complex
- SEQ ID NO: 44: exemplary human HLA-G/rat RT1A β2M MHC complex wherein the positions specific for human HLA-G are grafted onto the rat RT1A framework For the exemplary HLA-A2 β2M MHC class I complex the following components were used and the complex was expressed in *E. Coli* and purified.

MHCI complex HLA-A2/b2M (SEQ ID NOs 35 and 33) (both with an additional N-terminal methionine)+VLD-FAPPGA peptide (SEQ ID NO: 46)+linker and his-Tag (SEQ ID NO: 45)

Example 2

Removal of N-Glycosylation Motif in CDR-L1

The CDR-L1 of anti-HLA-G antibody HLA-G-0090 contains a classical N-glycosylation motif "NSS" comprising positions 31 to 33 of the light chain (LC). It was decided to remove this motif as it could constitute a potential developability liability. An homology model of the variable region of HLA-G-0090 indicated that LC positions 31 to 33 are highly solvent accessible. Furthermore, the side chains of N31 and S32 are predicted to point inwards, in the direction of CDR-H3, making them likely candidates for being part of the antibody paratope. In fact, a number of published antibody-antigen X-ray complex structures document these residues to be undergoing chemical interactions with the antigen. Therefore, the risk of worsening the binding affinity of the antibody by introducing mutations at LC positions 31-33 was considered high. To ameliorate the risk, 11 different variants of antibody HLA-G-0090 with mutations on LC positions 31, 32, and 33 were designed and produced in HEK293F cells in an IgG1 format.

Note that mutant variant HLA-G-0090-VL-N31Y-N38Y contained a second mutation (N38Y), apart from the N-glycosylation motif, and not related to its removal, to increase germline identity.

Summary of Anti-HLA-G Antibody Sequences (SEQ ID NOs of Variable Regions and CDRs):

| | CDR-H1 | CDR-H2 | CDR-H3 | CDR-L1 | CDR-L2 | CDR-L3 | VH | VL |
|---|---|---|---|---|---|---|---|---|
| | | | | Anti-HLA-G antibody | | | | |
| | SEQ ID NO: | SEQ ID NO: | SEQ ID NO: | SEQ ID NO: | SEQ ID NO: | SEQ ID NO: | SEQ ID NO: | SEQ ID NO: |
| HLA-G-0090 | 1 | 2 | 3 | 4 | 5 | 6 | 7 | 8 |
| HLA-G-0090-VL-N31D | 1 | 2 | 3 | 9 | 5 | 6 | 7 | 10 |
| HLA-G-0090-VL-N31L | 1 | 2 | 3 | 11 | 5 | 6 | 7 | 12 |
| HLA-G-0090-VL-N31Q | 1 | 2 | 3 | 13 | 5 | 6 | 7 | 14 |
| HLA-G-0090-VL-N31S | 1 | 2 | 3 | 15 | 5 | 6 | 7 | 16 |
| HLA-G-0090-VL-N31T | 1 | 2 | 3 | 17 | 5 | 6 | 7 | 18 |
| HLA-G-0090-VL-N31Y | 1 | 2 | 3 | 19 | 5 | 6 | 7 | 20 |
| HLA-G-0090-VL-N31Y-N38Y | 1 | 2 | 3 | 21 | 5 | 6 | 7 | 22 |
| HLA-G-0090-VL-S32P | 1 | 2 | 3 | 23 | 5 | 6 | 7 | 24 |

-continued

| | CDR-H1 | CDR-H2 | CDR-H3 | CDR-L1 | CDR-L2 | CDR-L3 | VH | VL |
|---|---|---|---|---|---|---|---|---|
| | | | | Anti-HLA-G antibody | | | | |
| | SEQ ID NO: | SEQ ID NO: | SEQ ID NO: | SEQ ID NO: | SEQ ID NO: | SEQ ID NO: | SEQ ID NO: | SEQ ID NO: |
| HLA-G-0090-VL-S33A | 1 | 2 | 3 | 25 | 5 | 6 | 7 | 26 |
| HLA-G-0090-VL-S33D | 1 | 2 | 3 | 27 | 5 | 6 | 7 | 28 |
| HLA-G-0090-VL-S33P | 1 | 2 | 3 | 29 | 5 | 6 | 7 | 30 |

Binding and other properties of the obtained anti-HLA-G specific antibodies and biological activities were determined as described in the following Examples, and compared to the known reference, HLA-G-0090.

Expression and Purification

The expression yields from a 0.5 L expression in HEK293F cells after purification by affinity chromatography (MabSelect Sure) and dialysis are shown in the following table.

| | mg | Monomer Content [%] (analytical SEC) | Purity [%] (Caliper) |
|---|---|---|---|
| HLA-G-0090 | 3.2 | 98 | 99 |
| HLA-G-0090-VL-N31D | 0.4 | 97 | 98 |
| HLA-G-0090-VL-N31L | 0.4 | 98 | 99 |
| HLA-G-0090-VL-N31Q | 0.4 | 91 | 95 |
| HLA-G-0090-VL-N31S | 0.3 | 93 | 98 |
| HLA-G-0090-VL-N31T | 0.4 | 85 | 89 |
| HLA-G-0090-VL-N31Y | 0.3 | 89 | 94 |
| HLA-G-0090-VL-N31Y-N38Y | 0.7 | 94 | 98 |
| HLA-G-0090-VL-S32P | 2.4 | 98 | 99 |
| HLA-G-0090-VL-S33A | 2.1 | 98 | 99 |
| HLA-G-0090-VL-S33D | 2.4 | 98 | 99 |
| HLA-G-0090-VL-S33P | 1.4 | 98 | 99 |

Variants with mutations involving position LC 31 (N31X) showed strongly decreased expression titers and, often, impaired material quality, while LC 32 and LC33 positions variants showed good to acceptable expression titers and good material quality.

HLA-G Binding

Wt-HLA-G Affinity/Kinetic

Affinity to wt-HLA-G complex (SEQ ID NO: 39) of individual 5 nM anti-HLA-G antibodies was determined by capturing with anti-hFc (GE Healthcare BR-1008-39) on a CM3 sensor chip and the injection of wt-HLA-G antigen at a concentration of 11 nM to 300 nM diluted in HBS-P+(GE Healthcare) running buffer and a flow rate of 60 μl/min with 120 s association time and 600 s dissociation time. After each cycle the surface was regenerated by washing with 3M MgCl2 The kinetics binding curves were evaluated using T200 evaluation software and for the calculation of binding properties 1:1 Langmuir binding model was used.

Figure 3:
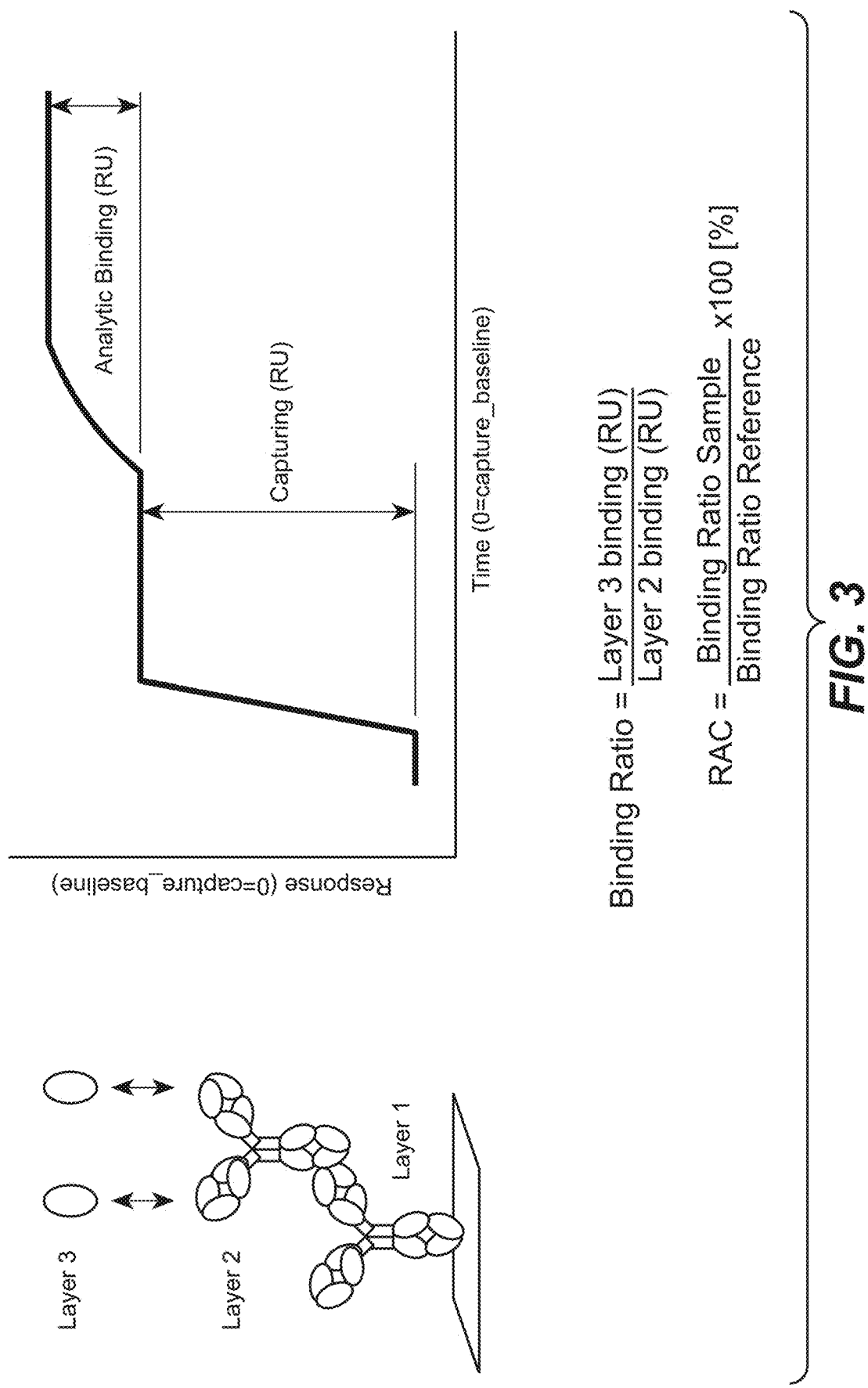
FIG. 3: Schematic antibody-antigen binding assay principle—relative active concentration (RAC) of HLA-G antibodies for binding to HLA-G.

RAC of HLAG Antibodies (Relative Active Concentration) (Assay Scheme is Shown in FIG. 3)

RAC of HLA-G binders of individual anti-HLA-G antibodies (10 nM solutions in HBS-P+) was determined by capturing with anti-hFc (GE Healthcare BR-1008-39) on a CM3 sensor chip and the injection of wt-HLA-G antigen at a concentration of 300 nM diluted in HBS-P+(GE Healthcare) running buffer and a flow rate of 10 μl/min with 60 s association time and 600 s dissociation time. After each cycle the surface was regenerated by washing with 3M MgCl2. Final RAC and Rmax values are calculated from "binding" report points and the capturing levels. Rmax= (MW analyte/MW ligand)*RU capturing ligand*stoichiometry of interaction.

The 11 variants were evaluated in an SPR binding experiment in which the antibodies were immobilized on a CM3 chip via the Fc part and recombinant single-chain HLA-G monomer/human HLA-G β2M MHC class I complex (SEQ ID NO: 39) was used as the analyte. The kinetic parameters were determined by a single cycle kinetic measurement on a Biacore T200 device at 25° C.

| | ka [1/ms] | kd [1/s] | t½ [s] | Kd [nM] | Rmax [%] |
|---|---|---|---|---|---|
| HLA-G-0090 | 1.19E+06 | 1.38E−03 | 501 | 1.2 | 86 |
| HLA-G-0090-VL-N31D | 1.94E+05 | 3.91E−03 | 177.3 | 20.2 | 66 |
| HLA-G-0090-VL-N31L | 5.28E+06 | 8.71E−03 | 79.6 | 1.7 | 91 |
| HLA-G-0090-VL-N31Q | 1.91E+06 | 3.73E−03 | 185.9 | 2.0 | 91 |
| HLA-G-0090-VL-N31S | 3.83E+05 | 9.22E−04 | 751.8 | 2.4 | 77 |
| HLA-G-0090-VL-N31T | 3.42E+05 | 7.69E−04 | 901.9 | 2.3 | 75 |
| HLA-G-0090-VL-N31Y | 5.49E+05 | 1.07E−03 | 646.2 | 2.0 | 78 |
| HLA-G-0090-VL-N31Y-N38Y-GL | 1.82E+09 | 4.30E+01 | 0 | 23.6 | 57 |
| HLA-G-0090-VL-S32P | 1.19E+06 | 1.24E−03 | 557.7 | 1.0 | 97 |
| HLA-G-0090-VL-S33A | 1.24E+06 | 1.24E−03 | 558.2 | 1.0 | 98 |
| HLA-G-0090-VL-S33D | 7.17E+05 | 3.44E−03 | 201.7 | 4.8 | 95 |
| HLA-G-0090-VL-S33P | 1.34E+06 | 2.36E−03 | 294.3 | 1.8 | 94 |

Among those, the four variants with acceptable expression titers (HLA-G-0090-VL-S32P, HLA-G-0090-VL-S33A, HLA-G-0090-VL-S33D, HLA-G-0090-VL-S33P) were evaluated further in a more accurate multi cycle kinetics measurement using the same SPR device and experimental setup.

| | ka [1/ms] | kd [1/s] | t½ [s] | Kd [nM] | Rmax [%] |
|---|---|---|---|---|---|
| HLA-G-0090 | 1.30E+06 | 1.78E−03 | 389.9 | 1.4 | 87 |
| HLA-G-0090-VL-S32P | 1.27E+06 | 1.57E−03 | 440.6 | 1.2 | 99 |
| HLA-G-0090-VL-S33A | 1.24E+06 | 1.49E−03 | 465.9 | 1.2 | 99 |
| HLA-G-0090-VL-S33D | 8.97E+05 | 6.67E−03 | 103.9 | 7.4 | 98 |
| HLA-G-0090-VL-S33P | 1.36E+06 | 3.68E−03 | 188.1 | 2.7 | 97 |

The two variants HLA-G-0090-VL-S32P and HLA-G-0090-VL-S33A have an improved binding affinity compared to the parental antibody HLA-G-0090 while the two variants HLA-G-0090-VL-S33D and HLA-G-0090-VL-S33P are losing binding affinity by a factor of 5 and 2, respectively. Surprisingly, for the tested variants, the removal of the N-glycosylation motif leads to a higher Rmax value in the kinetics measurement, indicating a higher fraction of successful complex formation than for the N-glycosylated antibody.

Crossreactivity of Anti HLA-G Antibodies and Variants to Soluble Human HLA-G, Soluble Degrafted Human HLA-G with HLA-A Consensus Specific Sequence, and Rat/Mouse Homologues To further investigate the binding properties of the two binding-affinity improved variants HLA-G-0090-VL-S32P and HLA-G-0090-VL-S33A, SPR binding experiments to four counter-screening constructs were performed. These recombinant single-chain peptide-MHC complex constructs were murine H2-K1 (SEQ ID NO: 41), rat RT1 (SEQ ID NO: 43), and human HLA-G β2M MHC class I complex, wherein the HLA-G specific amino acids have been replaced by HLA-A consensus amino acids (SEQ ID NO:40). The latter construct constitutes a version of HLA-G in which all HLA-G specific residues have been replaced by their HLA-A consensus counterparts. Again, the antibodies were immobilized on CM3 chip and the single-chain peptide-MHC constructs were used as analyte on a Biacore T200 device at 25° C.

| Antigen | Antibody | Interaction |
|---|---|---|
| murine H2-K1 (SEQ ID NO: 41) | HLA-G-0090 | no binding interaction |
| murine H2-K1 (SEQ ID NO: 41) | HLA-G-0090-VL-S32P | no binding interaction |
| murine H2-K1 (SEQ ID NO: 41) | HLA-G-0090-VL-S33A | no binding interaction |
| rat RT1 (SEQ ID NO: 43) | HLA-G-0090 | no binding interaction |
| rat RT1 (SEQ ID NO: 43) | HLA-G-0090-VL-S32P | no binding interaction |
| rat RT1 (SEQ ID NO: 43) | HLA-G-0090-VL-S33A | no binding interaction |
| HLA-A consensus on HLA-G frame (SEQ ID NO: 40) | HLA-G-0090 | no binding interaction |
| HLA-A consensus on HLA-G frame (SEQ ID NO: 40) | HLA-G-0090-VL-S32P | no binding interaction |
| HLA-A consensus on HLA-G frame (SEQ ID NO: 40) | HLA-G-0090-VL-S33A | no binding interaction |
| HLA-G (SEQ ID NO: 39) | HLA-G-0090 | very strong binding interaction |
| HLA-G (SEQ ID NO: 39) | HLA-G-0090-VL-S32P | very strong binding interaction |
| HLA-G (SEQ ID NO: 39) | HLA-G-0090-VL-S33A | very strong binding interaction |

Stability Under Stress

The parental antibody as well as the two derived variants HLA-G-0090-VL-S32P and HLA-G-0090-VL-S33A were stressed for 13 days under two different conditions:
  pH 6.0 20 mM His/HisCl, 140 mM NaCl; at 40° C. (His 40° C.)
  pH 7.4 PBS; at 37° C. (PBS 37° C.).

Afterwards, the material was analysed using SEC, and SPR to investigate chemical degradation and possible effects on target binding. For reference, the stressed material was compared with material kept under storage conditions:
  pH 6.0 20 mM His/HisCl, 140 mM NaCl; frozen at −80° C. (Ref.)

The results are listed in the following table (relative in % compared to Ref):

| Parameter | | HLA-G-0090_VL-S32P | HLA-G-0090_VL-S33A | HLA-G-0090 |
|---|---|---|---|---|
| SEC monomer [%] | Ref. | 100 | 99 | 99 |
| | His 40° C. | 98 | 98 | 98 |
| | PBS 37° C. | 98 | 98 | 98 |
| relative HLA-G binding signal compared to Ref (as 100%) ± stress, by SPR RAC | Ref. | 100 | 100 | 100 |
| | His 40° C. | 99 | 99 | 99 |
| | PBS 37° C. | 98 | 96 | 96 |

While all three antibodies are showing a very similar stability profile, variant HLAG-0090_VL-S32P is retaining more HLA-G binding (SPR relative active concentration (RAC)) after stress in PBS at 37° C. than the other two, including the parental antibody.

Thermal Stability Testing

For thermal stability testing of the purified proteins the Uncle device was used (UNCHAINED LABS, Boston, MA, USA). Static light scattering at 266 nm and 473 nm and in parallel intrinsic fluorescence is hereby used to determine aggregation temperature (Tagg) and melting temperature (Tm) of the purified proteins. A temperature ramp from 30° C. to 90° C. in 0.1° C./min steps was run. Glass cuvettes with 9 μl volume per samples were used and the concentration was 1 mg/mL in 20 mM Histidin, 140 mM NaCl, pH 6.0 buffer. For analysis, the software UNcle analysis (UNCHAINED LABS) was used.

Mass Spectrometry Analysis and N-Glcyosylation

Figure 4A:
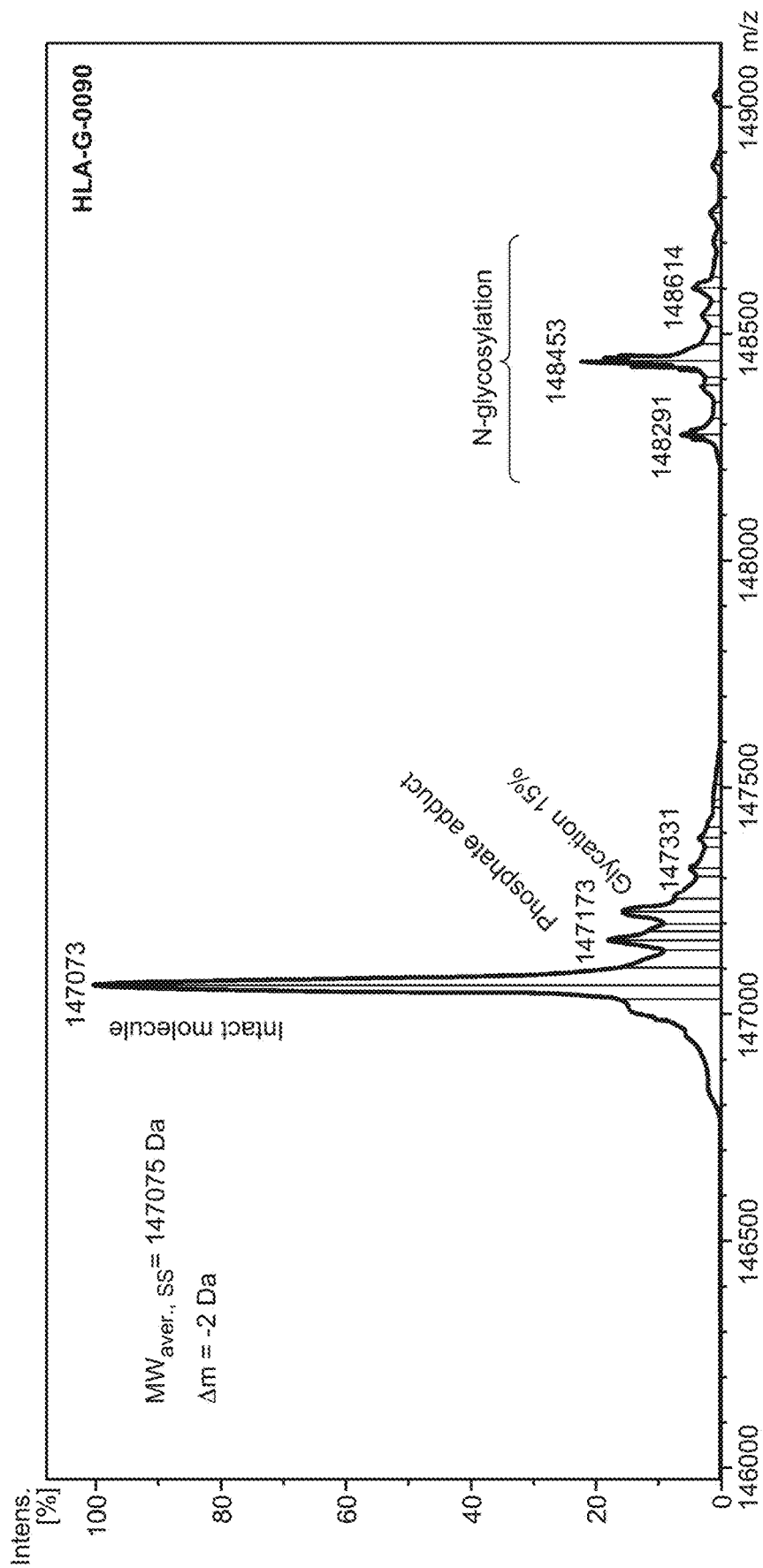
FIG. 4A: Mass spectrum of N-glycosylation of HLA-G-0090 indicates Fab-glycosylation.
Figure 4B:
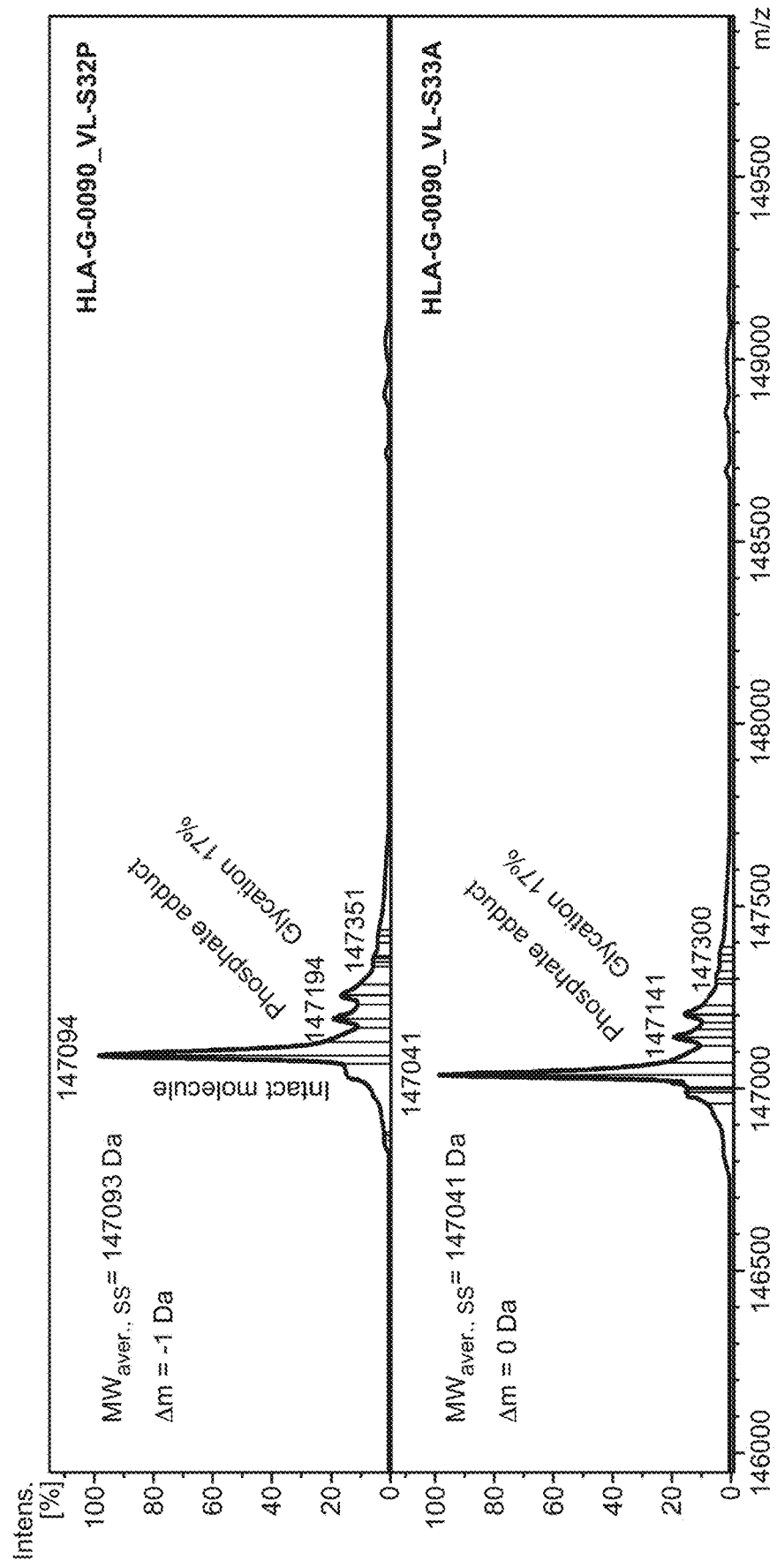
FIG. 4B: Mass spectra of N-glycosylation of HLA-G-0090-VL-S32P and HLA-G-0090-VL-S33A: No Fab-glycosylation detectable.

The deconvoluted mass spectra of the intact samples are documenting the impact on the N-Glycosylation of the removal of the N-glycosylation site/NSS motif in HLA-G-0090_VL-S32P and HLA-G-0090_VL-S33A. The samples were prepared with PNGase F to remove all N-linked glycans and obtain the molecular mass of the antibody only. While PNGase F is fully specific for cleavage of N-linked Fc-glycans, it shows much less efficacy when cleaving N-linked Fab-glycans. HLA-G-0090 is showing a clear N-glycosylation pattern coming from incomplete deglycosylation and therefore indicating Fab-glycosylation (see FIG. 4A). No signs of residual N-glycosylation can be detected for HLA-G-0090_VL-S32P and HLA-G-0090_VL-S33A (see FIG. 4B).

Example 3

ILT2 and -4 Binding Inhibition of Anti-HLA-G Antibodies

The ELISA is set up by coating the Fc tagged ILT2 and ILT4 respectively to Maxisorp microtiter plates. After incubation and washing steps, the respective antibodies are added at a concentration of 100 nM. Soluble His tagged monomeric, dimeric or trimeric HLA-G was added to the wells. After incubation and washing steps, detection of bound receptor is carried out by anti-His-antibody-POD conjugates. Percentage inhibition (%) is calculated in comparison to values obtained from wells with ILT2/4+HLA-G (mono-, di-, or Trimer) without anti HLA-G or ILT2/4 antibodies (100% binding=0% inhibition) and shown in a table Example 4

Binding of HLA-G Antibodies to Natural or Recombinant HLA-G Expressed on Cells (as Assessed by FACS Analysis)

For flow cytometry analysis, cells were stained with anti HLA-G mAbs at 4° C. Briefly, each cell suspension was transferred into a polypropylene tube ($2\times10^5$ cells/tube) and prechilled at 5° C. for 10 minutes. Cells were then washed with 2 ml FACS Buffer (4° C.) and centrifuged at 300 g for 5 minutes. Anti-HLA-G antibodies HLAG-0090-VL-S32P, HLAG-0090-VL-S33A, HLAG-0090 were diluted in staining buffer to a starting concentration of 50 µg/ml. A 5-fold serial dilution of the antibodies was performed to get the final concentrations (10 µg/ml, 2 µg/ml, 0.4 µg/ml, 0.08 µg/ml, 0,016 µg/ml, 0.0032 µg/ml). FACS buffer was then aspirated from the tubes and the cell pellets were resuspended in 100 µl of the antibody solution and incubated for 1 h at 5° C. Cells were then washed once with 2 ml staining buffer and centrifuged at 300 g for 5 minutes.

Figure 5:
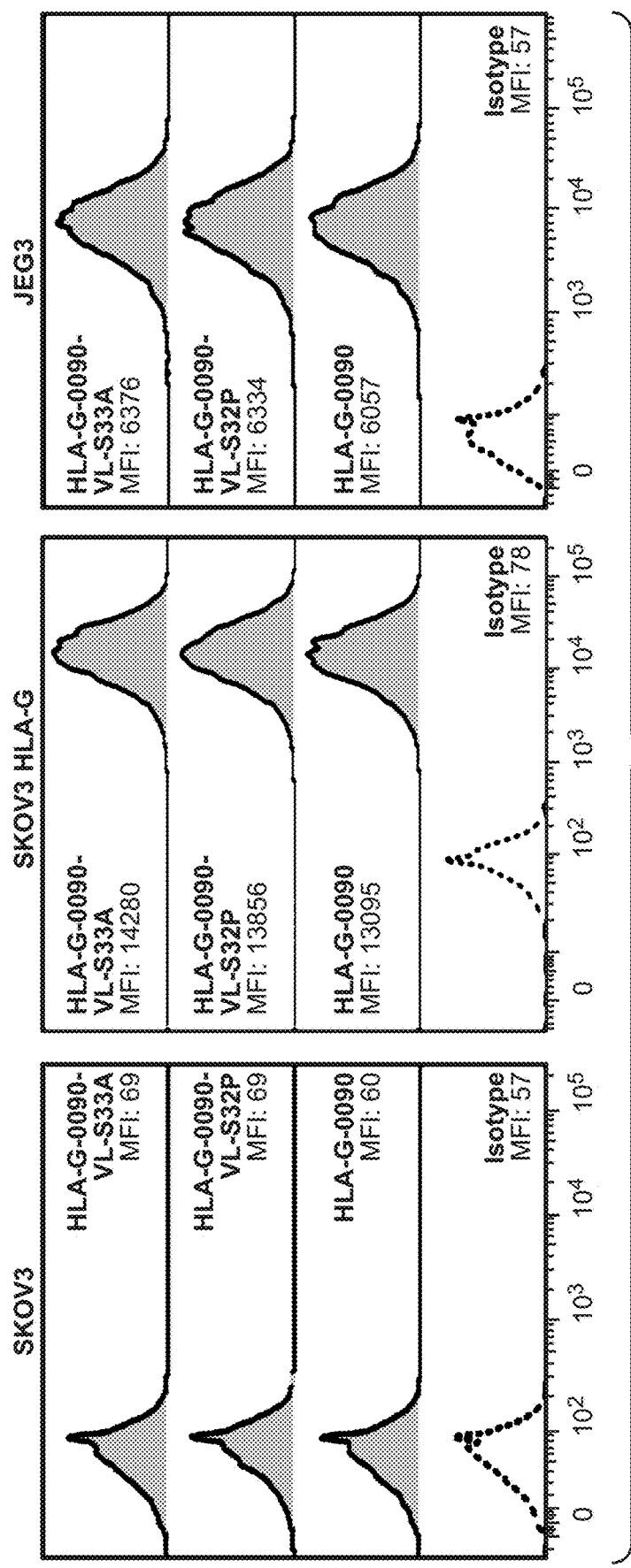
FIG. 5: Exemplary FACS staining for anti-HLA-G antibodies HLA-G-0090, HLA-G-0090-VL-S32P and HLA-G-0090-VL-S33A (2 μg/ml) on SKOV3 cells (no HLA-G expression, JEG3 cells (expressing HLA-G) and SKOV3-HLA-G cells (SKOV3 cells transfected with HLA-G).

For detection fluorescent labeled anti-species antibody (goat anti-human IgG (H+L) conjugated to Alexa 488, Life technologies #A11013) was diluted to 10 µg/ml in a staining buffer and cell pellets were resuspended in 100 µl of detection antibody. After a 1 hour incubation at 5° C. cells were again washed once with 2 ml of staining buffer, resuspended in 500 µl of staining buffer and measured on a FACS CELESTA An exemplary FACS staining for anti-HLA-G antibodies HLA-G-0090, HLA-G-0090-VL-S32P and HLA-G-0090-VL-S32P (10 µg/ml) is shown in the FACS overlays of FIG. 5: Both deglycosylated variants of the HLA-G 0090, HLA-G-0090-VL-S32P and HLA-G-0090-VL-S32P show good binding to HLA-G expressing SKOV3 cells and JEG cells but not to parental SKOV3 cells. The MFI values of the respective HLA-G antibodies are indicated in the histograms.

Example 5

Anti HLA-G Antibodies Inhibit/Modulate the Binding of ILT2 to HLA-G Expressed on JEG3 Cells For analysis, JEG3 cells (ATCC HTB36) were stained with ILT2-c-Myc-Fc fusion protein (control=no inhibition) with or without pre-incubation with different anti-HLA-G antibodies.

Figure 6:
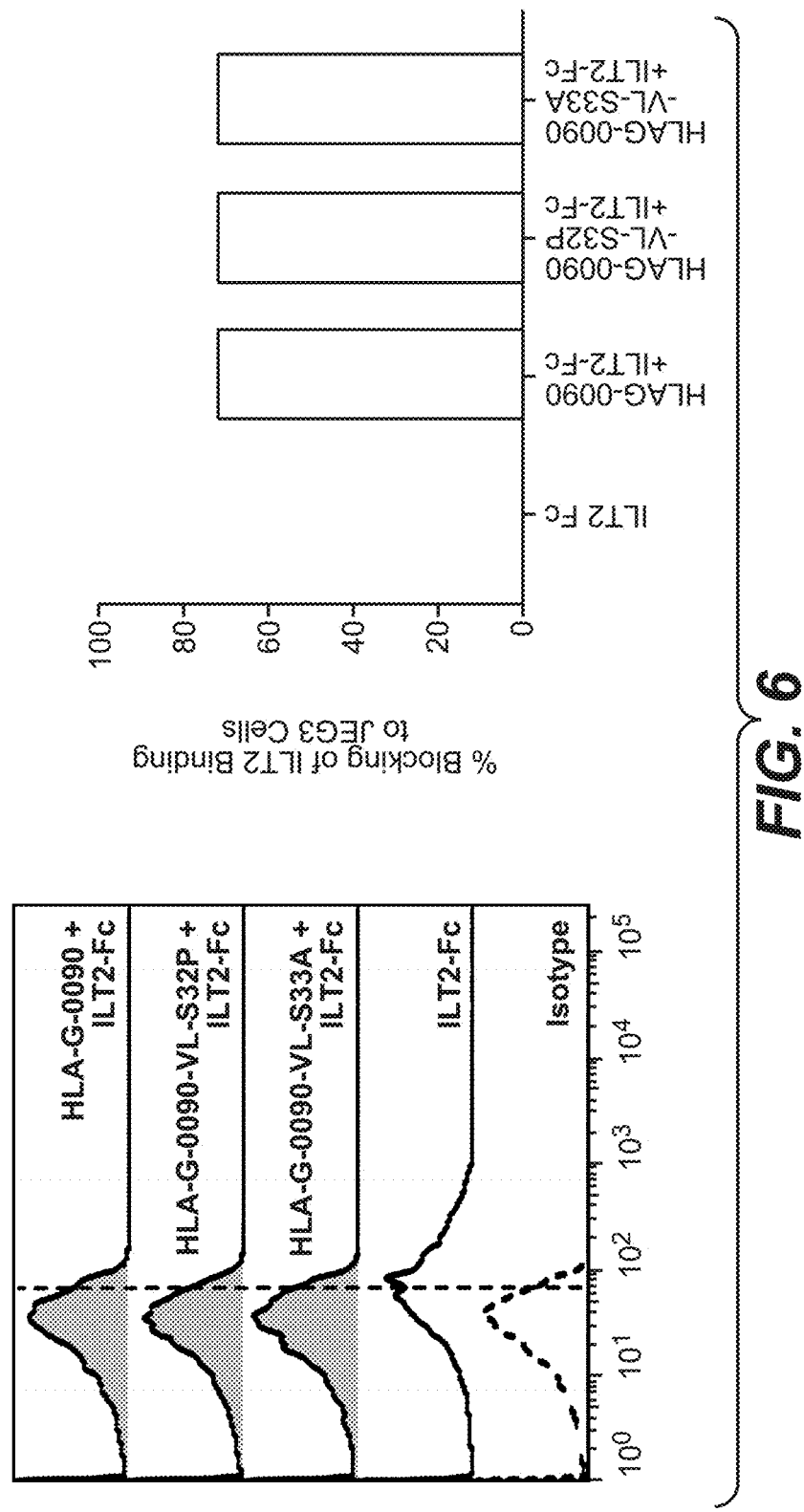
FIG. 6: Ability of the HLA-G antibodies HLA-G-0090, HLA-G-0090-VL-S32P and HLA-G-0090-VL-S33A to modify/inhibit the interaction and binding of recombinant soluble ILT2 (ILT2Fc domain fusion) to HLA-G naturally expressed on JEG3 tumor cells. JEG3 cells are preincubated/pretreated with HLA-G antibodies so that ILT2 binding to JEG3 cells is inhibited/blocked. Controls were carried out with JEG3 cells without HLA-G antibody pretreatment (only ILT2-Fc) and isotype antibody.

Binding/Inhibition of binding was determined as follows: Recombinant ILT2-c-Myc-Fc protein was added to JEG3 cells either pre-incubated anti HLA-G mAbs as described or to untreated JEG3 cells as reference. For the pre-incubation with anti-HLA-G antibodies, $2\times10^5$ cells were transferred into a polypropylene tube. Anti HLA-G antibodies HLAG-0090-VL-S32P, HLAG-0090-VL-S33A and HLA-G-0090 were diluted in staining buffer to a concentration of 80 µg/ml and 25 µl of the antibody solution was added to the prepared cells and incubated for 1 h at 5° C. The ILT2-c-Myc-Fc or (control human IgG (Jackson-Immuno-Research #009-000-003)) were diluted in staining buffer to a 2-fold concentration of 20 µg/ml and added to the prepared cells at a final concentration of 10 µg/ml and incubated for 2 h at 5° C. Cells were washed twice with 200 µl of staining buffer. Human ILT2-c-Myc-Fc protein was detected with fluorescent labeled Anti-Myc tag (9E10) Alexa Fluor 647 (abcam; #ab223895) at a dilution of 10 µg/ml in staining buffer. Cells were resuspended in 50 µl detection antibody dilution and incubated for 1 hour at 5° C. Cells were then washed once with 2 ml staining buffer and resuspended in 500 µl of staining buffer before measuring at a FACS CELESTA As control, the anti-HLA-G antibodies bound to JEG-3 pre-incubated cells were detected by using anti-species antibody (goat anti-human IgG (H+L) conjugated to Alexa 488, Life technologies #A11013), was diluted to 10 µg/ml in staining buffer and cell pellets were resuspended in 100 µl/well detection antibody. After a 1 hour incubation at 5° C. cells were again washed once with staining buffer, resuspended in 500 µl of staining buffer and measured at a FACS CELESTA The histograms in FIG. 6 show the respective ability of the HLA-G antibodies to modify/inhibit the interaction and binding of recombinant ILT2 to HLA-G naturally expressed on JEG3 tumor cells.

The following table summarizes the results from the experiments. The binding of the anti-HLA-G antibodies to JEG3 cells is depicted as +=weak binding-+++=strong binding. The ability of the anti-HLA-G antibodies either to inhibit/block or increase the binding of ILT2 to the HLA-G expressing JEG3 cells. In the last column, the binding of the recombinant ILT2 to the cells or the inhibition/blockade thereof is shown/quantified (staining of ILT2-c-Myc-Fc in the absence of an anti-HLA-G antibody was set to 100% binding=0% inhibition):

| Antibody | Binding to JEG-3 cells | HLA-G:ILT2 interaction | Inhibition of ILT2 binding to Jeg3 cells |
|---|---|---|---|
| ILT2-Fc w/o Antibody | — | — | 0% inhibition |
| HLA-G-0090 | +++ | inhibits binding of ILT2 | 72% inhibition |
| HLAG-0090-VL-S32P | +++ | inhibits binding of ILT2 | 72% inhibition |
| HLAG-0090-VL-S33A | +++ | inhibits binding of ILT2 | 72% inhibition |

Example 6

Generation of Optimized CD3 Binder

Starting from a previously described CD3 binder, termed "$CD3_{orig}$" herein (see for details e.g. WO2014/131712 incorporated herein by reference) comprising the VH and VL sequences of SEQ ID NOs 92 and 93 and we aimed at optimizing properties of this binder by removal of two asparagine deamidation sequence motifs at Kabat positions 97 and 100 of the heavy chain CDR3.

To this aim, we generated an antibody library, suitable for phage display, of the heavy chain with both asparagines at Kabat position 97 and 100 removed, and in addition the CDRs H1, H2, and H3 randomized in order to compensate for loss of affinity caused by replacing Asn97 and Asn100 through an affinity-maturation process.

This library was put on a filamentous phage via fusion to minor coat protein p3 (Marks et al. (1991) *J Mol Biol* 222, 581-597) and selected for binding to recombinant CD3ε.

10 candidate clones were identified in the initial screening, showing acceptable binding on recombinant antigen as measured by SPR as Fab fragments (produced in *E. coli*).

Only one of these clones, however, showed acceptable binding activity to CD3 expressing cells as measured by flow cytometry after conversion to IgG format.

The selected clone, termed P035-093 (P035) (="CD3$_{opt}$") herein and comprising the VH and VL sequences of SEQ ID NOs 58 and 59, respectively, was further evaluated and converted into bispecific format as described in the following.

Example 7

Binding of Optimized CD3 Binder to CD3
Binding to Recombinant CD3

Binding to recombinant CD3 was determined by surface plasmon resonance (SPR) for the optimized CD3 binder P035-093 (P035) (="CD3$_{opt}$") and the original CD3 binder "CD3$_{orig}$", both in human IgG1 format with P329G L234A L235A ("PGLALA", EU numbering) mutations in the Fc region (SEQ ID NOs 94 and 96 (CD3$_{orig}$) and SEQ ID NOs 95 and 96 (P035=CD3$_{opt}$)).

In order to assess the effect of the deamidation site removal and its effect on the stability of the antibodies, binding of the original and the optimized CD3 binder to recombinant CD3 was tested after temperature stress for 14 days at 37° C. or 40° C. Samples stored at −80° C. were used as reference. The reference samples and the samples stressed at 40° C. were in 20 mM His, 140 mM NaCl, pH 6.0, and the samples stressed at 37° C. in PBS, pH 7.4, all at a concentration of 1.2-1.3 mg/ml. After the stress period (14 days) samples in PBS were dialyzed back to 20 mM His, 140 mM NaCl, pH 6.0 for further analysis.

Relative Active Concentration (RAC) of the samples was determined by SPR as follows.

SPR was performed on a Biacore T200 instrument (GE Healthcare). Anti-Fab capturing antibody (GE Healthcare, #28958325) was immobilized on a Series S Sensor Chip CM5 (GE Healthcare) using standard amine coupling chemistry, resulting in a surface density of 4000-6000 resonance units (RU). As running and dilution buffer, HBS-P+(10 mM HEPES, 150 mM NaCl pH 7.4, 0.05% Surfactant P20) was used. CD3 antibodies with a concentration of 2 µg/ml were injected for 60 s at a flow rate of 5 µl/min. CD3 antigen (see below) was injected at a concentration of 10 µg/ml for 120 s and dissociation was monitored at a flow rate of 5 µl/min for 120 s. The chip surface was regenerated by two consecutive injections of 10 mM glycine pH 2.1 for 60 s each. Bulk refractive index differences were corrected by subtracting blank injections and by subtracting the response obtained from the blank control flow cell. For evaluation, the binding response was taken 5 seconds after injection end. To normalize the binding signal, the CD3 binding was divided by the anti-Fab response (the signal (RU) obtained upon capture of the CD3 antibody on the immobilized anti-Fab antibody). The relative active concentration was calculated by referencing each temperature stressed sample to the corresponding, non-stressed sample.

The antigen used was a heterodimer of CD3 delta and CD3 epsilon ectodomains fused to a human Fc domain with knob-into-hole modifications and a C-terminal Avi-tag (see SEQ ID NOs 90 and 91).

The results of this experiment are shown in FIG. 15. As can be seen, the optimized CD3 binder CD3$_{opt}$ P035-093 (P035) (=CD3$_{opt}$) showed strongly improved binding to CD3 after temperature stress (2 weeks at 37° C., pH 7.4) as compared to the original CD3 binder CD3$_{orig}$. This result demonstrates that the deamidation site removal was successful, and has yielded an antibody with superior stability properties, relevant for in vivo half-life, as well as formulation of the antibody at neutral pH.

Binding to CD3 on Jurkat Cells

Binding to CD3 on the human reporter T-cell line Jurkat NFAT was determined by FACS for the optimized CD3 binder P035-093 (P035) (=CD3$_{opt}$) and the original CD3 binder "CD3$_{orig}$", both in human IgG$_1$ format with P329G L234A L235A ("PGLALA", EU numbering) mutations in the Fc region (SEQ ID NOs 94 and 96 (CD3$_{orig}$) and SEQ ID NOs 95 and 96 (P035=CD3$_{opt}$)).

Jurkat-NFAT reporter cells (GloResponse Jurkat NFAT-RE-luc2P; Promega #CS176501) are a human acute lymphatic leukemia reporter cell line with a NFAT promoter, expressing human CD3. The cells were cultured in RPMI1640, 2 g/l glucose, 2 g/l NaHCO$_3$, 10% FCS, 25 mM HEPES, 2 mM L-glutamine, 1×NEAA, 1× sodium-pyruvate at 0.1-0.5 mio cells per ml. A final concentration of 200 µg per ml hygromycin B was added whenever cells were passaged.

For the binding assay, Jurkat NFAT cells were harvested, washed with PBS and resuspended in FACS buffer. The antibody staining was performed in a 96-well round bottom plate. Therefore 100'000 to 200'000 cells were seeded per well. The plate was centrifuged for 4 min at 400×g and the supernatant was removed. The test antibodies were diluted in FACS buffer and 20 µl of the antibody solution were added to the cells for 30 min at 4° C. To remove unbound antibody, the cells were washed twice with FACS buffer before addition of the diluted secondary antibody (PE-conjugated AffiniPure F(ab')2 Fragment goat anti-human IgG Icg Fragment Specific; Jackson ImmunoResearch #109-116-170). After 30 min incubation at 4° C. unbound secondary antibody was washed away. Before measurement the cells were resuspended in 200 µl FACS buffer and then analyzed by flow cytometry using a BD Canto II device.

As shown in FIG. 16, the optimized CD3 binder P035-093 (P035) (=CD3$_{opt}$) and the original CD3 binder "CD3$_{orig}$" bound comparably well to CD3 on Jurkat cells.

Example 8

Functional Activity of Optimized CD3 Binder

The functional activity of the optimized CD3 binder "CD3$_{opt}$" was tested in a Jurkat reporter cell assay and compared to the activity of the original CD3 binder "CD3$_{orig}$". To test the functional activity of the IgGs, anti-PGLALA expressing CHO cells were co-incubated with Jurkat NFAT reporter cells in the presence of increasing concentrations of CD3$_{opt}$ human IgG1 PGLALA or CD3$_{orig}$ human IgG1 PGLALA. Activation of CD3 on the Jurkat NFAT reporter cells upon T cell cross-linking induces the production of luciferase and luminescence can be measured as an activation marker. CD3$_{orig}$ human IgG1 wt was included as negative control which cannot bind to anti- PGLALA expressing CHO cells and therefore cannot be crosslinked on Jurkat NFAT cells. A schematic illustration of the assay is provided in FIG. 17.

Anti-PGLALA expressing CHO cells are CHO-K1 cells engineered to express on their surface an antibody that specifically binds human IgG$_1$ Fc(PGLALA) (see WO 2017/072210, incorporated herein by reference). These cells were cultured in DMEM/F12 medium containing 5% FCS+1% GluMax. The Jurkat NFAT reporter cells are as described in Example 7.

Upon simultaneous binding of the CD3 huIgG1 PGLALA to anti-PGLALA expressed on CHO and CD3 expressed on Jurkat-NFAT reporter cells, the NFAT promoter is activated and leads to expression of active firefly luciferase. The intensity of luminescence signal (obtained upon addition of luciferase substrate) is proportional to the intensity of CD3 activation and signaling. Jurkat-NFAT reporter cells grow in suspension and were cultured in RPMI1640, 2 g/l glucose, 2 g/l NaHCO$_3$, 10% FCS, 25 mM HEPES, 2 mM L-glutamin, 1×NEAA, 1×sodium-pyruvate at 0.1-0.5 mio cells per ml, 200 µg per ml hygromycin. For the assay, CHO cells were harvested and viability determined using ViCell. 30 000 target cells/well were plated in a flat-bottom, white-walled 96-well-plate (Greiner bio-one #655098) in 100 µl medium and 50 µl/well of diluted antibodies or medium (for controls) were added to the CHO cells. Subsequently, Jurkat-NFAT reporter cells were harvested and viability assessed using ViCell. Cells were resuspended at 1.2 mio cells/ml in cell culture medium without hygromycin B and added to CHO cells at 60 000 cells/well (50 µl/well) to obtain a final effector-to-target (E:T) ratio of 2:1 and a final volume of 200 µl per well. Then, 4 µl of GloSensor (Promega #E1291) was added to each well (2% of final volume). Cells were incubated for 24 h at 37° C. in a humidified incubator. At the end of incubation time, luminescence was detected using TECAN Spark 10M.

As shown in FIG. 18, the optimized CD3 binder P035-093 (P035) (=CD3$_{opt}$) had a similar activity on Jurkat NFAT cells upon crosslinking as CD3$_{orig}$.

Example 9

Generation of Bispecific Antibodies that Bind to Human HLA-G and to Human CD3 (Anti-HLA-G/Anti-CD3 Antibodies)

Recombinant DNA Techniques

Standard methods were used to manipulate DNA as described in Sambrook, J. et al., Molecular cloning: A laboratory manual; Cold Spring Harbor Laboratory Press, Cold Spring Harbor, New York, 1989. The molecular biological reagents were used according to the manufacturer's instructions.

Gene and Oligonucleotide Synthesis

Desired gene segments were prepared by chemical synthesis at Geneart GmbH (Regensburg, Germany). The synthesized gene fragments were cloned into an *E. coli* plasmid for propagation/amplification. The DNA sequences of subcloned gene fragments were verified by DNA sequencing. Alternatively, short synthetic DNA fragments were assembled by annealing chemically synthesized oligonucleotides or via PCR. The respective oligonucleotides were prepared by metabion GmbH (Planegg-Martinsried, Germany)

Description of the Basic/Standard Mammalian Expression Plasmid

For the expression of a desired gene/protein (e.g. antibody heavy chain or antibody light chain) a transcription unit comprising the following functional elements is used:
the immediate early enhancer and promoter from the human cytomegalovirus (P-CMV) including intron A,
a human heavy chain immunoglobulin 5'-untranslated region (5'UTR),
a murine immunoglobulin heavy chain signal sequence,
a gene/protein to be expressed (e.g. full length antibody heavy chain or MHC class I molecule), and
the bovine growth hormone polyadenylation sequence (BGH pA).

Beside the expression unit/cassette including the desired gene to be expressed the basic/standard mammalian expression plasmid contains
an origin of replication from the vector pUC18 which allows replication of this plasmid in *E. coli*, and
a beta-lactamase gene which confers ampicillin resistance in *E. coli*.

Protein Determination

The protein concentration of purified polypeptides was determined by determining the optical density (OD) at 280 nm, using the molar extinction coefficient calculated on the basis of the amino acid sequence of the polypeptide.

Generation of Expression Plasmids for Recombinant Monoclonal Bispecific Antibodies The recombinant monoclonal antibody genes encode the respective immunoglobulin heavy and light chains.

The expression plasmids for the transient expression monoclonal antibody molecules comprised besides the immunoglobulin heavy or light chain expression cassette an origin of replication from the vector pUC18, which allows replication of this plasmid in *E. coli*, and a beta-lactamase gene which confers ampicillin resistance in *E. coli*.

The transcription unit of a respective antibody heavy or light chain comprised the following functional elements:
the immediate early enhancer and promoter from the human cytomegalovirus (P-CMV) including intron A,
a human heavy chain immunoglobulin 5'-untranslated region (5'UTR),
a murine immunoglobulin heavy chain signal sequence, and
the bovine growth hormone polyadenylation sequence (BGH pA).

Transient Expression and Analytical Characterization

The recombinant production was performed by transient transfection of HEK293 cells (human embryonic kidney cell line 293-derived) cultivated in F17 Medium (Invitrogen Corp.). For the production of monoclonal antibodies, cells were co-transfected with plasmids containing the respective immunoglobulin heavy- and light chain. For transfection "293-Fectin" Transfection Reagent (Invitrogen) was used. Transfection was performed as specified in the manufacturer's instructions. Cell culture supernatants were harvested three to seven (3-7) days after transfection. Supernatants were stored at reduced temperature (e.g. −80° C.).

General information regarding the recombinant expression of human immunoglobulins in e.g. HEK293 cells is given in: Meissner, P. et al., Biotechnol. Bioeng. 75 (2001) 197-203.

Using the above described methods for recombinant DNA techniques, the generation of expression plasmids for recombinant monoclonal antibodies and transient expression and analytical characterization, the following bispecific antibodies that bind to human HLA-G and to human CD3 were produced and analyzed:

Bispecific Antibodies that Bind to Human HLA-G and to Human CD3 (Anti-HLA-G/Anti-CD3 Antibodies) (SEQ ID Nos of Variable Regions VH/VL and Hypervariable Regions (HVRs) of Antigen Binding Moieties/Sites Binding Human HLA-G and of Antigen Binding Moieties/Sites Binding Human CD3):

|  | HVR-H1 | HVR-H2 | HVR-H3 | HVR-L1 | HVR-L2 | HVR-L3 | VH | VL |
|---|---|---|---|---|---|---|---|---|
| | | | Anti-HLA-G antigen binding site | | | | | |
| HLA-G-0090-S32P | SEQ ID NO: 1 | SEQ ID NO: 2 | SEQ ID NO: 3 | SEQ ID NO: 23 | SEQ ID NO: 5 | SEQ ID NO: 6 | SEQ ID NO: 7 | SEQ ID NO: 24 |
| | | | Anti-CD3 antigen binding site | | | | | |
| P035-093 (P035) | SEQ ID NO: 52 | SEQ ID NO: 53 | SEQ ID NO: 54 | SEQ ID NO: 55 | SEQ ID NO: 56 | SEQ ID NO: 57 | SEQ ID NO: 58 | SEQ ID NO: 59 |
| Clone 22 (Cl22) | SEQ ID NO: 60 | SEQ ID NO: 61 | SEQ ID NO: 62 | SEQ ID NO: 63 | SEQ ID NO: 64 | SEQ ID NO: 65 | SEQ ID NO: 66 | SEQ ID NO: 67 |
| V9 | SEQ ID NO: 68 | SEQ ID NO: 69 | SEQ ID NO: 70 | SEQ ID NO: 71 | SEQ ID NO: 72 | SEQ ID NO: 73 | SEQ ID NO: 74 | SEQ ID NO: 75 |

"Clone 22 (abbreviated as "Cl22")" is an optimized CD3 binder (see WO 2020/127619); "P035-093 (abbreviated as "P035") is another optimized variant CD3 binder; V9 is another CD3 binder described e.g. in Rodrigues et al., Int J Cancer Suppl (1992) 7, 45-50, and WO 1992/22653 (SEQ ID NOs 20 and 17 of WO 1992/22653 are the VH and VL sequences).

Bispecific Anti-HLA-G/Anti-CD3 T Cell Bispecific (TCB) Antibodies:

P1AF7977 (HLA-G-0090-VL-S32P/CD3 P035-093 (P035)):
  SEQ ID NO: 76 light chain 1 P1AF7977
  SEQ ID NO: 77 light chain 2 P1AF7977
  SEQ ID NO: 78 heavy chain 1 P1AF7977
  SEQ ID NO: 79 heavy chain 2 P1AF7977
P1AF7978 (HLA-G-0090-VL-S32P/CD3 Clone 22 (Cl22)):
  SEQ ID NO: 80 light chain 1 P1AF7978
  SEQ ID NO: 81 light chain 2 P1AF7978
  SEQ ID NO: 82 heavy chain 1 P1AF7978
  SEQ ID NO: 83 heavy chain 2 P1AF7978
P1AF7979 (HLA-G-0090-VL-S32P/CD3 V9):
  SEQ ID NO: 84 light chain 1 P1AF7979
  SEQ ID NO: 85 light chain 2 P1AF7979
  SEQ ID NO: 86 heavy chain 1 P1AF7979
  SEQ ID NO: 87 heavy chain 2 P1AF7979

Example 10

Binding and Stability of Bispecific Anti-HLA-G/Anti-CD3 Antibody (T Cell Bispecific (TCB) Antibody) to HLA-G Stability Under Stress The three TCB molecules featuring the same HLA-G targeting binder HLAG-0090-VL-S32P and three different CD3e binders were stressed for 14 days under two different conditions:
  pH 6.0 20 mM His/HisCl, 140 mM NaCl; at 40° C. (His 40° C.)
  pH 7.4 PBS; at 37° C. (PBS 37° C.).

Afterwards, the material was analysed using CD-SDS, SEC, and Surface plasmon resonance) SPR to investigate chemical degradation and possible effects on target binding. For reference, the stressed material was compared with material kept under storage conditions:
  pH 6.0 20 mM His/HisCl, 140 mM NaCl; frozen at −80° C. (Ref.)

The results are listed in the following tables:

| Parameter | | P1AF7977 (HLA-G-0090-VL-S32P/CD3 P035) | P1AF7978 (HLA-G-0090-VL-S32P/CD3 Cl22) | P1AF7977 (HLA-G-0090-VL-S32P/CD3 V9) |
|---|---|---|---|---|
| CE-SDS [%] (Caliper, non-reducing) | Ref. | 95 | 95 | 96 |
| | His 40° C. | 93 | 96 | 95 |
| | PBS 37° C. | 93 | 94 | 95 |
| CE-SDS [%] (Caliper, reducing) | Ref. | 100 | 100 | 100 |
| | His 40° C. | 100 | 100 | 100 |
| | PBS 37° C. | 100 | 100 | 100 |
| SEC monomer [%] | Ref. | 99 | 99 | 99 |
| | His 40° C. | 97 | 98 | 98 |
| | PBS 37° C. | 96 | 96 | 97 |
| Thermal stability (DLS $T_{agg}$) | | 64 | 64 | 68 |

| | | P1AF7977 (HLA-G-0090-VL-S32P/CD3 P035) | | P1AF7978 (HLA-G-0090-VL-S32P/CD3 Cl22) | | P1AF7979 (HLA-G-0090-VL-S32P/CD3 V9) | |
|---|---|---|---|---|---|---|---|
| | | HLA-G | CD3 | HLA-G | CD3 | HLA-G | CD3 |
| HLAG or CD3 specific binding (respectively) ± stress, by Biacore RAC | Ref. | 100 | 100 | 100 | 100 | 100 | 100 |
| | His 40° C. | 100 | 99 | 99 | 97 | 99 | 96 |
| | PBS 37° C. | 98 | 96 | 98 | 92 | 98 | 91 |

All three TCBs are showing an acceptable stability profile with moderate loss of binding after stress. Furthermore, Thermal stability was measured by DLS ($T_{agg}$) and it is in the normal range known for human IgG. RAC Binding was determined by Surface plasmon resonance (Biacore) as described in Example 2.

Example 11

Binding of Bispecific Anti-HLA-G/Anti-CD3 Antibody (T Cell Bispecific (TCB) Antibody) to CD3 Expressed on T-Cells (as Assessed by Flow Cytometry)

Figure 7:
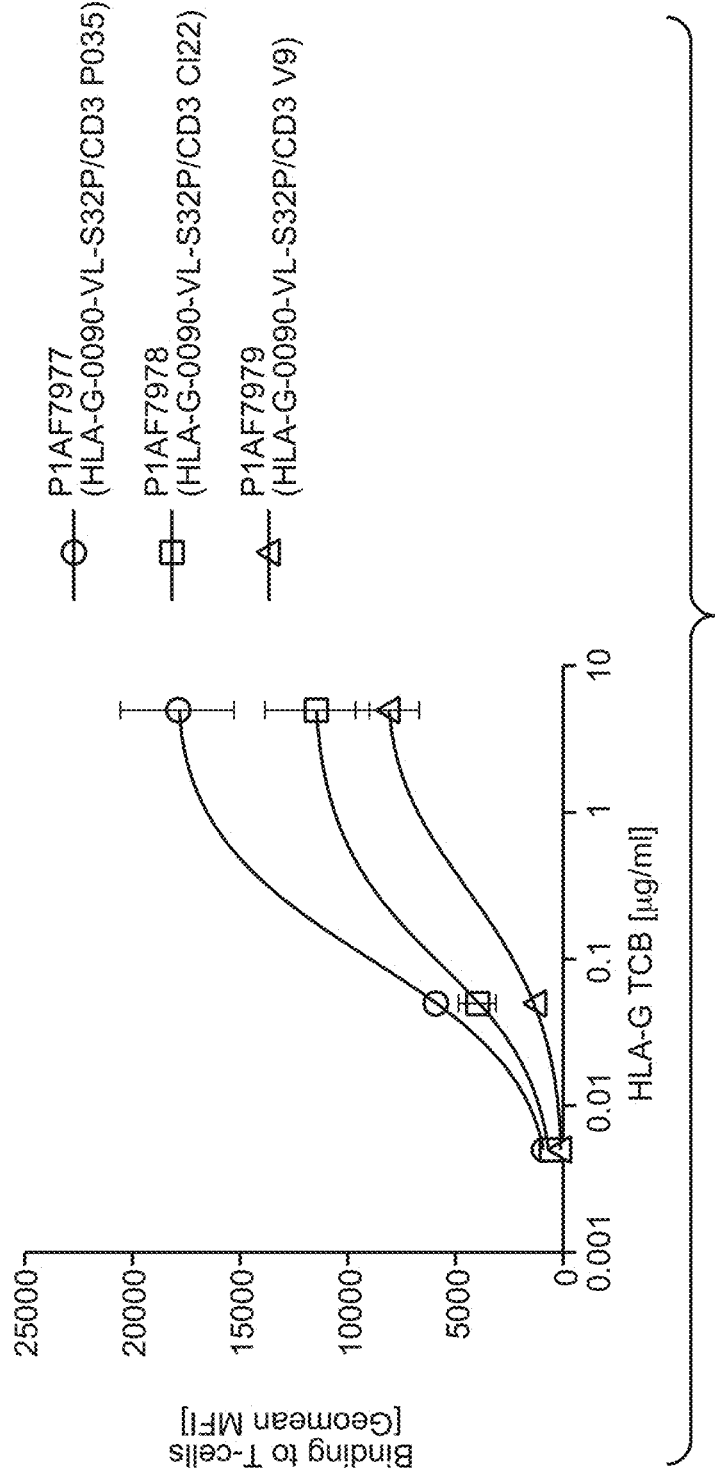
FIG. 7: Binding of bispecific anti-HLA-G/anti-CD3 T cell bispecific (TCB) antibody to CD3 expressed on T-cells by antibodies P1AF7977, P1AF7978 and P1AF7979.

Briefly, 100 ml fresh blood was collected in Erlenmeyer flasks and mixed with 100 ml of isolation buffer (PBS with 2% FBS and 2 mM EDTA). 25 ml of the suspension was then transferred carefully over 15 ml of ficoll in a 50 ml tube and centrifuged for 15 min at 800 g without brakes. The PBMC layer in the ficoll gradient was then transferred to a fresh 50 ml tube with isolation buffer and centrifuged at 300 g for 10 min at 4° C. The PBMCs were then washed twice and the cells were pooled in 10 ml of isolation buffer. PBMCs were frozen at −80° C. until further use. T cells were isolated from the PBMCs using EasySep negative selection human T cell Isolation kit (Stem cell, #17951) as per manufacturer's instructions. Binding of HLA-G TCBs to T cells was then measured by flow cytometry. Briefly, 500 µl of T cells (5×105 cells) were added to each FACS tube. T cells were washed in 2 ml of staining buffer (PBS with 2% FBS) and centrifuged at 300 g at 4° C. for 5 minutes. The HLA-G TCBs were diluted at different concentrations ranging from 5-0.05 µg/ml in medium. T cells were then resuspended in 100 µl of HLA-G TCB dilution and incubated for 30 min in the dark at 4° C. After washing once with 2 ml staining buffer, cells were centrifuged at 300 g for 5 min and then resuspended in 100 µl of secondary antibody dilution (Alexa Fluor 488 labeled anti-human IgG, 1:200) for 30 min at 4° C. in the dark. T cells were washed twice with 2 ml staining buffer and centrifuged at 300 g for 5 min at 4° C. Finally cells were resuspended in 500 µl medium and binding of HLA-G TCBs to T Cells was detected on BD LSR. The binding of HLA-G TCBs P1AF7977 (HLA-G-0090-VL-S32P/CD3 P035); P1AF7978 (HLA-G-0090-VL-S32P/CD3 CI22) and P1AF7979 (HLA-G-0090-VL-S32P/CD3 V9) to CD3 on T cells at different concentrations is illustrated in FIG. 7.

Example 12

Binding of Bispecific Anti-HLA-G/Anti-CD3 Antibody (T Cell Bispecific (TCB) Antibody) to Natural or Recombinant HLA-G Expressed on Cells (as Assessed by Flow Cytometry)

Binding ability of anti HLA-G TCB mAb to HLA-G expressed on different cells and cell lines was assessed by FACS analysis. Either the binding to naturally HLA-G expressing JEG3 tumor cells or Skov3 transfectants and respective parental, untransfected cells is described.

Figure 8:
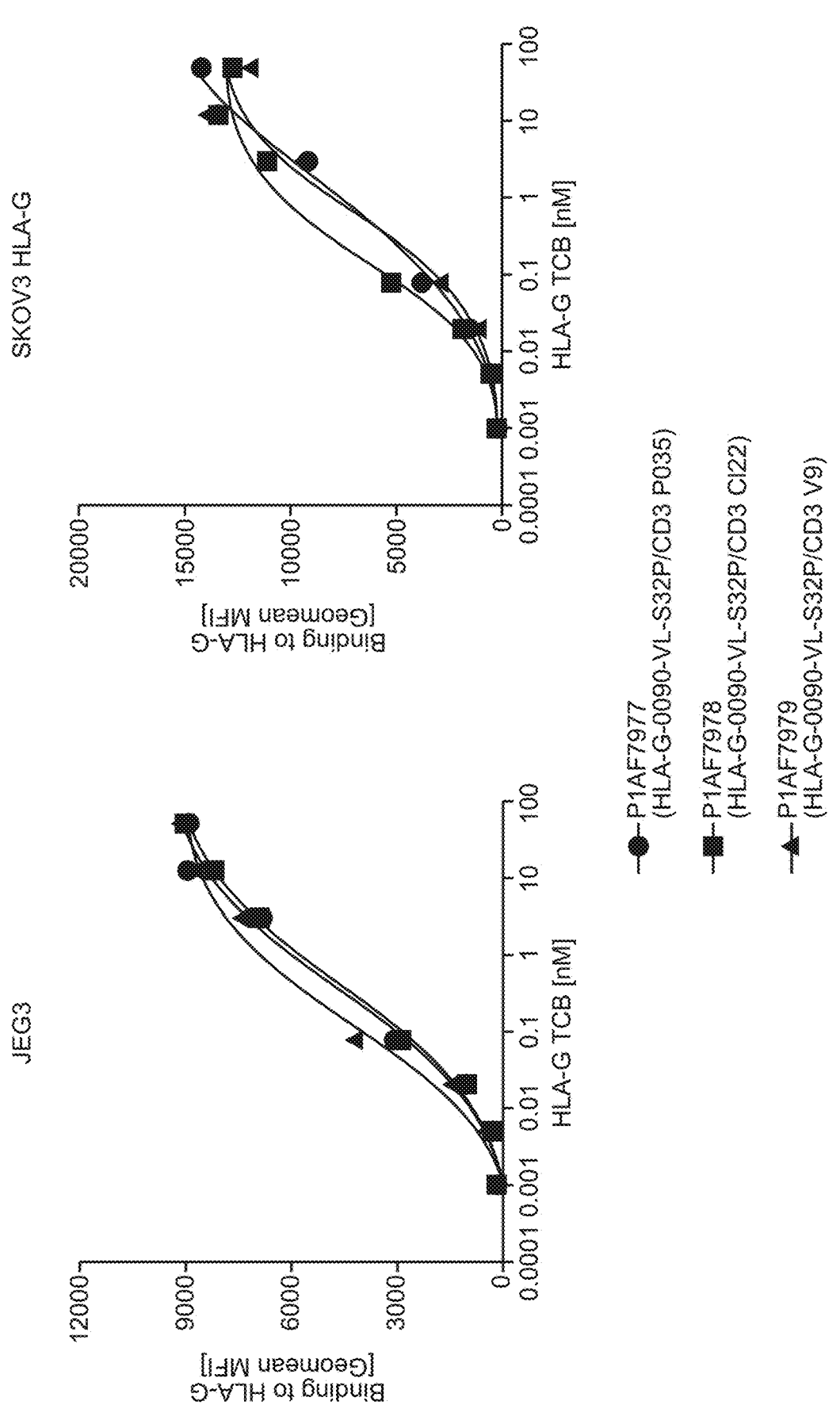
FIG. 8: Bispecific anti-HLA-G/anti-CD3 T cell bispecific (TCB) antibodies P1AF7977, P1AF7978 and P1AF7979 showed binding to JEG3 cells and SKOV3 cells, transfected with HLA-G.

For flow cytometry analysis, cells were stained with anti HLA-G TCB mAb at 4° C. Briefly, 25 µl/well of each cell suspension (5×104 cells/well) was transferred into a polypropylene 96-Well V-bottom plate and prechilled in the fridge at 5° C. for 10 min. Anti-HLA-G samples were diluted in staining buffer to a 2-fold starting concentration of 80 µg/ml. A 4-fold serial dilution of the antibodies was performed and 25 µl/well of the antibody solution was added to the prepared cells and incubated for 1 h at 5° C. Cells were washed twice with 200 µl/well staining buffer and centrifugation at 300 g for 5 min. Cell pellets were resuspended in 25111 of staining buffer afterwards. For detection fluorescent labeled anti-species antibody (donkey anti human IgG (H+L) conjugated to PE, Jackson Immuno Research #709-116-149) was diluted 1:100 in staining buffer and 25 µl/well detection antibody was added to the cell suspension. After a 1 hour incubation at 5° C. cells were again washed twice with staining buffer, resuspended in 70 µl of staining buffer and measured at a FACS Canto II. Bispecific anti-HLA-G/anti-CD3 antibodies (T cell bispecific (TCB) antibodies) P1AF7977 (HLA-G-0090-VL-S32P/CD3 P035); P1AF7978 (HLA-G-0090-VL-S32P/CD3 CI22) and P1AF7979 (HLA-G-0090-VL-S32P/CD3 V9) showed binding to JEG3 cells and SKOV3 cells, transfected with HLAG (see FIG. 8). The EC50 values for FACS binding are listed in the table below.

| Cell binding EC50 (nM) | JEG3 | SKOV3 HLA-G |
| --- | --- | --- |
| P1AF7977 | 0.42 | 1.5 |
| P1AF7978 | 0.12 | 0.15 |
| P1AF7979 | 0.36 | 0.58 |

Example 13

ILT2 and -4 Binding Inhibition of Bispecific Anti-HLA-G/Anti-CD3 Antibody (T Cell Bispecific (TCB) Antibody)

The ELISA was set up by coating the Fc tagged ILT2 and ILT4 respectively to Maxisorp microtiter plates. After incubation and washing steps, the respective antibodies are added at a concentration of 100 nM. Soluble His tagged monomeric, dimeric or trimeric HLA-G was added to the wells. After incubation and washing steps, detection of bound receptor was carried out by anti-His-antibody-POD conjugates. Percentage inhibition (%) is calculated in comparison to values obtained from wells with ILT2/4+HLA-G (mono-, di-, or Trimer) without anti HLA-G or ILT2/4 antibodies (100% binding=0% inhibition) and shown in the following table.

| % Binding inhibition (133 nM) | ILT2 | ILT4 |
| --- | --- | --- |
| P1AF7977 (HLA-G-0090-VL-S32P/CD3 P035) | 100 | 92 |
| P1AF7978 (HLA-G-0090-VL-S32P/CD3 CI22) | 100 | 91 |
| P1AF7979 (HLA-G-0090-VL-S32P/CD3 V9) | 100 | 95 |

Example 14

Figure 9:
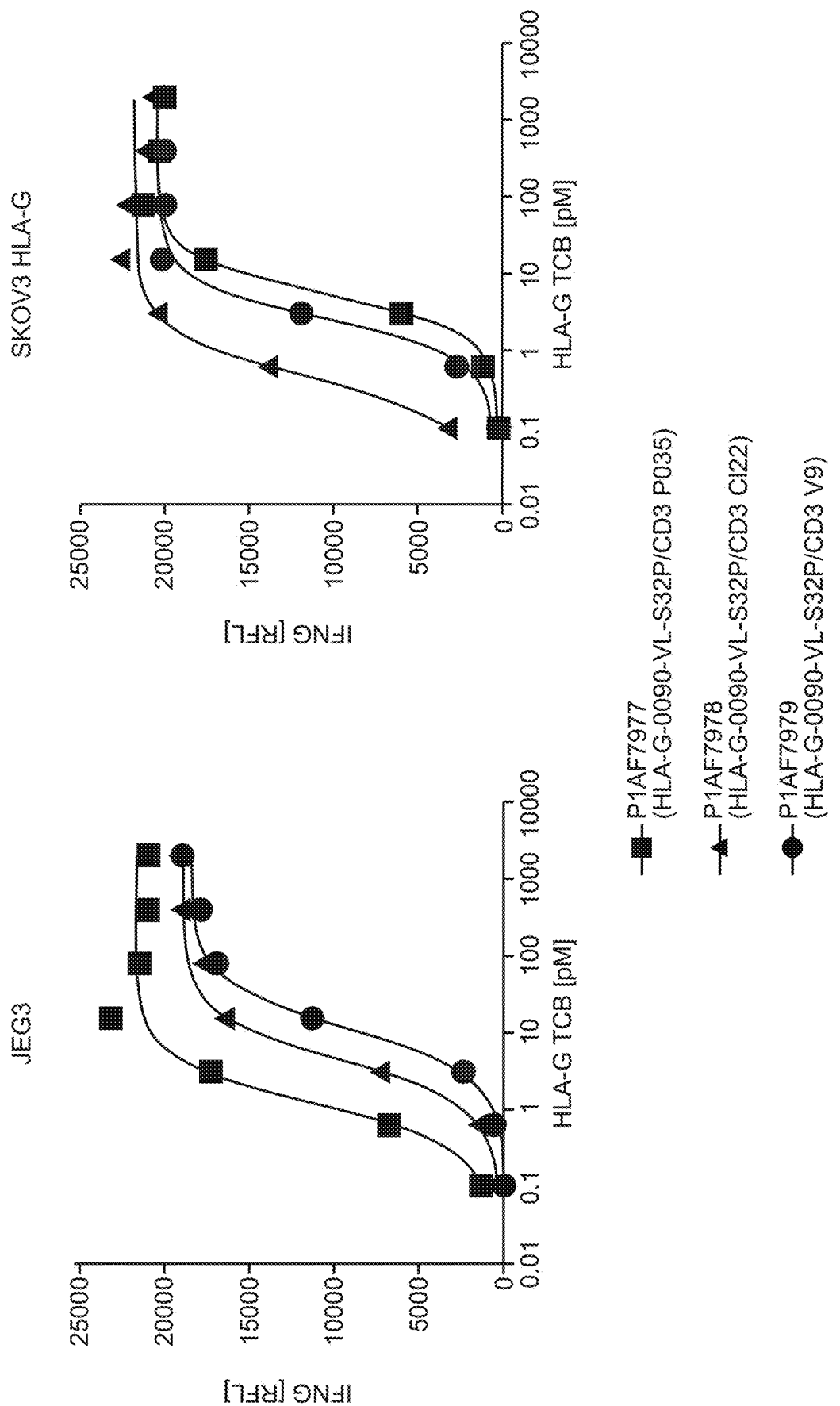
FIG. 9: Bispecific anti-HLA-G/anti-CD3 T cell bispecific (TCB) antibody mediated/induced IFN gamma secretion by T cells, by antibodies P1AF7977, P1AF7978 and P1AF7979.

Bispecific Anti-HLA-G/Anti-CD3 Antibody (T Cell Bispecific (TCB) Antibody) Mediated IFN Gamma Secretion by T Cells Ability of anti HLA-G TCB to induce IFN gamma secretion by T cells in the presence of HLA-G expressing tumor cells was tested using SKOV3 cells transfected with recombinant HLA-G (SKOV3 HLA-G) and JEG3 cells expressing endogenous HLA-G. IFN gamma secretion was detected by Luminex technology. For measurement of IFN gamma secretion by T cells after TCB treatment, co-cultures of PBMCs and SKOV3HLA-G cells or JEG3 cells were incubated with anti-HLA-G TCB. Briefly, PBMCs were isolated from human peripheral blood by density gradient centrifugation using Lymphocyte Separating Medium Tubes (PAN #P04-60125). PBMC's and SKOV 3 HLA-G cells were seeded at a ratio of 10:1 in 96-well U bottom plates. The co-culture was then incubated with HLA-G-TCB at different concentrations as shown in the figure (FIG. 9) and incubated for 24 h at 37° C. in an incubator with 5% Co2. On the next day, supernatants were collected and IFN gamma secretion was measured using Milliplex MAP kit (Luminex technology) according to the manufacturer's instructions. Bispecific anti-HLA-G/anti-CD3 (T cell bispecific (TCB)) antibodies P1AF7977 (HLA-G-0090-VL-S32P/CD3 P035); P1AF7978 (HLA-G-0090-VL-S32P/CD3 CI22) and P1AF7979 (HLA-G-0090-VL-S32P/CD3 V9) induced IFN gamma secretion by T cells (FIG. 9). The EC50 values are listed in the table below.

| IFNgamma induction $EC_{50}$ (nM) | JEG3 | SKOV3 HLA-G |
|---|---|---|
| P1AF7977 | 20 | 30 |
| P1AF7978 | 2.2 | 2.6 |
| P1AF7979 | 29 | 16 |

Example 15

Induction of T Cell Mediated Cytotoxicity/Tumor Cell Killing by Bispecific Anti-HLA-G/Anti-CD3 Antibody (T Cell Bispecific (TCB) Antibody)

Figure 10:
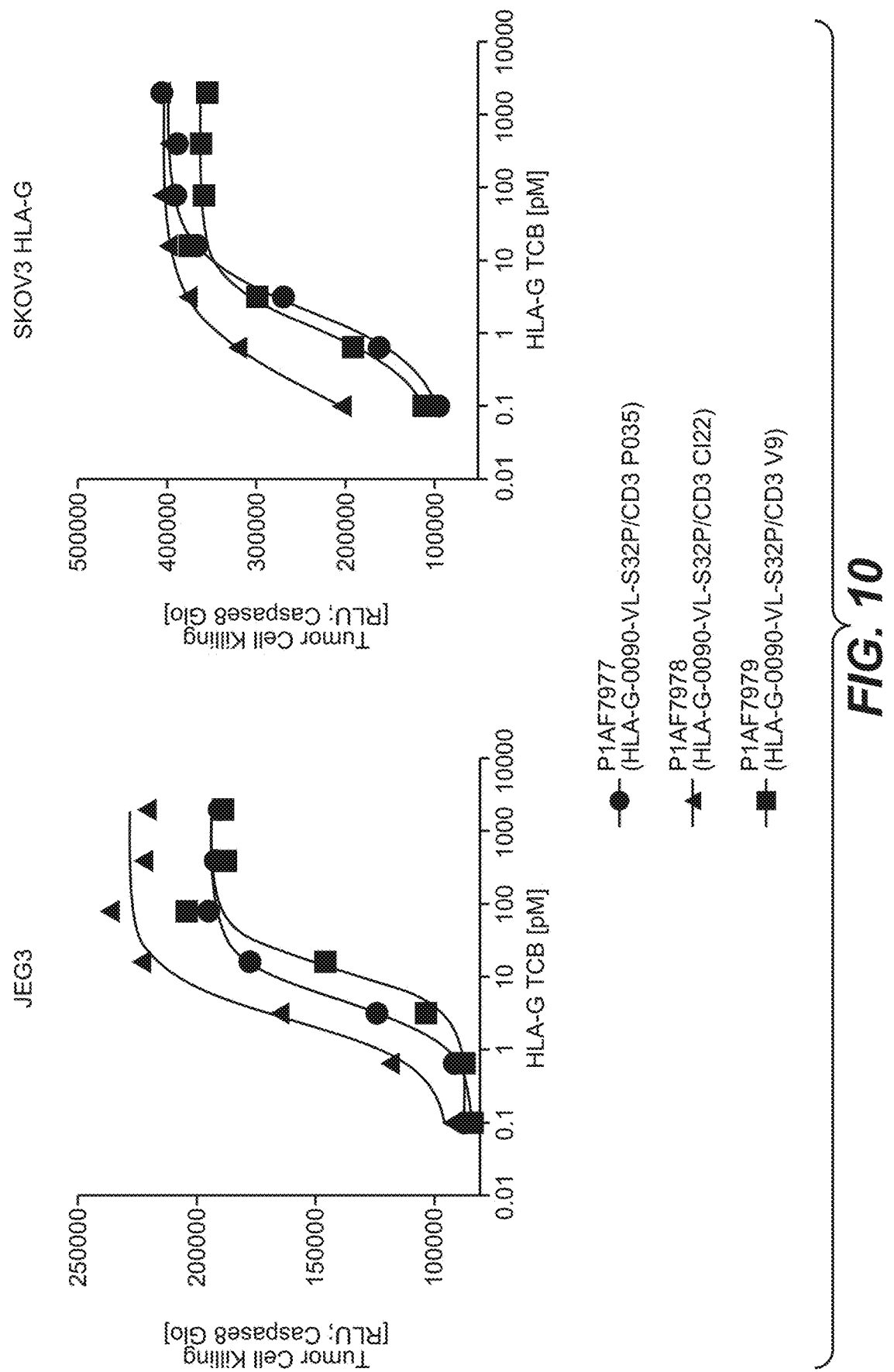
FIG. 10: Bispecific anti-HLA-G/anti-CD3 T cell bispecific (TCB) antibodies P1AF7977, P1AF7978 and P1AF7979 induced T cell mediated cytotoxicity/tumor cell killing.

Ability of anti HLA-G TCB to induce T cell mediated cytotoxicity in the presence of HLA-G expressing tumor cells was tested on SKOV3 cells transfected with recombinant HLA-G (SKOV 3 HLA-G) and JEG3 cells expressing endogenous HLA-G. Cytotoxicity was detected by measuring Caspase 8 activation in cells after treatment with HLA-G TCB. For measurement of Caspase 8 activation after HLA-G/anti-CD3 antibody (TCB) treatment, co-cultures of PBMCs and SKOV3 HLA-G cells or JEG3 cells were incubated with anti-HLA-G TCB for 24 hours and Caspase8 activation was measured using the Caspase8Glo kit (Promega, #G8200). Briefly, PBMCs were isolated from human peripheral blood by density gradient centrifugation using Lymphocyte Separating Medium Tubes (PAN #P04-60125). PBMC's and SKOV3 HLA-G or JEG3 cells were seeded at a ratio of 10:1 (100 µl per well) in black clear bottom 96-well plates. The co-culture was then incubated with HLA-G-TCB at different concentrations as shown in the figure (FIG. 10) and incubated for 24 h or 48 h at 37° C. in an incubator with 5% Co2. On the next day, 100 µl of Caspase8 Glo substrate was added to each well and placed on a shaker for 1 hour at room temperature. The luminescence was measured on a BioTek Synergy 2 machine. The relative luminescence units (RLUs) correspond to the Caspase8 activation/cytotoxicity are plotted in the graph (FIG. 10). Bispecific anti-HLA-G/anti-CD3 (T cell bispecific (TCB)) antibodies P1AF7977 (HLA-G-0090-VL-S32P/CD3 P035); P1AF7978 (HLA-G-0090-VL-S32P/CD3 CI22) and P1AF7979 (HLA-G-0090-VL-S32P/CD3 V9) induced T cell mediated cytotoxicity/tumor cell killing. The EC50 values of the tumor cell killing are listed in the table below.

| T cell mediated cytotoxicity induction $EC_{50}$ (nM) | JEG3 | SKOV3 HLA-G |
|---|---|---|
| P1AF7977 | 12 | 1.4 |
| P1AF7978 | 2.6 | 1.36 |
| P1AF7979 | 4.6 | 1 |

Example 16

In Vivo Anti-Tumor Efficacy of Bispecific Anti-HLA-G/Anti-CD3 (T Cell Bispecific (TCB)) Antibody in Humanized NSG Mice Bearing SKOV3 Human Ovarian Carcinoma Transfected with Recombinant HLA-G (SKOV3 HLA-G)

Figure 11:
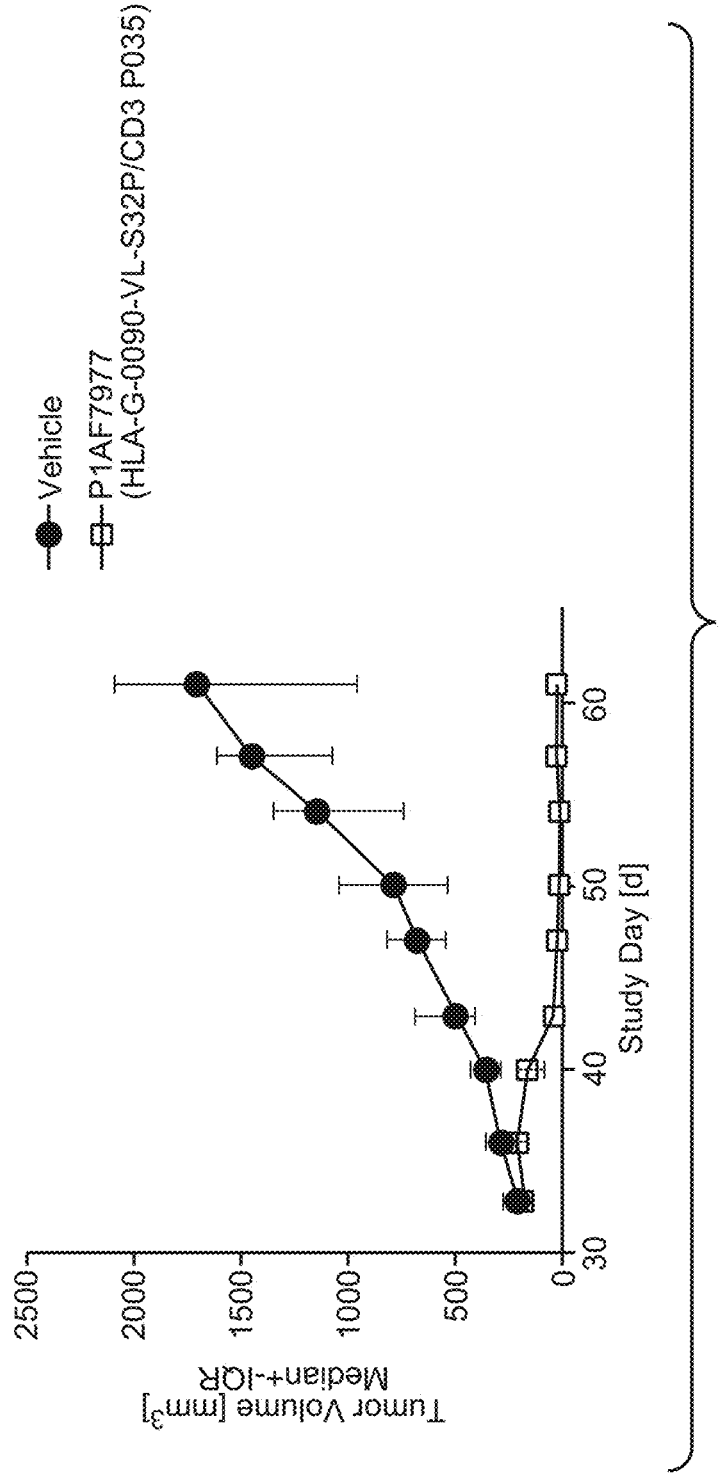
FIG. 11: In vivo anti-tumor efficacy of anti-HLA-G/anti-CD3 T cell bispecific (TCB) antibody P1AF7977 in humanized NSG mice bearing SKOV3 human ovarian carcinoma transfected with recombinant HLA-G (SKOV3 HLA-G), leading to tumor regression.

Humanized NSG (NOD/scid/IL-2Rγnull humanized with CD34+ cord blood cells by Jackson Laboratories, US) mice (n=15) were injected subcutaneously with 5×10⁶ SKOV3 HLA-G cells in a total volume of 100 Once the tumors reached an average volume of 200 mm3, mice were randomized and treated weekly with bispecific anti-HLA-G/anti-CD3 (T cell bispecific (TCB)) antibody (P1AF7977 (HLA-G-0090-VL-S32P/CD3 P035)) (5 mg/kg) weekly. As a control, one group of mice received weekly i.v. injections of histidine buffer (vehicle). Tumor volume was measured twice weekly until study termination. The results of the experiment are shown in FIG. 11. Results show tumor volume data (Median and Inter quartile range (IQR)) measured by caliper in the two study groups. The anti-HLA-G/anti-CD3 T cell bispecific (TCB) antibody P1AF7977 showed strong tumor growth inhibition/tumor regression in the SKOV3-HLA-G tumor model.

Example 17

Dose-Response Study Bispecific Anti-HLA-G/Anti-CD3 (T Cell Bispecific (TCB)) Antibody in Humanized NSG Mice Bearing Human Breast Cancer PDX Tumors (BC004)

Figure 12:
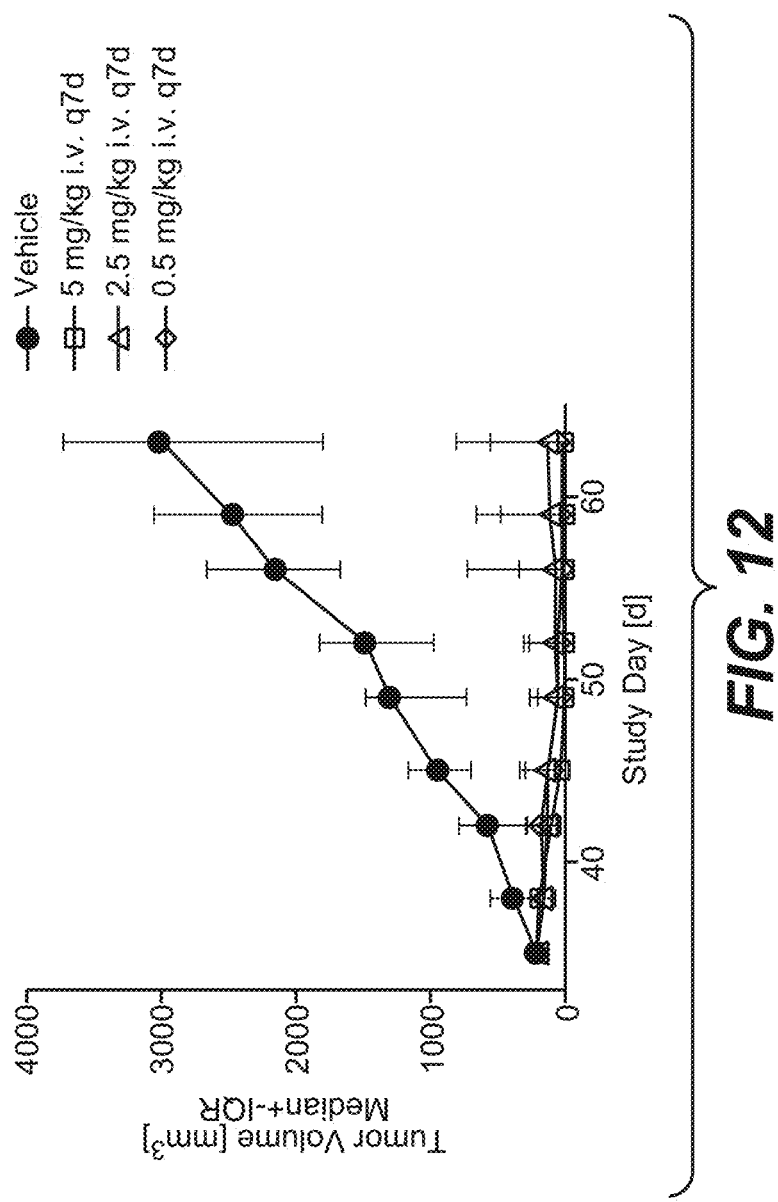
FIG. 12: Dose-response study with anti-HLA-G/anti-CD3 T cell bispecific (TCB) antibody P1AF7977 in humanized NSG mice bearing human breast cancer PDX tumors (BC004). Strong tumor growth inhibition until tumor regression is observed in mice treated with different doses.

Humanized NSG (NOD/scid/IL-2Rγnull humanized by intravenous injection of 1×10⁵ CD34+ cord blood cells per mouse) mice were injected with 2×10⁶ BC004 breast cancer cells in total volume of 50 µL PBS into the intra-mammary fat pad. Once the tumors reached an average volume of approximately 200 mm3, mice were randomized (n=15 animals per group) and treated weekly with bispecific anti-HLA-G/anti-CD3 (T cell bispecific (TCB)) antibody (P1AF7977 (HLA-G-0090-VL-S32P/CD3 P035)) with three different doses (5 mg/kg, 2.5 mg/kg, 0.5 mg/kg). As a control, one group of mice received weekly i.v. injections of histidine buffer (vehicle). Tumor volume was determined twice weekly via caliper measurement. The results of the experiment shown in FIG. 12 demonstrates tumor volume data (Median and Inter quartile range (IQR)). All three doses of anti-HLA-G/anti-CD3 T cell bispecific (TCB) antibody showed strong tumor growth inhibition/tumor regression in the BC004 tumor model. The highest dose (5 mg/kg) shows slightly higher efficacy compared to the 2.5 mg/kg and 0.5 mg/kg treatment groups.

Example 18

Induction of T Cell Activation in the Presence of HLA-G Expressing Tumor Cells was Tested on SKOV3 Cells Transfected with Recombinant HLA-G (SKOV3 HLA-G) by Bispecific Anti-HLA-G/Anti-CD3 Antibody (T Cell Bispecific (TCB) Antibody)

Ability of anti HLA-G/anti CD3 TCB to activate T cells in the presence of HLA-G expressing tumor cells was tested on SKOV3 cells transfected with recombinant HLA-G (SKOV3 HLA-G). Activation of T cells was assessed by FACS analysis of cell surface activation markers CD25 and early activation marker CD69 on T cells. Briefly, Peripheral Blood Mononuclear Cells (PBMCs) are isolated from human peripheral blood by density gradient centrifugation using Lymphocyte Separating Medium Tubes (PAN #P04-

60125). PBMC's and SKOV3 HLA-G cells are seeded at a ratio of 10:1 in 96-well U bottom plates. The co-culture was then incubated with anti-HLA-G/anti-CD3 (T cell bispecific (TCB)) antibody (P1AF7977 (HLA-G-0090-VL-S32P/CD3 P035)) (0.01 nM) and incubated for 24 h at 37° C. in an incubator with 5% Co2. On the next day, expression of CD25 and CD69 was measured by flow cytometry.

For flow cytometry analysis, cells are stained with PerCP-Cy5.5 Mouse Anti-Human CD8 (BD Pharmingen #565310), PE-Cy7 Mouse Anti-Human CD4 (Biolegend #317414), FITC Mouse Anti-Human CD25 (Biolegend #356106) and APC Mouse Anti-Human CD69 (BD Pharmingen #555533) at 4° C. Briefly, antibodies are diluted to a 2-fold concentration and 25 μl of antibody dilution are added in each well with 25 μl of pre-washed co-cultures. Cells are stained for 30 min at 4° C. and washed twice with 200 μl/well staining buffer and centrifugation at 300 g for 5 min. Cell pellets are resuspended in 200 μl of staining buffer and stained with DAPI for live dead discrimination at a final concentration of 2 μg/ml. Samples are then measured using BD LSR flow cytometer. Data analysis was performed using FlowJo V.10.1 software. FIG. 14 shows the induction of T cell activation by bispecific anti-HLA-G/anti-CD3 antibody P1AF7977 (HLA-G-0090-VL-S32P/CD3 P035 in the presence of SKOV3 HLAG cells.

What is claimed is:

1. A bispecific antibody that binds to human HLA-G and human CD3, comprising:
   a first antigen binding moiety that binds to human HLA-G and comprises:
   A) (a) a heavy chain variable (VH) domain comprising (i) heavy chain complementarity determining region (CDR) 1 (CDR-H1) comprising the amino acid sequence of SEQ ID NO:1, (ii) heavy chain CDR 2 (CDR-H2) comprising the amino acid sequence of SEQ ID NO:2, and (iii) heavy chain CDR 3 (CDR-H3) comprising the amino acid sequence of SEQ ID NO:3; and (b) a light chain variable (VL) domain comprising (i) light chain CDR 1 (CDR-L1) comprising the amino acid sequence of SEQ ID NO:23, (ii) light chain CDR 2 (CDR-L2) comprising the amino acid sequence of SEQ ID NO:5, and (iii) light chain CDR 3 (CDR-L3) comprising the amino acid sequence of SEQ ID NO: 6; or
   B) (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:25, (ii) CDR-L2 comprising the amino acid sequence of SEQ ID NO:5, and (iii) CDR-L3 comprising the amino acid sequence of SEQ ID NO:6; and a second antigen binding moiety that binds to human CD3 and comprises:
- C) (a) a VH domain comprising (i) CDR-H1 comprising the amino acid sequence of SEQ ID NO:52, (ii) CDR-H2 comprising the amino acid sequence of SEQ ID NO:53, and (iii) CDR-H3 comprising the amino acid sequence of SEQ ID NO:54; and (b) a VL domain comprising (i) CDR-L1 comprising the amino acid sequence of SEQ ID NO:55, (ii) CDR-L2 comprising the amino acid sequence of SEQ ID NO:56, and (iii) CDR-L3 comprising the amino acid sequence of SEQ ID NO:57;
- D) (a) a VH domain comprising (i) CDR-H1 comprising the amino acid sequence of SEQ ID NO:60, (ii) CDR-H2 comprising the amino acid sequence of SEQ ID NO:61, and (iii) CDR-H3 comprising the amino acid sequence of SEQ ID NO:62; and (b) a VL domain comprising (i) CDR-L1 comprising the amino acid sequence of SEQ ID NO:63, (ii) CDR-L2 comprising the amino acid sequence of SEQ ID NO:64, and (iii) CDR-L3 comprising the amino acid sequence of SEQ ID NO:65; or
- E) (a) a VH domain comprising (i) CDR-H1 comprising the amino acid sequence of SEQ ID NO:68, (ii) CDR-H2 comprising the amino acid sequence of SEQ ID NO:69, and (iii) CDR-H3 comprising the amino acid sequence of SEQ ID NO:70; and (b) a VL domain comprising (i) CDR-L1 comprising the amino acid sequence of SEQ ID NO:71, (ii) CDR-L2 comprising the amino acid sequence of SEQ ID NO:72, and (iii) CDR-L3 comprising the amino acid sequence of SEQ ID NO:73.

2. A bispecific antibody that binds to human HLA-G and human CD3, comprising:
a first antigen binding moiety that binds to human HLA-G and comprises (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23, (ii) CDR-L2 comprising the amino acid sequence of SEQ ID NO:5, and (iii) CDR-L3 comprising the amino acid sequence of SEQ ID NO:6; and
a second antigen binding moiety that binds to human CD3 and comprises (a) a VH domain comprising (i) CDR-H1 comprising the amino acid sequence of SEQ ID NO:52, (ii) CDR-H2 comprising the amino acid sequence of SEQ ID NO:53, and (iii) CDR-H3 comprising the amino acid sequence of SEQ ID NO:54; and (b) a VL domain comprising (i) CDR-L1 comprising the amino acid sequence of SEQ ID NO:55, (ii) CDR-L2 comprising the amino acid sequence of SEQ ID NO:56, and (iii) CDR-L3 comprising the amino acid sequence of SEQ ID NO: 57.

3. The bispecific antibody of claim 1, wherein the first antigen binding moiety comprises:
- A) a VH domain comprising the amino acid sequence of SEQ ID NO:7 and a VL domain comprising the amino acid sequence of SEQ ID NO:24; or
- B) a VH domain comprising the amino acid sequence of SEQ ID NO:7 and a VL domain comprising the amino acid sequence of SEQ ID NO:26, and wherein the second antigen binding moiety comprises:
- C) a VH domain comprising the amino acid sequence of SEQ ID NO:58 and a VL domain comprising the amino acid sequence of SEQ ID NO:59;
- D) a VH domain comprising the amino acid sequence of SEQ ID NO:66 and a VL domain comprising the amino acid sequence of SEQ ID NO:67; or
- E) a VH domain comprising the amino acid sequence of SEQ ID NO:74 and a VL domain comprising the amino acid sequence of SEQ ID NO:75.

4. A bispecific antibody that binds to human HLA-G and human CD3, comprising:
a first antigen binding moiety that binds to human HLA-G and comprises a VH domain comprising the amino acid sequence of SEQ ID NO:7 and a VL domain comprising the amino acid sequence of SEQ ID NO:24; and
a second antigen binding moiety that binds to human CD3 and comprises a VH domain comprising the amino acid sequence of SEQ ID NO:58 and a VL domain comprising the amino acid sequence of SEQ ID NO:59.

5. The bispecific antibody of claim 1, wherein the bispecific antibody shows:
- a) inhibition of ILT2 or ILT4 binding to HLA-G;
- b) antibody-mediated IFN gamma secretion by T cells on
  - i) SKOV3 cells transfected with recombinant HLA-G; or
  - ii) JEG3 cells expressing endogenous HLA-G;
- c) T cell-mediated cytotoxicity or tumor cell killing on
  - i) SKOV3 cells transfected with recombinant HLA-G; or
  - ii) JEG3 cells expressing endogenous HLA-G;
- d) in vivo anti-tumor efficacy or tumor regression in humanized NSG mice bearing SKOV3 human ovarian carcinoma transfected with recombinant HLA-G; or
- e) in vivo anti-tumor efficacy or tumor regression in humanized NSG mice bearing human breast cancer patient-derived xenograft BC004 tumors.

6. One or more isolated nucleic acids encoding the bispecific antibody of claim 1.

7. A host cell comprising the one or more nucleic acids of claim 6.

8. A method of producing the bispecific antibody encoded by the one or more nucleic acids of the host cell of claim 7, comprising culturing the host cell so that the bispecific antibody is produced.

9. The method of claim 8, further comprising recovering the bispecific antibody from the host cell.

10. A pharmaceutical formulation comprising the bispecific antibody of claim 1 and a pharmaceutically acceptable carrier.

11. The bispecific antibody of claim 2, further comprising a third antigen binding moiety that binds to human HLA-G and comprises (a) a VH domain comprising (i) CDR-H1 comprising the amino acid sequence of SEQ ID NO:1, (ii) CDR-H2 comprising the amino acid sequence of SEQ ID NO:2, and (iii) CDR-H3 comprising the amino acid sequence of SEQ ID NO:3; and (b) a VL domain comprising (i) CDR-L1 comprising the amino acid sequence of SEQ ID NO:23, (ii) CDR-L2 comprising the amino acid sequence of SEQ ID NO:5, and (iii) CDR-L3 comprising the amino acid sequence of SEQ ID NO:6.

12. The bispecific antibody of claim 11, wherein the first, the second, and the third antigen binding moieties are each a Fab molecule; wherein each of the three Fab molecules comprises a light chain constant domain (CL) and a heavy chain constant domain 1 (CH1); and wherein the bispecific antibody further comprises an Fc domain comprising a first Fc subunit and a second Fc subunit.

13. The bispecific antibody of claim 12, wherein:
a) the first and the third Fab molecules are each a conventional Fab molecule; and
b) the second Fab molecule is a crossover Fab molecule.

14. The bispecific antibody of claim 13, wherein:
a) the first Fab molecule is fused at the C-terminus of the Fab heavy chain to the N-terminus of the Fab heavy chain of the second Fab molecule, and the second Fab molecule is fused at the C-terminus of the Fab heavy chain to the N-terminus of the first subunit of the Fc domain; and
b) the third Fab molecule is fused at the C-terminus of the Fab heavy chain to the N-terminus of the second subunit of the Fc domain.

15. The bispecific antibody of claim 14, wherein:
a) in the CL of the first and the third Fab molecules,
i) the amino acid at position 123 is substituted by lysine (K), arginine (R), or histidine (H); and
ii) the amino acid at position 124 is substituted by lysine (K), arginine (R), or histidine (H),
wherein the amino acid positions are numbered according to Kabat, and
b) in the CH1 of the first and the third Fab molecules,
iii) the amino acid at position 147 is substituted by glutamic acid (E) or aspartic acid (D); and
iv) the amino acid at position 213 is substituted by glutamic acid (E) or aspartic acid (D),
wherein the amino acid positions are numbered according to the Kabat EU index.

16. The bispecific antibody of claim 15, wherein:
a) in the CL of the first and the third Fab molecules,
i) the amino acid at position 123 is substituted by arginine (R); and
ii) the amino acid at position 124 is substituted by lysine (K),
wherein the amino acid positions are numbered according to Kabat, and
b) in the CH1 of the first and the third Fab molecules,
iii) the amino acid at position 147 is substituted by glutamic acid (E); and
iv) the amino acid at position 213 is substituted by glutamic acid (E),
wherein the amino acid positions are numbered according to the Kabat EU index.

17. The bispecific antibody of claim 16, wherein:
a) in the first subunit of the Fc domain, the amino acid at position 366 is substituted by tryptophan (W); and
b) in the second subunit of the Fc domain, the amino acid at position 366 is substituted by serine(S), the amino acid at position 368 is substituted by alanine (A), and the amino acid at position 407 is substituted by valine (V),
wherein the amino acid positions are numbered according to the Kabat EU index.

18. The bispecific antibody of claim 17, wherein the Fc domain is of the IgG1 isotype.

19. The bispecific antibody of claim 18, wherein in each of the first and the second subunits of the Fc domain:
the amino acid at position 234 is substituted by alanine (A);
the amino acid at position 235 is substituted by alanine (A); and
the amino acid at position 329 is substituted by glycine (G),
wherein the amino acid positions are numbered according to the Kabat EU index.

20. The bispecific antibody of claim 12, wherein the first and the third Fab molecules each comprises a VH domain comprising an amino acid sequence of at least 95% sequence identity to the amino acid sequence of SEQ ID NO:7 and a VL domain comprising an amino acid sequence of at least 95% sequence identity to the amino acid sequence of SEQ ID NO: 24; and
wherein the second Fab molecule comprises a VH domain comprising an amino acid sequence of at least 95% sequence identity to the amino acid sequence of SEQ ID NO:58 and a VL domain comprising an amino acid sequence of at least 95% sequence identity to the amino acid sequence of SEQ ID NO:59.

21. The bispecific antibody of claim 19, wherein the first and the third Fab molecules each comprises a VH domain comprising an amino acid sequence of at least 95% sequence identity to the amino acid sequence of SEQ ID NO:7 and a VL domain comprising an amino acid sequence of at least 95% sequence identity to the amino acid sequence of SEQ ID NO: 24; and
wherein the second Fab molecule comprises a VH domain comprising an amino acid sequence of at least 95% sequence identity to the amino acid sequence of SEQ ID NO:58 and a VL domain comprising an amino acid sequence of at least 95% sequence identity to the amino acid sequence of SEQ ID NO:59.

22. The bispecific antibody of claim 11, wherein the bispecific antibody comprises:
a polypeptide comprising an amino acid sequence that is at least 98% identical to the sequence of SEQ ID NO: 76;
two polypeptides comprising an amino acid sequence that is at least 98% identical to the sequence of SEQ ID NO: 77;
a polypeptide comprising an amino acid sequence that is at least 98% identical to the sequence of SEQ ID NO: 78; and
a polypeptide comprising an amino acid sequence that is at least 98% identical to the sequence of SEQ ID NO: 79.

23. The bispecific antibody of claim 19, wherein the bispecific antibody comprises:
a polypeptide comprising an amino acid sequence that is at least 98% identical to the sequence of SEQ ID NO: 76;
two polypeptides comprising an amino acid sequence that is at least 98% identical to the sequence of SEQ ID NO: 77;
a polypeptide comprising an amino acid sequence that is at least 98% identical to the sequence of SEQ ID NO: 78; and
a polypeptide comprising an amino acid sequence that is at least 98% identical to the sequence of SEQ ID NO: 79.

24. A pharmaceutical formulation comprising the bispecific antibody of claim 11 and a pharmaceutically acceptable carrier.

25. A pharmaceutical formulation comprising the bispecific antibody of claim 19 and a pharmaceutically acceptable carrier.

26. A pharmaceutical formulation comprising the bispecific antibody of claim 20 and a pharmaceutically acceptable carrier.

27. A pharmaceutical formulation comprising the bispecific antibody of claim 21 and a pharmaceutically acceptable carrier.

28. A pharmaceutical formulation comprising the bispecific antibody of claim 22 and a pharmaceutically acceptable carrier.

29. A pharmaceutical formulation comprising the bispecific antibody of claim 23 and a pharmaceutically acceptable carrier.

30. The bispecific antibody of claim 4, further comprising a third antigen binding moiety that binds to human HLA-G and comprises a VH domain comprising the amino acid sequence of SEQ ID NO:7 and a VL domain comprising the amino acid sequence of SEQ ID NO:24.

31. The bispecific antibody of claim 30, wherein the first, the second, and the third antigen binding moieties are each a Fab molecule; wherein each of the three Fab molecules comprises a CL and a CH1; and wherein the bispecific antibody further comprises an Fc domain comprising a first Fc subunit and a second Fc subunit.

32. The bispecific antibody of claim 31, wherein:
a) the first and the third Fab molecules are each a conventional Fab molecule; and
b) the second Fab molecule is a crossover Fab molecule.

33. The bispecific antibody of claim 32, wherein:
a) the first Fab molecule is fused at the C-terminus of the Fab heavy chain to the N-terminus of the Fab heavy chain of the second Fab molecule and the second Fab molecule is fused at the C-terminus of the Fab heavy chain to the N-terminus of the first subunit of the Fc domain; and
b) the third Fab molecule is fused at the C-terminus of the Fab heavy chain to the N-terminus of the second subunit of the Fc domain.

34. The bispecific antibody of claim 33, wherein:
a) in the CL of the first and the third Fab molecules,
i) the amino acid at position 123 is substituted by lysine (K), arginine (R), or histidine (H); and
ii) the amino acid at position 124 is substituted by lysine (K), arginine (R), or histidine (H),
wherein the amino acid positions are numbered according to Kabat, and
b) in the CH1 of the first and the third Fab molecules,
iii) the amino acid at position 147 is substituted by glutamic acid (E) or aspartic acid (D); and
iv) the amino acid at position 213 is substituted by glutamic acid (E) or aspartic acid (D),
wherein the amino acid positions are numbered according to the Kabat EU index.

35. The bispecific antibody of claim 34, wherein:
a) in the CL of the first and the third Fab molecules,
i) the amino acid at position 123 is substituted by arginine (R); and
ii) the amino acid at position 124 is substituted by lysine (K),
wherein the amino acid positions are numbered according to Kabat, and
b) in the CH1 of the first and the third Fab molecules,
iii) the amino acid at position 147 is substituted by glutamic acid (E); and
iv) the amino acid at position 213 is substituted by glutamic acid (E),
wherein the amino acid positions are numbered according to the Kabat EU index.

36. The bispecific antibody of claim 35, wherein:
a) in the first subunit of the Fc domain, the amino acid at position 366 is substituted by tryptophan (W); and
b) in the second subunit of the Fc domain, the amino acid at position 366 is substituted by serine(S), the amino acid at position 368 is substituted by alanine (A), and the amino acid at position 407 is substituted by valine (V),
wherein the amino acid positions are numbered according to the Kabat EU index.

37. The bispecific antibody of claim 36, wherein the Fc domain is of the IgG1 isotype.

38. The bispecific antibody of claim 37, wherein in each of the first and the second subunits of the Fc domain:
the amino acid at position 234 is substituted by alanine (A);
the amino acid at position 235 is substituted by alanine (A); and
the amino acid at position 329 is substituted by glycine (G),
wherein the amino acid positions are numbered according to the Kabat EU index.

39. A bispecific antibody that binds to human HLA-G and human CD3, wherein the bispecific antibody comprises:
a VH domain that binds to human CD3 comprising the amino acid sequence of SEQ ID NO: 58 and a VL domain that binds to human CD3 comprising the amino acid sequence of SEQ ID NO: 59, and
two VH domains that bind to human HLA-G comprising SEQ ID NO: 7 and two VL domains that bind to human HLA-G comprising SEQ ID NO: 24, wherein the bispecific antibody comprises
a polypeptide comprising an amino acid sequence that is at least 98% identical to the sequence of SEQ ID NO: 76, wherein the polypeptide comprises, in an N- to C-terminal direction, the VH domain comprising the amino acid sequence of SEQ ID NO: 58 and a CL domain;
two polypeptides comprising an amino acid sequence that is at least 98% identical to the sequence of SEQ ID NO: 77, wherein each of the two polypeptides comprises, in an N- to C-terminal direction, one of the two VL domains comprising the amino acid sequence of SEQ ID NO: 24 and a CL domain;
a polypeptide comprising an amino acid sequence that is at least 98% identical to the sequence of SEQ ID NO: 78, wherein the polypeptide comprises, in an N- to C-terminal direction, one of the two VH domains comprising the amino acid sequence of SEQ ID NO: 7 and a CH1 domain; and
a polypeptide comprising an amino acid sequence that is at least 98% identical to the sequence of SEQ ID NO: 79, wherein the polypeptide comprises, in an N- to C-terminal direction, one of the two VH domains comprising the amino acid sequence of SEQ ID NO: 7, a CH1 domain, the VL domain comprising the amino acid sequence of SEQ ID NO: 59, and a CH1 domain.

40. A bispecific antibody that binds to human HLA-G and human CD3, wherein the bispecific antibody comprises:
a VH domain that binds to human CD3 comprising the amino acid sequence of SEQ ID NO: 58 and a VL domain that binds to human CD3 comprising the amino acid sequence of SEQ ID NO: 59, and
two VH domains that bind to human HLA-G comprising SEQ ID NO: 7 and two VL domains that bind to human HLA-G comprising SEQ ID NO: 24, wherein the bispecific antibody comprises
a polypeptide comprising an amino acid sequence that is at least 98% identical to the sequence of SEQ ID NO: 76, wherein the polypeptide comprises, in an N- to C-terminal direction, the VH domain comprising the amino acid sequence of SEQ ID NO: 58 and a CL domain;

two polypeptides comprising an amino acid sequence that is at least 98% identical to the sequence of SEQ ID NO: 77, wherein each of the polypeptides chains comprises, in an N- to C-terminal direction, one of the two VL domains comprising the amino acid sequence of SEQ ID NO: 24 and a CL domain, and wherein, in the CL, (i) the amino acid at position 123 is substituted by arginine (R); and (ii) the amino acid at position 124 is substituted by lysine (K), wherein the amino acid positions are numbered according to Kabat;

a polypeptide comprising an amino acid sequence that is at least 98% identical to the sequence of SEQ ID NO: 78, wherein the polypeptide comprises an N- to C-terminal direction, one of the two VH domains comprising the amino acid sequence of SEQ ID NO: 7, a CH1 domain, a CH2 domain and a CH3 domain; wherein, in the CH1 domain, (i) the amino acid at position 147 is substituted by glutamic acid (E); and (ii) the amino acid at position 213 is substituted by glutamic acid (E), wherein the amino acid positions are numbered according to the Kabat EU index; wherein, in the CH3 domain, the amino acid at position 349 is substituted by cysteine (C), the amino acid at position 366 is substituted by serine(S), the amino acid at position 368 is substituted by alanine (A), the amino acid at position 407 is substituted by valine (V);

wherein in the CH2 domain, the amino acid at position 234 is substituted by alanine (A), the amino acid at position 235 is substituted by alanine (A), and the amino acid at position 329 is substituted by glycine (G), wherein the amino acid positions are numbered according to the Kabat EU index; and a polypeptide comprising an amino acid sequence that is at least 98% identical to the sequence of SEQ ID NO: 79, wherein the polypeptide comprises in an N- to C-terminal direction, one of the two VH domains comprising the amino acid sequence of SEQ ID NO: 7, a first CH1 domain, the VL domain comprising the amino acid sequence of SEQ ID NO: 59, a second CH1 domain, a CH2 domain and a CH3 domain; wherein, in the first CH1 domain, (i) the amino acid at position 147 is substituted by glutamic acid (E); and (ii) the amino acid at position 213 is substituted by glutamic acid (E), wherein the amino acid positions are numbered according to the Kabat EU index; wherein, in the CH3 domain, the amino acid at position 354 is substituted by cysteine (C), the amino acid at position 366 is substituted by tryptophan (W); wherein, in the CH2 domain, the amino acid at position 234 is substituted by alanine (A), the amino acid at position 235 is substituted by alanine (A), and the amino acid at position 329 is substituted by glycine (G), wherein the amino acid positions are numbered according to the Kabat EU index.

41. A pharmaceutical formulation comprising the bispecific antibody of claim 30 and a pharmaceutically acceptable carrier.

42. A pharmaceutical formulation comprising the bispecific antibody of claim 38 and a pharmaceutically acceptable carrier.

43. A pharmaceutical formulation comprising the bispecific antibody of claim 39 and a pharmaceutically acceptable carrier.

44. A pharmaceutical formulation comprising the bispecific antibody of claim 40 and a pharmaceutically acceptable carrier.

45. A bispecific antibody that binds to human HLA-G and human CD3, comprising:
A) a polypeptide comprising the amino acid sequence of SEQ ID NO: 76; two polypeptides each comprising the amino acid sequence of SEQ ID NO: 77; a polypeptide comprising the amino acid sequence of SEQ ID NO: 78; and a polypeptide comprising the amino acid sequence of SEQ ID NO: 79;
B) a polypeptide comprising the amino acid sequence of SEQ ID NO: 80; two polypeptides each comprising the amino acid sequence of SEQ ID NO: 81; a polypeptide comprising the amino acid sequence of SEQ ID NO: 82; and a polypeptide comprising the amino acid sequence of SEQ ID NO: 83; or
C) a polypeptide comprising the amino acid sequence of SEQ ID NO: 84; two polypeptides each comprising the amino acid sequence of SEQ ID NO: 85; a polypeptide comprising the amino acid sequence of SEQ ID NO: 86; and a polypeptide comprising the amino acid sequence of SEQ ID NO: 87.

46. A bispecific antibody that binds to human HLA-G and human CD3, comprising:
a polypeptide comprising the amino acid sequence of SEQ ID NO: 76;
two polypeptides each comprising the amino acid sequence of SEQ ID NO: 77;
a polypeptide comprising the amino acid sequence of SEQ ID NO: 78; and
a polypeptide comprising the amino acid sequence of SEQ ID NO: 79.

47. A pharmaceutical formulation comprising the bispecific antibody of claim 46 and a pharmaceutically acceptable carrier.

48. One or more isolated nucleic acids encoding the bispecific antibody of claim 31.

49. One or more isolated nucleic acids encoding the bispecific antibody of claim 19.

50. One or more isolated nucleic acids encoding the bispecific antibody of claim 20.

51. One or more isolated nucleic acids encoding the bispecific antibody of claim 21.

52. One or more isolated nucleic acids encoding the bispecific antibody of claim 22.

53. One or more isolated nucleic acids encoding the bispecific antibody of claim 23.

54. One or more isolated nucleic acids encoding the bispecific antibody of claim 30.

55. One or more isolated nucleic acids encoding the bispecific antibody of claim 38.

56. One or more isolated nucleic acids encoding the bispecific antibody of claim 39.

57. One or more isolated nucleic acids encoding the bispecific antibody of claim 40.

58. One or more isolated nucleic acids encoding the bispecific antibody of claim 46.

59. A host cell comprising the one or more nucleic acids of claim 48.

60. A host cell comprising the one or more nucleic acids of claim 49.

61. A host cell comprising the one or more nucleic acids of claim 50.

62. A host cell comprising the one or more nucleic acids of claim 51.

63. A host cell comprising the one or more nucleic acids of claim 52.

64. A host cell comprising the one or more nucleic acids of claim 53.

65. A host cell comprising the one or more nucleic acids of claim 54.

66. A host cell comprising the one or more nucleic acids of claim 55.

67. A host cell comprising the one or more nucleic acids of claim 56.

68. A host cell comprising the one or more nucleic acids of claim 57.

69. A host cell comprising the one or more nucleic acids of claim 58.

70. A method of producing the bispecific antibody encoded by the one or more nucleic acids of the host cell of claim 59, comprising culturing the host cell so that the bispecific antibody is produced.

71. The method of claim 70, further comprising recovering the bispecific antibody from the host cell.

72. A method of producing the bispecific antibody encoded by the one or more nucleic acids of the host cell of claim 60, comprising culturing the host cell so that the bispecific antibody is produced.

73. The method of claim 72, further comprising recovering the bispecific antibody from the host cell.

74. A method of producing the bispecific antibody encoded by the one or more nucleic acids of the host cell of claim 61, comprising culturing the host cell so that the bispecific antibody is produced.

75. The method of claim 74, further comprising recovering the bispecific antibody from the host cell.

76. A method of producing the bispecific antibody encoded by the one or more nucleic acids of the host cell of claim 62, comprising culturing the host cell so that the bispecific antibody is produced.

77. The method of claim 76, further comprising recovering the bispecific antibody from the host cell.

78. A method of producing the bispecific antibody encoded by the one or more nucleic acids of the host cell of claim 63, comprising culturing the host cell so that the bispecific antibody is produced.

79. The method of claim 78, further comprising recovering the bispecific antibody from the host cell.

80. A method of producing the bispecific antibody encoded by the one or more nucleic acids of the host cell of claim 64, comprising culturing the host cell so that the bispecific antibody is produced.

81. The method of claim 80, further comprising recovering the bispecific antibody from the host cell.

82. A method of producing the bispecific antibody encoded by the one or more nucleic acids of the host cell of claim 65, comprising culturing the host cell so that the bispecific antibody is produced.

83. The method of claim 82, further comprising recovering the bispecific antibody from the host cell.

84. A method of producing the bispecific antibody encoded by the one or more nucleic acids of the host cell of claim 66, comprising culturing the host cell so that the bispecific antibody is produced.

85. The method of claim 84, further comprising recovering the bispecific antibody from the host cell.

86. A method of producing the bispecific antibody encoded by the one or more nucleic acids of the host cell of claim 67, comprising culturing the host cell so that the bispecific antibody is produced.

87. The method of claim 86, further comprising recovering the bispecific antibody from the host cell.

88. A method of producing the bispecific antibody encoded by the one or more nucleic acids of the host cell of claim 68, comprising culturing the host cell so that the bispecific antibody is produced.

89. The method of claim 88, further comprising recovering the bispecific antibody from the host cell.

90. A method of producing the bispecific antibody encoded by the one or more nucleic acids of the host cell of claim 69, comprising culturing the host cell so that the bispecific antibody is produced.

91. The method of claim 90, further comprising recovering the bispecific antibody from the host cell.

\* \* \* \* \*